United States Patent
Litichever et al.

(10) Patent No.: US 11,055,615 B2
(45) Date of Patent: Jul. 6, 2021

(54) SYSTEM AND METHOD FOR USING SIGNAL WAVEFORM ANALYSIS FOR DETECTING A CHANGE IN A WIRED NETWORK

(71) Applicant: Arilou Information Security Technologies Ltd., Ramat-Gan (IL)

(72) Inventors: Gil Litichever, Modiin (IL); Ziv Levi, Nahariya (IL)

(73) Assignee: ARILOU INFORMATION SECURITY TECHNOLOGIES LTD., Ramat-Gan (IL)

(*) Notice: Subject to any disclaimer, the term of this patent is extended or adjusted under 35 U.S.C. 154(b) by 177 days.

(21) Appl. No.: 16/464,307

(22) PCT Filed: Nov. 18, 2017

(86) PCT No.: PCT/IL2017/051259
§ 371 (c)(1),
(2) Date: May 28, 2019

(87) PCT Pub. No.: WO2018/104929
PCT Pub. Date: Jun. 14, 2018

(65) Prior Publication Data
US 2019/0385057 A1    Dec. 19, 2019

Related U.S. Application Data

(60) Provisional application No. 62/430,988, filed on Dec. 7, 2016.

(51) Int. Cl.
*H04L 29/06* (2006.01)
*G06N 3/08* (2006.01)

(52) U.S. Cl.
CPC ........... *G06N 3/08* (2013.01); *H04L 63/1416* (2013.01)

(58) Field of Classification Search
CPC ....... G06N 3/08; H04L 63/1416; H04L 63/14; H04L 29/06; Y04S 40/20; G06F 11/3027;
(Continued)

(56) References Cited

U.S. PATENT DOCUMENTS 5,092,343 A * 3/1992 Spitzer ................. A61B 5/7267
600/515
5,420,963 A    5/1995 Kuwata
(Continued)

FOREIGN PATENT DOCUMENTS

WO    2016/115280 A1    7/2016
WO    2017/013622       1/2017

OTHER PUBLICATIONS

CS 595D Presentation by Kathy Macropol, "Clustering on Graphs: The Markov Cluster Algorithm", (downloaded Dec. 2016) (46 pages).
(Continued)

*Primary Examiner* — Khoi V Le
(74) *Attorney, Agent, or Firm* — May Patents Ltd.

(57) ABSTRACT

An analyzer for monitoring a configuration of a wired network medium that is used for communication between multiple devices. The configuration change includes an additional device tapping to the medium for eavesdropping, or the substituting one of the devices. The analyzer is connected to the medium for receiving, storing, and analyzing waveforms of the physical-layer signals propagated over the medium. The analysis includes comparing the received signals to reference signals, and notifying upon detecting a difference according to pre-set criteria. The analysis may be time or frequency-domain based, and may use a feed-forward Artificial Neural Network (ANN). The wired network may be an automotive or in-vehicle network, PAN, LAN, MAN, or WAN, may use balanced or unbalanced signaling, and may be configured as point-to-point or multi-
(Continued)

point topology. The analyzer may be connected at an end of the medium, and may be integrated with one of the devices.

74 Claims, 38 Drawing Sheets

(58) Field of Classification Search
CPC .. G06F 11/30; G06F 11/3006; G06F 11/3051; G05B 19/042
See application file for complete search history.

(56) References Cited

U.S. PATENT DOCUMENTS

| | | | |
|---|---|---|---|
| 5,751,911 | A | 5/1998 | Goldman |
| 5,832,218 | A | 11/1998 | Gibbs et al. |
| 6,018,728 | A | 1/2000 | Spence et al. |
| 6,038,337 | A | 3/2000 | Lawrence et al. |
| 6,081,832 | A | 6/2000 | Gilchrist et al. |
| 6,694,316 | B1 | 2/2004 | Langseth et al. |
| 7,010,050 | B2 | 3/2006 | Maryanka |
| 7,091,876 | B2 | 8/2006 | Steger |
| 7,136,482 | B2 | 11/2006 | Wille |
| 7,136,901 | B2 | 11/2006 | Chung et al. |
| 7,334,001 | B2 | 2/2008 | Eichstaedt et al. |
| 7,557,689 | B2 | 7/2009 | Seddigh et al. |
| 7,653,573 | B2 | 1/2010 | Hayes, Jr. et al. |
| 7,752,672 | B2 | 7/2010 | Karam et al. |
| 7,818,383 | B2 | 10/2010 | Kodama |
| 8,213,321 | B2 | 7/2012 | Butts et al. |
| 8,345,984 | B2 | 1/2013 | Ji et al. |
| 8,375,221 | B2 | 2/2013 | Booth |
| 8,521,671 | B2 | 8/2013 | Moore |
| 8,705,849 | B2 | 4/2014 | Prokhorov |
| 8,898,093 | B1 | 11/2014 | Helmsen |
| 8,955,130 | B1 | 2/2015 | Kalintsev et al. |
| 8,972,589 | B2 | 3/2015 | Roese et al. |
| 9,172,635 | B2 | 10/2015 | Kim et al. |
| 9,230,550 | B2 | 1/2016 | Hosom et al. |
| 9,280,501 | B2 | 3/2016 | Hopfner |
| 9,297,721 | B2 | 3/2016 | Bertosa et al. |
| 9,330,045 | B2 | 5/2016 | Muth |
| 9,361,178 | B2 | 6/2016 | Hartwich et al. |
| 9,401,923 | B2 | 7/2016 | Valasek et al. |
| 9,450,911 | B2 | 9/2016 | Cha et al. |
| 9,471,528 | B2 | 10/2016 | Muth |
| 9,600,372 | B2 | 3/2017 | Jiang et al. |
| 9,616,828 | B2 | 4/2017 | Ben Noon et al. |
| 9,652,423 | B2 | 5/2017 | Monroe et al. |
| 9,661,006 | B2 | 5/2017 | Kantor et al. |
| 2006/0123133 | A1* | 6/2006 | Hrastar ............... H04L 63/1491 709/238 |
| 2006/0161984 | A1* | 7/2006 | Phillips ................ G06F 21/564 726/24 |
| 2007/0182421 | A1 | 8/2007 | Janke et al. |
| 2007/0214095 | A1 | 9/2007 | Adams et al. |
| 2007/0256337 | A1 | 11/2007 | Segan |
| 2008/0258913 | A1 | 10/2008 | Busey |
| 2009/0024759 | A1 | 1/2009 | McKibben et al. |
| 2009/0235354 | A1 | 9/2009 | Gray |
| 2010/0318794 | A1 | 12/2010 | Dierickx |
| 2011/0243214 | A1 | 10/2011 | Wolcott et al. |
| 2014/0070613 | A1 | 3/2014 | Garb et al. |
| 2014/0159877 | A1 | 6/2014 | Huang |
| 2014/0215491 | A1 | 7/2014 | Addepalli et al. |
| 2014/0380416 | A1 | 12/2014 | Adachi |
| 2015/0020152 | A1 | 1/2015 | Litichever et al. |
| 2015/0066239 | A1 | 3/2015 | Mabuchi |
| 2015/0071115 | A1 | 3/2015 | Neff et al. |
| 2015/0106314 | A1 | 4/2015 | Birdwell et al. |
| 2015/0195297 | A1 | 7/2015 | Ben Noon et al. |
| 2015/0271201 | A1 | 9/2015 | Ruvio et al. |
| 2015/0317475 | A1* | 11/2015 | Aguayo Gonzalez .. G06F 21/55 726/23 |
| 2016/0116520 | A1* | 4/2016 | Di Stefano ........ G01R 31/1245 702/58 |
| 2016/0149934 | A1 | 5/2016 | Frank et al. |
| 2016/0328642 | A1 | 11/2016 | Himebaugh et al. |
| 2016/0381055 | A1 | 12/2016 | Galula et al. |
| 2016/0381059 | A1 | 12/2016 | Galula et al. |
| 2017/0093659 | A1 | 3/2017 | Elend et al. |
| 2017/0230385 | A1 | 8/2017 | Ruvio et al. |
| 2018/0007074 | A1* | 1/2018 | Kune ..................... G06F 21/56 |

OTHER PUBLICATIONS

Belden Inc., 'Category 7 Nonbonded-Pair ScTP Cable' Part No. 1885ENC, dated Nov. 10, 2016 (5 pages).
Lite-On Electronics, Inc., Publication BNS-OD-C131/A4 downloaded Mar. 2011 (6 pages).
Belden Inc., 'Cat 5e Unjacketed MSHA Data Tuff® 24 AWG Solid BC, PO/PVC/PVC, CMR, CMX-Outdoor' Part No. 11700A, dated Nov. 10, 2016 (5 pages).
Electronic Industries Alliance (EIA) in ANSI/TIA/EIA-568-B.2-2001 entitled: "Part 2: Balanced Twisted-Pair Cabling Components" standard published May 2001 (160 pages).
Karl Koscher, Alexei Czeskis, Franziska Roesner, Shwetak Patel, and Tadayoshi Kohno, "Experimental Security Analysis of a Modern Automobile", 2010 IEEE Symposium on Security and Privacy (16 pages).
'Natural Speech & Complex Sound Synthesizer', User's Manual Revision 1.0 Jul. 27, 2004 (17 pages).
Datasheet DocID15724 Rev. 9, "STM32F105xx STM32F107xx", Sep. 2015 (107 pages).
YMF721 OPL4-ML2 FM + Wavetable Synthesizer LSI available from Yamaha Corporation described in YMF721 Catalog No. LSI-4MF721A20, Jul. 10, 1997 (41 pages).
Freescale Semiconductor, Inc. Application Note, Document No. AN4255 entitled: "FFT-Based Algorithm for Metering Applications", Rev.4, Jul. 2015 (43 pages).
Maxim Integrated Products, Inc. Application Note 1796: "Overview of 1-Wire Technology and Its Use", published 2013 (13 pages).
Thesis by Alexey Petrenko, "Detecting physical layer attacks on Ethernet networks", presented by the Helsinki Metropolia University of Applied Sciences, Degree Programme in Information Technology dated Oct. 8, 2015 (72 pages).
Controller Bachelor Project No. DA-2016-06 by Roar Elias Georgsen entitled: "Machine Learning Based Intrusion Detection in Controller Area Networks", published by the University College of Southeast Norway, May 19, 2016 (43 pages).
SAE J1939 Surface Vehicle Recommended Practice entitled: "Recommended Practice for a Serial Control and Communication Vehicle Network", issued on Apr. 2000 (257 pages).
SAE J1939-01 Surface Vehicle Standard entitled: "Recommended Practice for Control and Communication Network for On-Highway Equipment", Sep. 2000 (7 pages).
SAE International Surface Vehicle Standard J1979 entitled: "E/E Diagnostic Test Modes", Apr. 2002 (97 pages).
Part No. 1505A, Belden Inc., Publication entitled: '1505A Coax—RG-59/U Type' Revision No. 10 Date Jun. 17, 2016 (4 pages).
"Technical Handbook & Catalog" Twelfth Edition published 2006 by Standard Wire & Cable Co. (299 pages).
SAE J1939-74 Surface Vehicle Recommended Practice entitled: "Application—Configurable Messaging", Sep. 2004 (36 pages).
SAE J1939-75 Surface Vehicle Recommended Practice entitled: "Application Layer—Generator Sets and Industrial", Dec. 2002 (37 pages).
SAE J1939-11 Surface Vehicle Recommended Practice entitled: "Physical Layer, 250K basis, Twisted Shielded Pair", issued on Dec. 1994 (31 pages).
SAE J1939-15 Surface Vehicle Recommended Practice entitled: "Reduced Physical Layer, 250K bits/s, Un-Shielded Twisted Pair (UTP)", issued on Nov. 2003 (19 pages).
SAE J1939-21 Surface Vehicle Recommended Practice entitled: "Data Link Layer", Jul. 1994 (47 pages).
SAE J1939-31 Surface Vehicle Recommended Practice entitled: "Network Layer", Dec. 1994 (27 pages).
SAE J1939-81 Surface Vehicle Recommended Practice entitled: "Network Management", Jul. 1997 (39 pages).

(56) References Cited

OTHER PUBLICATIONS

SAE J1939-71 Surface Vehicle Recommended Practice entitled: "Vehicle Application Layer (through Dec. 2004)", Aug. 1994 (686 pages).
SAE J1939-73 Surface Vehicle Recommended Practice entitled: "Application Layer—Diagnostics", Feb. 1996 (158 pages).
Book published 2005 by Pearson Education, Inc. William Stallings [ISBN: 0-13-191835-4] "Wireless Communications and Networks—second Edition" (569 pages).
Telecom Regulatory Authority, "WiFi Technology", published on Jul. 2003 (60 pages).
Bluetooth SIG published Dec. 2, 2014 standard Covered Core Package version: 4.2, "Master Table of Contents & Compliance Requirements—Specification vol. 0" (2772 pages).
Carles Gomez et al., "Overview and Evaluation of Bluetooth Low Energy: An Emerging Low-Power Wireless Technology", published 2012 in Sensors [ISSN 1424-8220] [Sensors 2012, 12, 11734-11753; doi:10.3390/s120211734] (20 pages).
ECMA International white paper Ecma/TC32-TG19/2005/012 "Near Field Communication—White paper" (12 pages).
Rohde&Schwarz White Paper 1MA182_4e "Near Field Communication (NFC) Technology and Measurements White Paper", (26 pages).
Jan Kremer Consulting Services (JKCS) white paper "NFC—Near Field Communication—White paper" (44 pages).
Book by Wikipedia entitled: "Electronics" downloaded from en.wikibooks.org dated Mar. 15, 2015 (401 pages).
'4749R Coax—Low Loss Serial Digital Coax' Part No. 4794R, Belden Inc., Publication entitled: '4749R Coax—Low Loss Serial Digital Coax' Revision No. 1 Date Jul. 15, 2016 (3 pages).
National Semiconductors Corporation Application Note 806, entitled: "Data Transmission Lines and Their Characteristics", (No. AN011336, dated Apr. 1992) (7 pages).
National Semiconductors Corporation Application Note 807, entitled: "Reflections: Computations and Waveforms", (No. AN011337, dated Mar. 1992) (25 pages).
National Semiconductors Corporation Application Note 808, entitled: "Long Transmission Lines and Data Signal Quality", (No. AN011338, dated Mar. 1992) (23 pages).
ON Semiconductor® Publication No. AND9075/D entitled: "Understanding Data Eye Diagram Methodology for Analyzing High Speed Digital Signal", Jun. 2015 (7 pages).
NXP Semiconductors N.V. user manual document No. UM10204 Rev. 6 released Apr. 4, 2014, entitled: "UM10204-I²C-bus specification and user manual" (64 pages).
Renesas Application Note AN0303011/Rev1.00 (Sep. 2003) entitled: "Serial Peripheral Interface (SPI) & Inter-IC (IC2) (SPI_I2C)" (14 pages).
Embedded Systems and Systems Software 55:036 presentation (downloaded Jul. 2015) entitled: "Serial Interconnect Buses—I2C (SMB) and SPI" (7 pages).
CES 466 presentation (downloaded Jul. 2015) entitled: "Serial Peripheral Interface" (29 pages).
Microchip presentation (downloaded Jul. 2015) entitled: "SPI™—Overview and Use of the PICmicro Serial Peripheral Interface" (46 pages).
National Semiconductor Application Note 1031 publication AN012598 dated Jan. 2000, titled: "TIA/EIA-422-B Overview" (7 pages).
B&B Electronics publication "RS-422 and RS-485 Application Note" dated Jun. 2006 (43 pages).
National Semiconductor Application Note 1057 publication AN012882 dated Oct. 1996 and titled: "Ten ways to Bulletproof RS-485 Interfaces" (10 pages).
Maxim Integrated Products, Inc. of Sunnyvale, Calif., U.S.A., Data Sheet "±15kV ESD-Protected, 10Mbps, 3V/5V, Quad RS-422/RS-485 Receivers" publication No. 19-0498 Rev.1 10/00 (14 pages).
Maxim Integrated Products, Inc. of Sunnyvale, Calif., U.S.A., Data sheet "±15kV ESD-Protected, 3.3V Quad RS-422 Transmitters" publication No. 19-2671 Rev.0 10/02 (12 pages).

ISO 11898-5:2007 entitled: "Road vehicles—Controller area network (CAN)—Part 5: High-speed medium access unit with low-power mode" (28 pages).
Book authored by Owen Bishop entitled: "Electronics—Circuits and Systems" Fourth Edition, published 2011 by Elsevier Ltd. [ISBN—978-0-08-096634-2] (381 pages).
Data Sheet "Fail-Safe, High-Speed (10Mbps), Slew-Rate-Limited RS-485/RS-422 Transceivers" publication No. 19-1138 Rev.3 12/05 (20 pages).
Cisco Systems, Inc. Publication No. 1-587005-001-3 (6/99), "Internetworking Technologies Handbook", Chapter 7: "Ethernet Technologies", pp. 7-1 to 7-38 (38 pages).
Chapter 20: "Wireless Technologies" of the publication No. 1-587005-001-3 by Cisco Systems, Inc. (7/99) "Internetworking Technologies Handbook" (42 pages).
Robert Bosch GmbH, "Bosch Automotive Electric and Automotive Electronics" (5th Edition, Jul. 2007) [ISBN—978-3-658-01783-5] (530 pages).
Vineet P. Aras of the Department of Electrical Engineering, Indian Institute of Technology Bombay, "Design of Electronic Control Unit (ECU) for Automobiles—Electronic Engine Management system", M. Tech. Project first stage report (EE696) dated Jul. 2004 (51 pages).
National Instruments paper entitled: "ECU Designing and Testing using National Instruments Products", published Nov. 7, 2009 (9 pages).
Brochure by Sensor-Technik Wiedemann GmbH (headquartered in Kaufbeuren, Germany) entitled "Control System Electronics", dated Mar. 4, 2011 (20 pages).
Data Sheet Document No. MPC5748G Rev. 2 entitled: "MPC5748 Microcontroller Datasheet", Freescale Semiconductor, Inc. (headquartered in Tokyo, Japan) May 2014 (67 pages).
OSEK/VDX NM Concept & API 2.5.2 entitled: "Open Systems and the Corresponding Interfaces for Automotive Electronics—Network Management—Concept and Application Programming Interface", Version 2.5.3, Jul. 26, 2004 (139 pages).
ISO 14230-1:2012 entitled: "Road vehicles—Diagnostic communication over K-Line (DoK-Line)—Part 1: Physical layer" (12 pages).
ISO 14230-2:2013 entitled: "Road vehicles—Diagnostic communication over K-Line (DoK-Line)—Part 2: Data link layer" (28 pages).
ISO 14230-4:2000 entitled: "Road vehicles—Diagnostic systems—Keyword Protocol 2000—Part 4: Requirements for emission-related systems" (10 pages).
AUTOSAR consortium entitled: "Release 4.2 Overview and Revision History", Release 4.2.2 released Jan. 31, 2015 (47 pages).
Texas Instrument Application Report No. SLOA101A entitled: "Introduction to the Controller Area Network (CAN)" (15 pages).
ISO 11898-2:2003 entitled: "Road vehicles—Controller area network (CAN)—Part 2: High-speed medium access unit" (26 pages).
ISO 11992-1:2003 entitled: "Road vehicles—Interchange of digital information on electrical connections between towing and towed vehicles—Part 1: Physical and data-link layer" (28 pages).
ISO 11898-4:2004 entitled: "Road vehicles—Controller area network (CAN)—Part 4: Time-triggered communication" (40 pages).
SAE J2411_200002 entitled: "Single Wire Can Network for Vehicle Applications", issued on Feb. 2000 (33 pages).
ISO 9141 "LIN Specification Package—Revision 2.2A" by the LIN Consortium (dated Dec. 31, 2010) (194 pages).
Product data sheet entitled: "TJA1080A FlexRay Transceiver—Rev. 6—Nov. 28, 2012 — Product data sheet", (ocument Identifier TJA1080A, date of release: Nov. 28, 2012 (49 pages).
Application Note AA-1123 (AN10035-0-2/12(0) Rev. 0) entitled: "Controller Area Network (CAN) Implementation Guide—by Dr. Conal Watterson", Analog Devices, Inc., published 2012 (16 pages).
Product Data Sheet entitled: "TJA1055 Enhanced fault-tolerant CAN transceiver—Rev. 5—Dec. 6, 2013—Product data sheet", (document Identifier TJA1055, date of release: Dec. 6, 2013) (26 pages).

(56) References Cited

OTHER PUBLICATIONS

Product data sheet entitled: "TJA1044 High-speed CAN transceiver with Standby mode—Rev. 4—Jul. 10, 2015—Product data sheet", (document Identifier TJA1055, date of release: Dec. 6, 2013) (22 pages).
Lorenz, Steffen entitled: "The FlexRay Electrical Physical Layer Evolution", Carl Hanser Verlag Gmbh 2010 publication (Automotive 2010) (6 pages).
National Instruments Corporation Technical Overview Publication entitled: "FlexRay Automotive Communication Bus Overview", Aug. 21, 2009 (8 pages).
A specification entitled: "CAN with Flexible Data-Rate", by Robert Bosch GmbH, Version 1.0, released on Apr. 17, 2012 (34 pages).
Automation article by Florian Hatwich entitled: "Bit Time Requirements for CAN FD" (6 pages).
Automation article by Florian Hatwich entitled: "Can with Flexible Data-Rate" (9 pages).
National Instruments article entitled: "Understanding CAN with Flexible Data-Rate (CAN FD)", published Aug. 1, 2014 (2 pages).
Application Note AN4389 (document No. DocD025493 Rev 2) entitled: "SPC57472/SPC57EM80 Getting Started", published 2014 (53 pages).
Data Sheet DS20005284A entitled: "MCP2561/2FD—High-Speed CAN Flexible Data Rate Transceiver", published 2014 [ISBN—978-1-63276-020-3] (32 pages).
Data-Sheet Document No. MC33689 Rev. 8.0 entitled: "System Basis Chip with LIN Transceiver", dated Sep. 2012 (31 pages).
Franzis Verlag Gmbh, edited by Prof. Dr. Ing. Andreas Grzemba, entitled: "MOST—The Automotive Multimedia Network—From MOST25 to MOST 150", [ISBN—978-3-645-65061-8] published 2011 (337 pages).
MOST Dynamic Specification by MOST Cooperation Rev. 3.0.2 entitled: "MOST—Multimedia and Control Networking Technology", dated Oct. 2012 (82 pages).
MOST Specification Rev. 3.0 E2 by MOST Cooperation, dated Jul. 2010 (262 pages).
Data Sheet DS00001935A OS81118 entitled: "MOST150 INIC with USB 2.0 Device Port", Microchip Technology Incorporated, published 2015 (2 pages).
Data Sheet PFL_OS8104A_V01_00_XX-4.fm entitled: "MOST Network Interface Controller", by Microchip Technology Incorporated, published Aug. 2007 (2 pages).
FlexRay consortium publication entitled: "FlexRay Communications System—Protocol Specification—Version 3.0.1", Oct. 2010 (341 pages).
David Kriesel, "A Brief Introduction to Neural Networks" (ZETA2-EN) [downloaded May 2015 from www.dkriesel.com] (244 pages).
Final Technical Report No. RL-TR-94-150, Dennis Tebbe et al., "Neural Network Communications Signal Processing", published by Rome Laboratory, Aug. 1994 (128 pages).
Howard Demuth and Mark Beale, "Neural Network ToolBox—for Use with MATLAB®", User's Guide Version 4 published by the MathWorks, Inc., Jul. 2002 (840 pages).
Agilent Technologies Application Note 243 [5952-8898E] entitled: "The Fundamentals of Signal Processing", 2000 (68 pages).
Lectures Notes entitled: "EE 261—The Fourier Transform and its Applications" by Prof. Brad Osgood of the Electrical Engineering Department, Stanford University, downloaded from the Internet on Nov. 2016 (428 pages).
Agilent Technologies Application Note 150 [5952-0292] entitled: "Spectrum Analysis Basics", Feb. 25, 2014 (89 pages).
OPTi 82C931 'Plug and Play Integrated Audio Controller', described in Data Book 912-3000-035 Revision: 2.1, published on Aug. 1, 1997 (64 pages).
Data-sheet "Programmable Single-/Dual-/Triple—Tone Gong, SAE 800, Siemens semiconductor Group, 09.94" (14 pages).
Data sheet "36 Melody Music Generator", Holtek HT3834 CMOS VLSI Integrated Circuit (IC), available from Holtek Semiconductor Inc., Rev. 1.00 dated Nov. 2, 2006 (16 pages).
Data-sheet Multi Color LED Part No. 08L5015RGBC, by RSR Electronics, Inc. from NJ, U.S.A. (2 pages).
MIL-STD-1553B, by the Department of Defense of U.S.A."Aircraft Internal Time Division Command / Response Multiplex Data Bus", dated Sep. 21, 1978 (44 pages).
AIM Gmbh tutorial v2.3, "MIL-STD-1553 Tutorial", Nov. 2010 (82 pages).
Avionics Interface Technologies Doc. No. 40100001 (downloaded from the Internet on Nov. 2016) entitled: "ARINC 429 Protocol Tutorial" (28 pages).
ARINC Specification 429 prepared by Airlines Electronic Engineering Committee, entitled: "Mark 33 Digital Information Transfer System (DITS)—Part 1—Functional Description, Electrical Interface, Label Assignments and Word Formats", published May 17, 2004 by Aeronautical Radio, Inc. (309 pages).
Actel Corporation (headquartered in Mountain-View, California, USA), Document No. 51700055-5/9.06 "ARINC 429 Bus Interface", Sep. 2006 (22 pages).
Data Sheet No. 19-6425; Rev 2; 1/15 (2015) by Maxim Integrated Products, Inc. entitled: "DS1339A—Low-Current, I2C, Serial Real-Time Clock" (19 pages).
Tutorial 5791 by Maxim Integrated Products, Inc. entitled: "Tips for Writing Bulletproof Real-Time Clock Control Code", dated Mar 28, 2014 (7 pages).
Cisco Systems, Inc. (7/99), publication No. 1-587005-001-3, "Internetworking Technologies Handbook" Chapter 5: "Routing Basics" (pp. 5-1 to 5-10) (5 pages).
Cisco Systems, Inc. (7/99), publication No. 1-587005-001-3, "Internetworking Technologies Handbook" Chapter 30: "Internet Protocols" (pp. 30-1 to 30-16) (16 pages).
Cisco Systems, Inc. (7/99), publication No. 1-587005-001-3, "Internetworking Technologies Handbook" Chapter 32: "IPv6" (pp. 32-1 to 32-6) (6 pages).
Cisco Systems, Inc. (7/99), publication No. 1-587005-001-3, "Internetworking Technologies Handbook" Chapter 45: "OSI Routing" (pp. 45-1 to 45-8) (8 pages).
Cisco Systems, Inc. (7/99), publication No. 1-587005-001-3, "Internetworking Technologies Handbook" Chapter 51: "Security" (pp. 51-1 to 51-12) (12 pages).
IIBM Corporation, International Technical Support Organization Redbook Documents No. SG24-4756-00, "Local Area Network Concepts and Products: LAN Operation Systems and Management", 1st Edition May 1996 (216 pages).
IBM Corporation, International Technical Support Organization Redbook Document No. GG24-4338-00, "Introduction to Networking Technologies", 1st Edition Apr. 1994 (220 pages).
IBM Corporation, International Technical Support Organization Redbook Document No. SG24-2580-01 "IP Network Design Guide", 2nd Edition Jun. 1999 (324 pages).
IBM Corporation, International Technical Support Organization Redbook Document No. GG24-3376-07 "TCP/IP Tutorial and Technical Overview", ISBN 0738494682 8th Edition Dec. 2006 (1004 pages).
Paul S. Wang and Sanda Katila, "An Introduction to Web Design + Programming" (Brooks / Cole book / Dec. 24, 2003) (717 pages).
Thesis by Tim van Lokven, "Review and Comparison of Instant Messaging Protocols", Jan. 23, 2011 (52 pages).
Paul Heckbert, "Fourier Transforms and the Fast Fourier Transform (FFT) Algorithm", Feb. 1995 (Revised Jan. 27, 1998) [Notes 3, Computer Graphics 2, 15-463] (13 pages).
3GPP technical specification 3GPP TS 23.140, "3rd Generation Partnership Project; Technical Specification Group Core Network and Terminals; Multimedia Messaging Service (MMS); Functional description; Stage 2 (Release 6)", (V6.16.0, Mar. 2009) (224 pages).
American Majority organization entitled:"facebook—A Beginner's Guide", retrieved Oct. 2015 from http://cmrw.org/ (28 pages).
Guide by Twitter, Inc., entitled: "Twitter for Small Business—A Guide to Get Started", retrieved Oct. 2015 from https://g.twimg.com/business/pdfs/Twitter_Smallbiz_Guide.pdf (22 pages).
Karen Church and Rodrigo de Oliveira, "What's up with WhatsApp? Comparing Mobile Instant—Messaging Behaviors with Traditional SMS", published (Aug. 30, 2013) on Mobile HCI 2013—Collaboration and Communication (10 pages).

(56) References Cited

OTHER PUBLICATIONS

IETF RFC 5598 entitled: "Internet Mail Architecture", Jul. 2009 (40 pages).
IETF RFC 5321 entitled: "Simple Mail Transfer Protocol", Oct. 2008 (95 pages).
IETF RFC 7504 entitled: "SMTP 521 and 556 Reply Codes", Jun. 2015 (7 pages).
Craig Partridge, "The technical Development of Internet Mail", IEEE Annals of the History of Computing paper published 2008 by the IEEE Computer Society [1058-6180/08] (27 pages).
'Pocket Consultant' book [ISBN: 978-0-7356-8168-2] entitled: "Microsoft Exchange Server 2013—Configuration & Clients", published 2013 by Microsoft Press (384 pages).
IETF RFC 1939 entitled: "Post Office Protocol", May 1996 (23 pages).
IETF RFC 2449 entitled: "POP3 Extension Mechanism", Nov. 1998 (19 pages).
IETF RFC 1734 entitled: "POP3 AUTHentication command", Dec. 1994 (5 pages).
IETF RFC 3501 entitled: "Internet Message Access Protocol—Version 4rev1", Mar. 2003 (108 pages).
IETF RFC 4314 entitled: "IMAP4 Access Control List (ACL) Extension", Dec. 2005 (27 pages).
IETF RFC 6914 entitled: "Simple Made Simple: An Overview of the IETF Specifications for Instant Messaging and Presence Using the Session Initiation Protocol (SIP)", Apr. 2013 (15 pages).
Data sheet "PF226-04" EPSON 7910 series 'Multi-Melody IC' available from Seiko-Epson Corporation, Electronic Devices Marketing Division located in Tokyo, Japan, dated 1998 (5 pages).
"Chapter 1: Mass Storage basics", downloaded Oct. 2011 from: http://www.lvr.com/files/usb_mass_storage_chapter_1.pdf (24 pages).
White Paper "Blu-ray Disc Format, 4. Key Technologies", by Blu-ray Disc Founders, Aug. 2004 (8 pages).
Brochure entitled: "Blu-ray Technology—DISCover the infinite storage media", by DISC Archiving Systems B.V., 2010 (2 pages).
Whitepaper entitled: "Sustainable Archival Storage—The Benefits of Optical Archiving", by DISC Archiving Systems B. V., downloaded from www.disc-group.com (17 pages).
Mehedi Hasan, "Hard-Disk Basics", compiled from pcguide.com, Feb. 12, 2005 (738 pages).
International Search Report of PCT/IL2017/051259 dated May 2, 2018.
Martin B., Dell entitled: "DELL Solid State Disk (SSD) Drive—Storage Solutions for Select Poweredge Server", May 2009 (7 pages).
Janukowicz J., Reisel D., "MLC Solid State Drives: Accelerating the Adoption of SSDs", IDC #213730, Sep. 2008 (11 pages).
Dufrasne B., Blum K, Dubberke U., IBM Corp. Redbooks Redpaper entitled: "DS8000: Introducing Solid State Drives" (2009) (20 pages).
3GPP Technical Specification 3GPP TS 22.011 (v143.0.0, Sep. 2015) entitled: "3rd Generation Partnership Project; Technical Specification Group Services and System Aspects; Service accessibility (Release 14)".
Simon Haykin entitled: "Neural Networks and Learning Machines—Third Edition", published by Pearson Education, Inc. 2009 [ISBN—978-0-13-147139-9] (938 pages).
Juan A. Ramirez-Quintana, Mario I. Cacon-Murguia, and F. Chacon-Hinojos, "Artificial Neural Image Processing Applications: A Survey", an article in Engineering Letters, 20:1, EL_20_1_09 (Advance online publication: Feb. 27, 2012) (13 pages).
M. Egmont-Petersen, D. de Ridder, and H. Handels, "Image processing with neural networks—a review", by Pattern Recognition Society in Pattern Recognition 35 (2002) 2279-2301 (23 pages).
Dick de Ridder et al. (of the Utrecht University, Utrecht, The Netherlands), "Nonlinear image processing using artificial neural networks" (87 pages).
Christian Szegedy, Alexander Toshev, and Dumitru Erhan, "Deep Neural Networks for Object Detection", of Google, Inc. (downloaded Jul. 2015) (9 pages).

Dumitru Erhan, Christian Szegedy, Alexander Toshev, and Dragomir Anguelov (of Google, Inc., Mountain-View, California, U.S.A.), "Scalable Object Detection using Deep Neural Networks", a CVPR2014 paper provided by the Computer Vision Foundation (downloaded Jul. 2015) (8 pages).
Shawn McCann and Jim Reesman (both of Stanford University), "Object Detection using Convolutional Neural Networks" (downloaded Jul. 2015) (5 pages).
Mehdi Ebady Manaa, Nawfal Turki Obies, and Dr. Tawfiq A. Al-Assadi (of Department of Computer Science, Babylon University), "Object Classification using neural networks with Gray-level Co-occurrence Matrices (GLCM)", (downloaded Jul. 2015) (9 pages).
Yuhua Zheng et al. "Object Recognition using Neural Networks with Bottom-Up and top-Down Pathways" (downloaded Jul. 2015) (13 pages).
Technical report No. IDSIA-01-11 by Dan C. Ciresan et al. entitled: "High-Performance Neural Networks for Visual Object Classification", Jan. 2011 published by IDSIA/USI-SUPSI (12 pages).
Karen Simonyan, Andrea Vedaldi, and Andrew Zisserman (all of Visual Geometry Group, University of Oxford), "Deep Inside Convolutional Networks: Visualising Image Classification Models and Saliency Maps" Apr. 19, 2014 (downloaded Jul. 2015) (8 pages).
presentation entitled: "Introduction to on Board Diagnostics (II)" downloaded on Nov. 2012 from: http://groups.engin.umd.umich.edu/vi/w2_workshops/OBD_ganesan_w2.pdf (148 pages).
Charu C. Aggarwal and Chandan K. Reddy, "Data Clustering—Algorithms and Applications", published by CRC Press—Taylor & Francis Group, LLC [ISBN—978-1-4665-5822-9], 2014 (648 pages).
Society of Automotive Engineers (SAE) J1962 standard, Diagnostic Connector Equivalent to ISO/DIS, Jan. 1995 (8 pages).
Society of Automotive Engineers (SAE) J1850 standard, Implementing the J1850 Protocol (15 pages).
ISO 15765-3 standard entitled: "Road vehicles—Diagnostics on Controller Area Networks (CAN)", Oct. 15, 2004 (100 pages).
Maxim Integrated Products, Inc. Data Sheet (Rev. 4; 8/09) entitled: "S9090 Evaluation Kit—Evaluates: 1-Wire EEPROM, EPROM, and ROM Devices" (9 pages).
The manual "80186/80188 High-Integration 16-Bit Microprocessors" by Intel Corporation (34 pages).
The manual "MC68360 Quad Integrated Communications Controller—User's Manual" by Motorola, Inc. (962 pages).
Data sheet [DS-TM4C123GH6PM-15842.2741, SPMS376E, Revision 15842.2741 Jun. 2014], "Tiva™ TM4C123GH6PM Microcontroller—Data Sheet", published 2015 by Texas Instruments Incorporated (1409 pages).
Maxim Integrated Products, Inc. of Sunnyvale, Calif., U.S.A., Data Sheet "±15 kV ESD-Protected, +5V RS-232 Transceivers" publication No. 19-0175 Rev.6 Mar. 2005 (26 pages).
White paper document No. 915-3510-01 Rev. A, "Automotive Ethernet: An Overview", published by Ixia, May 2014 (20 pages).
Charles M. Kozierok, Colt Correa, Robert B. Boatright, and Jeffrey Quesnelle, "Automotive Ethernet: The Definitive Guide", published by Interpid Control Systems, 2014 [ISBN-13: 978-0-9905388-0-6] (207 pages).
ISO 17356-3 standard entitled: "Part 3: OSEK/VDX Operating System (OS)", (First edition, Nov. 1, 2005) (7 pages).
Texas Instruments Incorporated (Headquartered in Dallas, Texas, U.S.A.), Datasheet SLLS557G, "SN65HVD23x 3.3-V CAN Bus Transceivers", Nov. 2002—Revised Jan. 2015 (35 pages).
Dr. Bernd Korber, "BroadR-Reach® Definitions for Communication Channel—Version 2.0", published by the OPEN Alliance, Nov. 28, 2014 (40 pages).
Checkoway, Damon McCoy, Brian Kantor, Danny Anderson, Hovav Shacham, and Stefan Savage Stephen, "Comprehensive Experimental Analyses of Automotive Attack Surfaces", 2011 (16 pages).
Handbook "Data Acquisition Handbook—A Reference for DAQ and Analog & Digital Signal Conditioning", Measurement Computing Corporation, published 2004-2012 (145 pages).
Book entitled: "Practical Design Techniques for Sensor Signal Conditioning", by Analog Devices, Inc., 1999 (ISBN-0-916550-20-6) (366 pages).

(56) References Cited

OTHER PUBLICATIONS

ISO 17356-1 standard entitled: "Part 1: General structure and terms, definitions and abbreviated terms", (First edition, Jan. 15, 2005) (26 pages).
Standard Microsystems Corporation (SMSC) data-sheet "LAN91C111 10/100 Non-PCI Ethernet Single Chip MAC + PHY" Data-Sheet, Rev. 15 (Feb. 20, 2004) (127 pages).
Data Sheet DocID022930 Rev. 6 entitled: "SPBT2632C1A—Bluetooth® technology class-1 module", dated Apr. 2015 (27 pages).
ISO 17356-2 standard entitled: "Part 2: OSEK/VDX specifications for binding OS, COM and NM", (First edition, May 1, 2005) (8 pages).

\* cited by examiner

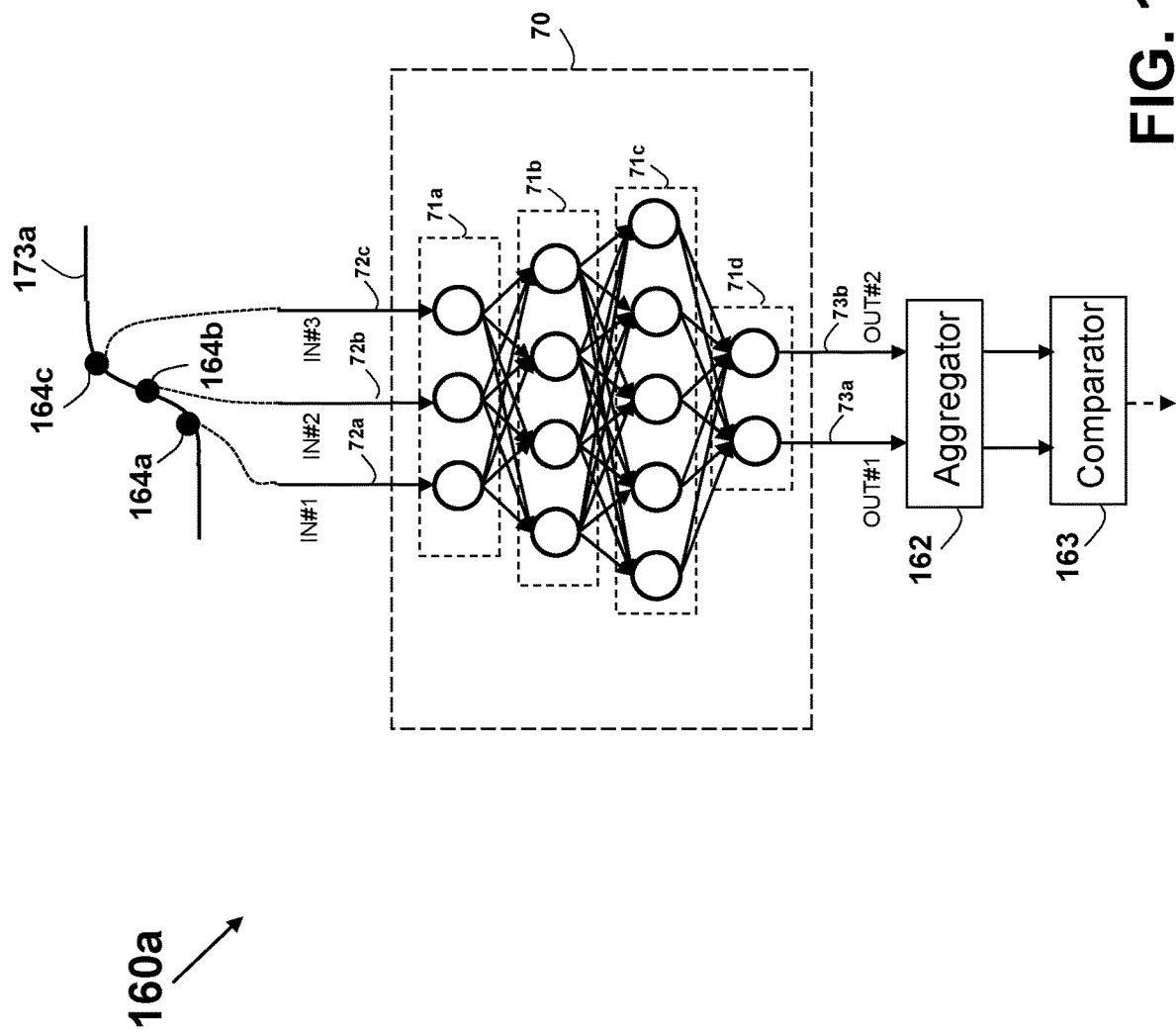

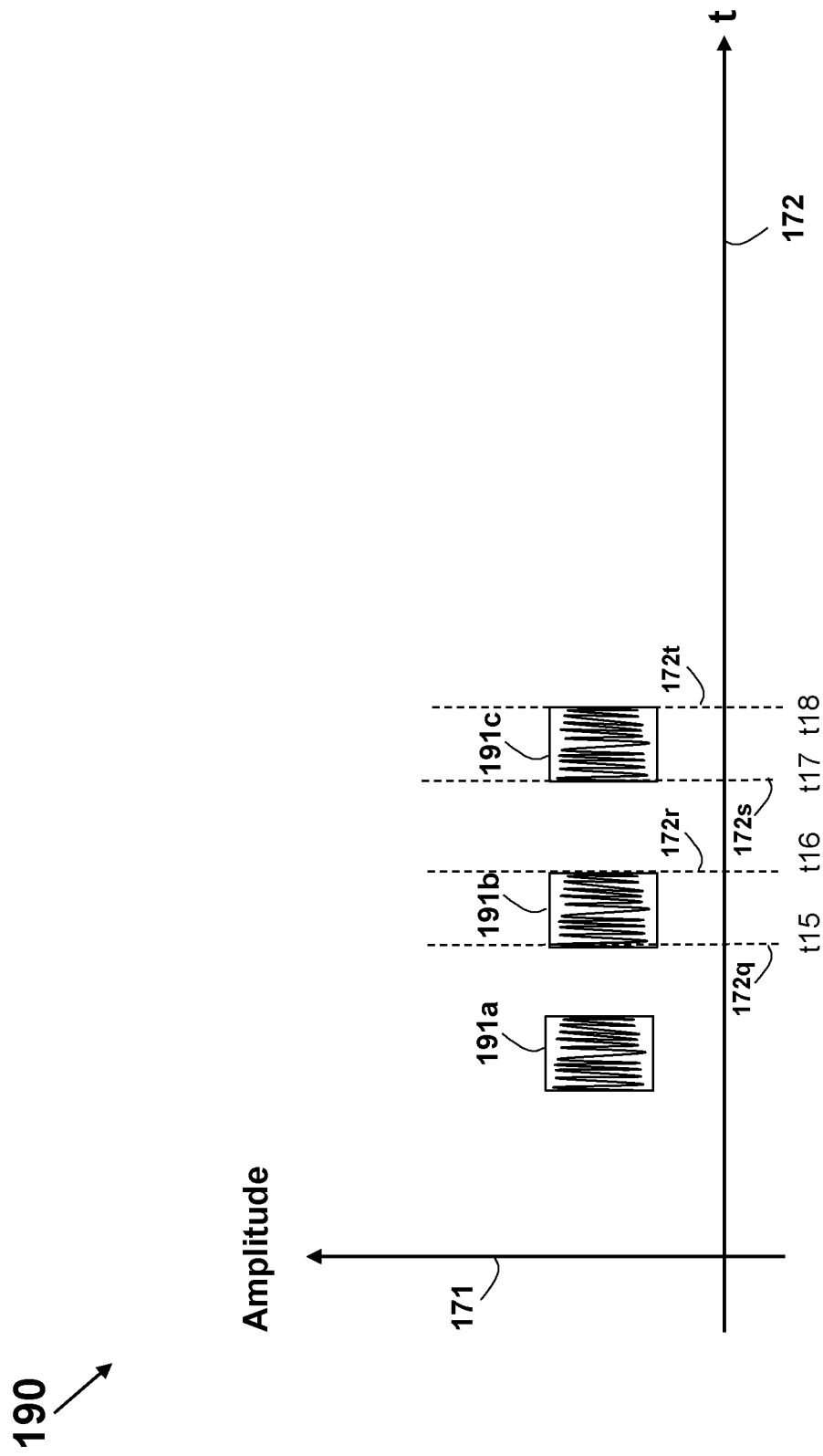

230

|  | ID1 | ID2 | ID3 | ID4 | ID5 | ID6 |
|---|---|---|---|---|---|---|
| ID1 | X | | | | | |
| ID2 | 97% | X | | | | |
| ID3 | 90% | 96% | X | | | |
| ID4 | 50% | 94% | 96% | X | | |
| ID5 | 98% | 60% | 95% | 99% | X | |
| ID6 | 89% | 55% | 96% | 97% | 51% | X |

|     | ID1 | ID2 | ID3 | ID4 | ID5 | ID6 |
|-----|-----|-----|-----|-----|-----|-----|
| ID1 | X   |     |     |     |     |     |
| ID2 | 97% | X   |     |     |     |     |
| ID3 | 90% | 96% | X   |     |     |     |
| ID4 | 50% | 94% | 96% | X   |     |     |
| ID5 | 98% | 60% | 95% | 99% | X   |     |
| ID6 | 89% | 55% | 96% | 97% | 51% | X   |

FIG. 23a

|     | ID1 | ID2 | ID3 | ID4 | ID5 | ID6 |
|-----|-----|-----|-----|-----|-----|-----|
| ID1 | X   |     |     |     |     |     |
| ID2 | 97% | X   |     |     |     |     |
| ID3 | 90% |     | X   |     |     |     |
| ID4 | 50% |     |     | X   |     |     |
| ID5 | 98% |     |     |     | X   |     |
| ID6 | 89% |     |     |     |     | X   |

FIG. 23b

|  | ID1+<br>ID4 | ID2 | ID3 | ID5 | ID6 |
|---|---|---|---|---|---|
| ID1 | X |  |  |  |  |
| ID2 | 97% | X |  |  |  |
| ID3 | 90% | 96% | X |  |  |
| ID5 | 98% | 60% |  | X |  |
| ID6 | 89% | 55% |  |  | X |

SYSTEM AND METHOD FOR USING SIGNAL WAVEFORM ANALYSIS FOR DETECTING A CHANGE IN A WIRED NETWORK

RELATED APPLICATIONS

This patent application is a national phase application of a PCT Application No. PCT/IL2017/051259 that was filed on Nov. 18, 2017 and which claims the benefit of U.S. Provisional Application Ser. No. 62/430,988 that was filed on Dec. 7, 2016, which are hereby incorporated herein by reference.

TECHNICAL FIELD

This disclosure relates generally to an apparatus and method for monitoring, isolating, and securing activity of a wired network by physical layer analyzing of a received signal waveform, and in particular, to detect by the waveform analysis of a change in the wired network, such as connection of an authorized device or an unauthorized substitution of a device communicating over the network.

BACKGROUND

Unless otherwise indicated herein, the materials described in this section are not prior art to the claims in this application, and are not admitted to be prior art by inclusion in this section.

Physical layer (PHY). The Open Systems Interconnection (OSI) model, which is defined by the International Organization for Standardization (ISO) and is maintained by the identification ISO/IEC 7498-1, includes seven-layers. The physical layer or layer 1 is the first and lowest layer. The physical layer consists of the basic networking hardware for transmission technologies of a network. It is a fundamental layer underlying the logical data structures of the higher level functions in a network. The physical layer defines the electrical and physical specifications of the data connection. It defines the relationship between a device and a physical transmission medium (e.g., a copper or fiber optical cable and radio frequency). This includes the layout of pins, voltages, line impedance, cable specifications, signal timing and similar characteristics for connected devices and frequency (5 GHz or 2.4 GHz etc.) for wireless devices. It is responsible for transmission and reception of unstructured raw data in a physical medium. It may define transmission mode as simplex, half-duplex, and full duplex. It further defines the network topology as bus, mesh, or ring being some of the most common.

The physical layer defines the means of transmitting raw bits rather than logical data packets over a physical link connecting network nodes. The bit stream may be grouped into code words or symbols and converted to a physical signal that is transmitted over a hardware transmission medium. The physical layer provides an electrical, mechanical, and procedural interface to the transmission medium. The major functions and services performed by the physical layer are bit-by-bit or symbol-by-symbol delivery, providing a standardized interface to physical transmission media, including mechanical specification of electrical connectors and cables, for example maximum cable length, electrical specification of transmission line signal level and impedance, radio interface, including electromagnetic spectrum frequency allocation and specification of signal strength, analog bandwidth, modulation, line coding, bit synchronization in synchronous serial communication, start-stop signaling and flow control in asynchronous serial communication, circuit switching, multiplexing, establishment and termination of circuit switched connections, carrier sense and collision detection (utilized by some level 2 multiple access protocols), equalization filtering, training sequences, pulse shaping and other signal processing of physical signals, forward error correction, bit-interleaving and other channel coding. The physical layer is also concerned with bit rate, point-to-point, multipoint or point-to-multipoint line configuration, physical network topology, for example bus, ring, mesh or star network, serial or parallel communication, simplex, half duplex or full duplex transmission mode, and auto-negotiation.

Medium. In a communication network, multiple devices or stations that implement some part of the communication protocol are communicating over a transmission medium, which is a transmission path along which a signal propagates, such as a wire pair, coaxial cable, waveguide, optical fiber, or radio path. Such a medium may include any material substance, such as fiber-optic cable, twisted-wire pair, coaxial cable, dielectric-slab waveguide, water, and air, which can be used for the propagation of signals, usually in the form of modulated radio, light, or acoustic waves, from one point to another. A free space is typically also considered as a transmission medium for electromagnetic waves, although it is not a material medium. A medium that consists of a specialized cable or other structure designed to carry alternating current of radio frequency, that is, currents with a frequency high enough that their wave nature must be taken into account, is referred to as a transmission line. Transmission lines are commonly used for purposes such as connecting radio transmitters and receivers with their antennas.

The transfer of information such as the digital data between two nodes in a network commonly makes use of a line driver for transmitting the signal to the conductors serving as the transmission medium connecting the two nodes, and a line receiver for receiving the transmitted signal from the transmission medium. The communication may use a proprietary interface or preferably an industry standard, which typically defines the electrical signal characteristics such as voltage level, signaling rate, timing and slew rate of signals, voltage withstanding levels, short-circuit behavior, and maximum load capacitance. Further, the industry standard may define the interface mechanical characteristics such as the pluggable connectors and pin identification and pin-out. In one example, the module circuit can use an industry or other standard used for interfacing serial binary data signals. Preferably, the line drivers, the line receivers, and their associated circuitry will be protected against Electro-Static Discharge (ESD), electromagnetic interference (EMI/EMC) and against faults (fault-protected), and employs proper termination, failsafe scheme and supports live insertion. Preferably, a point-to-point connection scheme is used, wherein a single line driver is communicating with a single line receiver. However, multi-drop or multi-point configurations may as well be used. Further, the line driver and the line receiver may be integrated into a single IC (Integrated Circuit), commonly known as transceiver IC. A device that transmits data to a medium typically uses a line driver, which commonly includes an electronic amplifier as part of a circuit designed for a load such as a transmission line, and preferably optimized to the medium used. The output impedance of the amplifier typically matches the characteristic impedance of the transmission line. The line driver typically converts the logic levels used by the module internal digital logic circuits (e.g., CMOS, TTL, LSTTL and HCMOS) to a signal to be transmitted over the medium. At the receiving device, a line receiver is used which typically converts the received signal to the logic levels used by the module internal digital logic circuits (e.g., CMOS, TTL, LSTTL and HCMOS). A set of a line driver and a line receiver is commonly referred to as, or is part of, a transceiver (transmitter+receiver), and is used in nodes that both transmits digital data to the medium and receives digital data from the medium. In the case where the signal over the medium is modulated, a modem (a MOdulator-DEModulator) device is used, which encodes digital information onto an analog carrier signal by varying their amplitude, frequency, or phase of that carrier. The demodulator extracts digital information from a similarly modified carrier. A modem transforms digital signals into a form suitable for transmission over an analog medium.

Wire. An electrical wire is a single, usually cylindrical, flexible strand or rod of metal, typically for carrying electricity and telecommunications signals. Wire is commonly formed by drawing the metal through a hole in a die or draw plate, and wire gauges come in various standard sizes, as expressed in terms of a gauge number. Wire comes in solid core, stranded, or braided forms. Although usually circular in cross-section, wire can be made in square, hexagonal, flattened rectangular, or other cross-sections, either for decorative purposes, or for technical purposes such as high-efficiency voice coils in loudspeakers. A wire pair consists of two like conductors employed to form or serve an electric circuit.

Cable. An electrical cable is an assembly of one or more insulated conductors, or optical fibers, or a combination of both, within an enveloping jacket, where the conductors or fibers may be used singly or in groups. A typical electrical cable is made of two or more wires running side by side and bonded, twisted, or braided together to form a single assembly, the ends of which can be connected to two devices, enabling the transfer of electrical signals from one device to the other.

Wireline. Wireline or wired network uses conductors, typically metallic wire conductors, as the transmission medium. The transmission mediums used in common wirelines include twisted-pair, coaxial cable, stripline, and microstrip. Microstrip is a type of electrical transmission line, which can be fabricated using printed circuit board technology, and is used to convey microwave-frequency signals. It consists of a conducting strip separated from a ground plane by a dielectric layer known as the substrate. Microwave components such as antennas, couplers, filters, power dividers etc. can be formed from microstrip, with the entire device existing as the pattern of metallization on the substrate. A stripline circuit uses a flat strip of metal, which is sandwiched between two parallel ground planes, where the insulating material of the substrate forms a dielectric. The width of the strip, the thickness of the substrate and the relative permittivity of the substrate determine the characteristic impedance of the strip, which is a transmission line. Various cables are described in "Technical Handbook & Catalog" Twelfth Edition published 2006 by Standard Wire & Cable Co., which is incorporated in its entirety for all purposes as if fully set forth herein.

Twisted pair. A twisted wire pair is a pair of individually insulated conductors (or wires) twisted together and treated as an entity in the transmission of electrical signals or power. A twisted-pair is usually composed of two individually insulated solid or stranded conductors (or wires). Because the wires are twisted together, interfering signals tend to create opposing electromagnetic forces at frequent intervals, reducing the effect of the interference on the signal or power supply voltage being conducted. In balanced pair operation, also known as differential mode transmission, the two wires carry equal and opposite signals and the destination detects the difference between the two. Noise sources introduce signals into the wires by coupling of electric or magnetic fields and tend to couple to both wires equally. The noise thus produces a common-mode signal, which is canceled at the receiver when the difference signal is taken. Balanced twisted wire pairs are standardized under Telecommunications Industry Standard (TIA) that is part of the Electronic Industries Alliance (EIA) in ANSI/TIA/EIA-568-B.2-2001 entitled: "*Part 2: Balanced Twisted-Pair Cabling Components*" standard published May 2001, which is incorporated in its entirety for all purposes as if fully set forth herein.

Unshielded Twisted Pair (UTP). An Unshielded Twisted Pair (UTP) cable, used extensively in telephone networks and in many data communications applications, is not surrounded by any shielding. Common indoor UTP cables are used for Ethernet, and are typically made with copper wires measured at 22 or 24 American Wire Gauge (AWG), with the colored insulation typically made from an insulator such as polyethylene or FEP and the total package covered in a polyethylene jacket. For urban outdoor telephone cables containing hundreds or thousands of pairs, the cable is divided into smaller but identical bundles. Each bundle consists of twisted pairs that have different twist rates. The bundles are in turn twisted together to make up the cable. Pairs having the same twist rate within the cable can still experience some degree of crosstalk.

Shielded Twisted Pair (STP). Twisted-pair cables are often shielded in an attempt to prevent electromagnetic interference. Shielding provides an electrically conductive barrier to attenuate electromagnetic waves external to the shield, and provides a conduction path by which induced currents can be circulated and returned to the source, via ground reference connection. This shielding can be applied to individual pairs or quads, or to the collection of pairs. Individual pairs are foiled, while overall cable may use braided screen, foil, or braiding with foil. When shielding is applied to the collection of pairs, this is usually referred to as screening, but different vendors and authors use "screening", "shielding", and "STP" inconsistently to denote various shielded cable types. International Organization for Standardization (ISO) and the International Electrotechnical Commission (IEC) ISO/IEC 11801:2002 Standard internationally standardize the various designations for shielded cables by using combinations of three letters—U for unshielded, S for braided shielding (in outer layer only), and F for foiled shielding—to explicitly indicate the type of screen for overall cable protection and for individual pairs or quads, using a two-part abbreviation in the form of x/xTP. Because the shielding is made of metal, it may also serve as a ground. Usually a shielded twisted pair cable has a special grounding wire added called a drain wire which is electrically connected to the shield or screen. The drain wire simplifies connection to ground at the connectors.

Common shield construction types used include Individual shield (U/FTP), also known as pair in metal foil, shielded twisted pair, and screened twisted pair, where individual shielding with aluminum foil for each twisted pair or quad. This type of shielding protects cable from external EMI entering or exiting the cable and further protects neighboring pairs from crosstalk. Overall shield (F/UTP, S/UTP, and SF/UTP) cables, also known as foiled twisted pair, shielded twisted pair, and screened twisted pair, include overall foil, braided shield or braiding with foil across all of the pairs within the 100 ohm twisted pair cable. This type of shielding helps prevent EMI from entering or exiting the cable. Individual and overall shield (F/FTP, S/FTP, and SF/FTP) cables, also known as fully shielded twisted pair, screened foiled twisted pair, shielded foiled twisted pair, screened shielded twisted pair, and shielded screened twisted pair, use individual shielding using foil between the twisted pair sets, and also an outer foil and/or braided shielding. This type of shielding helps prevent EMI from entering or exiting the cable and further protects neighboring pairs from crosstalk. International standard ISO/IEC 11801—"*Information technology—Generic cabling for customer premises*" specifies general-purpose telecommunication cabling systems (structured cabling) that are suitable for a wide range of applications (analog and ISDN telephony, various data communication standards, building control systems, factory automation). It covers both balanced copper cabling and optical-fibre cabling, categorized to include Category 3, Category 5, Category 5e, Category 6, Category 6A, Category 7, Category 7A, Category 8.1, and Category 8.2. An example of Category 5e cable is 'Cat 5e Unjacketed MSHA Data Tuff® 24 AWG Solid BC, PO/PVC/PVC, CMR, CMX-Outdoor' Part Number 11700A available from Belden Inc. (headquartered in St. Louis, Mo., United States) and described in Belden Inc. Publication Part #PF_11700A dated Nov. 10, 2016, which is incorporated in its entirety for all purposes as if fully set forth herein. An example of Category 7 cable is 'Category 7 Nonbonded-Pair ScTP Cable' Part Number 1885ENC available from Belden Inc. and described in Belden Inc. Publication Part #PF_1885ENC dated Nov. 10, 2016, which is incorporated in its entirety for all purposes as if fully set forth herein.

Coaxial cable. A coaxial cable is a cable that consists of a center conductor surrounded by an insulating material and a concentric outer conductor and optional protective covering, all of circular cross-section. Coaxial cables are used primarily for CATV and other wideband, video, or RF applications. A coaxial cable typically has an inner conductor surrounded by a tubular insulating layer, surrounded by a tubular conducting shield. Many coaxial cables also have an insulating outer sheath or jacket. The term 'coaxial' comes from the inner conductor and the outer shield sharing a geometric axis. Coaxial cable differs from other shielded cable used for carrying lower-frequency signals, in that the dimensions of the cable are controlled to give a precise, constant conductor spacing, which is needed for it to function efficiently as a transmission line.

Coaxial cable conducts electrical signal using an inner conductor (usually a solid copper, stranded copper or copper plated steel wire) surrounded by an insulating layer and all enclosed by a shield, typically one to four layers of woven metallic braid and metallic tape. The cable is protected by an outer insulating jacket. Normally, the shield is kept at ground potential and a signal carrying voltage is applied to the center conductor. The advantage of coaxial design is that electric and magnetic fields are restricted to the dielectric with little leakage outside the shield. Larger diameter cables and cables with multiple shields have less leakage. This property makes coaxial cable a good choice for carrying weak signals that cannot tolerate interference from the environment or for stronger electrical signals that are not allowed to radiate or couple into adjacent structures or circuits.

The characteristic impedance of the cable is determined by the dielectric constant of the inner insulator and the radii of the inner and outer conductors. A controlled cable characteristic impedance is important because the source and load impedance should be matched to ensure maximum power transfer and minimum standing wave ratio. Other important properties of coaxial cable include attenuation as a function of frequency, voltage handling capability, and shield quality. Dielectric material used are commonly foamed polyethylene (FPE), solid polyethylene (PE), polyethylene foam (PF), polytetrafluoroethylene (PTFE), and air space polyethylene (ASP). An example of a coaxial cable is '4749R Coax—Low Loss Serial Digital Coax' Part Number 4794R available from Belden Inc. and described in Belden Inc. Publication entitled: '4749R Coax—Low Loss Serial Digital Coax' Revision Number: 1 Date Jul. 15, 2016, which is incorporated in its entirety for all purposes as if fully set forth herein. Another example of a RG-59/U type coaxial cable is '1505A Coax—RG-59/U Type' Part Number 1505A available from Belden Inc. and described in Belden Inc. Publication entitled: '1505A Coax—RG-59/U Type' Revision Number: 10 Date Jun. 17, 2016, which is incorporated in its entirety for all purposes as if fully set forth herein.

Topology. A wired network is defined by the specific physical arrangement of the elements (nodes) connected to a network, although the networks may differ in physical interconnections, distances between nodes, transmission rates, and/or signal types. Network topology is the arrangement of the various elements (links, nodes, etc.) of a computer network. Essentially, it is the topological structure of a network and may be depicted physically or logically. Physical topology is the placement of the various components of a network, including device location and cable installation, while logical topology illustrates how data flows within a network, regardless of its physical design. Distances between nodes, physical interconnections, transmission rates, or signal types may differ between two networks, yet their topologies may be identical. Traditionally, eight basic topologies are identified: point-to-point, bus, star, ring or circular, mesh, tree, hybrid, and daisy chain.

A point-to-point topology is a configuration where there are only nodes connected over a dedicated medium. In a bus topology (also known as linear topology), all nodes, i.e., stations, are connected together by a single medium. A fully connected topology (also known as fully connected mesh network), there is a direct path between any two nodes, so that with n nodes, there are n(n−1)/2 direct paths. In a ring topology, every node has exactly two branches connected to it. A ring topology is actually a bus topology in a closed loop, where data travels around the ring in one direction. When one node sends data to another, the data passes through each intermediate node on the ring until it reaches its destination. The intermediate nodes repeat (retransmit) the data to keep the signal strong. Every node is a peer; there is no hierarchical relationship of clients and servers. If one node is unable to retransmit data, it severs communication between the nodes before and after it in the bus.

A combination of any two or more network topologies is known as hybrid topology. A network topology in which peripheral nodes are connected to a central node, which rebroadcasts all transmissions received from any peripheral node to all peripheral nodes on the network, including the originating node, is referred to as star topology. All peripheral nodes may thus communicate with all others by transmitting to, and receiving from, the central node only. If the star central node is passive, the originating node must be able to tolerate the reception of an echo of its own transmission, delayed by the two-way transmission time, i.e., to and from the central node, plus any delay generated in the central node. An active star network has an active central node that usually has the means to prevent echo-related problems.

In local area networks where bus topology is used, each node is connected to a single cable, by the help of interface connectors. This central cable is the backbone of the network and is known as the bus. A signal from the source travels in both directions to all nodes connected on the bus cable until it finds the intended recipient. If the node address does not match the intended address for the data, the machine ignores the data. Alternatively, if the data matches the node address, the data is accepted. Because the bus topology consists of only one or two wire, it is rather inexpensive to implement when compared to other topologies. In a linear bus, all of the nodes of the network are connected to a common transmission medium which has exactly two endpoints (this is the 'bus', which is also commonly referred to as the backbone, or trunk)—all data that is transmitted between nodes in the network is transmitted over this common transmission medium and is able to be received by all nodes in the network simultaneously. In a star topology network, each network node is connected to a central hub with a point-to-point connection, so effectively every node is indirectly connected to every other node with the help of the hub. In star topology, every node is connected to a central node called hub, router or switch. The switch is the server and the peripherals are the clients. The network does not necessarily have to resemble a star to be classified as a star network, but all of the nodes on the network must be connected to one central device. All traffic that traverses the network passes through the central hub. The hub acts as a signal repeater. The star topology is considered the easiest topology to design and implement. An advantage of the star topology is the simplicity of adding additional nodes. The primary disadvantage of the star topology is that the hub represents a single point of failure.

Duplexing. In a wired network using point-to-point topology, the communication may be unidirectional (also known as simplex), where the transmission is in one direction only. Alternatively, a duplex (bi-directional) communication may be employed, such as half-duplex or full-duplex. A duplex communication channel requires two simplex channels operating in opposite directions. In half-duplex operation, a transmission over a medium may be in either direction, but only one direction at a time, while in full-duplex configuration, each end can simultaneously transmit and receive.

Balanced/unbalanced line. A transmission line, such as a coaxial cable, in which the magnitudes of the voltages on the two conductors are not equal with respect to ground, is referred to as unbalanced line. In such an unbalanced circuit, the transmission properties between the ports of the circuit are different for the two poles of each port. It is usually taken to mean that one pole of each port is bonded to a common potential (single-ended signaling). This common point is commonly ground or earth, but it may well not actually be connected to electrical ground at all. A balanced line refers to a transmission line consisting of two conductors in the presence of ground, capable of being operated in such a way that when the voltages of the two conductors at all transverse planes are equal in magnitude and opposite in polarity with respect to ground (differential signaling), the currents in the two conductors are equal in magnitude and opposite in direction. A balanced line may be operated in an unbalanced condition.

Typically in a balanced line or balanced signal pair, the transmission line consisting of two conductors of the same type, each of which have equal impedances along their lengths and equal impedances to ground and to other circuits. The main advantage of the balanced line format is good rejection of external noise when fed to a differential amplifier. Common forms of balanced line are twin-lead, used for radio frequency signals and twisted pair, used for lower frequencies. They are to be contrasted to unbalanced lines, such as coaxial cable, which is designed to have its return conductor connected to ground, or circuits whose return conductor actually is ground. Balanced and unbalanced circuits can be interconnected using a transformer called a 'balun'.

A balanced line allows a differential receiver to reduce the noise on a connection by rejecting common-mode interference. The lines have the same impedance to ground, so the interfering fields or currents induce the same voltage in both wires. Since the receiver responds only to the difference between the wires, it is not influenced by the induced noise voltage. If balanced line is used in an unbalanced circuit, with different impedances from each conductor to ground, currents induced in the separate conductors will cause different voltage drops to ground, thus creating a voltage differential, making the line more susceptible to noise. Examples of twisted pairs include category 5 cable. Compared to unbalanced circuits, balanced lines reduce the amount of noise per distance, allowing a longer cable run to be practical. This is because electromagnetic interference will affect both signals the same way. Similarities between the two signals are automatically removed at the end of the transmission path when one signal is subtracted from the other.

An example for differential signaling that may be used over a balanced line is the industry standard TIA/EIA-422 (a.k.a. RS-422). American national standard ANSI/TIA/EIA-422-B (formerly RS-422) and its international equivalent ITU-T Recommendation V.11 (also known as X.27), are technical standards that specify the "electrical characteristics of the balanced voltage digital interface circuit". These technical standards provide for data transmission, using balanced or differential signaling, with unidirectional/non-reversible, terminated or non-terminated transmission lines, point to point. Overview of the RS-422 standard can be found in National Semiconductor Application Note 1031 publication AN012598 dated January 2000 and titled: "*TIA/EIA-422-B Overview*" and in B&B Electronics publication "*RS-422 and RS-485 Application Note*" dated June 2006, which are both incorporated in their entirety for all purposes as if fully set forth herein. An example for RS-422 receiver is Model No. MAX3095, available from Maxim Integrated Products, Inc. of Sunnyvale, Calif., U.S.A., described in the data sheet "*±15 kV ESD—Protected, 10 Mbps, 3V/5V, Quad RS-422/RS-485 Receivers*" publication number 19-0498 Rev. 1 October 2000, which is incorporated in its entirety for all purposes as if fully set forth herein. An example for an RS-422 line driver is RS-422 transmitter Model No. MAX3030E, available from Maxim Integrated Products, Inc. of Sunnyvale, Calif., U.S.A., described in the data sheet "*±15 kV ESD—Protected, 3.3V Quad RS-422 Transmitters*" publication number 19-2671 Rev. 0 October 2002, which is incorporated in its entirety for all purposes as if fully set forth herein. An example for an RS-422 receiver is Model No. MAX3095, available from Maxim Integrated Products, Inc. of Sunnyvale, Calif., U.S.A., described in the data sheet "±15 kV ESD-Protected, 10 Mbps, 3V/5V, Quad RS-422/RS-485 Receivers" publication number 19-0498 Rev. 1 October 2000, which is incorporated in its entirety for all purposes as if fully set forth herein.

An example for single ended signaling that may be used over an unbalanced line may be based on Electronic Industries Association (ETA) and Telecommunications Industry Association (TIA) EIA/TIA-232, also known as Recommended Standard RS-232 and ITU-T (The Telecommunication Standardization Sector (ITU-T) of the International Telecommunication Union (ITU)) V.24 (formerly known as CCITT Standard V.24). Similarly, RS-423 based serial signaling standard may be used. An example for an RS-232 transceiver is Model No. MAX202E, available from Maxim Integrated Products, Inc. of Sunnyvale, Calif., U.S.A., described in the data sheet "±12 kV ESD-Protected, +5V RS-232 Transceivers" publication number 19-0175 Rev. 6 March 2005, which is incorporated in its entirety for all purposes as if fully set forth herein.

Serial/Parallel transmission. The communication over a network medium may use serial or parallel transmission. Serial transmission involves a sequential transmission of the signal elements of a group representing a character or other entity of data, so the characters are transmitted in a sequence over a single line, rather than simultaneously over two or more lines, as in parallel transmission. Typically, serial communication involves the process of sending data one bit at a time, sequentially, over a communication medium or computer bus. This is in contrast to parallel communication, where several bits are sent as a whole, on a link with several parallel channels.

The simultaneous transmission of the signal elements of a character or other data item is referred to as a parallel transmission, where there is simultaneous transmission of related signal elements over two or more separate paths. Such a method involves conveying multiple binary digits (bits) simultaneously. It contrasts with serial communication, which conveys only a single bit at a time; this distinction is one way of characterizing a communications link. The basic difference between a parallel and a serial communication channel is the number of electrical conductors used at the physical layer to convey bits. Parallel communication implies more than one such conductor. For example, an 8-bit parallel channel will convey eight bits (or a byte) simultaneously, whereas a serial channel would convey those same bits sequentially, one at a time. If both channels operated at the same clock speed, the parallel channel would be eight times faster. A parallel channel may have additional conductors for other signals, such as a clock signal to pace the flow of data, a signal to control the direction of data flow, and handshaking signals.

An example of a unidirectional communication over a balanced line, such as according to RS-422, is shown in an arrangement 10a in FIG. 1. A wired communication medium 16 comprises two conductors or wires 14a and 14b, connected in a point-to-point topology, and may be a balanced line such as a UTP. A device 'A' 15a is connected as a node at one end, and a device 'B' 15b at the other medium end, and are respectively connected to the medium 16 by connectors 13a and 13b. The device 'A' 15a includes a balanced line driver 11 connected to the connector 13a for differential signal transmitting to the medium 16, and the device 'B' 15b includes a balanced line receiver 12 connected to the connector 13b for differential signal receiving from the medium 16. An arrangement 10b shown in FIG. 1 discloses using a shielded medium 16a, which may comprise an STP, where the two conductors or wires 14a and 14b are shielded by a shield 14c connected to the ground. A termination impedance such as a resistor R 19 is connected at the receiving end for matching to the medium impedance for reducing signal reflections. Proper termination techniques and factors affecting signal wave in a wired networks are described in National Semiconductors Corporation Application Note 806 (Number AN011336, dated April 1992) entitled: "Data Transmission Lines and Their Characteristics", Application Note 807 (Number AN011337, dated March 1992) entitled: "Reflections: Computations and Waveforms", and Application Note 808 (Number AN011338, dated March 1992) entitled: "Long Transmission Lines and Data Signal Quality", which are all incorporated in their entirety for all purposes as if fully set forth herein.

An example of bi-directional communication over the point-to-point topology balanced line 16 is shown in an arrangement 20 in FIG. 2. A device 'E' 15e is connected as a node at one end, and a device 'F' 15f at the other medium end, and are respectively connected to the medium 16 by connectors 13a and 13b. In addition to the balanced line driver 11, the device 'E' 15e further includes a line receiver 12a, both connected to the connector 13a for differential signal transmitting to, and for receiving from, the medium 16. Similarly, in addition to the balanced line receiver 12, the device 'F' 15f further includes a line driver 11a, both connected to the connector 13b for differential signal receiving from, and for transmitting to, the medium 16. Termination impedances such as resistors 19a and 19b are connected at both ends for matching to the medium impedance for reducing signal reflections. While the termination 19b is shown external to the Device 'E' 15e, a termination may be implemented as part of a node, such as the termination 19a shown as part of the device 'F' 15f.

While differential signaling over a balanced line was example above, a single-end signaling over unbalanced medium may be used, such as according to RS-232, such as shown in an arrangement 30a shown in FIG. 3. A wired communication medium 14a comprises a single conductor or wire 14a, connected in a point-to-point topology. A device 'C' 15c is connected as a node at one end, and a device 'D' 15d at the other medium end, and are respectively connected to the medium 14a by connectors 13a and 13b. The device 'C' 15c includes a single-ended or unbalanced line driver 17 connected to the connector 13a for non-differential signal transmitting to the medium 14a, and the device 'D' 15d includes an unbalanced line receiver 18 connected to the connector 13b for non-differential signal receiving from the medium 14a. A termination impedance such as a resistor 19a is connected at the receiving end for matching to the medium impedance for reducing signal reflections.

An example of bi-directional communication over the point-to-point topology unbalanced line 14a, is shown in an arrangement 30b in FIG. 3. A device 'G' 15g is connected as a node at one end, and a device 'H' 15h at the other medium end, and are respectively connected to the medium 14a by connectors 13a and 13b. In addition to the unbalanced line driver 17, the device 'G' 15g further includes a single-ended line receiver 18, both connected to the connector 13a for non-differential signal transmitting to, and for receiving from, the medium 14a. Similarly, in addition to an unbalanced line receiver 18a, the device 'H' 15h further includes a single-ended line driver 17a, both connected to the connector 13b for non-differential signal receiving from, and for transmitting to, the medium 14a. Impedances such as resistors 19a and 19b are connected at both ends as terminations for matching to the medium impedance for reducing signal reflections.

An example of a multi-point 'bus' topology communication over a balanced line, such as according to RS-485, is shown in an arrangement 40 in FIG. 4. The wired communication medium 16 comprises two conductors or wires 14a and 14b, cooperatively connected in a point-to-point topology, and may form a balanced line such as a UTP or STP. Bus devices 'A' 41a, 'B' 41b, and 'C' 41c are connected at different points along the medium (or at the medium ends), and are respectively connected to the medium 16 by connectors 13a, 13b, and 13c. The bus devices 'A' 41a, 'B' 41b, and 'C' 41c respectively comprises balanced line drivers 41a, 41b, and 41c, and balanced line receivers 42a, 42b, and 42c, that may be part of respective transceivers 43a, 43b, and 43c, that are respectively connected to the connectors 13a, 13b, and 13c for coupling to the medium 16. Impedances such as resistors 19a and 19b are connected at both ends of the medium 16 as terminations for matching to the medium impedance for reducing signal reflections.

Frame. A frame is a digital data transmission unit in computer networking and telecommunication. A frame typically include frame synchronization features consisting of a sequence of bits or symbols that indicate to the receiver the beginning and end of the payload data within the stream of symbols or bits it receives. If a receiver is connected to the system in the middle of a frame transmission, it ignores the data until it detects a new frame synchronization sequence. In the OSI model of computer networking, a frame is the protocol data unit at the data link layer. Frames are the result of the final layer of encapsulation before the data is transmitted over the physical layer. Each frame is separated from the next by an interframe gap. A frame is a series of bits generally composed of framing bits, the packet payload, and a frame check sequence. In telecommunications, specifically in time-division multiplex (TDM) and time-division multiple access (TDMA) variants, a frame is a cyclically repeated data block that consists of a fixed number of time slots, one for each logical TDM channel or TDMA transmitter. In this context, a frame is typically an entity at the physical layer. The frame is also an entity for time-division duplex, where the mobile terminal may transmit during some timeslots and receive during others. Often, frames of several different sizes are nested inside each other. For example, when using Point-to-Point Protocol (PPP) over asynchronous serial communication, the eight bits of each individual byte are framed by start and stop bits, the payload data bytes in a network packet are framed by the header and footer, and several packets can be framed with frame boundary octets.

Packet. A packet is the unit of data passed across the interface between the internet layer and the link layer. It typically includes an IP header and data, and a packet may be a complete IP datagram or a fragment of an IP datagram. A packet is typically a formatted unit of data carried by a packet-switched network. When data is formatted into packets, packet switching is possible and the bandwidth of the communication medium can be better shared among users than with circuit switching.

A packet consists of control information and user data, which is also known as the payload. Control information provides data for delivering the payload, for example: source and destination network addresses, error detection codes, and sequencing information. Typically, control information is found in packet headers and trailers. In the seven-layer OSI model of computer networking, packet strictly refers to a data unit at layer 3, the Network Layer. The correct term for a data unit at Layer 2, the Data Link Layer, is a frame, and at Layer 4, the Transport Layer, the correct term is a segment or datagram. For the case of TCP/IP communication over Ethernet, a TCP segment is carried in one or more IP packets, which are each carried in one or more Ethernet frames. Different communications protocols use different conventions for distinguishing between the elements and for formatting the data. For example, in Point-to-Point Protocol, the packet is formatted in 8-bit bytes, and special characters are used to delimit the different elements. Other protocols like Ethernet, establish the start of the header and data elements by their location relative to the start of the packet. Some protocols format the information at a bit level instead of a byte level. A network design can achieve two major results by using packets: error detection and multiple host addressing. A packet typically includes various fields such as addresses, Error detection and correction, hop counts, priority, length, and payload.

The addresses fields commonly relating to the routing of network packets requires two network addresses, the source address of the sending host, and the destination address of the receiving host. Error detection and correction is performed at various layers in the protocol stack. Network packets may contain a checksum, parity bits or cyclic redundancy checks to detect errors that occur during transmission. At the transmitter, the calculation is performed before the packet is sent. When received at the destination, the checksum is recalculated, and compared with the one in the packet. If discrepancies are found, the packet may be corrected or discarded. Any packet loss is dealt with by the network protocol. Under fault conditions packets can end up traversing a closed circuit. If nothing was done, eventually the number of packets circulating would build up until the network was congested to the point of failure. A time-to-live is a field that is decreased by one each time a packet goes through a network node. If the field reaches zero, routing has failed, and the packet is discarded. Ethernet packets have no time-to-live field and so are subject to broadcast radiation in the presence of a switch loop. There may be a field to identify the overall packet length. However, in some types of networks, the length is implied by the duration of transmission. Some networks implement quality of service, which can prioritize some types of packets above others. This field indicates which packet queue should be used; a high priority queue is emptied more quickly than lower priority queues at points in the network where congestion is occurring. In general, payload is the data that is carried on behalf of an application. It is usually of variable length, up to a maximum that is set by the network protocol and sometimes the equipment on the route. Some networks can break a larger packet into smaller packets when necessary.

Clock Signal. In electronics circuits and especially in synchronous digital circuits, a clock signal is a particular type of signal that oscillates between a high and a low state, and is utilized like a metronome to coordinate actions of circuits. A clock signal is typically produced by a clock generator, which consists of, or uses, an oscillator such as a quartz oscillator. The most common clock signal is in the form of a square wave with a 50% duty cycle, usually with a fixed, constant frequency, and circuits using the clock signal for synchronization may become active at either the rising edge, falling edge, or, in the case of double data rate, both in the rising and in the falling edges of the clock cycle. Most integrated circuits (ICs) of sufficient complexity use a clock signal in order to synchronize different parts of the circuit, cycling at a rate less than the worst-case internal propagation delays. In some cases, more than one clock cycle is required to perform a predictable action. As ICs become more complex, the problem of supplying accurate and synchronized clocks to all the circuits becomes increasingly difficult. The preeminent example of such complex chips is the microprocessor, the central component of modern computers, which relies on a clock from a crystal oscillator. A network timing, strobing, synchronization, or clocking information may be carried as a separate signal (e.g., clock signal) over a dedicated channel, such as separate and dedicated wired in a cable, or alternatively may use embedded clocking (a.k.a. self-clocking), where the timing information is encoded with the data signal, commonly used in line codes such as Manchester code, where the clock information occurs at the transition points.

Some digital data streams, especially high-speed serial data streams (such as the raw stream of data from the magnetic head of a disk drive and serial communication networks such as Ethernet) are sent without an accompanying clock signal. The receiver generates a clock from an approximate frequency reference, and then phase-aligns the clock to the transitions in the data stream with a Phase-Locked Loop (PLL). This is one method of performing a process commonly known as clock and data recovery (CDR). Other methods include the use of a delay-locked loop and oversampling of the data stream. Oversampling can be done blind using multiple phases of a free-running clock to create multiple samples of the input and then selecting the best sample. Alternatively, a counter can be used that is driven by a sampling clock running at some multiple of the data stream frequency, with the counter reset on every transition of the data stream and the data stream sampled at some predetermined count. These two types of oversampling are sometimes called spatial and time respectively, and the best bit error ratio (BER) is obtained when the samples are taken as far away as possible from any data stream transitions. While most oversampling designs using a counter employ a sampling clock frequency that is an even multiple of the data stream, an odd multiple is better able to create a sampling point further from any data stream transitions and can do so at nearly half the frequency of a design using an even multiple. In oversampling type CDRs, the signal used to sample the data can be used as the recovered clock.

In order for this scheme to work, a data stream must transition frequently enough to correct for any drift in the PLL's oscillator. The limit for how long a clock recovery unit can operate without a transition is known as its maximum consecutive identical digits (CID) specification. To ensure frequent transitions, some sort of self-clocking signal is used, often a run length limited encoding; 8b/10b encoding is very common, while Manchester encoding serves the same purpose in old revisions of 802.3 local area networks.

Vehicle. A vehicle is a mobile machine that transports people or cargo. Most often, vehicles are manufactured, such as wagons, bicycles, motor vehicles (motorcycles, cars, trucks, buses), railed vehicles (trains, trams), watercraft (ships, boats), aircraft and spacecraft. The vehicle may be designed for use on land, in fluids, or be airborne, such as bicycle, car, automobile, motorcycle, train, ship, boat, submarine, airplane, scooter, bus, subway, train, or spacecraft. A vehicle may consist of, or may comprise, a bicycle, a car, a motorcycle, a train, a ship, an aircraft, a boat, a spacecraft, a boat, a submarine, a dirigible, an electric scooter, a subway, a train, a trolleybus, a tram, a sailboat, a yacht, or an airplane. Further, a vehicle may be a bicycle, a car, a motorcycle, a train, a ship, an aircraft, a boat, a spacecraft, a boat, a submarine, a dirigible, an electric scooter, a subway, a train, a trolleybus, a tram, a sailboat, a yacht, or an airplane.

A vehicle may be a land vehicle typically moving on the ground, using wheels, tracks, rails, or skies. The vehicle may be locomotion-based where the vehicle is towed by another vehicle or an animal. Propellers (as well as screws, fans, nozzles, or rotors) are used to move on or through a fluid or air, such as in watercrafts and aircrafts. The system described herein may be used to control, monitor or otherwise be part of, or communicate with, the vehicle motion system. Similarly, the system described herein may be used to control, monitor or otherwise be part of, or communicate with, the vehicle steering system. Commonly, wheeled vehicles steer by angling their front or rear (or both) wheels, while ships, boats, submarines, dirigibles, airplanes and other vehicles moving in or on fluid or air usually have a rudder for steering. The vehicle may be an automobile, defined as a wheeled passenger vehicle that carries its own motor, and primarily designed to run on roads, and have seating for one to six people. Typically, automobiles have four wheels, and are constructed to principally transport of people.

Human power may be used as a source of energy for the vehicle, such as in non-motorized bicycles. Further, energy may be extracted from the surrounding environment, such as solar powered car or aircraft, a street car, as well as by sailboats and land yachts using the wind energy. Alternatively or in addition, the vehicle may include energy storage, and the energy is converted to generate the vehicle motion. A common type of energy source is a fuel, and external or internal combustion engines are used to burn the fuel (such as gasoline, diesel, or ethanol) and create a pressure that is converted to a motion. Another common medium for storing energy are batteries or fuel cells, which store chemical energy used to power an electric motor, such as in motor vehicles, electric bicycles, electric scooters, small boats, subways, trains, trolleybuses, and trams.

Aircraft. An aircraft is a machine that is able to fly by gaining support from the air. It counters the force of gravity by using either static lift or by using the dynamic lift of an airfoil, or in a few cases, the downward thrust from jet engines. The human activity that surrounds aircraft is called aviation. Crewed aircraft are flown by an onboard pilot, but unmanned aerial vehicles may be remotely controlled or self-controlled by onboard computers. Aircraft may be classified by different criteria, such as lift type, aircraft propulsion, usage and others.

Aerostats are lighter than air aircrafts that use buoyancy to float in the air in much the same way that ships float on the water. They are characterized by one or more large gasbags or canopies filled with a relatively low-density gas such as helium, hydrogen, or hot air, which is less dense than the surrounding air. When the weight of this is added to the weight of the aircraft structure, it adds up to the same weight as the air that the craft displaces. Heavier-than-air aircraft, such as airplanes, must find some way to push air or gas downwards, so that a reaction occurs (by Newton's laws of motion) to push the aircraft upwards. This dynamic movement through the air is the origin of the term aerodyne. There are two ways to produce dynamic upthrust: aerodynamic lift and powered lift in the form of engine thrust.

Aerodynamic lift involving wings is the most common, with fixed-wing aircraft being kept in the air by the forward movement of wings, and rotorcraft by spinning wing-shaped rotors sometimes called rotary wings. A wing is a flat, horizontal surface, usually shaped in cross-section as an aerofoil. To fly, air must flow over the wing and generate lift. A flexible wing is a wing made of fabric or thin sheet material, often stretched over a rigid frame. A kite is tethered to the ground and relies on the speed of the wind over its wings, which may be flexible or rigid, fixed, or rotary.

Gliders are heavier-than-air aircraft that do not employ propulsion once airborne. Take-off may be by launching forward and downward from a high location, or by pulling into the air on a tow-line, either by a ground-based winch or vehicle, or by a powered "tug" aircraft. For a glider to maintain its forward air speed and lift, it must descend in relation to the air (but not necessarily in relation to the ground). Many gliders can 'soar'—gain height from updrafts such as thermal currents. Common examples of gliders are sailplanes, hang gliders and paragliders. Powered aircraft have one or more onboard sources of mechanical power, typically aircraft engines although rubber and manpower have also been used. Most aircraft engines are either lightweight piston engines or gas turbines. Engine fuel is stored in tanks, usually in the wings but larger aircraft also have additional fuel tanks in the fuselage.

A propeller aircraft use one or more propellers (airscrews) to create thrust in a forward direction. The propeller is usually mounted in front of the power source in tractor configuration but can be mounted behind in pusher configuration. Variations of propeller layout include contra-rotating propellers and ducted fans. A Jet aircraft use airbreathing jet engines, which take in air, burn fuel with it in a combustion chamber, and accelerate the exhaust rearwards to provide thrust. Turbojet and turbofan engines use a spinning turbine to drive one or more fans, which provide additional thrust. An afterburner may be used to inject extra fuel into the hot exhaust, especially on military "fast jets". Use of a turbine is not absolutely necessary: other designs include the pulse jet and ramjet. These mechanically simple designs cannot work when stationary, so the aircraft must be launched to flying speed by some other method. Some rotorcrafts, such as helicopters, have a powered rotary wing or rotor, where the rotor disc can be angled slightly forward so that a proportion of its lift is directed forwards. The rotor may, similar to a propeller, be powered by a variety of methods such as a piston engine or turbine. Experiments have also used jet nozzles at the rotor blade tips.

A vehicle may include a hood (a.k.a. bonnet), which is the hinged cover over the engine of motor vehicles that allows access to the engine compartment (or trunk on rear-engine and some mid-engine vehicles) for maintenance and repair. A vehicle may include a bumper, which is a structure attached, or integrated to, the front and rear of an automobile to absorb impact in a minor collision, ideally minimizing repair costs. Bumpers also have two safety functions: minimizing height mismatches between vehicles and protecting pedestrians from injury. A vehicle may include a cowling, which is the covering of a vehicle's engine, most often found on automobiles and aircraft. A vehicle may include a dashboard (also called dash, instrument panel, or fascia), which is a control panel placed in front of the driver of an automobile, housing instrumentation and controls for operation of the vehicle. A vehicle may include a fender that frames a wheel well (the fender underside). Its primary purpose is to prevent sand, mud, rocks, liquids, and other road spray from being thrown into the air by the rotating tire. Fenders are typically rigid and can be damaged by contact with the road surface. Instead, flexible mud flaps are used close to the ground where contact may be possible. A vehicle may include a quarter panel (a.k.a. rear wing), which is the body panel (exterior surface) of an automobile between a rear door (or only door on each side for two-door models) and the trunk (boot) and typically wraps around the wheel well. Quarter panels are typically made of sheet metal, but are sometimes made of fiberglass, carbon fiber, or fiber-reinforced plastic. A vehicle may include a rocker, which is the body section below the base of the door openings. A vehicle may include a spoiler, which is an automotive aerodynamic device whose intended design function is to 'spoil' unfavorable air movement across a body of a vehicle in motion, usually described as turbulence or drag. Spoilers on the front of a vehicle are often called air dams. Spoilers are often fitted to race and high-performance sports cars, although they have become common on passenger vehicles as well. Some spoilers are added to cars primarily for styling purposes and have either little aerodynamic benefit or even make the aerodynamics worse. The trunk (a.k.a. boot) of a car is the vehicle's main storage compartment. A vehicle door is a type of door, typically hinged, but sometimes attached by other mechanisms such as tracks, in front of an opening, which is used for entering and exiting a vehicle. A vehicle door can be opened to provide access to the opening, or closed to secure it. These doors can be opened manually, or powered electronically. Powered doors are usually found on minivans, high-end cars, or modified cars. Car glass includes windscreens, side and rear windows, and glass panel roofs on a vehicle. Side windows can be either fixed or be raised and lowered by depressing a button (power window) or switch or using a hand-turned crank.

Automotive electronics. Automotive electronics involves any electrically-generated systems used in vehicles, such as ground vehicles. Automotive electronics commonly involves multiple modular ECUs (Electronic Control Unit) connected over a network such as Engine Control Modules (ECM) or Transmission Control Modules (TCM). Automotive electronics or automotive embedded systems are distributed systems, and according to different domains in the automotive field, they can be classified into Engine electronics, Transmission electronics, Chassis electronics, Active safety, Driver assistance, Passenger comfort, and Entertainment (or infotainment) systems.

One of the most demanding electronic parts of an automobile is the Engine Control Unit. Engine controls demand one of the highest real time deadlines, as the engine itself is a very fast and complex part of the automobile. The computing power of the engine control unit is commonly the highest, typically a 32-bit processor, that typically controls in real-time in a diesel engine the Fuel injection rate, Emission control, NOx control, Regeneration of oxidation catalytic converter, Turbocharger control, Throttle control, and Cooling system control. In a gasoline engine, the engine control typically involves Lambda control, OBD (On-Board Diagnostics), Cooling system control, Ignition system control, Lubrication system control, Fuel injection rate control, and Throttle control.

An engine ECU typically connects to, or includes, sensors that actively monitor in real-time engine parameters such as pressure, temperature, flow, engine speed, oxygen level and NOx level, plus other parameters at different points within the engine. All these sensor signals are analyzed by the ECU, which has the logic circuits to do the actual controlling. The ECU output is commonly connected to different actuators for the throttle valve, EGR valve, rack (in VGTs), fuel injector (using a pulse-width modulated signal), dosing injector, and more.

Transmission electronics involves control of the transmission system, mainly the shifting of the gears for better shift comfort and to lower torque interrupt while shifting. Automatic transmissions use controls for their operation, and many semi-automatic transmissions having a fully automatic clutch or a semi-auto clutch (declutching only). The engine control unit and the transmission control typically exchange messages, sensor signals and control signals for their operation. Chassis electronics typically includes many sub-systems that monitor various parameters and are actively controlled, such as ABS—Anti-lock Braking System, TCS—Traction Control System, EBD—Electronic Brake Distribution, and ESP—Electronic Stability Program. Active safety systems involve modules that are ready-to-act when there is a collision in progress, or used to prevent it when it senses a dangerous situation, such as Air bags, Hill descent control, and Emergency brake assist system. Passenger comfort systems involve, for example, Automatic climate control, Electronic seat adjustment with memory, Automatic wipers, Automatic headlamps—adjusts beam automatically, and Automatic cooling—temperature adjustment. Infotainment systems include systems such as Navigation system, Vehicle audio, and Information access.

Automotive electric and electronic technologies and systems are described in a book published by Robert Bosch GmbH (5$^{th}$ Edition, July 2007) entitled: "*Bosch Automotive Electric and Automotive Electronics*" [ISBN-978-3-658-01783-5], which is incorporated in its entirety for all purposes as if fully set forth herein.

ECU. In automotive electronics, an Electronic Control Unit (ECU) is a generic term for any embedded system that controls one or more of the electrical system or subsystems in a vehicle such as a motor vehicle. Types of ECU include Electronic/engine Control Module (ECM) (sometimes referred to as Engine Control Unit—ECU, which is distinct from the generic ECU—Electronic Control Unit), Airbag Control Unit (ACU), Powertrain Control Module (PCM), Transmission Control Module (TCM), Central Control Module (CCM), Central Timing Module (CTM), Convenience Control Unit (CCU), General Electronic Module (GEM), Body Control Module (BCM), Suspension Control Module (SCM), Door Control Unit (DCU), Powertrain Control Module (PCM), Electric Power Steering Control Unit (PSCU), Seat Control Unit, Speed Control Unit (SCU), Suspension Control Module (SCM), Telematic Control Unit (TCU), Telephone Control Unit (TCU), Transmission Control Unit (TCU), Brake Control Module (BCM or EBCM; such as ABS or ESC), Battery management system, control unit, or control module.

A microprocessor or a microcontroller serves as a core of an ECU, and uses a memory such as SRAM, EEPROM, and Flash. An ECU is power fed by a supply voltage, and includes or connects to sensors using analog and digital inputs. In addition to a communication interface, an ECU typically includes a relay, H-Bridge, injector, or logic drivers, or outputs for connecting to various actuators.

ECU technology and applications is described in the M. Tech. Project first stage report (EE696) by Vineet P. Aras of the Department of Electrical Engineering, Indian Institute of Technology Bombay, dated July 2004, entitled: "*Design of Electronic Control Unit (ECU) for Automobiles—Electronic Engine Management system*", and in National Instruments paper published Nov. 7, 2009 entitled: "*ECU Designing and Testing using National Instruments Products*", which are both incorporated in their entirety for all purposes as if fully set forth herein. ECU examples are described in a brochure by Sensor-Technik Wiedemann Gmbh (headquartered in Kaufbeuren, Germany) dated Mar. 4, 2011 GB entitled "*Control System Electronics*", which is incorporated in its entirety for all purposes as if fully set forth herein. An ECU or an interface to a vehicle bus may use a processor such as the MPC5748G controller available from Freescale Semiconductor, Inc. (headquartered in Tokyo, Japan, and described in a data sheet Document Number MPC5748G Rev. 2, May 2014 entitled: "*MPC5748 Microcontroller Datasheet*", which is incorporated in its entirety for all purposes as if fully set forth herein.

OSEK/VDX. OSEK/VDX, formerly known as OSEK (*Offene Systeme und deren Schnittstellen für die Elektronik in Kraftfahrzeugen*; in English: "*Open Systems and their Interfaces for the Electronics in Motor Vehicles*") OSEK is an open standard, published by a consortium founded by the automobile industry for an embedded operating system, a communications stack, and a network management protocol for automotive embedded systems. OSEK was designed to provide a standard software architecture for the various electronic control units (ECUs) throughout a car.

The OSEK standard specifies interfaces to multitasking functions—generic I/O and peripheral access—and thus remains architecture dependent. OSEK systems are expected to run on chips without memory protection. Features of an OSEK implementation can be usually configured at compile-time. The number of application tasks, stacks, mutexes, etc., is statically configured; it is not possible to create more at run time. OSEK recognizes two types of tasks/threads/compliance levels: basic tasks and enhanced tasks. Basic tasks never block; they "run to completion" (coroutine). Enhanced tasks can sleep and block on event objects. The events can be triggered by other tasks (basic and enhanced) or interrupt routines. Only static priorities are allowed for tasks, and First-In-First-Out (FIFO) scheduling is used for tasks with equal priority. Deadlocks and priority inversion are prevented by priority ceiling (i.e. no priority inheritance). The specification uses ISO/ANSI-C-like syntax; however, the implementation language of the system services is not specified. OSEK/VDX Network Management functionality is described in a document by OSEK/VDX NM Concept & API 2.5.2 (Version 2.5.3, 26 Jul. 2004) entitled: "*Open Systems and the Corresponding Interfaces for Automotive Electronics—Network Management—Concept and Application Programming Interface*", which is incorporated in its entirety for all purposes as if fully set forth herein. Some parts of the OSEK are standardized as part of ISO 17356 standard series entitled: "*Road vehicles—Open interface for embedded automotive applications*", such as ISO 17356-1 standard (First edition, 2005 Jan. 15) entitled: "*Part 1: General structure and terms, definitions and abbreviated terms*", ISO 17356-2 standard (First edition, 2005 May 1) entitled: "*Part 2: OSEK/VDX specifications for binding OS, COM and NM*", ISO 17356-3 standard (First edition, 2005 Nov. 1) entitled: "*Part 3: OSEK/VDX Operating System (OS)*", and ISO 17356-4 standard (First edition, 2005 Nov. 1) entitled: "*Part 4: OSEK/VDX Communication (COM)*", which are all incorporated in their entirety for all purposes as if fully set forth herein.

AUTOSAR. AUTOSAR (Automotive Open System Architecture) is a worldwide development partnership of automotive interested parties founded in 2003. It pursues the objective of creating and establishing an open and standardized software architecture for automotive electronic control units excluding infotainment. Goals include the scalability to different vehicle and platform variants, transferability of software, the consideration of availability and safety requirements, a collaboration between various partners, sustainable utilization of natural resources, maintainability throughout the whole "Product Life Cycle".

AUTOSAR provides a set of specifications that describe basic software modules, defines application interfaces, and builds a common development methodology based on standardized exchange format. Basic software modules made available by the AUTOSAR layered software architecture can be used in vehicles of different manufacturers and electronic components of different suppliers, thereby reducing expenditures for research and development, and mastering the growing complexity of automotive electronic and software architectures. Based on this guiding principle, AUTOSAR has been devised to pave the way for innovative electronic systems that further improve performance, safety and environmental friendliness and to facilitate the exchange and update of software and hardware over the service life of the vehicle. It aims to be prepared for the upcoming technologies and to improve cost-efficiency without making any compromise with respect to quality.

AUTOSAR uses a three-layered architecture: Basic Software—standardized software modules (mostly) without any functional job itself that offers services necessary to run the functional part of the upper software layer; Runtime environment—Middleware which abstracts from the network topology for the inter- and intra-ECU information exchange between the application software components and between the Basic Software and the applications; and Application Layer—application software components that interact with the runtime environment. System Configuration Description includes all system information and the information that must be agreed between different ECUs (e.g. definition of bus signals). ECU extract is the information from the System Configuration Description needed for a specific ECU (e.g. those signals where a specific ECU has access to). ECU Configuration Description contains all basic software configuration information that is local to a specific ECU. The executable software can be built from this information, the code of the basic software modules and the code of the software components. The AUTOSAR specifications are described in Release 4.2.2 released 31 Jan. 2015 by the AUTOSAR consortium entitled: "*Release 4.2 Overview and Revision History*", which is incorporated in its entirety for all purposes as if fully set forth herein.

Vehicle bus. A vehicle bus is a specialized internal (in-vehicle) communications network that interconnects components inside a vehicle (e.g., automobile, bus, train, industrial or agricultural vehicle, ship, or aircraft). Special requirements for vehicle control such as assurance of message delivery, of non-conflicting messages, of minimum time of delivery, of low cost, and of EMF noise resilience, as well as redundant routing and other characteristics mandate the use of less common networking protocols. A vehicle bus typically connects the various ECUs in the vehicle. Common protocols include Controller Area Network (CAN), Local Interconnect Network (LIN) and others. Conventional computer networking technologies (such as Ethernet and TCP/IP) may as well be used.

Any in-vehicle internal network that interconnects the various devices and components inside the vehicle may use any of the technologies and protocols described herein. Common protocols used by vehicle buses include a Control Area Network (CAN), FlexRay, and a Local Interconnect Network (LIN). Other protocols used for in-vehicle are optimized for multimedia networking such as MOST (Media Oriented Systems Transport). The CAN is described in the Texas Instrument Application Report No. SLOA101A entitled: "*Introduction to the Controller Area Network (CAN)*", and may be based on, may be compatible with, or may be according to, ISO 11898 standards, ISO 11992-1 standard, SAE J1939 or SAE J2411 standards, which are all incorporated in their entirety for all purposes as if fully set forth herein. The LIN communication may be based on, may be compatible with, or according to, ISO 9141, and is described in "*LIN Specification Package—Revision 2.2A*" by the LIN Consortium, which are all incorporated in their entirety for all purposes as if fully set forth herein. In one example, the DC power lines in the vehicle may also be used as the communication medium, as described for example in U.S. Pat. No. 7,010,050 to Maryanka, entitled: "Signaling over Noisy Channels", which is incorporated in its entirety for all purposes as if fully set forth herein.

CAN. A controller area network (CAN bus) is a vehicle bus standard designed to allow microcontrollers and devices to communicate with each other in applications without a host computer. It is a message-based protocol, designed originally for multiplex electrical wiring within automobiles, but is also used in many other contexts. CAN bus is one of five protocols used in the on-board diagnostics (OBD)-II vehicle diagnostics standard. CAN is a multi-master serial bus standard for connecting Electronic Control Units [ECUs] also known as nodes. Two or more nodes are required on the CAN network to communicate. The complexity of the node can range from a simple I/O device up to an embedded computer with a CAN interface and sophisticated software. The node may also be a gateway allowing a standard computer to communicate over a USB or Ethernet port to the devices on a CAN network. All nodes are connected to each other through a two-wire bus. The wires are 120Ω nominal twisted pair. Implementing CAN is described in an Application Note (AN10035-0-2/12(0) Rev. 0) published 2012 by Analog Devices, Inc. entitled: "*Controller Area Network (CAN) Implementation Guide—by Dr. Conal Watterson*", which is incorporated in its entirety for all purposes as if fully set forth herein.

CAN transceiver is defined by ISO 11898-2/3 Medium Access Unit [MAU] standards, and in receiving, converts the levels of the data stream received from the CAN bus to levels that the CAN controller uses. It usually has protective circuitry to protect the CAN controller, and in transmitting state converts the data stream from the CAN controller to CAN bus compliant levels. An example of a CAN transceiver is Model No. TJA1055 or Model No. TJA1044 both available from NXP Semiconductors N.V. headquartered in Eindhoven, Netherlands, respectively described in Product data sheets (document Identifier TJA1055, date of release: 6 Dec. 2013) entitled: "*TJA1055 Enhanced fault-tolerant CAN transceiver—Rev. 5—6 Dec. 2013—Product data sheet*", and Product data sheets (document Identifier TJA1055, date of release: 6 Dec. 2013) entitled: "*TJA1044 High-speed CAN transceiver with Standby mode—Rev. 4—10 Jul. 2015—Product data sheet*", which are both incorporated in their entirety for all purposes as if fully set forth herein.

Another example of a CAN Transceiver is Model No. SN65HVD234D available from Texas Instruments Incorporated (Headquartered in Dallas, Tex., U.S.A.), described in Datasheet SLLS557G (NOVEMBER 2002-REVISED JANUARY 2015), entitled: "*SN65HVD23x 3.3-V CAN Bus Transceivers*", which is incorporated in its entirety for all purposes as if fully set forth herein. An example of a CAN controller is Model No. STM32F105Vc available from STMicroelectronics NV described in Datasheet DoclD15724 Rev. 9, published September 2015 and entitled: "*STM32F105xx STM32F107xx*", which is incorporated in its entirety for all purposes as if fully set forth herein, which is part of the STM32F105xx connectivity line family that incorporates the high-performance ARM®Cortex®-M3 32-bit RISC core operating at a 72 MHz frequency, high-speed embedded memories (Flash memory up to 256 Kbytes and SRAM 64 Kbytes), and an extensive range of enhanced I/Os and peripherals connected to two APB buses. All devices offer two 12-bit ADCs, four general-purpose 16-bit timers plus a PWM timer, as well as standard and advanced communication interfaces: up to two I2Cs, three SPIs, two 12Ss, five USARTs, an USB OTG FS and two CANs. An example of a captured waveform of an actual CAN frame over a CAN medium is shown in view 60b in FIG. 6, and an example of a captured waveform of an actual logical digital signal of a CAN frame is shown in a view 60a in FIG. 6, showing a signal carried over one of the CAN bus conductors versus ground.

A Controller Area Network (CAN) transceiver is disclosed in U.S. Pat. No. 9,471,528 to Muth entitled: "Controller area network (CAN) transceiver and method for operating a CAN transceiver", which is incorporated in its entirety for all purposes as if fully set forth herein. The CAN transceiver includes a CAN bus interface, a TXD interface, an RXD interface, a transmitter connected between the TXD interface and the CAN bus interface, a receiver connected between the RXD interface and the CAN bus interface, a traffic control system connected between the CAN bus interface, the TXD interface, and the RXD interface. The traffic control system detects the presence of CAN Flexible Data-rate (FD) traffic on the CAN bus interface and if the traffic control system detects the presence of CAN FD traffic on the CAN bus interface, the traffic controls system changes an operating state of the transceiver.

Embodiments of a device and method are disclosed in U.S. Pat. No. 9,330,045 to Muth et al. entitled: "Controller area network (CAN) device and method for controlling CAN traffic", which is incorporated in its entirety for all purposes as if fully set forth herein. In an embodiment, a CAN device is disclosed. The CAN device includes a TXD input interface, a TXD output interface, an RXD input interface, an RXD output interface, and a traffic control system connected between the TXD input and output interfaces and between the RXD input and output interfaces. The traffic control system is configured to detect the presence of CAN Flexible Data-rate (FD) traffic on the RXD input interface and if the traffic control system detects the presence of CAN FD traffic on the RXD input interface, disconnect the RXD input interface from the RXD output interface and disconnect the TXD input interface from the TXD output interface.

A network node is disclosed in U.S. Pat. No. 9,280,501 to Hopfner entitled: "Compatible network node, in particular, for can bus systems", which is incorporated in its entirety for all purposes as if fully set forth herein. The node including a device, in particular, an error detection logic, which is deactivated if it is detected that a signal according to a first protocol or a first version of a first protocol is received, and which is not deactivated if it is detected that a signal according to a second, different protocol or a second, different version of the first protocol is received.

Controller Area Network (CAN) communications apparatus and methods are presented in U.S. Pat. No. 9,652,423 to Monroe et al. entitled: "CAN and flexible data rate CAN node apparatus and methods for mixed bus CAN FD communications", which is incorporated in its entirety for all purposes as if fully set forth herein. The apparatus and methods are for CAN flexible data rate (CAN FD) communications in a mixed CAN network with CAN FD nodes and one or more non-FD CAN nodes, in which a CAN FD node wishing to transmit CAN FD frames sends a first predefined message requesting the non-FD CAN nodes to disable their transmitters before transmitting the CAN FD frames, and thereafter sends a second predefined message or a predefined signal to return the non-FD CAN nodes to normal operation.

Each node is able to send and receive messages, but not simultaneously. A message or Frame consists primarily of the ID (identifier), which represents the priority of the message, and up to eight data bytes. A CRC, acknowledge slot [ACK] and other overhead are also part of the message. The improved CAN FD extends the length of the data section to up to 64 bytes per frame. The message is transmitted serially onto the bus using a non-return-to-zero (NRZ) format and may be received by all nodes. The devices that are connected by a CAN network are typically sensors, actuators, and other control devices. These devices are connected to the bus through a host processor, a CAN controller, and a CAN transceiver. A terminating bias circuit is power and ground provided together with the data signaling in order to provide electrical bias and termination at each end of each bus segment to suppress reflections.

CAN data transmission uses a lossless bit-wise arbitration method of contention resolution. This arbitration method requires all nodes on the CAN network to be synchronized to sample every bit on the CAN network at the same time. While some call CAN synchronous, the data is transmitted without a clock signal in an asynchronous format. The CAN specifications use the terms "dominant" bits and "recessive" bits where dominant is a logical '0' (actively driven to a voltage by the transmitter) and recessive is a logical '1' (passively returned to a voltage by a resistor). The idle state is represented by the recessive level (Logical 1). If one node transmits a dominant bit and another node transmits a recessive bit, then there is a collision and the dominant bit "wins". This means there is no delay to the higher-priority message, and the node transmitting the lower priority message automatically attempts to re-transmit six-bit clocks after the end of the dominant message. This makes CAN very suitable as a real time prioritized communications system.

The exact voltages for a logical level '0' or '1' depend on the physical layer used, but the basic principle of CAN requires that each node listen to the data on the CAN network including the data that the transmitting node is transmitting. If a logical 1 is transmitted by all transmitting nodes at the same time, then a logical 1 is seen by all of the nodes, including both the transmitting node(s) and receiving node(s). If a logical 0 is transmitted by all transmitting node(s) at the same time, then a logical 0 is seen by all nodes. If a logical 0 is being transmitted by one or more nodes, and a logical 1 is being transmitted by one or more nodes, then a logical 0 is seen by all nodes including the node(s) transmitting the logical 1. When a node transmits a logical 1 but sees a logical 0, it realizes that there is a contention and it quits transmitting. By using this process, any node that transmits a logical 1 when another node transmits a logical 0 "drops out" or loses the arbitration. A node that loses arbitration re-queues its message for later transmission and the CAN frame bit-stream continues without error until only one node is left transmitting. This means that the node that transmits the first 1, loses arbitration. Since the 11 (or 29 for CAN 2.0B) bit identifier is transmitted by all nodes at the start of the CAN frame, the node with the lowest identifier transmits more zeros at the start of the frame, and that is the node that wins the arbitration or has the highest priority.

The CAN protocol, like many networking protocols, can be decomposed into the following abstraction layers—Application layer, Object layer (including Message filtering and Message and status handling), and Transfer layer.

Most of the CAN standard applies to the transfer layer. The transfer layer receives messages from the physical layer and transmits those messages to the object layer. The transfer layer is responsible for bit timing and synchronization, message framing, arbitration, acknowledgement, error detection and signaling, and fault confinement. It performs Fault Confinement, Error Detection, Message Validation, Acknowledgement, Arbitration, Message Framing, Transfer Rate and Timing, and Information Routing.

The mechanical aspects of the physical layer (connector type and number, colors, labels, pin-outs) are not specified. As a result, an automotive ECU will typically have a particular-often custom-connector with various sorts of cables, of which two are the CAN bus lines. Nonetheless, several de facto standards for mechanical implementation have emerged, the most common being the 9-pin D-sub type male connector with the following pin-out: pin 2: CAN-Low (CAN−); pin 3: GND (Ground); pin 7: CAN-High (CAN+); and pin 9: CAN V+(Power). This de facto mechanical standard for CAN could be implemented with the node having both male and female 9-pin D-sub connectors electrically wired to each other in parallel within the node. Bus power is fed to a node's male connector and the bus draws power from the node's female connector. This follows the electrical engineering convention that power sources are terminated at female connectors. Adoption of this standard avoids the need to fabricate custom splitters to connect two sets of bus wires to a single D connector at each node. Such nonstandard (custom) wire harnesses (splitters) that join conductors outside the node, reduce bus reliability, eliminate cable interchangeability, reduce compatibility of wiring harnesses, and increase cost.

Noise immunity on ISO 11898-2:2003 is achieved by maintaining the differential impedance of the bus at a low level with low-value resistors (120 ohms) at each end of the bus. However, when dormant, a low-impedance bus such as CAN draws more current (and power) than other voltage-based signaling buses. On CAN bus systems, balanced line operation, where current in one signal line is exactly balanced by current in the opposite direction in the other signal provides an independent, stable 0 V reference for the receivers. Best practice determines that CAN bus balanced pair signals be carried in twisted pair wires in a shielded cable to minimize RF emission and reduce interference susceptibility in the already noisy RF environment of an automobile. ISO 11898-2 provides some immunity to common mode voltage between transmitter and receiver by having a '0' V rail running along the bus to maintain a high degree of voltage association between the nodes. Also, in the de facto mechanical configuration mentioned above, a supply rail is included to distribute power to each of the transceiver nodes. The design provides a common supply for all the transceivers. The actual voltage to be applied by the bus and which nodes apply to it are application-specific and not formally specified. Common practice node design provides each node with transceivers which are optically isolated from their node host and derive a 5 V linearly regulated supply voltage for the transceivers from the universal supply rail provided by the bus. This usually allows operating margin on the supply rail sufficient to allow interoperability across many node types. Typical values of supply voltage on such networks are 7 to 30 V. However, the lack of a formal standard means that system designers are responsible for supply rail compatibility.

ISO 11898-2 describes the electrical implementation formed from a multi-dropped single-ended balanced line configuration with resistor termination at each end of the bus. In this configuration, a dominant state is asserted by one or more transmitters switching the CAN- to supply 0 V and (simultaneously) switching CAN+ to the +5 V bus voltage thereby forming a current path through the resistors that terminate the bus. As such, the terminating resistors form an essential component of the signaling system and are included not just to limit wave reflection at high frequency. During a recessive state, the signal lines and resistor(s) remain in a high impedances state with respect to both rails. Voltages on both CAN+ and CAN− tend (weakly) towards ½ rail voltage. A recessive state is only present on the bus when none of the transmitters on the bus is asserting a dominant state. During a dominant state the signal lines and resistor(s) move to a low impedance state with respect to the rails so that current flows through the resistor. CAN+ voltage tends to +5 V and CAN− tends to 0 V. Irrespective of signal state the signal lines are always in low impedance state with respect to one another by virtue of the terminating resistors at the end of the bus. Multiple access on CAN bus is achieved by the electrical logic of the system supporting just two states that are conceptually analogous to a 'wired OR' network.

The CAN is standardized in a standards set ISO 11898 entitled: "*Road vehicles—Controller area network (CAN)*" that specifies physical and datalink layer (levels 1 and 2 of the ISO/OSI model) of serial communication technology called Controller Area Network that supports distributed real-time control and multiplexing for use within road vehicles The standard ISO 11898-1:2015 entitled: "*Part 1: Data link layer and physical signalling*" specifies the characteristics of setting up an interchange of digital information between modules implementing the CAN data link layer. Controller area network is a serial communication protocol, which supports distributed real-time control and multiplexing for use within road vehicles and other control applications. The ISO 11898-1:2015 specifies the Classical CAN frame format and the newly introduced CAN Flexible Data Rate Frame format. The Classical CAN frame format allows bit rates up to 1 Mbit/s and payloads up to 8 byte per frame. The Flexible Data Rate frame format allows bit rates higher than 1 Mbit/s and payloads longer than 8 byte per frame. ISO 11898-1:2015 describes the general architecture of CAN in terms of hierarchical layers according to the ISO reference model for open systems interconnection (OSI) according to ISO/IEC 7498-1. The CAN data link layer is specified according to ISO/IEC 8802-2 and ISO/IEC 8802-3. ISO 11898-1:2015 contains detailed specifications of the following: logical link control sub-layer; medium access control sub-layer; and physical coding sub-layer.

The standard ISO 11898-2:2003 entitled: "*Part 2: High-speed medium access unit*" specifies the high-speed (transmission rates of up to 1 Mbit/s) medium access unit (MAU), and some medium dependent interface (MDI) features (according to ISO 8802-3), which comprise the physical layer of the controller area network (CAN): a serial communication protocol that supports distributed real-time control and multiplexing for use within road vehicles.

The standard ISO 11898-3:2006 entitled: "*Part 3: Low-speed, fault-tolerant, medium-dependent interface*" specifies characteristics of setting up an interchange of digital information between electronic control units of road vehicles equipped with the controller area network (CAN) at transmission rates above 40 kBit/s up to 125 kBit/s.

The standard ISO 11898-4:2004 entitled: "*Part 4: Time-triggered communication*" specifies time-triggered communication in the controller area network (CAN): a serial communication protocol that supports distributed real-time control and multiplexing for use within road vehicles. It is applicable to setting up a time-triggered interchange of digital information between electronic control units (ECU) of road vehicles equipped with CAN, and specifies the frame synchronization entity that coordinates the operation of both logical link and media access controls in accordance with ISO 11898-1, to provide the time-triggered communication schedule.

The standard ISO 11898-5:2007 entitled: "*Part 5: High-speed medium access unit with low-power mode*" specifies the CAN physical layer for transmission rates up to 1 Mbit/s for use within road vehicles. It describes the medium access unit functions as well as some medium dependent interface features according to ISO 8802-2. ISO 11898-5:2007 represents an extension of ISO 11898-2, dealing with new functionality for systems requiring low-power consumption features while there is no active bus communication. Physical layer implementations according to ISO 11898-5:2007 are compliant with all parameters of ISO 11898-2, but are defined differently within ISO 11898-5:2007. Implementations according to ISO 11898-5:2007 and ISO 11898-2 are interoperable and can be used at the same time within one network.

The standard ISO 11898-6:2013 entitled: "*Part 6: High-speed medium access unit with selective wake-up functionality*" specifies the controller area network (CAN) physical layer for transmission rates up to 1 Mbit/s. It describes the medium access unit (MAU) functions. ISO 11898-6:2013 represents an extension of ISO 11898-2 and ISO 11898-5, specifying a selective wake-up mechanism using configurable CAN frames. Physical layer implementations according to ISO 11898-6:2013 are compliant with all parameters of ISO 11898-2 and ISO 11898-5. Implementations according to ISO 11898-6:2013, ISO 11898-2 and ISO 11898-5 are interoperable and can be used at the same time within one network.

The standard ISO 11992-1:2003 entitled: "*Road vehicles—Interchange of digital information on electrical connections between towing and towed vehicles—Part 1: Physical and data-link layers*" specifies the interchange of digital information between road vehicles with a maximum authorized total mass greater than 3 500 kg, and towed vehicles, including communication between towed vehicles in terms of parameters and requirements of the physical and data link layer of the electrical connection used to connect the electrical and electronic systems. It also includes conformance tests of the physical layer.

The standard ISO 11783-2:2012 entitled: "*Tractors and machinery for agriculture and forestry—Serial control and communications data network—Part 2: Physical layer*" specifies a serial data network for control and communications on forestry or agricultural tractors and mounted, semi-mounted, towed or self-propelled implements. Its purpose is to standardize the method and format of transfer of data between sensors, actuators, control elements and information storage and display units, whether mounted on, or part of, the tractor or implement, and to provide an open interconnect system for electronic systems used by agricultural and forestry equipment. ISO 11783-2:2012 defines and describes the network's 250 kbit/s, twisted, non-shielded, quad-cable physical layer. ISO 11783-2 uses four unshielded twisted wires; two for CAN and two for terminating bias circuit (TBC) power and ground. This bus is used on agricultural tractors. It is intended to provide interconnectivity between the tractor and any agricultural implement adhering to the standard.

The standard J1939/11_201209 entitled: "*Physical Layer, 250 Kbps, Twisted Shielded Pair*" defines a physical layer having a robust immunity to EMI and physical properties suitable for harsh environments. These SAE Recommended Practices are intended for light- and heavy-duty vehicles on- or off-road as well as appropriate stationary applications which use vehicle derived components (e.g., generator sets). Vehicles of interest include but are not limited to: on- and off-highway trucks and their trailers; construction equipment; and agricultural equipment and implements.

The standard SAE J1939/15_201508 entitled: "*Physical Layer, 250 Kbps, Un-Shielded Twisted Pair (UTP)*" describes a physical layer utilizing Unshielded Twisted Pair (UTP) cable with extended stub lengths for flexibility in ECU placement and network topology. CAN controllers are now available which support the newly introduced CAN Flexible Data Rate Frame format (known as "CAN FD"). These controllers, when used on SAE J1939-15 networks, must be restricted to use only the Classical Frame format compliant to ISO 11898-1 (2003).

The standard SAE J2411_200002 entitled: "*Single Wire Can Network for Vehicle Applications*" defines the Physical Layer and portions of the Data Link Layer of the OSI model for data communications. In particular, this document specifies the physical layer requirements for any Carrier Sense Multiple Access/Collision Resolution (CSMA/CR) data link which operates on a single wire medium to communicate among Electronic Control Units (ECU) on road vehicles. Requirements stated in this document will provide a minimum standard level of performance to which all compatible ECUs and media shall be designed. This will assure full serial data communication among all connected devices regardless of the supplier. This document is to be referenced by the particular vehicle OEM Component Technical Specification which describes any given ECU, in which the single wire data link controller and physical layer interface is located. Primarily, the performance of the physical layer is specified in this document.

A specification for CAN FD (CAN with Flexible Data-Rate) version 1.0 was released on Apr. 17, 2012 by Robert Bosch GmbH entitled: CAN with Flexible Data-Rate Specification Version 1.0), and is incorporated in its entirety for all purposes as if fully set forth herein. This specification uses a different frame format that allows a different data length as well as optionally switching to a faster bit rate after the arbitration is decided. CAN FD is compatible with existing CAN 2.0 networks so new CAN FD devices can coexist on the same network with existing CAN devices. CAN FD is further described in iCC 2013 CAN in Automation articles by Florian Hatwich entitled: "*Bit Time Requirements for CAN FD*" and "*Can with Flexible Data-Rate*", and in National Instruments article published Aug. 1, 2014 entitled: "*Understanding CAN with Flexible Data-Rate (CAN FD)*", which are all incorporated in their entirety for all purposes as if fully set forth herein. In one example, the CAN FD interface is based on, compatible with, or uses, the SPC57EM80 controller device available from STMicroelectronics described in an Application Note AN4389 (document number DocD025493 Rev 2) published 2014 entitled: "*SPC57472/SPC57EM80 Getting Started*", which is incorporated in its entirety for all purposes as if fully set forth herein. Further, a CAN FD transceiver may be based on, compatible with, or use, transceiver model MCP2561/2FD available from Microchip Technology Inc., described in a data sheet DS20005284A published 2014 [ISBN-978-1-63276-020-3] entitled: "*MCP2561/2FD—High-Speed CAN Flexible Data Rate Transceiver*", which is incorporated in its entirety for all purposes as if fully set forth herein.

LIN. LIN (Local Interconnect Network) is a serial network protocol used for communication between components in vehicles. The LIN communication may be based on, compatible with, or is according to, ISO 9141, and is described in "*LIN Specification Package—Revision 2.2A*"

by the LIN Consortium (dated Dec. 31, 2010), which is incorporated in its entirety for all purposes as if fully set forth herein. The LIN standard is further standardized as part of ISO 17987-1 to 17987-7 standards. LIN may be used also over the vehicle's battery power-line with a special DC-LIN transceiver. LIN is a broadcast serial network comprising 16 nodes (one master and typically up to 15 slaves). All messages are initiated by the master with at most one slave replying to a given message identifier. The master node can also act as a slave by replying to its own messages, and since all communications are initiated by the master it is not necessary to implement a collision detection. The master and slaves are typically microcontrollers, but may be implemented in specialized hardware or ASICs in order to save cost, space, or power. Current uses combine the low-cost efficiency of LIN and simple sensors to create small networks that can be connected by a backbone network. (i.e., CAN in cars).

The LIN bus is an inexpensive serial communications protocol, which effectively supports remote application within a car's network, and is particularly intended for mechatronic nodes in distributed automotive applications, but is equally suited to industrial applications. The protocol's main features are single master, up to 16 slaves (i.e. no bus arbitration), Slave Node Position Detection (SNPD) that allows node address assignment after power-up, Single wire communications up to 19.2 kbit/s @ 40 meter bus length (in the LIN specification 2.2 the speed up to 20 kbit/s), Guaranteed latency times, Variable length of data frame (2, 4 and 8 byte), Configuration flexibility, Multi-cast reception with time synchronization, without crystals or ceramic resonators, Data checksum and error detection, Detection of defective nodes, Low cost silicon implementation based on standard UART/SCI hardware, Enabler for hierarchical networks, and Operating voltage of 12 V. LIN is further described in U.S. Pat. No. 7,091,876 to Steger entitled: "Method for Addressing the Users of a Bus System by Means of Identification Flows", which is incorporated in its entirety for all purposes as if fully set forth herein.

Data is transferred across the bus in fixed form messages of selectable lengths. The master task transmits a header that consists of a break signal followed by synchronization and identifier fields. The slaves respond with a data frame that consists of between 2, 4 and 8 data bytes plus 3 bytes of control information. The LIN uses Unconditional Frames, Event-triggered Frames, Sporadic Frames, Diagnostic Frames, User-Defined Frames, and Reserved Frames.

Unconditional Frames always carry signals and their identifiers are in the range 0 to 59 (0x00 to 0x3b) and all subscribers of the unconditional frame shall receive the frame and make it available to the application (assuming no errors were detected), and Event-triggered Frame, to increase the responsiveness of the LIN cluster without assigning too much of the bus bandwidth to the polling of multiple slave nodes with seldom occurring events. The first data byte of the carried unconditional frame shall be equal to a protected identifier assigned to an event-triggered frame. A slave shall reply with an associated unconditional frame only if its data value has changed. If none of the slave tasks responds to the header, the rest of the frame slot is silent and the header is ignored. If more than one slave task responds to the header in the same frame slot a collision will occur, and the master has to resolve the collision by requesting all associated unconditional frames before requesting the event-triggered frame again. Sporadic Frame is transmitted by the master as required, so a collision cannot occur. The header of a sporadic frame shall only be sent in its associated frame slot when the master task knows that a signal carried in the frame has been updated. The publisher of the sporadic frame shall always provide the response to the header. Diagnostic Frame always carries diagnostic or configuration data and they always contain eight data bytes. The identifier is either 60 (0x3C), called master request frame, or 61 (0x3D), called slave response frame. Before generating the header of a diagnostic frame, the master task asks its diagnostic module if it shall be sent or if the bus shall be silent. The slave tasks publish and subscribe to the response according to their diagnostic module. User-Defined Frame carry any kind of information. Their identifier is 62 (0x3E). The header of a user-defined frame is usually transmitted when a frame slot allocated to the frame is processed. Reserved Frame are not be used in a LIN 2.0 cluster, and their identifier is 63 (0x3F).

The LIN specification was designed to allow very cheap hardware-nodes being used within a network. The LIN specification is based on ISO 9141:1989 standard entitled: "*Road vehicles—Diagnostic systems—Requirements for interchange of digital information*" that Specifies the requirements for setting up the interchange of digital information between on-board Electronic Control Units (ECUs) of road vehicles and suitable diagnostic testers. This communication is established in order to facilitate inspection, test diagnosis and adjustment of vehicles, systems and ECUs. It does not apply when system-specific diagnostic test equipment is used. The LIN specification is further based on ISO 9141-2:1994 standard entitled: "*Road vehicles—Diagnostic systems—Part* 2: *CARB requirements for interchange of digital information*" that involves vehicles with nominal 12 V supply voltage, describes a subset of ISO 9141:1989, and specifies the requirements for setting-up the interchange of digital information between on-board emission-related electronic control units of road vehicles and the SAE OBD II scan tool as specified in SAE J1978. It is a low-cost, single-wire network, where microcontrollers with either UART capability or dedicated LIN hardware are used. The microcontroller generates all needed LIN data by software and is connected to the LIN network via a LIN transceiver (simply speaking, a level shifter with some add-ons). Working as a LIN node is only part of the possible functionality. The LIN hardware may include this transceiver and works as a pure LIN node without added functionality. As LIN Slave nodes should be as cheap as possible, they may generate their internal clocks by using RC oscillators instead of crystal oscillators (quartz or a ceramic). To ensure the baud rate-stability within one LIN frame, the SYNC field within the header is used. An example of a LIN transceiver is IC Model No. 33689D available from Freescale Semiconductor, Inc. described in a data-sheet Document Number MC33689 Rev. 8.0 (dated September 2012) entitled: "*System Basis Chip with LIN Transceiver*", which is incorporated in its entirety for all purposes as if fully set forth herein.

The LIN-Master uses one or more predefined scheduling tables to start the sending and receiving to the LIN bus. These scheduling tables contain at least the relative timing, where the message sending is initiated. One LIN Frame consists of the two parts header and response. The header is always sent by the LIN Master, while the response is sent by either one dedicated LIN-Slave or the LIN master itself. Transmitted data within the LIN is transmitted serially as eight-bit data bytes with one start & stop-bit and no parity. Bit rates vary within the range of 1 kbit/s to 20 kbit/s. Data on the bus is divided into recessive (logical HIGH) and dominant (logical LOW). The time normal is considered by the LIN Masters stable clock source, the smallest entity is one bit time (52 as @ 19.2 kbit/s).

Two bus states—Sleep-mode and active—are used within the LIN protocol. While data is on the bus, all LIN-nodes are requested to be in active state. After a specified timeout, the nodes enter Sleep mode and will be released back to active state by a WAKEUP frame. This frame may be sent by any node requesting activity on the bus, either the LIN Master following its internal schedule, or one of the attached LIN Slaves being activated by its internal software application. After all nodes are awakened, the Master continues to schedule the next Identifier.

MOST. MOST (Media Oriented Systems Transport) is a high-speed multimedia network technology optimized for use in automotive applications, and may be used for applications inside or outside the car. The serial MOST bus uses a ring topology and synchronous data communication to transport audio, video, voice and data signals via plastic optical fiber (POF) (MOST25, MOST150) or electrical conductor (MOST50, MOST150) physical layers. The MOST specification defines the physical and the data link layer as well as all seven layers of the ISO/OSI-Model of data communication. Standardized interfaces simplify the MOST protocol integration in multimedia devices. For the system developer, MOST is primarily a protocol definition. It provides the user with a standardized interface (API) to access device functionality, and the communication functionality is provided by driver software known as MOST Network Services. MOST Network Services include Basic Layer System Services (Layer 3, 4, 5) and Application Socket Services (Layer 6). They process the MOST protocol between a MOST Network Interface Controller (NIC), which is based on the physical layer, and the API (Layer 7).

A MOST network is able to manage up to 64 MOST devices in a ring configuration. Plug and play functionality allows MOST devices to be easily attached and removed. MOST networks can also be set up in virtual star network or other topologies. Safety critical applications use redundant double ring configurations. In a MOST network, one device is designated the timing master, used to continuously supply the ring with MOST frames. A preamble is sent at the beginning of the frame transfer. The other devices, known as timing followers, use the preamble for synchronization. Encoding based on synchronous transfer allows constant post-sync for the timing followers.

MOST25 provides a bandwidth of approximately 23 megabaud for streaming (synchronous) as well as package (asynchronous) data transfer over an optical physical layer. It is separated into 60 physical channels. The user can select and configure the channels into groups of four bytes each. MOST25 provides many services and methods for the allocation (and deallocation) of physical channels. MOST25 supports up to 15 uncompressed stereo audio channels with CD-quality sound or up to 15 MPEG-1 channels for audio/video transfer, each of which uses four Bytes (four physical channels). MOST also provides a channel for transferring control information. The system frequency of 44.1 kHz allows a bandwidth of 705.6 kbit/s, enabling 2670 control messages per second to be transferred. Control messages are used to configure MOST devices and configure synchronous and asynchronous data transfer. The system frequency closely follows the CD standard. Reference data can also be transferred via the control channel. Some limitations restrict MOST25's effective data transfer rate to about 10 kB/s. Because of the protocol overhead, the application can use only 11 of 32 bytes at segmented transfer and a MOST node can only use one third of the control channel bandwidth at any time.

MOST50 doubles the bandwidth of a MOST25 system and increases the frame length to 1024 bits. The three established channels (control message channel, streaming data channel, packet data channel) of MOST25 remain the same, but the length of the control channel and the sectioning between the synchronous and asynchronous channels are flexible. Although MOST50 is specified to support both optical and electrical physical layers, the available MOST50 Intelligent Network Interface Controllers (INICs) only support electrical data transfer via Unshielded Twisted Pair (UTP).

MOST150 was introduced in October 2007 and provides a physical layer to implement Ethernet in automobiles. It increases the frame length up to 3072 bits, which is about 6 times the bandwidth of MOST25. It also integrates an Ethernet channel with adjustable bandwidth in addition to the three established channels (control message channel, streaming data channel, packet data channel) of the other grades of MOST. MOST150 also permits isochronous transfer on the synchronous channel. Although the transfer of synchronous data requires a frequency other than the one specified by the MOST frame rate, it is also possible with MOST150. MOST150's advanced functions and enhanced bandwidth will enable a multiplex network infrastructure capable of transmitting all forms of infotainment data, including video, throughout an automobile. The optical transmission layer uses Plastic Optical Fibers (POF) with a core diameter of 1 mm as transmission medium, in combination with light emitting diodes (LEDs) in the red wavelength range as transmitters. MOST25 only uses an optical Physical Layer. MOST50 and MOST150 support both optical and electrical Physical Layers.

The MOST protocol is described in a book published 2011 by Franzis Verlag Gmbh [ISBN-978-3-645-65061-8] edited by Prof. Dr. Ing. Andreas Grzemba entitled: "*MOST—The Automotive Multimedia Network—From MOST25 to MOST 150*", in MOST Dynamic Specification by MOST Cooperation Rev. 3.0.2 dated October 2012 entitled: "*MOST—Multimedia and Control Networking Technology*", and in MOST Specification Rev. 3.0 E2 dated July 2010 by MOST Cooperation, which are all incorporated in their entirety for all purposes as if fully set forth herein.

MOST Interfacing may use a MOST transceiver, such as IC model No. OS81118 available from Microchip Technology Incorporated (headquartered in Chandler, Ariz., U.S.A.) and described in a data sheet DS00001935A published 2015 by Microchip Technology Incorporated entitled: "*MOST150 INIC with USB 2.0 Device Port*", or IC model No. OS8104A also available from Microchip Technology Incorporated and described in a data sheet PFL_OS8104A_V01_00_XX-4.fm published August 2007 by Microchip Technology Incorporated entitled: "*MOST Network Interface Controller*", which are both incorporated in their entirety for all purposes as if fully set forth herein.

FlexRay. FlexRay™ is an automotive network communications protocol developed by the FlexRay Consortium to govern on-board automotive computing. The FlexRay consortium disbanded in 2009, but the FlexRay standard is described in a set of ISO standards, ISO 17458 entitled: "*Road vehicles—FlexRay communications system*", including ISO 17458-1:2013 standard entitled: "*Part 1: General information and use case definition*", ISO 17458-2:2013 standard entitled: "*Part 2: Data link layer specification*", ISO 17458-3:2013 standard entitled: "*Part 3: Data link layer conformance test specification", ISO 17458-4:2013 standard entitled: "*Part 4: Electrical physical layer specification*", and ISO 17458-5:2013 standard entitled: "*Part 5: Electrical physical layer conformance test specification*".

FlexRay supports high data rates, up to 10 Mbit/s, explicitly supports both star and "party line" bus topologies, and can have two independent data channels for fault-tolerance (communication can continue with reduced bandwidth if one channel is inoperative). The bus operates on a time cycle, divided into two parts: the static segment and the dynamic segment. The static segment is pre-allocated into slices for individual communication types, providing a stronger real-time guarantee than its predecessor CAN. The dynamic segment operates more like CAN, with nodes taking control of the bus as available, allowing event-triggered behavior. FlexRay specification Version 3.0.1 is described in FlexRay consortium October 2010 publication entitled: "*FlexRay Communications System—Protocol Specification—Version 3.0.1*", which is incorporated in its entirety for all purposes as if fully set forth herein. The FlexRay physical layer is described in Carl Hanser Verlag Gmbh 2010 publication (Automotive 2010) by Lorenz, Steffen entitled: "*The FlexRay Electrical Physical Layer Evolution*", and in National Instruments Corporation Technical Overview Publication (Aug. 21, 2009) entitled: "*FlexRay Automotive Communication Bus Overview*", which are both incorporated in their entirety for all purposes as if fully set forth herein.

FlexRay system consists of a bus and processors (Electronic control unit, or ECUs), where each ECU has an independent clock. The clock drift must be not more than 0.15% from the reference clock, so the difference between the slowest and the fastest clock in the system is no greater than 0.3%. At each time, only one ECU writes to the bus, and each bit to be sent is held on the bus for 8 sample clock cycles. The receiver keeps a buffer of the last 5 samples, and uses the majority of the last 5 samples as the input signal. Single-cycle transmission errors may affect results near the boundary of the bits, but will not affect cycles in the middle of the 8-cycle region. The value of the bit is sampled in the middle of the 8-bit region. The errors are moved to the extreme cycles, and the clock is synchronized frequently enough for the drift to be small (Drift is smaller than 1 cycle per 300 cycles, and during transmission the clock is synchronized more than once every 300 cycles). An example of a FlexRay transceiver is model TJA1080A available from NXP Semiconductors N.V. headquartered in Eindhoven, Netherlands, described in Product data sheet (document Identifier TJA1080A, date of release: 28 Nov. 2012) entitled: "*TJA1080A FlexRay Transceiver—Rev. 6—28 Nov. 2012—Product data sheet*", which is incorporated in its entirety for all purposes as if fully set forth herein.

Further, the vehicular communication system employed may be used so that vehicles may communicate and exchange information with other vehicles and with roadside units, may allow for cooperation and may be effective in increasing safety such as sharing safety information, safety warnings, as well as traffic information, such as to avoid traffic congestion. In safety applications, vehicles that discover an imminent danger or obstacle in the road may inform other vehicles directly, via other vehicles serving as repeaters, or via roadside units. Further, the system may help in deciding right to pass first at intersections, and may provide alerts or warning about entering intersections, departing highways, discovery of obstacles, and lane change warnings, as well as reporting accidents and other activities in the road. The system may be used for traffic management, allowing for easy and optimal traffic flow control, in particular in the case of specific situations such as hot pursuits and bad weather. The traffic management may be in the form of variable speed limits, adaptable traffic lights, traffic intersection control, and accommodating emergency vehicles such as ambulances, fire trucks and police cars.

The vehicular communication system may further be used to assist the drivers, such as helping with parking a vehicle, cruise control, lane keeping, and road sign recognition. Similarly, better policing and enforcement may be obtained by using the system for surveillance, speed limit warning, restricted entries, and pull-over commands. The system may be integrated with pricing and payment systems such as toll collection, pricing management, and parking payments. The system may further be used for navigation and route optimization, as well as providing travel-related information such as maps, business location, gas stations, and car service locations. Similarly, the system may be used for emergency warning system for vehicles, cooperative adaptive cruise control, cooperative forward collision warning, intersection collision avoidance, approaching emergency vehicle warning (Blue Waves), vehicle safety inspection, transit or emergency vehicle signal priority, electronic parking payments, commercial vehicle clearance and safety inspections, in-vehicle signing, rollover warning, probe data collection, highway-rail intersection warning, and electronic toll collection.

OBD. On-Board Diagnostics (OBD) refers to a vehicle's self-diagnostic and reporting capability. OBD systems give the vehicle owner or repair technician access to the status of the various vehicle subsystems. Modern OBD implementations use a standardized digital communications port to provide real-time data in addition to a standardized series of diagnostic trouble codes, or DTCs, which allow one to rapidly identify and remedy malfunctions within the vehicle. Keyword Protocol 2000, abbreviated KWP2000, is a communications protocol used for on-board vehicle diagnostics systems (OBD). This protocol covers the application layer in the OSI model of computer networking. KWP2000 also covers the session layer in the OSI model, in terms of starting, maintaining and terminating a communications session, and the protocol is standardized by International Organization for Standardization as ISO 14230.

One underlying physical layer used for KWP2000 is identical to ISO 9141, with bidirectional serial communication on a single line called the K-line. In addition, there is an optional L-line for wakeup. The data rate is between 1.2 and 10.4 kilobaud, and a message may contain up to 255 bytes in the data field. When implemented on a K-line physical layer, KWP2000 requires special wakeup sequences: 5-baud wakeup and fast-initialization. Both of these wakeup methods require timing critical manipulation of the K-line signal, and are therefore not easy to reproduce without custom software. KWP2000 is also compatible on ISO 11898 (Controller Area Network) supporting higher data rates of up to 1 Mbit/s. CAN is becoming an increasingly popular alternative to K-line because the CAN bus is usually present in modern-day vehicles and thus removing the need to install an additional physical cable. Using KWP2000 on CAN with ISO 15765 Transport/Network layers is most common. Also using KWP2000 on CAN does not require the special wakeup functionality.

KWP2000 can be implemented on CAN using just the service layer and session layer (no header specifying length, source and target addresses is used and no checksum is used); or using all layers (header and checksum are encapsulated within a CAN frame). However using all layers is overkill, as ISO 15765 provides its own Transport/Network layers.

ISO 14230-1:2012 entitled: "*Road vehicles—Diagnostic communication over K-Line (DoK-Line)—Part 1: Physical layer*", which is incorporated in its entirety for all purposes as if fully set forth herein, specifies the physical layer, based on ISO 9141, on which the diagnostic services will be implemented. It is based on the physical layer described in ISO 9141-2, but expanded to allow for road vehicles with either 12 V DC or 24 V DC voltage supply.

ISO 14230-2:2013 entitled: "*Road vehicles—Diagnostic communication over K-Line (DoK-Line)—Part 2: Data link layer*", which is incorporated in its entirety for all purposes as if fully set forth herein, specifies data link layer services tailored to meet the requirements of UART-based vehicle communication systems on K-Line as specified in ISO 14230-1. It has been defined in accordance with the diagnostic services established in ISO 14229-1 and ISO 15031-5, but is not limited to use with them, and is also compatible with most other communication needs for in-vehicle networks. The protocol specifies an unconfirmed communication. The diagnostic communication over K-Line (DoK-Line) protocol supports the standardized service primitive interface as specified in ISO 14229-2. ISO 14230-2:2013 provides the data link layer services to support different application layer implementations like: enhanced vehicle diagnostics (emissions-related system diagnostics beyond legislated functionality, non-emissions-related system diagnostics); emissions-related OBD as specified in ISO 15031, SAE J1979-DA, and SAE J2012-DA. In addition, ISO 14230-2:2013 clarifies the differences in initialization for K-line protocols defined in ISO 9141 and ISO 14230. This is important since a server supports only one of the protocols mentioned above and the client has to handle the coexistence of all protocols during the protocol-determination procedure.

The application layer is described in ISO 14230-3:1999 entitled: "*Road vehicles—Diagnostic systems—Keyword Protocol* 2000 —*Part* 3: *Application layer*", and the requirements for emission-related systems are described in ISO 14230-4:2000 entitled: "*Road vehicles—Diagnostic systems—Keyword Protocol* 2000 —*Part 4: Requirements for emission-related systems*", which are both incorporated in their entirety for all purposes as if fully set forth herein.

Automotive Ethernet. Automotive Ethernet refers to the use of an Ethernet-based network for connections between in-vehicle electronic systems, and typically defines a physical network that is used to connect components within a car using a wired network. Ethernet is a family of computer networking technologies commonly used in Local Area Networks (LAN), Metropolitan Area Networks (MAN) and Wide Area Networks (WAN). It was commercially introduced in 1980 and first standardized in 1983 as IEEE 802.3, and has since been refined to support higher bit rates and longer link distances. The Ethernet standards comprise several wiring and signaling variants of the OSI physical layer in use with Ethernet. Systems communicating over Ethernet divide a stream of data into shorter pieces called frames. Each frame contains source and destination addresses, and error-checking data so that damaged frames can be detected and discarded; most often, higher-layer protocols trigger retransmission of lost frames. As per the OSI model, Ethernet provides services up to and including the data link layer. Since its commercial release, Ethernet has retained a good degree of backward compatibility. Features such as the 48-bit MAC address and Ethernet frame format have influenced other networking protocols. Simple switched Ethernet networks, while a great improvement over repeater-based Ethernet, suffer from single points of failure, attacks that trick switches or hosts into sending data to a machine even if it is not intended for it, scalability and security issues with regard to switching loops, broadcast radiation and multicast traffic, and bandwidth choke points where a lot of traffic is forced down a single link.

Advanced networking features in switches use shortest path bridging (SPB) or the spanning-tree protocol (STP) to maintain a loop-free, meshed network, allowing physical loops for redundancy (STP) or load-balancing (SPB). Advanced networking features also ensure port security, provide protection features such as MAC lockdown and broadcast radiation filtering, use virtual LANs to keep different classes of users separate while using the same physical infrastructure, employ multilayer switching to route between different classes, and use link aggregation to add bandwidth to overloaded links and to provide some redundancy. IEEE 802.1aq (shortest path bridging) includes the use of the link-state routing protocol IS-IS to allow larger networks with shortest path routes between devices.

A data packet on an Ethernet link is called an Ethernet packet, which transports an Ethernet frame as its payload. An Ethernet frame is preceded by a preamble and Start Frame Delimiter (SFD), which are both part of the Ethernet packet at the physical layer. Each Ethernet frame starts with an Ethernet header, which contains destination and source MAC addresses as its first two fields. The middle section of the frame is payload data including any headers for other protocols (for example, Internet Protocol) carried in the frame. The frame ends with a frame check sequence (FCS), which is a 32-bit cyclic redundancy check used to detect any in-transit corruption of data. Automotive Ethernet is described in a book by Charles M. Kozierok, Colt Correa, Robert B. Boatright, and Jeffrey Quesnelle entitled: "*Automotive Ethernet: The Definitive Guide*", published 2014 by Interpid Control Systems [ISBN-13: 978-0-9905388-0-6], and in a white paper document No. 915-3510-01 Rev. A published May 2014 by Ixia entitled: "*Automotive Ethernet: An Overview*", which are both incorporated in their entirety for all purposes as if fully set forth herein.

100BaseT1. 100BASE-T1 (and upcoming 1000Base-T1) is an Ethernet automotive standard, standardized in IEEE 802.3bw-2015 Clause 96 and entitled: "*802.3bw-2015 —IEEE Standard for Ethernet Amendment* 1: *Physical Layer Specifications and Management Parameters for* 100 *Mb/s Operation over a Single Balanced Twisted Pair Cable* (100*BASE-T*1)". The data is transmitted over a single copper pair, 3 bits per symbol (PAM3), and it supports only full-duplex, transmitting in both directions simultaneously. The twisted-pair cable is required to support 66 MHz, with a maximum length of 15 m. The standard is intended for automotive applications or when Fast Ethernet is to be integrated into another application.

BroadR-Reach®. BroadR-Reach® technology is an Ethernet physical layer standard designed for use in automotive connectivity applications. BroadR-Reach® technology allows multiple in-vehicle systems to simultaneously access information over unshielded single twisted pair cable, intended for reduced connectivity costs and cabling weight. Using BroadR-Reach® technology in automotive enables the migration from multiple closed applications to a single open, scalable Ethernet-based network within the automobile. This allows automotive manufacturers to incorporate multiple electronic systems and devices, such as advanced safety features (i.e. 360-degree surround view parking assistance, rear-view cameras and collision avoidance systems) and comfort and infotainment features. The automotive-qualified BroadR-Reach® Ethernet physical layer standard can be combined with IEEE 802.3 compliant switch technology to deliver 100 Mbit/s over unshielded single twisted pair cable.

The BroadR-Reach automotive Ethernet standard realizes simultaneous transmit and receive (i.e., full-duplex) operations on a single-pair cable instead of the half-duplex operation in 100BASE-TX, which uses one pair for transmit and one for receive to achieve the same data rate. In order to better de-correlate the signal, the digital signal processor (DSP) uses a highly optimized scrambler when compared to the scrambler used in 100BASE-TX. This provides a robust and efficient signaling scheme required by automotive applications. The BroadR-Reach automotive Ethernet standard uses a signaling scheme with higher spectral efficiency than that of 100BASE-TX. This limits the signal bandwidth of Automotive Ethernet to 33.3 MHz, which is about half the bandwidth of 100BASE-TX. A lower signal bandwidth improves return loss, reduces crosstalk, and ensures that BroadR-Reach® automotive Ethernet standard passes the stringent automotive electromagnetic emission requirements. The physical layer of BroadR-Reach® is described in a specification authored by Dr. Bernd Korber and published Nov. 28, 2014 by the OPEN Alliance, entitled: "BroadR-Reach® Definitions for Communication Channel—Version 2.0", which is incorporated in its entirety for all purposes as if fully set forth herein.

A method and a device for recording data or for transmitting stimulation data, which are transmitted in Ethernet-based networks of vehicles, are described in U.S. Patent Application No. 2015/0071115 to Neff et al. entitled: "Data Logging or Stimulation in Automotive Ethernet Networks Using the Vehicle Infrastructure", which is incorporated in its entirety for all purposes as if fully set forth herein. A method for recording data is described, wherein the data are transmitted from a transmitting control unit to a receiving control unit of a vehicle via a communication system of the vehicle. The communication system comprises an Ethernet network, wherein the data are conducted from a transmission component to a reception component of the Ethernet network via a transmission path, and wherein the data are to be recorded at a logging component of the Ethernet network, which does not lie on the transmission path. The method comprises the configuration of an intermediate component of the Ethernet network, which lies on the transmission path, to transmit a copy of the data as logging data to the logging component; and the recording of the logging data at the logging component.

A backbone network system for a vehicle enables high-speed and large-capacity data transmission between integrated control modules mounted in the vehicle, such that communication can be maintained through another alternative communication line when an error occurs in a specific communication line, is described in U.S. Pat. No. 9,172,635 to Kim et al. entitled: "Ethernet backbone network system for vehicle and method for controlling fail safe of the ethernet backbone network system", which is incorporated in its entirety for all purposes as if fully set forth herein. The backbone network system enables various kinds of integrated control modules mounted in the vehicle to perform large-capacity and high-speed communications, based on Ethernet communication, by connecting domain gateways of the integrated control modules through an Ethernet backbone network, and provides a fast fail-safe function so that domain gateways can perform communications through another communication line when an error occurs in a communication line between the domain gateways.

A system and method for managing a vehicle Ethernet communication network are disclosed in U.S. Pat. No. 9,450,911 to CHA et al. entitled: "System and method for managing ethernet communication network for use in vehicle", which is incorporated in its entirety for all purposes as if fully set forth herein. More specifically, each unit in a vehicle Ethernet communication network is configured to initially enter a power-on (PowerOn) mode when is applied to each unit of the vehicle to initialize operational programs. Once powered on, each unit enters a normal mode in which a node for each unit participates in a network to request the network. Subsequently, each unit enters a sleep indication (SleepInd) mode where other nodes are not requested even though the network has already been requested by the other nodes. A communication mode is then terminated at each unit and each unit enters a wait bus sleep (WaitBusSleep) mode in which all nodes connected to the network are no longer in communication and are waiting to switch to sleep mode. Finally, each unit is powered off to prevent communication between units in the network.

A system that includes an on-board unit (OBU) in communication with an internal subsystem in a vehicle on at least one Ethernet network and a node on a wireless network, is disclosed in U.S. Patent Application Publication No. 2014/0215491 to Addepalli et al. entitled: "System and method for internal networking, data optimization and dynamic frequency selection in a vehicular environment", which is incorporated in its entirety for all purposes as if fully set forth herein. A method in one embodiment includes receiving a message on the Ethernet network in the vehicle, encapsulating the message to facilitate translation to Ethernet protocol if the message is not in Ethernet protocol, and transmitting the message in Ethernet protocol to its destination. Certain embodiments include optimizing data transmission over the wireless network using redundancy caches, dictionaries, object contexts databases, speech templates and protocol header templates, and cross layer optimization of data flow from a receiver to a sender over a TCP connection. Certain embodiments also include dynamically identifying and selecting an operating frequency with least interference for data transmission over the wireless network.

An example of a vehicle bus, such as a CAN bus, is shown in an arrangement 50 in FIG. 5. The network is typically in a vehicle, where the wired communication medium 16b comprises two conductors or wires 54a and 54b, cooperatively connected in a multi-point ('bus') topology. ECUs 'A' 56a, 'B' 56b, and 'C' 56c are connected at different points along the medium (or at the medium ends), and are respectively connected to the medium 16b by connectors 55a, 55b, and 55c. The ECUs 'A' 56a, 'B' 56b, and 'C' 56c respectively comprises balanced line drivers 51a, 51b, and 51c, and balanced line receivers 52a, 52b, and 52c, that may be part of respective CAN bus transceivers 53a, 53b, and 53c, that are respectively connected to the connectors 55a, 55b, and 55c for coupling to the medium 16b. CAN Controllers 57a, 57b, and 57c are respectively coupled to the CAN transceivers 53a, 53b, and 53c, for handling the lower layers of the CAN protocol. Impedances such as resistors 19a and 19b are connected at both ends of the medium 16b as terminations for matching to the medium impedance for reducing signal reflections.

A vehicle bus may consist of, or may comprise, an avionics bus, used as a data bus in military, commercial and advanced models of civilian aircraft. Common avionics data bus protocols, with their primary application, include Aircraft Data Network (ADN) that is an Ethernet derivative for Commercial Aircraft, Avionics Full-Duplex Switched Ethernet (AFDX) that is a specific implementation of ARINC 664 (ADN) for Commercial Aircraft, ARINC 429: "Generic Medium-Speed Data Sharing for Private and Commercial Aircraft", ARINC 664, ARINC 629 used in Commercial Aircraft (such as Boeing 777), ARINC 708: "Weather Radar for Commercial Aircraft", ARINC 717: "Flight Data Recorder for Commercial Aircraft", ARINC 825 that is a CAN bus for commercial aircraft (for example Boeing 787 and Airbus A350), IEEE 1394b used in some Military Aircraft, MIL-STD-1553 and MIL-STD-1760 for Military Aircraft, and Time-Triggered Protocol (TTP): Boeing 787 Dreamliner, Airbus A380, Fly-By-Wire Actuation Platforms from Parker Aerospace.

MIL-STD-1553. MIL-STD-1553 is a military standard published by the United States Department of Defense that defines the mechanical, electrical, and functional characteristics of a serial data bus. It was originally designed as an avionic data bus for use with military avionics, but has also become commonly used in spacecraft on-board data handling (OBDH) subsystems, both military and civil. It features multiple (commonly dual) redundant balanced line physical layers, a (differential) network interface, time division multiplexing, half-duplex command/response protocol, and can handle up to 30 Remote Terminals (devices). The MIL-STD-1553 is standardized as a Military standard MIL-STD-1553B dated 21 Sep. 1978 by the Department of Defense of U.S.A. entitled: "*Aircraft Internal Time Division Command/Response Multiplex Data Bus*", and is described in AIM Gmbh tutorial v2.3 dated November 2010 entitled: "*MIL-STD-1553 Tutorial*", which are both incorporated in their entirety for all purposes as if fully set forth herein.

A single bus consists of a wire pair with 70-85Ω impedance at 1 MHz. Where a circular connector is used, its center pin is used for the high (positive) Manchester bi-phase signal. Transmitters and receivers couple to the bus via isolation transformers, and stub connections branch off using a pair of isolation resistors and, optionally, a coupling transformer, for reducing the impact of a short circuit and assures that the bus does not conduct current through the aircraft. A Manchester code is used to present both clock and data on the same wire pair and to eliminate any DC component in the signal (which cannot pass the transformers). The bit rate is 1.0 megabit per second (1 bit per µs). The combined accuracy and long-term stability of the bit rate is only specified to be within ±0.1%; the short-term clock stability must be within ±0.01%. The peak-to-peak output voltage of a transmitter is 18-27 V. The bus can be made dual or triply redundant by using several independent wire pairs, and then all devices are connected to all buses. There is provision to designate a new bus control computer in the event of a failure by the current master controller. Usually, the auxiliary flight control computer(s) monitor the master computer and aircraft sensors via the main data bus. A different version of the bus uses optical fiber, which weighs less and has better resistance to electromagnetic interference, including EMP.

A MIL-STD-1553 multiplex data bus system consists of a Bus Controller (BC) controlling multiple Remote Terminals (RT) all connected together by a data bus providing a single data path between the Bus Controller and all the associated Remote Terminals. There may also be one or more Bus Monitors (BM); however, Bus Monitors are specifically not allowed to take part in data transfers, and are only used to capture or record data for analysis, etc. In redundant bus implementations, several data buses are used to provide more than one data path, i.e. dual redundant data bus, tri-redundant data bus, etc. All transmissions onto the data bus are accessible to the BC and all connected RTs. Messages consist of one or more 16-bit words (command, data, or status). The 16 bits comprising each word are transmitted using Manchester code, where each bit is transmitted as a 0.5 µs high and 0.5 µs low for a logical 1 or a low-high sequence for a logical 0. Each word is preceded by a 3 µs sync pulse (1.5 µs low plus 1.5 µs high for data words and the opposite for command and status words, which cannot occur in the Manchester code) and followed by an odd parity bit. Practically each word could be considered as a 20-bit word: 3 bit for sync, 16 bit for payload and 1 bit for odd parity control. The words within a message are transmitted contiguously and there has to be a minimum of a 4 µs gap between messages. However, this inter-message gap can be, and often is, much larger than 4 µs, even up to 1 ms with some older Bus Controllers. Devices have to start transmitting their response to a valid command within 4-12 µs and are considered to not have received a command or message if no response has started within 14 µs.

ARINC 429. ARINC 429, also known as "Mark33 Digital Information Transfer System (DITS)" and as Aeronautical Radio INC. (ARINC), is the technical standard for the predominant avionics data bus used on most higher-end commercial and transport aircraft. It defines the physical and electrical interfaces of a two-wire data bus and a data protocol to support an aircraft's avionics local area network. ARINC 429 is a data transfer standard for aircraft avionics, and uses a self-clocking, self-synchronizing data bus protocol (Tx and Rx are on separate ports). The physical connection wires are twisted pairs carrying balanced differential signaling. Data words are 32 bits in length and most messages consist of a single data word. Messages are transmitted at either 12.5 or 100 kbit/s to other system elements that are monitoring the bus messages. The transmitter constantly transmits either 32-bit data words or the NULL state. A single wire pair is limited to one transmitter and no more than 20 receivers. The protocol allows for self-clocking at the receiver end, thus eliminating the need to transmit clocking data. The ARINC 429 unit of transmission is a fixed-length 32-bit frame, which the standard refers to as a 'word'. The bits within an ARINC 429 word are serially identified from Bit Number 1 to Bit Number 32 or simply Bit 1 to Bit 32. The fields and data structures of the ARINC 429 word are defined in terms of this numbering. The ARINC 429 is described in Avionics Interface Technologies Doc. No. 40100001 (downloaded from the Internet on November 2016) entitled: "*ARINC 429 Protocol Tutorial*", and in an ARINC Specification 429 prepared by Airlines Electronic Engineering Committee and published May 17, 2004 by Aeronautical Radio, Inc. entitled: "*Mark 33 Digital Information Transfer System (DITS)—Part 1—Functional Description, Electrical Interface, Label Assignments and Word Formats*", which are both incorporated in their entirety for all purposes as if fully set forth herein. ARINC 429 interface may use '*ARINC 429 Bus Interface—DirectCore*' v5.0 available from Actel Corporation (headquartered in Mountain-View, Calif., USA) described in Document No. 51700055-5/9.06 published September 2006, which is incorporated in its entirety for all purposes as if fully set forth herein.

Filter. A Low-Pass Filter (LPF) is a filter that passes signals with a frequency lower than a certain cutoff frequency and attenuates signals with frequencies higher than the cutoff frequency. The amount of attenuation for each frequency depends on the filter design. The LPF is also referred to as a high-cut filter, or treble-cut filter in audio applications. An LPF may be a simple first-order electronic high-pass filter that typically includes a series combination of a capacitor and a resistor and uses the voltage across the capacitor as an output. The capacitor exhibits reactance, and blocks low-frequency signals, forcing them through the load instead. At higher frequency, the reactance drops, and the capacitor effectively functions as a short circuit. Alternatively or in addition, the LPF may use an active electronic implementation of a first-order low-pass filter by using an operational amplifier. An LPF may equally be a second- or third-order, and may be passive or active.

A High Pass Filter (HPF) is a circuit or component that passes signals with a frequency higher than a certain cutoff frequency and attenuates signals with frequencies lower than the cutoff frequency, where the amount of attenuation for each frequency depends on the filter design. An HPF may be a simple first-order electronic high-pass filter that typically includes a series combination of a capacitor and a resistor and using the voltage across the resistor as an output. Alternatively or in addition, the HPF may use an active electronic implementation of a first-order high-pass filter by using an operational amplifier. An HPF may equally be a second- or third-order, and may be passive or active. A Band-Pass Filter (BPF) is a combination of a low-pass and a high-pass filter.

Waveform. As used herein, the term 'waveform' includes the shape and form of an electric signal as a varying quantity against time, such as a wave moving in a physical medium such as a transmission medium. Typically, a waveform is depicted by a graph that shows the changes in a real-time or recorded signal amplitude over the duration of recording. The amplitude of the signal is commonly measured on the Y-axis (vertical), and time on the X-axis (horizontal). A waveform may be represented as an image that represents an electronic signal or recording, and shows the changes in amplitude over a certain amount of time (horizontally). A periodic waveforms include these repetitive signals, such as a Sine-wave where the amplitude of the waveform follows a trigonometric sine function with respect to time, a Square-wave where the waveform is commonly used to represent digital information, a Triangle-wave that contains odd harmonics that decrease at −12 dB/octave, and a Sawtooth-wave that looks like the teeth of a saw. Other waveforms are often called composite waveforms and can often be described as a combination of a number of sinusoidal waves or other basis functions added together. The Fourier series describes the decomposition of periodic waveforms, such that any periodic waveform can be formed by the sum of a (possibly infinite) set of fundamental and harmonic components. Finite-energy non-periodic waveforms can be analyzed into sinusoids by the Fourier transform.

Timestamp. A timestamp is a sequence of characters or encoded information identifying when a certain event occurred, usually giving date and time of day, sometimes accurate to a small fraction of a second, and refers to digital date and time information attached to the digital data. For example, computer files contain timestamps that tell when the file was last modified, and digital cameras add timestamps to the pictures they take, recording the date and time the picture was taken. A timestamp is the time at which an event is recorded by a computer, not the time of the event itself. In many cases, the difference may be inconsequential: the time at which an event is recorded by a timestamp (e.g., entered into a log file) should be close to the time of the event. Timestamps are typically used for logging events or in a Sequence of Events (SOE), in which case each event in the log or SOE is marked with a timestamp. In a file system such as a database, timestamp commonly mean the stored date/time of creation or modification of a file or a record. The ISO 8601 standard standardizes the representation of dates and times, which are often used to construct timestamp values; and IETF RFC 3339 defines a date and time format for use in Internet protocols using the ISO 8601 standard representation.

RTC. Real-Time Clock (RTC) ICs measure time even when the power of the main device is off. During these times, RTC ICs draw power from an auxiliary battery or supercapacitor. Most modern RTC ICs reduce package pin count by supporting a serial interface. An example of an RTC IC is model No. DS1339A available from Maxim Integrated Products, Inc. (Headquartered in San Jose, Calif., U.S.A.), described in a data sheet No. 19-6425; Rev 2; January 2015 (2015) by Maxim Integrated Products, Inc. entitled: "*DS1339A—Low-Current, I²C, Serial Real-Time Clock*", which is incorporated in its entirety for all purposes as if fully set forth herein, and may be used as described in a tutorial 5791 (dated Mar. 28, 2014) by Maxim Integrated Products, Inc. entitled: "*Tips for Writing Bulletproof Real-Time Clock Control Code*", which is incorporated in its entirety for all purposes as if fully set forth herein.

The main aspects of the IP technology are IP addressing and routing. Addressing refers to how IP addresses are assigned to end hosts, and how sub-networks of IP host addresses are divided and grouped together. IP routing is performed by all hosts, but most importantly, by internetwork routers, which typically use either Interior Gateway Protocols (IGPs) or External Gateway Protocols (EGPs) to help make IP datagram forwarding decisions across IP connected networks. Core routers serving in the Internet backbone commonly use the Border Gateway Protocol (BGP) as per RFC 4098 or Multi-Protocol Label Switching (MPLS). Other prior art publications relating to Internet related protocols and routing include the following chapters of the publication number 1-587005-001-3 by Cisco Systems, Inc. (July 1999) entitled: "*Internetworking Technologies Handbook*", which are all incorporated in their entirety for all purposes as if fully set forth herein: Chapter 5: "*Routing Basics*" (pages 5-1 to 5-10), Chapter 30: "*Internet Protocols*" (pages 30-1 to 30-16), Chapter 32: "*IPv6*" (pages 32-1 to 32-6), Chapter 45: "*OSI Routing*" (pages 45-1 to 45-8) and Chapter 51: "*Security*" (pages 51-1 to 51-12), as well as in a IBM Corporation, International Technical Support Organization Redbook Documents No. GG24-4756-00 entitled: "*Local Area Network Concepts and Products: LAN Operation Systems and Management*", 1st Edition May 1996, Redbook Document No. GG24-4338-00, entitled: "*Introduction to Networking Technologies*", 1st Edition April 1994, Redbook Document No. GG24-2580-01 "*IP Network Design Guide*", 2nd Edition June 1999, and Redbook Document No. GG24-3376-07 "*TCP/IP Tutorial and Technical Overview*", ISBN 0738494682 8th Edition December 2006, which are incorporated in their entirety for all purposes as if fully set forth herein. Programming, designing, and using the Internet is described in a book by Paul S. Wang and Sanda Katila entitled: "*An Introduction to Web Design+Programming*" (Brooks/Cole book/Dec. 24, 2003), which is incorporated in its entirety for all purposes as if fully set forth herein.

Instant Messaging. Instant Messaging (IM) is a type of online chat, which offers real-time text transmission over the Internet. Short messages are typically transmitted bi-directionally between two parties, when each user chooses to complete a thought and select "send". Some IM applications can use push technology to provide real-time text, which transmits messages character by character, as they are composed. More advanced instant messaging can add file transfer, clickable hyperlinks, Voice over IP, or video chat. Instant messaging systems typically facilitate connections between specified known users (often using a contact list also known as a "buddy list" or "friend list"). Depending on the IM protocol, the technical architecture can be peer-to-peer (direct point-to-point transmission) or client-server (a central server retransmits messages from the sender to the communication device).

Instant messaging is a set of communication technologies used for text-based communication between two or more participants over the Internet or other types of networks. IM-chat happens in real-time. Of importance is that online chat and instant messaging differ from other technologies such as email due to the perceived quasi-synchrony of the communications by the users. Some systems permit messages to be sent to users not then 'logged on' (offline messages), thus removing some differences between IM and email (often done by sending the message to the associated email account). Various IP technologies are described in a thesis by Tim van Lokven (Jan. 23, 2011) entitled: *"Review and Comparison of Instant Messaging Protocols"*, which is incorporated in its entirety for all purposes as if fully set forth herein.

Text Messaging. Text messaging, or texting, is the act of composing and sending brief, electronic messages between two or more mobile phones, or fixed or portable devices over a phone network. The term commonly refers to messages sent using the Short Message Service (SMS), but may include messages containing image, video, and sound content (known as MMS messages). The sender of a text message is known as a texter, while the service itself has different colloquialisms depending on the region. Text messages can be used to interact with automated systems, for example, to order products or services, or to participate in contests. Advertisers and service providers use direct text marketing to message mobile phone users about promotions, payment due dates, et cetera instead of using mail, e-mail or voicemail. In a straight and concise definition for the purposes of this English language article, text messaging by phones or mobile phones should include all 26 letters of the alphabet and 10 numerals, i.e., alpha-numeric messages, or text, to be sent by texter or received by the textee. SMS messaging gateway providers can provide gateway-to-mobile (Mobile Terminated—MT) services. Some suppliers can also supply mobile-to-gateway (text-in or Mobile Originated/MO services).

SMS. Short Message Service (SMS) is a text messaging service component of phone, Web, or mobile communication systems. It uses standardized communications protocols to allow fixed line or mobile phone devices to exchange short text messages. SMS as used on modern handsets as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies, such as ANSI CDMA networks and Digital AMPS, as well as satellite and landline networks. The Short Message Service-Point to Point (SMS-PP) is standardized by the 3GPP as TS 23.040 and 3GPP TS 23.041, which define the Short Message Service—Cell Broadcast (SMS-CB), which allows messages (advertising, public information, etc.) to be broadcast to all mobile users in a specified geographical area.

Messages are sent to a Short Message Service Center (SMSC), which provides a "store and forward" mechanism. It attempts to send messages to the SMSC recipients, and if a recipient is not reachable, the SMSC queues the message for later retry. Some SMSCs also provide a "forward and forget" option where transmission is tried only once. Both Mobile Terminated (MT, for messages sent to a mobile handset) and Mobile Originating (MO, for those sent from the mobile handset) operations are supported, and the message delivery is "best effort" scheme, so there are no guarantees that a message will actually be delivered to its recipient, but delay or complete loss of a message is uncommon. SMS is a stateless communication protocol in which every SMS message is considered entirely independent of other messages. Enterprise applications using SMS as a communication channel for stateful dialogue (where an MO reply message is paired to a specific MT message) requires that session management be maintained external to the protocol through proprietary methods as Dynamic Dialogue Matrix (DDM).

The Short Message Service is realized by the use of the Mobile Application Part (MAP) of the SS #7 protocol, with Short Message protocol elements being transported across the network as fields within the MAP messages. These MAP messages may be transported using 'traditional' TDM based signaling, or over IP using SIGTRAN and an appropriate adaptation layer. The Short Message protocol itself is defined by 3GPP TS 23.040 for the Short Message Service— Point to Point (SMS-PP), and 3GPP TS 23.041 for the Cell Broadcast Service (CBS). SMS is further described in a 3GPP Technical Specification 3GPP TS 22.011 (v143.0.0, September 2015) entitled: *"3rd Generation Partnership Project, Technical Specification Group Services and System Aspects, Service accessibility (Release 14)"*, which is incorporated in its entirety for all purposes as if fully set forth herein.

MMS. Multimedia Messaging Service (MMS) is an Open Mobile Alliance (OMA) standard way to send messages that include multimedia content to and from mobile phones over a cellular network. It extends the core SMS (Short Message Service) capability that allowed exchange of text messages only up to 160 characters in length. The most popular use is to send photographs from camera-equipped handsets, and is also used on a commercial basis by media companies as a method of delivering news and entertainment content and by retail brands as a tool for delivering scannable coupon codes, product images, videos and other information. Unlike text only SMS, commercial MMS can deliver a variety of media including up to forty seconds of video, one image, multiple images via slideshow, or audio plus unlimited characters.

MMS messages are delivered differently from SMS. The first step is for the sending device to encode the multimedia content in a fashion similar to sending a MIME e-mail (MIME content formats are defined in the MMS Message Encapsulation specification). The message is then forwarded to the carrier MMS store and forward server, known as the MMSC (Multimedia Messaging Service Centre). If the receiver is on another carrier, then the MMSC acts as a relay, and forwards the message to the MMSC of the recipient's carrier using the Internet.

Once the recipient MMSC has received a message, it first determines whether the receiver's handset is "MMS capable", that it supports the standards for receiving MMS. If so, the content is extracted and sent to a temporary storage server with an HTTP front-end. An SMS "control message" (ping) containing the URL of the content is then sent to the recipient's handset to trigger the receiver's WAP browser to open and receive the content from the embedded URL. Several other messages are exchanged to indicate status of the delivery attempt. Before delivering content, some MMSCs also include a conversion service known as "content adaptation" that will attempt to modify the multimedia content into a format suitable for the receiver. E-mail and web-based gateways to the MMS (and SMS) system are common. On the reception side, the content servers can typically receive service requests from both WAPs and normal HTTP browsers, so delivery via the web is simple. For sending from external sources to handsets, most carriers allow MIME encoded message to be sent to the receiver's phone number with a special domain. MMS is described in a 3GPP technical specification 3GPP TS 23.140 V6.16.0 (March 2009) entitled: "3rd Generation Partnership Project, Technical Specification Group Core Network and Terminals, Multimedia Messaging Service (MMS); Functional description; Stage 2 (Release 6)", which is incorporated in its entirety for all purposes as if fully set forth herein.

Facebook. Facebook Messenger is an instant messaging service and software application which provides text and voice communication. Integrated with Facebook web-based Chat feature and built on the open MQTT protocol, Messenger lets Facebook users chat with friends both on mobile and on the main website. Facebook is described in a guide by American Majority organization (retrieved October 2015 from http://cmrw.org/) entitled: "facebook—A Beginner's Guide", which is incorporated in its entirety for all purposes as if fully set forth herein.

Twitter. Twitter is an online social networking service by Twitter Inc. (headquartered in San Francisco) that enables users to send and read short 140-character messages called "tweets". Registered users can read and post tweets, but unregistered users can only read them. Users access Twitter through the website interface, SMS, or mobile device applications. Tweets are publicly visible by default, but senders can restrict message delivery to just their followers. Users can tweet via the Twitter website, compatible external applications (such as for smartphones), or by Short Message Service (SMS) available in certain countries. Retweeting is when users forward a tweet via Twitter. Both tweets and retweets can be tracked to see which ones are most popular. Users may subscribe to other users tweets—this is known as "following" and subscribers are known as "followers" or "tweeps", a portmanteau of Twitter and peeps. Users can check the people who are unsubscribing them on Twitter ("unfollowing") via various services. In addition, users can block those who have followed them.

As a social network, Twitter revolves around the principle of followers. When you choose to follow another Twitter user, that user's tweets appear in reverse chronological order on your main Twitter page. Individual tweets are registered under unique IDs using software called snowflake, and geolocation data is added using 'Rockdove'. The URL t.co then checks for a spam link and shortens the URL. Next, the tweets are stored in a MySQL database using Gizzard, and the user receives acknowledgement that the tweets were sent. Tweets are then sent to search engines via the Firehose API. The process itself is managed by FlockDB and takes an average of 350 ms, and the service's Application Programming Interface (API) allows other web services and applications to integrate with Twitter. Twitter is described in a guide (retrieved October 2015 from https://g.twimg.com/business/pdfs/Twitter_Smallbiz_Guide.pdf) by Twitter, Inc., entitled: "Twitter for Small Business—A GUIDE TO GET STARTED", which is incorporated in its entirety for all purposes as if fully set forth herein.

WhatsApp. WhatsApp is an instant messaging app developed by WhatsApp Inc. (headquartered in Mountain View, Calif.) for smartphones that operates under a subscription business model. The proprietary, cross-platform app uses the Internet to send text messages, images, video, user location and audio media messages. WhatsApp uses a customized version of the open standard Extensible Messaging and Presence Protocol (XMPP). Upon installation, it creates a user account using one's phone number as the username (Jabber ID: [phone number]@s.whatsapp.net) WhatsApp software automatically compares all the phone numbers from the device's address book with its central database of WhatsApp users to automatically add contacts to the user's WhatsApp contact list.

Multimedia messages are sent by uploading the image, audio or video to be sent to an HTTP server and then sending a link to the content along with its Base64 encoded thumbnail (if applicable). WhatsApp follows a 'store and forward' mechanism for exchanging messages between two users. When a user sends a message, it first travels to the WhatsApp server where it is stored. Then the server repeatedly requests the receiver acknowledge receipt of the message. As soon as the message is acknowledged, the server drops the message; it is no longer available in database of server. The WhatsApp service is described in an article published (Aug. 30, 2013) on MOBILE HCI2013—COLLABORATION AND COMMUNICATION by Karen Church and Rodrigo de Oliveira (both of Telefonica Research) entitled: "What's up with WhatsApp? Comparing Mobile Instant—Messaging Behaviors with Traditional SMS", which is incorporated in its entirety for all purposes as if fully set forth herein.

Viber. Viber is an instant messaging and Voice over IP (VoIP) app for smartphones developed by Viber Media, where in addition to instant messaging, users can exchange images, video and audio media messages. Viber works on both 3G/4G and Wi-Fi networks. Viber includes text, picture and video messaging across all platforms, with voice calling available only to iPhone, Android and Microsoft's Windows Phone. The application user interface includes tab bar on the bottom, giving access to messages, recent calls, contact, the keypad and a button for accessing more options. Upon installation, it creates a user account using one's phone number as username. Viber synchronizes with the phone's address book, so users do not need to add contacts in a separate book. Since all users are registered with their phone number, the software returns all Viber users among the user contacts.

Mail Server. Mail server (a.k.a. Email server, Electronic Mail server, Mail Exchanger—MX) refer to a server operating as an electronic post office for email exchanging across networks, commonly performing the server-side of an MTA function. A Message Transfer Agent (or Mail Transfer Agent—MTA), or mail relay is a software that transfers electronic mail messages from one computer to another using a client-server application architecture. An MTA typically implements both the client (sending) and server (receiving) portions of the Simple Mail Transfer Protocol (SMTP). The Internet mail architecture is described in IETF RFC 5598 entitled: "Internet MailArchitecture", and the SMTP protocol is described in IETF RFC 5321 entitled: "Simple Mail Transfer Protocol" and in IETF RFC 7504 entitled: "SMTP 521 and 556 Reply Codes", which are all incorporated in their entirety for all purposes as if fully set forth herein.

The Domain Name System (DNS) typically associates a mail server to a domain with mail exchanger (MX) resource records, containing the domain name of a host providing MTA services. A message transfer agent receives mail either from another MTA, a Mail Submission Agent (MSA), or a Mail User Agent (MUA). The transmission details are specified by the Simple Mail Transfer Protocol (SMTP). When a recipient mailbox of a message is not hosted locally, the message is relayed, that is, forwarded to another MTA. Every time an MTA receives an email message, it adds a 'Received' trace header field to the top of the header of the message, thereby building a sequential record of MTAs handling the message. The process of choosing a target MTA for the next hop is also described in SMTP, but can usually be overridden by configuring the MTA software with specific routes. Internet mail schemes are described in IEEE Annals of the History of Computing paper published 2008 by the IEEE Computer Society [1058-6180/08], authored by Craig Partridge of BBN Technologies entitled: "*The technical Development of Internet Mail*", which is incorporated in its entirety for all purposes as if fully set forth herein.

A mail server infrastructure consists of several components that work together to send, relay, receive, store, and deliver email, and typically uses various Internet standard protocols for sending and retrieving email, such as the Internet standard protocol Simple Mail Transfer Protocol (SMTP) for sending email, the Internet standard protocols for retrieving email Post Office Protocol (POP), and Internet Message Access Protocol version 4 (IMAPv4). An example of a mail server software is 'Microsoft Exchange Server 2013' (available from Microsoft Corporation, headquartered in Redmond, Wash., U.S.A.), described in 'Pocket Consultant' book [ISBN: 978-0-7356-8168-2] published 2013 by Microsoft Press and entitled: "*Microsoft Exchange Server 2013—Configuration & Clients*", which is incorporated in its entirety for all purposes as if fully set forth herein.

The POP is specified in IETF RFC 1939 entitled: "*Post Office Protocol*", and updated specification with an extension mechanism is described in IETF RFC 2449 entitled: "*POP3 Extension Mechanism*", and an authentication mechanism is described in IETF RFC 1734 entitled: "*POP3 AUTHentication command*", which are all incorporated in their entirety for all purposes as if fully set forth herein. IMAP4 clients can create, rename, and/or delete mailboxes (usually presented to the user as folders) on the mail server, and copy messages between mailboxes, and this multiple mailbox support also allows servers to access shared and public folders. IMAP4 is described in IETF RFC 3501 entitled: "*INTERNET MESSAGE ACCESS PROTOCOL—VERSION 4 rev 1*", and the IMAP4 Access Control List (ACL) Extension may be used to regulate access rights, and is described in IETF RFC 4314 entitled: "*IMAP4 Access Control List (ACL) Extension*", which are both incorporated in their entirety for all purposes as if fully set forth herein.

Mail servers may be operated, or used by mailbox providers, and mail servers are described in U.S. Pat. No. 5,832,218 to Gibbs et al. entitled: "Client/server Electronic Mail System for Providing Off-Line Client Utilization and Seamless Server Resynchronization", in U.S. Pat. No. 6,081,832 to Gilchrist et al. entitled: "Object Oriented Mail Server Framework Mechanism", in U.S. Pat. No. 7,136,901 to Chung et al. entitled: "Electronic Mail Server", and in U.S. Pat. No. 7,818,383 to Kodama entitled: "E-Mail Server", which are all incorporated in their entirety for all purposes as if fully set forth herein.

XMPP. Extensible Messaging and Presence Protocol (XMPP) is an open standard communications protocol for message-oriented middleware based on XML (Extensible Markup Language) that enables the near-real-time exchange of structured yet extensible data between any two or more network entities. Designed to be extensible, the protocol has also been used for publish-subscribe systems, signaling for VoIP, video, file transfer, gaming, Internet of Things (IoT) applications such as the smart grid, and social networking services. The XMPP network uses a client-server architecture where clients do not talk directly to one another. The model is decentralized and anyone can run a server. By design, there is no central authoritative. Every user on the network has a unique XMPP address, called JID (for historical reasons, XMPP addresses are often called Jabber IDs). The JID is structured like an email address with a username and a domain name (or IP address) for the server where that user resides, separated by an 'at' sign (@), such as username@example.com. Since a user may wish to log in from multiple locations, they may specify a resource. A resource identifies a particular client belonging to the user (for example home, work, or mobile). This may be included in the JID by appending a slash followed by the name of the resource. For example, the full JID of a user's mobile account could be username@example.com/mobile. Each resource may have specified a numerical value called priority. Messages simply sent to username@example.com will go to the client with highest priority, but those sent to username@example.com/mobile will go only to the mobile client. The highest priority is the one with largest numerical value. JIDs without a username part are also valid, and may be used for system messages and control of special features on the server. A resource remains optional for these JIDs as well. XMPP is described in IETF RFC 6120 entitled: "*Extensible Messaging and Presence Protocol (XMPP): Core*", which describes client-server messaging using two open-ended XML streams, in IETF RFC 6121 entitled: "*Extensible Messaging and Presence Protocol (XMPP): Instant Messaging and Presence*", which describes instant messaging (IM), the most common application of XMPP, and in IETF RFC 6122 entitled: "*Extensible Messaging and Presence Protocol (XMPP): Address Format*", which describes the rules for XMPP addresses, also called JabberIDs or JIDs.

SIMPLE. The Session Initiation Protocol (SIP) for Instant Messaging and Presence Leveraging Extensions (SIMPLE) is an open standard Instant Messaging (IM) and presence protocol suite based on Session Initiation Protocol (SIP) managed by the Internet Engineering Task Force. The SIMPLE presence use the core protocol machinery that provides the actual SIP extensions for subscriptions, notifications and publications. IETF RFC 6665 defines the SUBSCRIBE and NOTIFY methods, where SUBSCRIBE allows to subscribe to an event on a server, and the server responds with NOTIFY whenever the event come up. IETF RFC 3856 defines how to make use of SUBSCRIBE/NOTIFY for presence. Two models are defined: an end-to-end model in which each User Agent handles presence subscriptions itself, and a centralized model. The message PUBLISH (IETF RFC 3903) allows User Agents to inform the presence server about their subscription states.

SIP defines two modes of instant messaging: The Page Mode makes use of the SIP method MESSAGE, as defined in IETF RFC 3428. This mode establishes no sessions, and the Session Mode. The Message Session Relay Protocol (RFC 4975, RFC 4976) is a text-based protocol for exchanging arbitrarily-sized content between users, at any time. An MSRP session is set up by exchanging certain information, such as an MSRP URI, within SIP and SDP signaling. SIMPLE is described in IETF RFC 6914 entitled: "*SIMPLE Made Simple: An Overview of the IETF Specifications for*

*Instant Messaging and Presence Using the Session Initiation Protocol (SIP)*", which is incorporated in its entirety for all purposes as if fully set forth herein.

Any message herein may comprise the time of the message and the controlled switch status, and may be sent over the Internet via the wireless network to a client device using a peer-to-peer scheme. Alternatively or in addition, any message herein may be sent over the Internet via the wireless network to an Instant Messaging (IM) server for being sent to a client device as part of an IM service. The message or the communication with the IM server may use, or may be based on, SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, Azureus Extended Messaging Protocol, Apple Push Notification Service (APNs), or Hypertext Transfer Protocol (HTTP). The message may be a text-based message and the IM service may be a text messaging service, and may be according to, or may be based on, a Short Message Service (SMS) message and the IM service may be a SMS service, the message may be according to, or based on, an electronic-mail (e-mail) message and the IM service may be an e-mail service, the message may be according to, or based on, WhatsApp message and the IM service may be a WhatsApp service, the message may be according to, or based on, an Twitter message and the IM service may be a Twitter service, or the message may be according to, or based on, a Viber message and the IM service may be a Viber service. Alternatively or in addition, the message may be a Multimedia Messaging Service (MMS) or an Enhanced Messaging Service (EMS) message that includes an audio or video data, and the IM service may respectively be a MMS or EMS service.

IP. The Internet Protocol (IP) is the principal communications protocol used for relaying datagrams (packets) across a network using the Internet Protocol Suite. It is considered as the primary protocol that establishes the Internet, and is responsible for routing packets across the network boundaries. IP is the primary protocol in the Internet Layer of the Internet Protocol Suite, and is responsible for delivering datagrams from the source host to the destination host based on their addresses. For this purpose, IP defines addressing methods and structures for datagram encapsulation. Internet Protocol Version 4 (IPv4) is the dominant protocol of the Internet. IPv4 is described in Internet Engineering Task Force (IETF) Request for Comments (RFC) 791 and RFC 1349, and the successor, Internet Protocol Version 6 (IPv6), is currently active and in growing deployment worldwide. IPv4 uses 32-bit addresses (providing 4 billion: $4.3 \times 10^9$ addresses), while IPv6 uses 128-bit addresses (providing 340 undecillion or $3.4 \times 10^{38}$ addresses), as described in RFC 2460.

The Internet Protocol is responsible for addressing hosts and routing datagrams (packets) from a source host to the destination host across one or more IP networks. For this purpose, the Internet Protocol defines an addressing system that has two functions. Addresses identify hosts, and provide a logical location service. Each packet is tagged with a header that contains the meta-data for the purpose of delivery. This process of tagging is also called encapsulation. IP is a connectionless protocol for use in a packet-switched Link Layer network, and does not need circuit setup prior to transmission. The aspects of guaranteeing delivery, proper sequencing, avoidance of duplicate delivery, and data integrity are addressed by an upper transport layer protocol (e.g., TCP—Transmission Control Protocol and UDP—User Datagram Protocol).

The main aspects of the IP technology are IP addressing and routing. Addressing refers to how IP addresses are assigned to end hosts, and how sub-networks of IP host addresses are divided and grouped together. IP routing is performed by all hosts, but most importantly, by internetwork routers, which typically use either Interior Gateway Protocols (IGPs) or External Gateway Protocols (EGPs) to help make IP datagram forwarding decisions across IP connected networks. Core routers serving in the Internet backbone commonly use the Border Gateway Protocol (BGP) as per RFC 4098 or Multi-Protocol Label Switching (MPLS). Other prior art publications relating to Internet related protocols and routing include the following chapters of the publication number 1-587005-001-3 by Cisco Systems, Inc. (July 1999) entitled: "*Internetworking Technologies Handbook*", which are all incorporated in their entirety for all purposes as if fully set forth herein: Chapter 5: "*Routing Basics*" (pages 5-1 to 5-10), Chapter 30: "*Internet Protocols*" (pages 30-1 to 30-16), Chapter 32: "*IPv6*" (pages 32-1 to 32-6), Chapter 45: "*OSI Routing*" (pages 45-1 to 45-8) and Chapter 51: "*Security*" (pages 51-1 to 51-12), as well as in a IBM Corporation, International Technical Support Organization Redbook Documents No. GG24-4756-00 entitled: "*Local Area Network Concepts and Products: LAN Operation Systems and Management*", $1^{st}$ Edition May 1996, Redbook Document No. GG24-4338-00, entitled: "*Introduction to Networking Technologies*", $1^{st}$ Edition April 1994, Redbook Document No. GG24-2580-01 "*IP Network Design Guide*", $2^{nd}$ Edition June 1999, and Redbook Document No. GG24-3376-07 "*TCP/IP Tutorial and Technical Overview*", ISBN 0738494682 $8^{th}$ Edition December 2006, which are incorporated in their entirety for all purposes as if fully set forth herein. Programming, designing, and using the Internet is described in a book by Paul S. Wang and Sanda Katila entitled: "*An Introduction to Web Design+Programming*" (Brooks/Cole book/Dec. 24, 2003), which is incorporated in its entirety for all purposes as if fully set forth herein.

Memory. The terms "memory" and "storage" are used interchangeably herein and refer to any physical component that can retain or store information (that can be later retrieved) such as digital data on a temporary or permanent basis, typically for use in a computer or other digital electronic device. A memory can store computer programs or any other sequence of instructions, or data such as files, text, numbers, audio and video, as well as any other form of information represented as a string of bits or bytes. The physical means of storing information may be electrostatic, ferroelectric, magnetic, acoustic, optical, chemical, electronic, electrical, or mechanical. A memory may be in a form of Integrated Circuit (IC, a.k.a. chip or microchip). Alternatively or in addition, the memory may be in the form of a packaged functional assembly of electronic components (module). Such module may be based on a PCB (Printed Circuit Board) such as PC Card according to Personal Computer Memory Card International Association (PCMCIA) PCMCIA 2.0 standard, or a Single In-line Memory Module (SIMM) (or DIMM) which is standardized under the JEDEC JESD-21C standard. Further, a memory may be in the form of a separately rigidly enclosed box such as a hard-disk drive.

Semiconductor memory may be based on Silicon-On-Insulator (SOI) technology, where a layered silicon-insulator-silicon substrate is used in place of conventional silicon substrates in semiconductor manufacturing, especially microelectronics, to reduce parasitic device capacitance and thereby improving performance. SOI-based devices differ from conventional silicon-built devices in that the silicon junction is above an electrical insulator, typically silicon dioxide or sapphire (these types of devices are called silicon on sapphire, or SOS, and are less common). SOI-Based memories include Twin Transistor RAM (TTRAM) and Zero-capacitor RAM (Z-RAM).

A memory may be a volatile memory, where a continuous power is required to maintain the stored information such as RAM (Random Access Memory), including DRAM (Dynamic RAM) or SRAM (Static RAM), or alternatively be a non-volatile memory which does not require a maintained power supply, such as Flash memory, EPROM, EEPROM and ROM (Read-Only Memory). Volatile memories are commonly used where long-term storage is required, while non-volatile memories are more suitable where fast memory access is required. Volatile memory may be dynamic, where the stored information is required to be periodically refreshed (such as re-read and then re-written) such as DRAM, or alternatively may be static, where there is no need to refresh as long as power is applied, such as RAM. In some cases, a small battery is connected to a low-power consuming volatile memory, allowing its use as a non-volatile memory.

A memory may be read/write (or mutable storage) memory where data may be overwritten more than once and typically at any time, such as RAM and Hard Disk Drive (HDD). Alternatively, a memory may be an immutable storage where the information is retained after being written once. Once written, the information can only be read and typically cannot be modified, sometimes referred to as Write Once Read Many (WORM). The data may be written at the time of manufacture of the memory, such as mask-programmable ROM (Read Only Memory) where the data is written into the memory a part of the IC fabrication, CD-ROM (CD—Compact Disc) and DVD-ROM (DVD—Digital Versatile Disk, or Digital Video Disk). Alternately, the data may be once written to the "write once storage" at some point after manufacturing, such as Programmable Read-Only Memory (PROM) or CD-R (Compact Disc-Recordable).

A memory may be accessed using "random access" scheme, where any location in the storage can be accessed at any moment in typically the same time, such as RAM, ROM or most semiconductor-based memories. Alternatively, a memory may be of "sequential access" type, where the pieces of information are gathered or stored in a serial order, and therefore the time to access a particular piece of information or a particular address depends upon which piece of information was last accessed, such as magnetic tape-based storage. Common memory devices are location-addressable, where each individually accessible unit of data in storage is selected using its numerical memory address. Alternatively, a memory may be file-addressable, where the information is divided into files of variable length, and a file is selected by using a directory or file name (typically a human readable name), or may be content-addressable, where each accessible unit of information is selected based on the stored content (or part of). File addressability and content addressability commonly involves additional software (firmware), hardware, or both.

Various storage technologies are used for the medium (or media) that actually holds the data in the memory. Commonly in use are semiconductor, magnetic, and optical mediums. Semiconductor based medium is based on transistors, capacitors or other electronic components in an IC, such as RAM, ROM and Solid-State Drives (SSDs). A currently popular non-volatile semiconductor technology is based on a flash memory, and can be electrically erased and reprogrammed. The flash memory is based on NOR- or NAND-based single-level cells (SLC) or multi-level cells (MLC), made from floating-gate transistors. Non-limiting examples of applications of flash memory include personal and laptop computers, PDAs, digital audio players (MP3 players), digital cameras, mobile phones, synthesizers, video games consoles, scientific instrumentation, industrial robotics and medical electronics. The magnetic storage uses different types of magnetization on a magnetic or a ferromagnetic coated surface as a medium for storing the information. The information is accessed by read/write heads or other transducers. Non-limiting examples of magnetic-based memory are Floppy disk, magnetic tape data storage and HDD.

In optical storage, typically an optical disc is used that stores information in deformities on the surface of a circular disc, and the information is read by illuminating the surface with a laser diode and observing the reflection. The deformities may be permanent (read only media), formed once (write once media) or reversible (recordable or read/write media). Non-limiting examples of read-only storage, commonly used for mass distribution of digital information such as music, audio, video or computer programs, include CD-ROM, BD-ROM (BD—Blu-ray Disc) and DVD-ROM. Non-limiting examples of write-once storage are CD-R, DVD-R, DVD+R, and BD-R, and non-limiting examples of recordable storage are CD-RW (Compact Disc-ReWritable), DVD-RW, DVD+RW, DVD-RAM, and BD-RE (Blu-ray Disc Recordable Erasable). Another non-limiting example is magneto-optical disc storage, where the magnetic state of a ferromagnetic surface stores the information, which can be read optically. 3D optical data storage is an optical data storage, in which information can be recorded and/or read, with three-dimensional resolution.

A storage medium may be removable, designed to be easily removed from, and easily installed or inserted into the computer by a person, typically without the need for any tool, and without needing to power off the computer or the associated drive. Such a capability allows for archiving, transporting data between computers, and buying and selling software. The medium may be read using a reader or player that reads the data from the medium, may be written by a burner or writer, or may be used for writing and reading by a writer/reader commonly referred to as a drive. Commonly in the case of magnetic or optical based mediums, the medium has the form factor of a disk, which is typically a round plate on which the data is encoded, respectively known as magnetic disc and optical disk. The machine that is associated with reading data from and writing data onto a disk is known as a disk drive. Disk drives may be internal (integrated within the computer enclosure) or may be external (housed in a separate box that connects to the computer). Floppy disks, that can be read from or written on by a floppy drive, are a non-limiting example of removable magnetic storage medium, and CD-RW (Compact Disc-ReWritable) is a non-limiting example of a removable optical disk. A commonly-used non-volatile removable semiconductor based storage medium is referred to as a memory card. A memory card is a small storage device, commonly based on flash memory, and can be read by a suitable card reader.

A memory may be accessed via a parallel connection or bus (wherein each data word is carried in parallel on multiple electrical conductors or wires), such as PATA, PCMCIA or EISA, or via serial bus (such as bit-serial connections) such as USB or Ethernet based on IEEE802.3 standard, or a combination of both. The connection may further be wired in various topologies such as multi-drop (electrical parallel), point-to-point, or daisy-chain. A memory may be powered via a dedicated port or connector, or may be powered via a power signal carried over the bus, such as SATA or USB.

A memory may be provided according to a standard, defining its form factor (such as its physical size and shape) and electrical connections (such as power and data interface). A standard-based memory may be easily inserted to, or removed from, a suitable corresponding slot (a.k.a. expansion slots) of a computer or other digital device. In one non-limiting example, a memory card using a PC Card form factor according to PCMCIA 2.0 (or JEIDA 4.1) is used that is suitable for mounting into a corresponding PCMCIA-compatible slot, supporting 16 or 32-bit width interface, and connected via 68 pin connectors. Similarly, CardBus according to PCMCIA 5.0 may be used. In one non-limiting example, the memory is in the form of SD (Secure Digital) Card, based on standard by SD Card Association (SDA), which is commonly used in many small portable devices such as digital video camcorders, digital cameras, audio players and mobile phones. Other types of memory cards may be equally used, such as CompactFlash (CF), MiniSD card, MicroSD Card, and xD-Picture Card.

In another non-limiting example, a memory may be provided as a USB drive (such as a USB Flash drive), which is a portable enclosed card that plugs into a computer USB port and communicates with a USB host. Such flash-based memory drives are commonly referred to as "thumb drives", "jump drives", and "memory sticks". Such USB mass storage devices and others are described in "*Chapter 1: Mass Storage basics*", downloaded October 2011 from: http://www.lvr.com/files/usb_mass_storage_chapter_1.pdf, which is incorporated in its entirety for all purposes as if fully set forth herein. In another non-limiting example, the memory is designed to fit into a drive bay in a computer enclosure. Commonly such drive bays are standard-sized, and used to store disk drives. The drives may be usually secured with screws or using a tool-less fasteners. A current popular standard is the 3.5 inches (3.5") bays, which dimensions are specified in SFF standard specifications SFF-8300 and SFF-8301, which were incorporated into the EIA (Electronic Industries Association) standard EIA-470.

Traditionally, computer-related storage was categorized to main memory, secondary and tertiary storages, having different latency (access time), capacity, and size. The main memory (or primary memory or internal memory) referred to the memory that was directly accessible by the CPU, and typically stored the program to be executed by the processor. The secondary storage (or external memory or auxiliary storage) referred to a memory which was not directly accessible to the CPU and thus required input/output channels, commonly offering larger storage capacity than the main memory. The tertiary storage involved mass storage media, commonly associated with a dismount removable media, used for archiving rarely accessed information. The latency of accessing a particular location is typically nanoseconds for primary storage, milliseconds for secondary storage, and seconds for tertiary storage. The capacity of a memory is commonly featured in bytes (B), where the prefix 'K' is used to denote kilo=$2^{10}=1024^1=1024$, the prefix 'M' is used to denote mega=$2^{20}=1024^2=1,048,576$, the prefix 'G' is used to denote giga=$2^{30}=1024^3=1,073,741,824$, and the prefix 'T' is used to denote tera=$2^{40}=1024^4=1,099,511,627,776$.

A memory may be Direct-Attached Storage (DAS), where the memory is directly connected to a host, computer, server, or workstation, commonly without a network in between. Common examples involve a number of Hard Disk Drives (HDDs) connected to a processor or a computer through a Host Bus Adapter (HBA). Commonly, serial and point-to-point connections are used, such as SATA, eSATA, SCSI, SAS and Fibre Channel. Alternatively, a memory can be part of a Network-Attached Storage (NAS), and a self-contained file level storage (typically arranged as a server) may be connected to a network, providing data sharing to other devices (such as heterogeneous clients), commonly via a network device such as a hub, switch or router. NAS is specialized for its task by its hardware, software, or both, and thus provides faster data access, easier administration, and simple configuration. NAS is typically associated with an LAN, and provides an Ethernet interface based on IEEE802.3 standard may be used such as 10/100BaseT, 1000BaseT/TX (gigabit Ethernet), 10 gigabit Ethernet (10GE or 10 GbE or 10 GigE per IEEE Standard 802.3ae-2002as standard), 40 Gigabit Ethernet (40 GbE), or 100 Gigabit Ethernet (100 GbE as per Ethernet standard IEEE P802.3ba). In another alternative, a memory may be part of a Storage Area Network (SAN), which is a high-speed (commonly dedicated) network (or sub-network) for sharing storage devices, such as disk arrays, tape libraries and optical jukeboxes. The SAN allows multiple computers or servers to access multiple storage devices using a network such as WAN or LAN. SAN often utilizes a Fibre Channel fabric topology, made up of a number of Fibre Channel switches.

Blu-ray Disc (official abbreviation BD) is an optical disc storage medium designed to supersede the DVD format, where blue laser is used to read the disc, allowing information to be stored at a greater density than is possible with the longer-wavelength red laser used for DVDs. The disc diameter is 120 mm and the disc thickness is 1.2 mm of plastic optical disc, the same size as DVDs and CDs. Blu-ray Discs contain 25 GB (23.31 GiB) per layer, with dual layer discs (50 GB) being the norm for feature-length video discs. Triple layer discs (100 GB) and quadruple layers (128 GB) are available for BD-XL Blu-ray re-writer drives. The Blu-ray technology and its uses are described in the White Paper "Blu-ray Disc Format, 4. Key Technologies", by Blu-ray Disc Founders, August 2004, in the brochure entitled: "*Blu-ray Technology—DISCover the infinite storage media*", by DISC Archiving Systems B.V., 2010, and in a Whitepaper entitled: "*Sustainable Archival Storage—The Benefits of Optical Archiving*", by DISC Archiving Systems B.V., downloaded from www.disc-group.com, which are all incorporated in their entirety for all purposes as if fully set forth herein.

Today, Hard Disk Drives (HDD) are used as secondary storage in general purpose computers, such as desktop personal computers and laptops. An HDD is a non-volatile, random access digital data storage device, featuring rotating rigid platters on a motor-driven spindle within a protective enclosure. The enclosure may be internal to the computer system enclosure, or external. Data is magnetically read from, and written to, the platter by read/write heads that float on a film or air above the platters. The HDDs are typically interfaced using high-speed interfaces, commonly of a serial type. Common HDDs structure, characteristics, operation, form factors, and interfacing are described in "*Hard-Disk*

*Basics*" compiled from PCGUIDE.COM by Mehedi Hasan, which is incorporated in its entirety for all purposes as if fully set forth herein. Most SSDs include a controller that incorporates the electronics that bridge the NAND memory components to the host computer. The controller is an embedded processor that executes firmware-level code and is one of the most important factors of SSD performance. Functions performed by the controller include Error correction (ECC), Wear leveling, Bad block mapping, Read scrubbing and read disturb management, Read and write caching, and Garbage collection. Information about SSD technology, marketing and applications are provided in Martin B., Dell entitled: "*DELL Solid State Disk (SSD) Drive—Storage Solutions for Select Poweredge Server*", May 2009, in Janukowicz J., Reisel D., White-Paper entitled: "*MLC Solid State Drives: Accelerating the Adoption of SSDs*", IDC #213730, September 2008, and in Dufrasne B., Blum K, Dubberke U., IBM Corp. Redbooks Redpaper entitled: "*DS8000: Introducing Solid State Drives*" (2009), which are all incorporated in their entirety for all purposes as if fully set forth herein.

PLD. A Programmable Logic Device (PLD) is an electronic component used to build reconfigurable circuits. A PLD may be reconfigured by programming in the field by a user to provide a logic function. Examples of PLDs include PAL (Programmable Array Logic), GAL (Generic Array Logic), CPLD (Complex Programmable Logic Device), and FPGA (Field-Programmable Gate Array). A PLD is effectively a combination of a logic device and a memory device, where the memory is used to store the pattern that was given to the chip during programming. The memory is typically electrically programmable and erasable, may be volatile or non-volatile, and is commonly an integrated circuit using common storage technology such as Silicon antifuses, SRAM, EPROM or EEPROM cells, or Flash memory. Further, the memory may be internal to the PLD or external to it. The programming typically uses a programming language such as Verilog and VHDL.

A CPLD is a PLD with complexity between that of PALs and FPGAs, and architectural features of both. The building block of a CPLD is the macrocell, which contains logic implementing disjunctive normal form expressions and more specialized logic operations, thus forming the logic functions with sea-of-gates (for example, a sum of products). Typically, a CPLD contain on-chip non-volatile memory. An FPGA is a PLD that contains programmable logic components called "logic blocks", and a hierarchy of reconfigurable interconnects that allow the blocks to be wired together. Logic blocks can be configured to perform complex combinational functions, or merely simple logic gates like AND and XOR. In most FPGAs, the logic blocks also include memory elements, which may be simple flip-flops or complete blocks of memory. In many cases, an FPGA uses a memory external to the component.

PLDs such as CPLD and FPGA are field programmable, allowing a user to change the logic per specific needs, and further for updating the programming by storing a new content into the PLD associated memory, being internal or external to the device. A processor (or a direct memory) is connected to the PLD associated memory, and writes the programming content into it. In case of malware in the system or an error in the communication link, the written content may be damaged, similar to the above discussion regarding writing to a peripheral device such as an HDD.

Malware. Malware, short for 'malicious software', is a general term used to refer to a variety of forms of hostile or intrusive software. Typically, a malware is software or program that is inserted into a system, usually covertly, with the intent of compromising the confidentiality, integrity, or availability of the victim's data, applications, or operating system or of otherwise annoying or disrupting the victim. Malware is commonly used or programmed by attackers to disrupt computer operation, gather sensitive information, or gain access to private computer systems. It can appear in the form of code, scripts, active content, firmware, and other software. Malware may be used to steal sensitive information of personal, financial, or business importance by black hat hackers with harmful intentions. Malware is sometimes used broadly against governments or corporations to gather guarded information, or to disrupt their operation in general. However, malware is often used against individuals to gain personal information such as social security numbers, bank or credit card numbers, and so on. Left unguarded, personal and networked computers can be at considerable risk of these threats. Malware includes computer viruses, ransomware, worms, Trojan horses, rootkits, backdoors, keyloggers, dialers, spyware, adware, malicious BHOs, rogue security software and other malicious programs. Some malware is disguised as genuine software, and may come from an official company website, or otherwise in the form of a useful or attractive program that has the harmful malware embedded in it along with additional tracking software. Further, as used herein, a malware will include any non-authentic software or firmware, such as software/firmware (or changes in such software) in a device that was not originally installed by the device manufacturer.

A computer virus is a form of malware that is designed to self-replicate, make copies of itself, and distribute the copies to other files, programs, or computers, without the user's consent. When executed, the virus replicates by inserting copies of itself (possibly modified) into other computer programs, data files, or the boot sector of the hard drive. Once this replication succeeds, the affected areas are then said to be "infected". Viruses often perform some type of harmful activity on infected hosts, such as stealing hard disk space or CPU time, accessing private information, corrupting data, displaying political or humorous messages on the user's screen, spamming their contacts, or logging their keystrokes. Virus writers commonly use social engineering, and exploit detailed knowledge of security vulnerabilities to gain access to their hosts' computing resources. Motives for creating viruses can include seeking profit, desire to send a political message, personal amusement, to demonstrate that a vulnerability exists in the software, for sabotage and denial of service, or simply because they wish to explore artificial life and evolutionary algorithms.

Ransomware (which when carried out correctly is called cryptoviral extortion, but is sometimes also called scareware) comprises a class of malware which restricts access to the computer system that it infects, and demands a ransom paid to the creator of the malware in order for the restriction to be removed. Some forms of ransomware encrypt files on the system's hard drive, while some may simply lock the system and display messages intended to coax the user into paying. Ransomware typically propagates like a conventional computer worm, entering a system through, for example, a downloaded file or vulnerability in a network service. The program will then run a payload: such as one that will begin to encrypt personal files on the hard drive. Ransomware payloads, especially ones that do not encrypt files, utilize elements of scareware to coax the user into paying for its removal. The payload may, for example, display notices purportedly issued by companies or law enforcement agencies which falsely claim that the user's system had been used for illegal activities, or contains illegal content such as pornography, and unlawfully obtained software. In any case, the ransomware will attempt to extort money from the system's user by forcing them to purchase either a program to decrypt the files it had encrypted, or an unlock code which will remove the locks it had applied.

A computer worm is a standalone malware computer program that is completely self-contained and self-propagating, and replicates itself in order to spread to other computers. Often, it uses a computer network to spread itself, relying on security failures on the target computer to access it. Unlike a computer virus, it does not need to attach itself to an existing program. Worms usually cause at least some harm to the network, even if only by consuming bandwidth, whereas viruses usually corrupt or modify files on a targeted computer. Many worms that have been created are designed only to spread, and do not attempt to change the systems they pass through. However, even these "payload free" worms can cause major disruption by increasing network traffic and other unintended effects. A "payload" code in the worm is designed to do more than spread the worm—it might delete files on a host system (e.g., the ExploreZip worm), encrypt files in a cryptoviral extortion attack, or send documents via e-mail. A very common payload for worms is to install a backdoor on the infected computer to allow the creation of a "zombie" computer under control of the worm author. Networks of such machines are often referred to as botnets and are very commonly used by spam senders for sending junk email or to cloak their website's address. Backdoors can be exploited by other malware, including worms.

A 'Trojan horse', or 'Trojan', is a non-self-replicating type of malware program that appears to be benign but actually has a hidden malicious purpose, which commonly gains privileged access to the operating system while appearing to perform a desirable function but instead, drops a malicious payload, often including a backdoor allowing unauthorized access to the target's computer. These backdoors tend to be invisible to average users, but may cause the computer to run slow. Trojans do not attempt to inject themselves into other files like a computer virus, but may steal information, or harm their host computer systems. Trojans may use drive-by downloads or install via online games or internet-driven applications in order to reach target computers.

A rootkit is a collection of files that is installed on a system to alter the standard functionality of the system in a malicious and stealthy way. Often malicious, the rootkit is designed to hide the existence of certain processes or programs from the normal methods of detection, and enable continued privileged access to a computer. Rootkit installation can be automated, or an attacker can install it once they've obtained root or Administrator access. Obtaining this access is a result of a direct attack on a system, such as by exploiting a known vulnerability or password (either by cracking, privilege escalation, or social engineering). Once installed, it becomes possible to hide the intrusion as well as to maintain privileged access. Full control over a system means that existing software can be modified, including software that might otherwise be used to detect or circumvent it. Rootkit detection is difficult because a rootkit may be able to subvert the software that is intended to find it. Detection methods include using an alternative and trusted operating system, behavioral-based methods, signature scanning, difference scanning, and memory dump analysis. Removal can be complicated or practically impossible, especially in cases where the rootkit resides in the kernel; reinstallation of the operating system may be the only available solution to the problem. When dealing with firmware rootkits, removal may require hardware replacement, or specialized equipment.

Keystroke logging, often referred to as 'keylogging' or 'Keyboard Capturing', is the action of recording (or logging) or monitoring the keys struck on a keyboard, typically in a covert manner so that the person using the keyboard is unaware that their actions are being monitored. It also has very legitimate uses in studies of human-computer interaction. There are numerous keylogging methods, ranging from hardware and software-based approaches to acoustic analysis.

Spyware is a malware that is intended to violate a user's privacy, typically by gathering information about a person or organization without their knowledge, and that may send such information to another entity without the user's consent, or that asserts control over a computer without the consumer's knowledge. These programs may be designed to monitor users' web browsing, display unsolicited advertisements, or redirect affiliate marketing revenues to the spyware creator. "Spyware" is mostly classified into four types: system monitors, Trojans, adware, and tracking cookies. Spyware is mostly used for the purposes such as tracking and storing internet users' movements on the web, and serving up pop-up ads to internet users. Whenever spyware is used for malicious purposes, its presence is typically hidden from the user, and can be difficult to detect. Some spyware, such as keyloggers, may be installed by the owner of a shared, corporate, or public computer intentionally in order to monitor users. The functions of spyware can extend beyond simple monitoring. Spyware can collect almost any type of data, including personal information like Internet surfing habits, user logins, and bank or credit account information. Spyware can also interfere with user control of a computer by installing additional software, or redirecting Web browsers. Some spyware can change computer settings, which can result in slow Internet connection speeds, unauthorized changes in browser settings, or changes to software settings. Sometimes, spyware is included along with genuine software, and may come from a malicious website.

Spyware does not necessarily spread in the same way as a virus or worm because infected systems generally do not attempt to transmit, or copy the software to other computers. Instead, spyware installs itself on a system by deceiving the user, or by exploiting software vulnerabilities. Most spyware is installed without users' knowledge, or by using deceptive tactics. Spyware may try to deceive users by bundling itself with desirable software. Other common tactics are using a Trojan horse. Some spyware authors infect a system through security holes in the Web browser or in other software, so that when the user navigates to a Web page controlled by the spyware author, the page contains code that attacks the browser and forces the download and installation of the spyware.

A backdoor is a method of bypassing normal authentication procedures, securing illegal remote access to a computer, obtaining access to plaintext, and so on, while attempting to remain undetected. Commonly a backdoor is a malicious program that listens for commands on a certain Transmission Control Protocol (TCP) or User Datagram Protocol (UDP) port. Once a system has been compromised, one or more backdoors may be installed in order to allow easier unauthorized access in the future. Backdoors may also be installed prior to other malicious software, to allow attackers entry. A backdoor in a login system might take the form of a hard-coded user and password combination that gives access to the system. The backdoor may take the form of an installed program (e.g., Back Orifice) or may subvert the system through a rootkit.

Neural networks. Neural Networks (or Artificial Neural Networks (ANNs)) are a family of statistical learning models inspired by biological neural networks (the central nervous systems of animals, in particular the brain) and are used to estimate or approximate functions that may depend on a large number of inputs and are generally unknown. Artificial neural networks are generally presented as systems of interconnected "neurons" which send messages to each other. The connections have numeric weights that can be tuned based on experience, making neural nets adaptive to inputs and capable of learning. For example, a neural network for handwriting recognition is defined by a set of input neurons that may be activated by the pixels of an input image. After being weighted and transformed by a function (determined by the network designer), the activations of these neurons are then passed on to other neurons, and this process is repeated until finally, an output neuron is activated, and determines which character was read. Like other machine learning methods—systems that learn from data—neural networks have been used to solve a wide variety of tasks that are hard to solve using ordinary rule-based programming, including computer vision and speech recognition. A class of statistical models is typically referred to as "Neural" if it contains sets of adaptive weights, i.e. numerical parameters that are tuned by a learning algorithm, and capability of approximating non-linear functions from their inputs. The adaptive weights can be thought of as connection strengths between neurons, which are activated during training and prediction. Neural Networks are described in a book by David Kriesel entitled: "*A Brief Introduction to Neural Networks*" (ZETA2-EN) [downloaded May 2015 from www.dkriesel.com], which is incorporated in its entirety for all purposes as if fully set forth herein. Neural Networks are further described in a book by Simon Haykin published 2009 by Pearson Education, Inc. [ISBN-978-0-13-147139-9] entitled: "*Neural Networks and Learning Machines—Third Edition*", which is incorporated in its entirety for all purposes as if fully set forth herein.

Neural networks based techniques may be used for image processing, as described in an article in Engineering Letters, 20:1, EL_20_1_09 (Advance online publication: 27 Feb. 2012) by Juan A. Ramirez-Quintana, Mario I. Cacon-Murguia, and F. Chacon-Hinojos entitled: "*Artificial Neural Image Processing Applications: A Survey*", in an article published 2002 by Pattern Recognition Society in Pattern Recognition 35 (2002) 2279-2301 [PII: S0031-3203(01)00178-9] authored by M. Egmont-Petersen, D. de Ridder, and H. Handels entitled: "*Image processing with neural networks—a review*", and in an article by Dick de Ridder et al. (of the Utrecht University, Utrecht, The Netherlands) entitled: "*Nonlinear image processing using artificial neural networks*", which are all incorporated in their entirety for all purposes as if fully set forth herein.

Neural networks may be used for object detection as described in an article by Christian Szegedy, Alexander Toshev, and Dumitru Erhan (of Google, Inc.) (downloaded July 2015) entitled: "*Deep Neural Networks for Object Detection*", in a CVPR2014 paper provided by the Computer Vision Foundation by Dumitru Erhan, Christian Szegedy, Alexander Toshev, and Dragomir Anguelov (of Google, Inc., Mountain-View, Calif., U.S.A.) (downloaded July 2015) entitled: "*Scalable Object Detection using Deep Neural Networks*", and in an article by Shawn McCann and Jim Reesman (both of Stanford University) (downloaded July 2015) entitled: "*Object Detection using Convolutional Neural Networks*", which are all incorporated in their entirety for all purposes as if fully set forth herein.

Using neural networks for object recognition or classification is described in an article (downloaded July 2015) by Mehdi Ebady Manaa, Nawfal Turki Obies, and Dr. Tawfiq A. Al-Assadi (of Department of Computer Science, Babylon University), entitled: "*Object Classification using neural networks with Gray-level Co-occurrence Matrices (GLCM)*", in a technical report No. IDSIA-01-11 January 2001 published by IDSIA/USI-SUPSI and authored by Dan C. Ciresan et al. entitled: "*High-Performance Neural Networks for Visual Object Classification*", in an article by Yuhua Zheng et al. (downloaded July 2015) entitled: "*Object Recognition using Neural Networks with Bottom-Up and top-Down Pathways*", and in an article (downloaded July 2015) by Karen Simonyan, Andrea Vedaldi, and Andrew Zisserman (all of Visual Geometry Group, University of Oxford), entitled: "*Deep Inside Convolutional Networks: Visualising Image Classification Models and Saliency Maps*", which are all incorporated in their entirety for all purposes as if fully set forth herein.

Using neural networks for object recognition or classification is further described in U.S. Pat. No. 6,018,728 to Spence et al. entitled: "Method and Apparatus for Training a Neural Network to Learn Hierarchical Representations of Objects and to Detect and Classify Objects with Uncertain Training Data", in U.S. Pat. No. 6,038,337 to Lawrence et al. entitled: "Method and Apparatus for Object Recognition", in U.S. Pat. No. 8,345,984 to Ji et al. entitled: "3D Convolutional Neural Networks for Automatic Human Action Recognition", and in U.S. Pat. No. 8,705,849 to Prokhorov entitled: "Method and System for Object Recognition Based on a Trainable Dynamic System", which are all incorporated in their entirety for all purposes as if fully set forth herein.

Signal processing using ANN is described in a final technical report No. RL-TR-94-150 published August 1994 by Rome Laboratory, Air force Material Command, Griffiss Air Force Base, New York, entitled: "*NEURAL NETWORK COMMUNICATIONS SIGNAL PROCESSING*", which is incorporated in its entirety for all purposes as if fully set forth herein. The technical report describes the program goals to develop and implement a neural network and communications signal processing simulation system for the purpose of exploring the applicability of neural network technology to communications signal processing; demonstrate several configurations of the simulation to illustrate the system's ability to model many types of neural network based communications systems; and use the simulation to identify the neural network configurations to be included in the conceptual design cf a neural network transceiver that could be implemented in a follow-on program.

Actual ANN implementation may be based on, or may use, the MATLB® ANN described in the User's Guide Version 4 published July 2002 by The MathWorks, Inc. (Headquartered in Natick, Mass., U.S.A.) entitled: "*Neural Network ToolBox—For Use with MATLAB®*" by Howard Demuth and Mark Beale, which is incorporated in its entirety for all purposes as if fully set forth herein. An VHDL IP core that is a configurable feedforward Artificial Neural Network (ANN) for implementation in FPGAs is available (under the Name: artificial_neural_network, created Jun. 2, 2016 and updated Oct. 11, 2016) from Open-Cores organization, downloadable from http://opencores.org/. This IP performs full feedforward connections between consecutive layers. All neurons' outputs of a layer become the inputs for the next layer. This ANN architecture is also known as Multi-Layer Perceptron (MLP) when is trained with a supervised learning algorithm. Different kinds of activation functions can be added easily coding them in the provided VHDL template. This IP core is provided in two parts: kernel plus wrapper. The kernel is the optimized ANN with basic logic interfaces. The kernel should be instantiated inside a wrapper to connect it with the user's system buses. Currently, an example wrapper is provided for instantiate it on Xilinx Vivado, which uses AXI4 interfaces for AMBA buses.

Dynamic neural networks are the most advanced in that they dynamically can, based on rules, form new connections and even new neural units while disabling others. In a feedforward neural network (FNN), the information moves in only one direction—forward: From the input nodes data goes through the hidden nodes (if any) and to the output nodes. There are no cycles or loops in the network. Feedforward networks can be constructed from different types of units, e.g. binary McCulloch-Pitts neurons, the simplest example being the perceptron. Contrary to feedforward networks, Recurrent Neural Networks (RNNs) are models with bi-directional data flow. While a feedforward network propagates data linearly from input to output, RNNs also propagate data from later processing stages to earlier stages. RNNs can be used as general sequence processors.

A logical representation example of a simple feed-forward Artificial Neural Network (ANN) 70 is shown in FIG. 7. The ANN 70 provides three inputs designated as IN #1 72*a*, IN #2 72*b*, and IN #3 72*c*, which connects to three respective neuron units forming an input layer 71*a*. Each neural unit is linked some to all of a next layer 71*b*, with links that may be enforced or inhibit by associating weights as part of the training process. An output layer 71*d* consists of two neuron units that feeds two outputs OUT #1 73*a* and OUT #2 73*b*. Another layer 71*c* is coupled between the layer 71*b* and the output layer 71*d*. The intervening layers 71*b* and 71*c* are referred to as hidden layers. While three inputs are exampled in the ANN 70, any number of inputs may be equally used, and while two output are exampled in the ANN 70, any number of outputs may equally be used. Further, the ANN 70 uses four layers, consisting of an input layer, an output layer, and two hidden layers. However, any number of layers may be used. For example, the number of layers may be equal to, or above than, 3, 4, 5, 7, 10, 15, 20, 25, 30, 35, 40, 45, or 50 layers. Similarly, an ANN may have any number below 4, 5, 7, 10, 15, 20, 25, 30, 35, 40, 45, or 50 layers.

A waveform analysis assembly (10) includes a sensor (12) for detecting physiological electrical and mechanical signals produced by the body is disclosed in U.S. Pat. No. 5,092,343 to Spitzer et al. entitled: "Waveform analysis apparatus and method using neural network techniques", which is incorporated in its entirety for all purposes as if fully set forth herein. An extraction neural network (22, 22') will learn a repetitive waveform of the electrical signal, store the waveform in memory (18), extract the waveform from the electrical signal, store the location times of occurrences of the waveform, and subtract the waveform from the electrical signal. Each significantly different waveform in the electrical signal is learned and extracted. A single or multilayer layer neural network (22, 22') accomplishes the learning and extraction with either multiple passes over the electrical signal or accomplishes the learning and extraction of all waveforms in a single pass over the electrical signal. A reducer (20) receives the stored waveforms and times and reduces them into features characterizing the waveforms. A classifier neural network (36) analyzes the features by classifying them through nonliner mapping techniques within the network representing diseased states and produces results of diseased states based on learned features of the normal and patient groups.

A real-time waveform analysis system that utilizes neural networks to perform various stages of the analysis is disclosed in U.S. Pat. No. 5,751,911 to Goldman entitled: "Real-time waveform analysis using artificial neural networks", which is incorporated in its entirety for all purposes as if fully set forth herein. The signal containing the waveform is first stored in a buffer and the buffer contents transmitted to a first and second neural network, which have been previously trained to recognize the start point and the end point of the waveform respectively. A third neural network receives the signal occurring between the start and end points and classifies that waveform as comprising either an incomplete waveform, a normal waveform or one of a variety of predetermined characteristic classifications. Ambiguities in the output of the third neural network are arbitrated by a fourth neural network, which may be given additional information, which serves to resolve these ambiguities. In accordance with the preferred embodiment, the present invention is applied to a system analyzing respiratory waveforms of a patient undergoing anesthesia and the classifications of the waveform correspond to normal or various categories of abnormal features functioning in the respiratory signal. The system performs the analysis rapidly enough to be used in real-time systems and can be operated with relatively low cost hardware and with minimal software development required.

A method for analyzing data is disclosed in U.S. Pat. No. 8,898,093 to Helmsen entitled: "Systems and methods for analyzing data using deep belief networks (DBN) and identifying a pattern in a graph", which is incorporated in its entirety for all purposes as if fully set forth herein. The method includes generating, using a processing device, a graph from raw data, the graph including a plurality of nodes and edges, deriving, using the processing device, at least one label for each node using a deep belief network, and identifying, using the processing device, a predetermined pattern in the graph based at least in part on the labeled nodes.

Signal Analysis. Digital Signal Processing (DSP) is the use of digital processing, such as by computers, to perform a wide variety of signal processing operations. The signals processed in this manner are a sequence of numbers that represent samples of a continuous variable in a domain such as time, space, or frequency. Digital signal processing and analog signal processing are subfields of signal processing. DSP applications include audio and speech signal processing, sonar, radar and other sensor array processing, spectral estimation, statistical signal processing, digital image processing, signal processing for telecommunications, control of systems, biomedical engineering, seismic data processing, among others. Digital signal processing can involve linear or nonlinear operations. Nonlinear signal processing is closely related to nonlinear system identification and can be implemented in the time, frequency, and spatio-temporal domains.

In DSP, digital signals are analyzed in one of the following domains: time domain (one-dimensional signals), spatial domain (multidimensional signals), frequency domain, and wavelet domains. The domain in which to process a signal is determined by making an informed assumption (or by trying different possibilities) as to which domain best represents the essential characteristics of the signal. A sequence of samples from a measuring device produces a temporal or spatial domain representation, whereas a discrete Fourier transform produces the frequency domain information, that is, the frequency spectrum. Signal analysis is further described in Agilent Technologies Application Note 243 published 2000 [5952-8898E] entitled: "*The Fundamentals of Signal Processing*", which is incorporated in its entirety for all purposes as if fully set forth herein.

Time domain is the analysis of mathematical functions, physical signals or time series of economic or environmental data, with respect to time. In the time domain, the signal or function's value is known for all real numbers, for the case of continuous time, or at various separate instants in the case of discrete time. An oscilloscope is a tool commonly used to visualize real-world signals in the time domain. A time-domain graph shows how a signal changes with time, whereas a frequency-domain graph shows how much of the signal lies within each given frequency band over a range of frequencies.

In frequency domain analysis, also known as spectrum- or spectral analysis, Signals are converted from time or space domain to the frequency domain usually through the Fourier transform. The Fourier transform converts the signal information to a magnitude and phase component of each frequency. Often the Fourier transform is converted to the power spectrum, which is the magnitude of each frequency component squared. The most common purpose for analysis of signals in the frequency domain is analysis of signal properties. The engineer can study the spectrum to determine which frequencies are present in the input signal and which are missing. There are some commonly used frequency domain transformations. For example, the cepstrum converts a signal to the frequency domain through Fourier transform, takes the logarithm, then applies another Fourier transform. This emphasizes the harmonic structure of the original spectrum. Fourier Transform is described in Lectures Notes entitled: "*EE 261—The Fourier Transform and its Applications*" by Prof. Brad Osgood of the Electrical Engineering Department, Stanford University, downloaded from the Internet on November 2016, which is incorporated in its entirety for all purposes as if fully set forth herein.

A spectrum analyzer measures the magnitude of an input signal versus frequency within the full frequency range of the instrument. The primary use is to measure the power of the spectrum of known and unknown signals. The input signal that a spectrum analyzer measures is electrical; however, spectral compositions of other signals, such as acoustic pressure waves and optical light waves, can be considered through the use of an appropriate transducer. By analyzing the spectra of electrical signals, dominant frequency, power, distortion, harmonics, bandwidth, and other spectral components of a signal can be observed that are not easily detectable in time domain waveforms. These parameters are useful in the characterization of electronic devices, such as wireless transmitters.

Spectrum analyzer types are distinguished by the methods used to obtain the spectrum of a signal. There are swept-tuned and Fast Fourier Transform (FFT) based spectrum analyzers. A swept-tuned analyzer uses a superheterodyne receiver to down-convert a portion of the input signal spectrum to the center frequency of a narrow band-pass filter, whose instantaneous output power is recorded or displayed as a function of time. By sweeping the receiver's center-frequency (using a voltage-controlled oscillator) through a range of frequencies, the output is also a function of frequency. While the sweep centers on any particular frequency, it may be missing short-duration events at other frequencies. An FFT analyzer computes a time-sequence of periodograms. FFT refers to a particular mathematical algorithm used in the process. This is commonly used in conjunction with a receiver and analog-to-digital converter. As above, the receiver reduces the center-frequency of a portion of the input signal spectrum, but the portion is not swept. The purpose of the receiver is to reduce the sampling rate that is contended by the analyzer. With a sufficiently low sample-rate, FFT analyzers can process all the samples (100% duty-cycle), and are therefore able to avoid missing short-duration events. Spectrum analyzer basics are described in Agilent Technologies Application Note 150 published Feb. 25, 2014 [5952-0292] entitled: "*Spectrum Analysis Basics*", which is incorporated in its entirety for all purposes as if fully set forth herein.

FFT. A Fast Fourier Transform (FFT) algorithm computes the discrete Fourier transform (DFT) of a sequence, or the inverse. Fourier analysis converts a signal from its original domain (often time or space) to a representation in the frequency domain and vice versa. An FFT rapidly computes such transformations by factorizing the DFT matrix into a product of sparse (mostly zero) factors. The DFT is obtained by decomposing a sequence of values into components of different frequencies. This operation is useful in many fields (see discrete Fourier transform for properties and applications of the transform) but computing it directly from the definition is often too slow to be practical. An FFT is a way to compute the same result more quickly: computing the DFT of N points in the naive way, using the definition, takes $O(N^2)$ arithmetical operations, while an FFT can compute the same DFT in only $O(N \log N)$ operations. The difference in speed can be enormous, especially for long data sets where N may be in the thousands or millions. In practice, the computation time can be reduced by several orders of magnitude in such cases, and the improvement is roughly proportional to N/log N. This huge improvement made the calculation of the DFT practical; FFTs are of great importance to a wide variety of applications, from digital signal processing and solving partial differential equations to algorithms for quick multiplication of large integers.

By far the most commonly used FFT is the Cooley-Tukey algorithm. This is a divide and conquer algorithm that recursively breaks down a DFT of any composite size $N=N_1N_2$ into many smaller DFTs of sizes $N_1$ and $N_2$, along with O(N) multiplications by complex roots of unity traditionally called twiddle factors. The best known use of the Cooley-Tukey algorithm is to divide the transform into two pieces of size N/2 at each step, and is therefore limited to power-of-two sizes, but any factorization can be used in general (as was known to both Gauss and Cooley/Tukey). These are called the radix-2 and mixed-radix cases, respectively (and other variants such as the split-radix FFT have their own names as well). Although the basic idea is recursive, most traditional implementations rearrange the algorithm to avoid explicit recursion. In addition, because the Cooley-Tukey algorithm breaks the DFT into smaller DFTs, it can be combined arbitrarily with any other algorithm for the DFT, such as those described below. FFT is described in an article by Paul Heckbert dated February 1995 (Revised 27 Jan. 1998) [Notes 3, Computer Graphics 2, 15-463] entitled: "*Fourier Transforms and the Fast Fourier Transform (FFT) Algorithm*", and in Freescale Semiconductor, Inc. Application Note, Document Number AN4255 Rev. 4, July 2015, entitled: "*FFT-Based Algorithm for Metering Applications*", which are both incorporated in their entirety for all purposes as if fully set forth herein.

SPI/I²C. I²C (Inter-Integrated Circuit), is a multi-master, multi-slave, single-ended, serial computer bus, typically used for attaching lower-speed peripheral ICs to processors and microcontrollers. I²C uses only two bidirectional open-drain lines, Serial Data Line (SDA) and Serial Clock Line (SCL), pulled up with resistors. Typical voltages used are +5 V or +3.3 V although systems with other voltages are permitted. The I²C reference design has a 7-bit or a 10-bit (depending on the device used) address space, and common I²C bus speeds are the 100 kbit/s standard mode and the 10 kbit/s low-speed mode, but arbitrarily low clock frequencies are also allowed. Recent revisions of I²C can host more nodes and run at faster speeds (400 kbit/s Fast mode, 1 Mbit/s Fast mode plus or Fm+, and 3.4 Mbit/s High Speed mode).

The bus uses a clock (SCL) and data (SDA) lines with 7-bit addressing, and has two roles for nodes: master and slave, where master node is a node that generates the clock and initiates communication with slaves, and a slave node is a node that receives the clock and responds when addressed by the master. The bus is a multi-master bus that means that any number of master nodes can be present. Additionally, master and slave roles may be changed between messages (after a STOP is sent). There may be four potential modes of operation for a given bus device, although most devices only use a single role and its two modes: 'master transmit': master node is sending data to a slave, 'master receive': master node is receiving data from a slave, 'slave transmit': slave node is sending data to the master, and 'slave receive': slave node is receiving data from the master. The master is initially in master transmit mode by sending a start bit followed by the 7-bit address of the slave it wishes to communicate with, which is finally followed by a single bit representing whether it wishes to write(0) to or read(1) from the slave. The I²C is described in NXP Semiconductors N.V. user manual document Number UM10204 Rev. 6 released 4 Apr. 2014, entitled: "*UM10204—PIC-bus specification and user manual*", which is incorporated in its entirety for all purposes as if fully set forth herein.

A Serial Peripheral Interface (SPI) bus is a synchronous serial communication interface specification used for short distance communication, primarily in embedded systems, such as for directly connecting components to a processor. SPI devices communicate in full duplex mode using a master-slave architecture with a single master, where the master device originates the frame for reading and writing, and multiple slave devices are supported through selection with individual slave select (SS) lines. The SPI bus, also known as a 'four-wire serial bus', specifies four logic signals: SCLK: Serial Clock (output from master), MOSI: Master Output, Slave Input (output from master), MISO: Master Input, Slave Output (output from slave), and SS: Slave Select (active low, output from master). SPI and I²C buses are described in Renesas Application Note AN0303011/Rev 1.00 (September 2003) entitled: "*Serial Peripheral Interface (SPI) & Inter-IC (IC2) (SPI I2C)*", in CES 466 presentation (downloaded July 2015) entitled: "*Serial Peripheral Interface*", in Embedded Systems and Systems Software 55:036 presentation (downloaded July 2015) entitled: "*Serial Interconnect Buses—I²C (SMB) and SPI*", and in Microchip presentation (downloaded July 2015) entitled: "*SPI™—Overview and Use of the PICmicro Serial Peripheral Interface*", which are all incorporated in their entirety for all purposes as if fully set forth herein.

1-Wire is a device communications bus system designed by Dallas Semiconductor Corp. that provides low-speed data, signaling, and power over a single conductor. 1-Wire is similar in concept to I²C, but with lower data rates and longer range, and it is typically used to communicate with small inexpensive devices such as digital thermometers and weather instruments. A network of 1-Wire devices with an associated master device is commonly called a MicroLAN. One distinctive feature of the bus is the possibility of using only two wires: data and ground. To accomplish this, 1-Wire devices include an 800 pF capacitor to store charge, and to power the device during periods when the data line is active. Dependent on function, native 1-Wire devices are available as single components in integrated circuit and TO92 packaging, and in some cases a portable form called an iButton that resembles a watch battery. Manufacturers also produce devices more complex than a single component that use the 1-Wire bus to communicate. 1-Wire devices may be one of many components on a circuit board within a product, may be a single component within a device such as a temperature probe, or may be attached to a device being monitored. Systems of sensors and actuators can be built by wiring together 1-Wire components, where each component contains all of the logic needed to operate on the 1-Wire bus. Examples include temperature loggers, timers, voltage and current sensors, battery monitors, and memory. 1-Wire devices can also be interfaced directly to microcontrollers from various vendors. Each 1-Wire chip has a unique ID code. This feature makes the chips, especially in an iButton package, suitable for use as a key to open a lock, arm and deactivate burglar alarms, authenticate computer system users, operate time clock systems, etc. 1-Wire is described in Maxim Integrated Products, Inc. Application Note 1796 published 2013 and entitled: "*Overview of 1-Wire Technology and Its Use*", and in Maxim Integrated Products, Inc. Data Sheet (Rev. 4; August 2009) entitled: "*S9090 Evaluation Kit—Evaluates: 1-Wire EEPROM, EPROM, and ROM Devices*", which are all incorporated in their entirety for all purposes as if fully set forth herein.

As security is a growing concern with in-vehicle networks, many of the components of an in-vehicle network utilize software that must periodically be updated. In order to update software, in-vehicle networks often have "back door" access ports. If a back door access port is hacked, elements in the in-vehicle network can be compromised. One known attack technique on an in-vehicle network that uses the CAN protocol involves an attacker sending error flags to disturb frames that start with a certain identifier, which causes a sending CAN node to go into a "bus off" state. A method for protecting against 'real time' attack in a vehicle bus, such as a CAN bus, is described in a flow-chart 75 shown in FIG. 7a. As part of a "Receive First Part" step 76 the first part of a frame or packet (including multiple bits) that is propagating over a communication medium, such as a bus, are received and decoded into bits by a corresponding transceiver or controller in a "Decode First Bits" step 77. The decoded bits may be associated with one or more fields, according to a frame structure based on a standard protocol, such as the CAN bus.

A criterion (or multiple criteria) is pre-set for identifying suspicious or non-legitimate message (such as frame or packet). As part of a "Criteria Met?" step 78, the decoded bits that consists of the beginning of the received frame (or packet), are checked versus the pre-set rule or criteria. If the received bits, which form the first part of the received message (frame or packet), are not found to be suspected, normal operation is resumed as part of a "Normal Operation" step 79, and the system continues to monitor the messages that are transmitted to the communication medium.

In one example, when CAN bus protocol is used, the bits that are decoded as part of the "Decode First Bits" step 77 and checked as part of the "Criteria Met?" step 78, comprise the 'identifier' field in the CAN frame. For example, to detect and prevent such an attack on the CAN network and in accordance with an embodiment of the invention, a CAN node can be configured to store the identifier of a CAN message that is being sent by the CAN node itself and further configured to compare the identifiers of incoming CAN messages to the stored identifier to determine if any incoming CAN messages have a matching identifier. Since identifiers are unique to each CAN node, if a received identifier matches a stored identifier, the receiving CAN node can assume that the CAN message is from an intruder and can take an action to prevent the intrusion.

However, if the received bits, which form the first part of the received message (frame or packet), are found to be suspected according to the applied criteria or rule, a signal or energy is transmitted to the communication medium as part of a "Corrupt Frame" step 79a. The corrupting signal is transmitted to the communication medium when the rest of the message (frame or packet) is still propagated over the communication medium, and interferes with the message. Such interference renders the total message (frame or packet) ineligible to be properly received by the devices connected and listening to the communication medium, thus preventing this suspected message to be properly received for affecting the other connected devices. For example, the messages over the communication medium may be according to a standard communication protocol, such as CAN protocol, and by affecting one or more bits in the message, the propagated message as a whole does not comply with the protocol and thus is rendered invalidated and ignored by the other devices connected to the medium. In the example of a vehicle bus connecting multiple ECUs, corrupting the frame or packet ensures that the ECUs connected to the bus do not read and act according to the corrupted suspected message, thus preventing a potential damage and thus preventing a corresponding message from being passed to the hosts to implement malicious activity at the corresponding CAN nodes.

For example, in response to detecting a match between a received identifier and a stored identifier, the CAN node can be configured to immediately send an error signal such as an error flag onto the CAN bus to prevent the malicious CAN message from being successfully and completely received by any CAN nodes on the CAN bus, e.g., to invalidate, destroy, and/or kill the CAN message. Applying such a technique, only the original CAN node that uses a particular identifier can send CAN messages with that identifier without the CAN messages being invalidated, destroyed, and/or killed.

A Cyclic Redundancy Check (CRC) is an error-detecting code commonly used in digital networks and storage devices to detect accidental changes to raw data. Blocks of data entering these systems get a short check value attached, based on the remainder of a polynomial division of their contents. On retrieval, the calculation is repeated and, in the event the check values do not match, corrective action can be taken against data corruption. CRCs can be used for error correction. The check (data verification) value is a redundancy (it expands the message without adding information) and the algorithm is based on cyclic codes, and because the check value has a fixed length, the function that generates it is occasionally used as a hash function. CRCs are commonly based on the theory of cyclic error-correcting codes. Specification of a CRC code requires definition of a generator polynomial, where this polynomial becomes the divisor in a polynomial long division, which takes the message as the dividend and in which the quotient is discarded and the remainder becomes the result. The important caveat is that the polynomial coefficients are calculated according to the arithmetic of a finite field, so the addition operation can always be performed bitwise-parallel (there is no carry between digits). The length of the remainder is always less than the length of the generator polynomial, which therefore determines how long the result can be.

In practice, all commonly used CRCs employ the Galois field of two elements, GF(2). The two elements are usually called 0 and 1, comfortably matching computer architecture. A CRC is called an n-bit CRC when its check value is n bits long. For a given n, multiple CRCs are possible, each with a different polynomial. Such a polynomial has highest degree n, which means it has n+1 terms. In other words, the polynomial has a length of n+1; its encoding requires n+1 bits. Note that most polynomial specifications either drop the MSB or LSB, since they are always 1. The simplest error-detection system, the parity bit, is in fact a trivial 1-bit CRC: it uses the generator polynomial x+1 (two terms), and has the name CRC-1. A CRC-enabled device calculates a short, fixed-length binary sequence, known as the check value or CRC, for each block of data to be sent or stored and appends it to the data, forming a codeword. When a codeword is received or read, the device either compares its check value with one freshly calculated from the data block, or equivalently, performs a CRC on the whole codeword and compares the resulting check value with an expected residue constant. If the CRC values do not match, then the block contains a data error. The device may take corrective action, such as rereading the block or requesting that it be sent again. Otherwise, the data is assumed to be error-free (though, with some small probability, it may contain undetected errors; this is the fundamental nature of error-checking).

In one example, the corruption is achieved by transmitting a signal that changes the value of a single bit in the message. This single bit change renders a CRC error, which may be used by the receiving devices as an indicator of an invalidated or corrupted message that needs to be ignored. Alternatively or in addition, multiple bits, which may be carried sequentially or non-sequentially in the message (frame or packet), are changed by the transmitted corrupting signal. Alternatively or in addition, the corrupting signal may change a value in one or more fields in the frame (or packet), rendering this field non-legitimate according to the agreed upon or used communication protocol. In one example, such as in a CAN protocol, the corrupting signal may generate a sequence of six or more consecutive identical bits when received by the devices over the bus, known to be a standard CAN error frame. Further, one or more defined flags in the message, such as error flag may be set by the corrupting signal. When the message uses recessive ('1') and dominant ('0') (non-recessive) bits, the corrupting signal may convert a recessive bit (or multiple bits) to a dominant one, or may convert a dominant bit (or multiple bits) to a recessive one.

A vehicle network with a monitoring-purpose onboard control apparatus that detects illicit data through monitoring the data communication format predetermined in order to operate a communication protocol that is used in the vehicle network is disclosed in U.S. Patent Application Publication No. 2015/0066239 to Mabuchi entitled: "Vehicle network monitoring method and apparatus", which is incorporated in its entirety for all purposes as if fully set forth herein. Upon detecting illicit data whose communication format is different from the prescribed communication format, the monitoring-purpose onboard control apparatus performs a process of transmitting alarm information to onboard control apparatuses, and also performs a process of prohibiting gateways from routing the illicit data.

A method of real-time data security of a communications bus is disclosed in International Patent application Publication WO 2017/013622 to LITICHEVER et al. entitled: "Vehicle communications bus data security", which is incorporated in its entirety for all purposes as if fully set forth herein. The method comprising the steps of: reading at least an early portion of a message being transmitted over a communications bus, determining whether the message is suspicious, according to at least one rule (or criteria) applied on the read early portion of the message, and upon determining that the message is suspicious, corrupting at least a part of the message.

A system for providing security to an in-vehicle communication network is disclosed in U.S. Pat. No. 9,616,828 to BEN NOON et al. entitled: "Global automotive safety system", which is incorporated in its entirety for all purposes as if fully set forth herein. The system comprising: a data monitoring and processing hub; and at least one module configured to monitor messages in communication traffic propagating in a vehicle's in-vehicle network, the network having a bus and at least one node connected to the bus, the module comprising: a communication interface configured to support communication with the hub; a memory having software comprising data characterizing messages that the at least one node transmits and receives during normal operation of the node; at least one communication port via which the module receives and transmits messages configured to be connected to a portion of the in-vehicle network; a processor that processes messages received via the port from the portion of the in-vehicle network responsive to the software in the memory to: identify an anomalous message in the received messages indicative of exposure of the in-vehicle network to damage from a cyber attack; determine an action to be taken by the module that affects the anomalous message; and transmit data responsive to the anomalous message to the hub for processing by the hub via the communication interface.

A method for serial data transmission in a bus system having at least two bus subscribers is disclosed in U.S. Pat. No. 9,361,178 to Hartwich et al. entitled: "Method and device for improving the data transmission security in a serial data transmission having flexible message size", which is incorporated in its entirety for all purposes as if fully set forth herein. The method exchange messages via the bus, the send access to the bus for each message being assigned to a bus subscriber by the arbitration method according to CAN Standard ISO 11898-1; it being decided as a function of a suitable identification (EDL) which result from one of the CRC calculations started in parallel is used for checking the correct data transmission; for at least one value of the identification an additional condition being checked, and in response to its presence, fixed stuff bit sequences from one or more bits are inserted into the message by the sender, at least into parts of the message.

A system and method for determining when to reset a controller in response to a bus off state are disclosed in U.S. Pat. No. 9,600,372 to Jiang et al. entitled: "Approach for controller area network bus off handling", which is incorporated in its entirety for all purposes as if fully set forth herein. The method includes determining that the controller has entered a first bus off state and immediately resetting the controller. The method further includes setting a reset timer in response to the controller being reset, determining whether the controller has entered a subsequent bus off state, and determining whether a reset time. The method immediately resets the controller in response to the subsequent bus off state if the reset time is greater than the first predetermined time interval, and resets the controller in response to the subsequent bus off state after a second predetermined time interval has elapsed if the reset time is less than the first predetermined time interval.

A communication apparatus for preventing the broadcasting of unauthorised messages on a broadcast bus network is disclosed in U.S. Patent Application Publication No. 2016/0149934 to Frank et al. entitled: "Illegal message destroyer", which is incorporated in its entirety for all purposes as if fully set forth herein. The communication apparatus comprising a first memory adapted to store first information; a second memory adapted to store second information; a monitoring unit adapted to monitor the bus for processing messages being broadcasted on the bus, and output a third information and fourth information, a comparing unit adapted to compare the first information with the third information and the second information with the fourth information; and a message destroyer adapted to when the first information matches with the third information, and the second information does not match with the fourth information, causing the body of the current message to be altered while the current message is being broadcasted on the bus.

Embodiments of a device and method are disclosed are disclosed in U.S. Patent Application Publication No. 2017/0093659 to Elend et al. entitled: "Controller area network (can) device and method for controlling can traffic", which is incorporated in its entirety for all purposes as if fully set forth herein. A controller area network (CAN) device includes a compare module configured to interface with a CAN transceiver, the compare module having a receive data (RXD) interface configured to receive data from the CAN transceiver, a CAN decoder configured to decode an identifier of a CAN message received from the RXD interface, and an identifier memory configured to store an entry that corresponds to at least one identifier, and compare logic configured to compare a received identifier from a CAN message to the entry that is stored in the identifier memory and to output a match signal when the comparison indicates that the received identifier of the CAN message matches the entry that is stored at the CAN device. The CAN device also includes a signal generator configured to output, in response to the match signal, a signal to invalidate the CAN message.

A method and system monitor a communications network, e.g., a controller area network (CAN), and more specifically, an in-vehicle communications network, are disclosed in U.S. Pat. No. 8,213,321 to Butts et al. entitled: "Controller area network condition monitoring and bus health on in-vehicle communications networks", which is incorporated in its entirety for all purposes as if fully set forth herein. The monitoring is performed by maintaining a count of each type of error code and a histogram of all network messages seen by each of the controllers during a measurement period; and by determining a bus health index of the communication bus based upon a percentage of a given type of error to the total count of all errors during a measurement period. An individual controller or controller area network bus segment can be indicated as having a communications problem as a result of the health index.

A system for providing network security on a vehicle information system and methods for manufacturing and using same is disclosed in U.S. Patent Application Publication No. 2010/0318794 to Dierickx entitled: "System and Method for Providing Security Aboard a Moving Platform", which is incorporated in its entirety for all purposes as if fully set forth herein. The security system comprises an all-in-one security system that facilitates security system functions for the vehicle information system. Exemplary security system functions include secure storage of keys used to encrypt and/or decrypt system data, security-related application programming interfaces, a security log file, and/or private data. The security system likewise can utilize antivirus software, anti-spyware software, an application firewall, and/or a network firewall. As desired, the security system can include an intrusion prevention system and/or an intrusion detection system. If the information system includes a wireless distribution system, the security system can include an intrusion prevention (and/or detection) system that is suitable for use with wireless network systems. Thereby, the security system advantageously can provide a defense in depth approach by adding multiple layers of security to the information system.

Methods and systems for mitigating cyber attacks on components of an automotive communication system are disclosed in U.S. Pat. No. 9,661,006 to Kantor et al. entitled: "Method for protection of automotive components in intra-vehicle communication system", which is incorporated in its entirety for all purposes as if fully set forth herein. These methods and systems comprise elements of hardware and software for receiving a frame; determining whether the frame potentially affects correct operation of an automotive component; and, taking protective action.

A project to find out if it is possible to select a set of metrics available from networking equipment, which could be used to detect known physical layer attacks on Ethernet networks, is described in a Thesis by Alexey Petrenko entitled: "*Detecting physical layer attacks on Ethernet networks*" that was presented by the Helsinki Metropolia University of Applied Sciences, Degree Programme in Information Technology dated 8 Oct. 2015, which is incorporated in its entirety for all purposes as if fully set forth herein. Known physical layer attacks on Ethernet networks were described in detail, and a set of metrics which might be used for attack detection was suggested. All metric values were gathered on each link in a topology in a normal state and under each of the attacks. Effectiveness of the suggested metrics was analyzed. The project showed that it is possible to use metrics obtained from networking devices to detect known physical layer attacks on Ethernet networks.

A diagnostic tool that can communicate with a computing device such as smart phone is disclosed in U.S. Pat. No. 9,297,721 to Bertosa et al. entitled: "Auto ID and fingerprint system and method thereof", which is incorporated in its entirety for all purposes as if fully set forth herein. The diagnostic tool can include a power management system that allows the dynastic tool to enter lower power state in order to prevent the power drain of vehicle battery. The diagnostic tool can also AutoID a vehicle or use a "fingerprinting" process to identify the vehicle. A crediting system is provided that can be used to credit a 3rd party for software purchased for use by the diagnostic tool or smart phone.

A system and method for securing links at the physical (PHY) layer in an IEEE 802.3 Ethernet communication system are disclosed in U.S. Pat. No. 8,375,201 to Booth entitled: "Ethernet PHY level security", which is incorporated in its entirety for all purposes as if fully set forth herein. A local device (LD) receives an electrical waveform representing link partner security information from a network-connected link partner (LP) via unformatted message pages. The LD accesses predetermined LP reference information stored in a tangible memory medium. The LD compares the received LP security information to the LP reference information. In response to the LD matching the received LP security information to the LP reference information, a secure link to the LP is verified. Likewise, the LD may send electrical waveforms representing security information to the LP via the unformatted message pages. In response to the LP matching the LD security information to the LD reference information, a secure link to the LD is verified.

A project that examines the feasibility of machine learning based fingerprinting of CAN transceivers, for the purpose of uniquely identifying signal sources during intrusion detection, is described in a Bachelor Project Number DA-2016-06 by Roar Elias Georgsen, published May 19, 2016 by the University College of Southeast Norway (Campus Vestfold) entitled: "*Machine Learning Based Intrusion Detection in Controller Area Networks*", which is incorporated in its entirety for all purposes as if fully set forth herein. A working multi-node CAN bus development environment was constructed, and an OpenCL Deep Learning Python Wrapper was ported to the platform. Multiple Machine Learning Algorithms were compared systematically, and two models fully implemented on a SoC ARM/FPGA device, with computationally intensive tasks running as Software Defined Hardware using an OpenCL FPGA interface. The implementation achieves a higher hit rate than earlier work based on least-mean squares and convolution Digital Signals Processing (DSP). Performance on learning tasks is comparable to high-end CPU devices, indicating that FPGA is a cost effective solution for utilizing machine learning in embedded systems.

An apparatus for detecting an attack on an electric circuit is disclosed in U.S. Patent Application Publication No. 2007/0182421 to Janke et al. entitled: "Apparatus for detecting an attack on an electric circuit", which is incorporated in its entirety for all purposes as if fully set forth herein. The electric circuit includes a current consumption threshold value discriminator to determine whether current consumption of the electric circuit exceeds a predetermined threshold value or not, and to generate a binary current limitation signal depending therefrom. The apparatus includes a monitor for monitoring the binary current limitation signal over a predetermined time interval, in order to indicate a signal characterizing the current consumption of the electric circuit over the predetermined time interval, and a detector for detecting an attack on the electric circuit based on the monitoring signal.

Methods and systems in which a network induces different distortions in signals traversing different segments of the network are disclosed in U.S. Patent Application Publication No. 2011/0243214 to Wolcott et al. entitled: "Inducing response signatures in a communication network", which is incorporated in its entirety for all purposes as if fully set forth herein. The distortions may be used to identify locations on the network of devices that transmit and receive the signals. The distortions may be reflected in equalization coefficients programmed into transmitting or receiving devices, which may be used to pre- or post-filter the signals to compensate for the distortions.

An apparatus for protecting a vehicle electronic system is disclosed in U.S. Patent Application Publication No. 2015/0020152 to Litichever et al. entitled: "Security system and method for protecting a vehicle electronic system", which is incorporated in its entirety for all purposes as if fully set forth herein. The protecting is by selectively intervening in the communications path in order to prevent the arrival of malicious messages at ECUs, in particular at the safety critical ECUs. The security system includes a filter, which prevents illegal messages sent by any system or device communicating over a vehicle communications bus from reaching their destination. The filter may, at its discretion according to preconfigured rules (or criteria), send messages as is, block messages, change the content of the messages, request authentication or limit the rate such messages can be delivered, by buffering the messages and sending them only in preconfigured intervals.

A system for providing security to an in-vehicle communication network is disclosed in U.S. Patent Application Publication No. 2015/0195297 to BEN NOON et al. entitled: "Global automotive safety system", which is incorporated in its entirety for all purposes as if fully set forth herein. The system comprising: a data monitoring and processing hub; and at least one module configured to monitor messages in communication traffic propagating in a vehicle's in-vehicle network, the network having a bus and at least one node connected to the bus, the module comprising: a communication interface configured to support communication with the hub; a memory having software comprising data characterizing messages that the at least one node transmits and receives during normal operation of the node; at least one communication port via which the module receives and transmits messages configured to be connected to a portion of the in-vehicle network; a processor that processes messages received via the port from the portion of the in-vehicle network responsive to the software in the memory to: identify an anomalous message in the received messages indicative of exposure of the in-vehicle network to damage from a cyber attack; determine an action to be taken by the module that affects the anomalous message; and transmit data responsive to the anomalous message to the hub for processing by the hub via the communication interface.

A system and method for providing security to a network may include maintaining, by a processor, a model of an expected behavior of data communications over the in-vehicle communication network are disclosed in U.S. Patent Application Publication No. 2016/0381059 to GALULA et al. entitled: "SYSTEM AND METHOD FOR TIME BASED ANOMALY DETECTION IN AN IN-VEHICLE COMMUNICATION NETWORK", which is incorporated in its entirety for all purposes as if fully set forth herein. The method comprises receiving, by the processor, a message sent over the network; determining, by the controller, based on the model and based on a timing attribute of the message, whether or not the message complies with the model; and if the message does not comply with the model then performing, by the processor, at least one action related to the message.

A system and method for providing security to a network are disclosed in U.S. Patent Application Publication No. 2016/0381055 to GALULA et al. entitled: "SYSTEM AND METHOD FOR PROVIDING SECURITY TO A COMMUNICATION NETWORK", which is incorporated in its entirety for all purposes as if fully set forth herein. The method may include identifying a message sent over a network, the message related to a data transfer from an initiator to a target node, and transmitting, over the network, at least one disruptive message that causes the data transfer to fail.

A system and method for detection of at least one cyber-attack on one or more vehicles are disclosed in U.S. Patent Application Publication No. 2017/0230385 to Ruvio et al. entitled: "Vehicle correlation system for cyber attacks detection and method thereof", which is incorporated in its entirety for all purposes as if fully set forth herein. The system and method including steps of transmitting and/or receiving by a first on-board agent module installed within one or more vehicles and/or a second on-board agent module installed within road infrastructure and in a range of communication with said first on-board agent module metadata to and/or from an on-site and/or remote cloud-based detection server including a correlation engine; detecting cyber-attacks based on correlation calculation between the metadata received from one or more first agent module installed within vehicles and/or from one or more second agent modules installed within road infrastructure; indicating a probability of a cyber-attack against one or more vehicle based on correlation calculation; initiating blocking of vehicle-to-vehicle communication to present and/or stop a spread of an identified threat.

A device for detection and prevention of an attack on a vehicle via its communication channels is disclosed in U.S. Patent Application Publication No. 2015/0271201 to Ruvio et al. entitled: "Device for detection and prevention of an attack on a vehicle", which is incorporated in its entirety for all purposes as if fully set forth herein. The device having: an input-unit configured to collect real-time and/or offline data from various sources such as sensors, network based services, navigation applications, the vehicles electronic control units, the vehicle's bus-networks, the vehicle's sub-systems, and on board diagnostics; a database, for storing the data; a detection-unit in communication with the input-unit; and an action-unit, in communication with the detection unit, configured for sending an alert via the communication channels and/or prevent the attack, by breaking or changing the attacked communication channels. The detection-unit is configured to simultaneously monitor the content, the meta-data and the physical-data of the data and detect the attack.

A connection detection apparatus is disclosed in U.S. Patent Application Publication No. 2014/0380416 to Adachi entitled: "Connection detection apparatus and in-vehicle relay apparatus", which is incorporated in its entirety for all purposes as if fully set forth herein. The apparatus includes a gateway to which communication lines are connected, and which detects whether an unauthorized communication device has been connected to the communication lines. The gateway samples a signal several times from each of the communication lines, and generates waveform information, such as an eye pattern in which the waveforms are superimposed on one another. Furthermore, the gateway has stored normal waveform information therein, such as a mask generated based on the eye pattern at normal times. The gateway compares the generated waveform information with the stored waveform information, and recognizes that the waveform information is abnormal if it does not sufficiently match the normal waveform information. If the waveform information is abnormal, it is determined that an unauthorized communication device has been connected to one or more of the communication lines.

A system and method for detecting an intrusion or a bug in a vehicle data transmission system is disclosed in U.S. Pat. No. 8,955,130 to Kalintsev et al. entitled: "Method for protecting vehicle data transmission system from intrusions", which is incorporated in its entirety for all purposes as if fully set forth herein. A hardware-software complex (HSC) is used to find a bug or intrusion device in a vehicle electronic system. The HSC is connected to CAN-buses in the vehicle and also scans radio waves, which can be used to transmit data to a bug. This complex is a self-teaching CAN-system used to monitor and block harmful commands in the vehicle. Each vehicle (of each model, type and settings) has its own reference bus data (parameters), which is used to detect added modules and malicious data sent over the vehicle's CAN bus.

A method for detecting threats or attacks on an automobile network, is disclosed in U.S. Pat. No. 9,401,923 to Valasek et al. entitled: "Electronic system for detecting and preventing compromise of vehicle electrical and control systems", which is incorporated in its entirety for all purposes as if fully set forth herein. The automobile network is connected to a plurality of electronic components and an attack monitoring unit including a processor, the method including: monitoring, by the processor of the attack monitoring unit, data messages transmitted on the automobile network; determining, by the processor of the attack monitoring unit, whether at least one data message among the data messages transmitted on the mobile network is a threat to one or more of the plurality of electronic components on the automobile network; and when it is determined, by the processor, that the at least one data message is a threat, performing at least one action based on the threat.

Methods and apparatus for physical layer security of a network communications link are disclosed in U.S. Pat. No. 7,752,672 to Karam et al. entitled: "Methods and apparatus for physical layer security of a network communications link", which is incorporated in its entirety for all purposes as if fully set forth herein. A communications port of a network communications device maintains capability information indicating that under normal operating conditions a communications link is capable of operating in a secure mode in which communications signals of the communications link are unintelligible to an intruder having an unauthorized physical connection (e.g. tap) to the communications link. During operation, the port detects occurrence of a link event of a type that can invoke an automatic communications-mode control mechanism to change the operating of the communications link to a non-secure mode in which communications signals of the communications link are intelligible to such an intruder. An example is Ethernet auto-negotiation, which can change from relatively secure 1000BaseT signaling to relatively non-secure 10/100BaseT signaling. Based on the capability information, the port responds to the link event by preventing the automatic communications mode control mechanism from changing the operating of the communications link to the non-secure mode.

Location-based access control in a data network is disclosed in U.S. Pat. No. 8,972,589 to Roese et al. entitled: "Location-based access control in a data network", which is incorporated in its entirety for all purposes as if fully set forth herein. A request for network access is received from a client device at a network entry device of a network infrastructure. The network infrastructure determines a physical location of the client device and determines authorization of the client device based on the physical location. The approach can include providing the physical location along with other user credentials to an authorizing device. The method can also include determining a level of service based on the physical location. Communication for the approach can make use of the IEEE 802.1X protocol.

A signal processing apparatus using a neural network is disclosed in U.S. Pat. No. 5,420,963 to Kuwata entitled: "Apparatus including a neural network used for signal processing, such as signal clustering, signal identification, and A/D conversion", which is incorporated in its entirety for all purposes as if fully set forth herein. The apparatus includes a reference signal generating section for generating a plurality of reference signals having different signal values, a complement signal generating section for receiving the reference signals and an unknown input signal as an object to be processed, and generating a plurality of complement signals, indicating complement values of the corresponding reference signals with respect to a signal value obtained by multiplying the unknown input signal with a natural number, a multiplication section for receiving the reference signals and the complement signals, and multiplying the reference signals with the corresponding complement signals, and a neural network, in which a plurality of neurons are reciprocal-inhibition-coupled, the neurons receive the products obtained by the multiplication section, and the neuron, which receives the product having a largest value, outputs a spark signal.

A sensor signal processing using an analog neural network is disclosed in U.S. Patent Application Publication No. 2016/0328642 to Himebaugh et al. entitled: "Sensor signal processing using an analog neural network", which is incorporated in its entirety for all purposes as if fully set forth herein. In an embodiment, a sensor signal processing system comprises: an analog neural network communicatively coupled to at least one sensor and a digital processor communicatively coupled to the analog neural network. The analog neural network is configured to receive a plurality of analog signals wherein the plurality of analog signals are associated with a plurality of sensor signals output by the at least one sensor. The analog neural network also determines an analog signal of the plurality of analog signals that is indicative of an event of interest and generates an activation signal to the digital processor in response to determining an analog signal is indicative of an event of interest. The digital processor is configured to receive the activation signal and transition to a higher-power state from a lower-power state in response to the activation signal.

A circuit element of a multi-dimensional dynamic adaptive neural network array (DANNA) is disclosed in U.S. Patent Application Publication No. 2015/0106314 to Birdwell et al. entitled: "Method and apparatus for constructing a dynamic adaptive neural network array (danna)", which is incorporated in its entirety for all purposes as if fully set forth herein. The element may comprise a neuron/synapse select input functional to select the circuit element to function as one of a neuron and a synapse. In one embodiment of a DANNA array of such circuit elements, (wherein a circuit element or component thereof may be analog or digital), a destination neuron may be connected to a first neuron by a first synapse in one dimension, a second destination neuron may be connected to the first neuron by a second synapse in a second dimension and, optionally, a third destination neuron may be connected to the first neuron by a third synapse. The DANNA may thus form multiple levels of neuron and synapse circuit elements. In one embodiment, multiples of eight inputs may be selectively received by the circuit element selectively functioning as one of a neuron and a synapse. The dynamic adaptive neural network array (DANNA) may comprise a special purpose processor for performing one of a control, anomaly detection and classification application and may comprise a first structure connected to a neuroscience-inspired dynamic artificial neural network (NIDA), comprise substructures thereof or be combined with other neural networks.

Systems, apparatuses, and methods for clustering data are disclosed in U.S. Pat. No. 8,521,671 to Moore entitled: "Neural network for clustering input data based on a Gaussian Mixture Model", which is incorporated in its entirety for all purposes as if fully set forth herein. Such a method includes providing input data to each of a plurality of cluster microcircuits of a neural network, wherein each cluster microcircuit includes a mean neural group and a variance neural group. The method also includes determining a response of each cluster microcircuit with respect to the input data. The method further includes modulating the mean neural group and the variance neural group of each cluster microcircuit responsive to a value system.

A computer system that stores speech data for a plurality of speakers, where the speech data includes a plurality of feature vectors and, for each feature vector, an associated sub-phonetic class, is disclosed in U.S. Pat. No. 9,230,550 to Hosom et al. entitled: "Speaker verification and identification using artificial neural network-based sub-phonetic unit discrimination", which is incorporated in its entirety for all purposes as if fully set forth herein. The computer system then builds, based on the speech data, an artificial neural network (ANN) for modeling speech of a target speaker in the plurality of speakers, where the ANN is configured to discriminate between instances of sub-phonetic classes uttered by the target speaker and instances of sub-phonetic classes uttered by other speakers in the plurality of speakers.

The term "processor" is used herein to include, but not limited to, any integrated circuit or any other electronic device (or collection of electronic devices) capable of performing an operation on at least one instruction, including, without limitation, a microprocessor (aP), a microcontroller (aC), a Digital Signal Processor (DSP), or any combination thereof. A processor may further be a Reduced Instruction Set Core (RISC) processor, a Complex Instruction Set Computing (CISC) microprocessor, a Microcontroller Unit (MCU), or a CISC-based Central Processing Unit (CPU). The hardware of the processor may be integrated onto a single substrate (e.g., silicon "die"), or distributed among two or more substrates.

A non-limiting example of a processor may be 80186 or 80188 available from Intel Corporation located at Santa Clara, Calif., USA. The 80186 and its detailed memory connections are described in the manual "80186/80188 *High-Integration 16-Bit Microprocessors*" by Intel Corporation, which is incorporated in its entirety for all purposes as if fully set forth herein. Other non-limiting example of a processor may be MC68360 available from Motorola Inc. located at Schaumburg, Ill., USA. The MC68360 and its detailed memory connections are described in the manual "*MC68360 Quad Integrated Communications Controller—User's Manual*" by Motorola, Inc., which is incorporated in its entirety for all purposes as if fully set forth herein. While exampled above regarding an address bus having an 8-bit width, other widths of address buses are commonly used, such as the 16-bit, 32-bit and 64-bit. Similarly, while exampled above regarding a data bus having an 8-bit width, other widths of data buses are commonly used, such as 16-bit, 32-bit and 64-bit width. In one example, the processor consists of, comprises, or is part of, Tiva™ TM4C123GH6PM Microcontroller available from Texas Instruments Incorporated (Headquartered in Dallas, Tex., U.S.A.), described in a data sheet published 2015 by Texas Instruments Incorporated [DS-TM4C123GH6PM-15842.2741, SPMS376E, Revision 15842.2741 June 2014], entitled: "*Tiva™ TM4C123GH6PM Microcontroller—Data Sheet*", which is incorporated in its entirety for all purposes as if fully set forth herein, and is part of Texas Instrument's Tiva™ C Series microcontrollers family that provide designers a high-performance ARM® Cortex™-M-based architecture with a broad set of integration capabilities and a strong ecosystem of software and development tools. Targeting performance and flexibility, the Tiva™ C Series architecture offers an 80 MHz Cortex-M with FPU, a variety of integrated memories and multiple programmable GPIO. Tiva™ C Series devices offer consumers compelling cost-effective solutions by integrating application-specific peripherals and providing a comprehensive library of software tools which minimize board costs and design-cycle time. Offering quicker time-to-market and cost savings, the Tiva™ C Series microcontrollers are the leading choice in high-performance 32-bit applications. Targeting performance and flexibility, the Tiva™ C Series architecture offers an 80 MHz Cortex-M with FPU, a variety of integrated memories and multiple programmable GPIO. Tiva™ C Series devices offer consumers compelling cost-effective solutions.

In consideration of the foregoing, it would be an advancement in the art to provide methods and systems for detecting, and taking action when detecting, an intrusion or an attack of a network or system, Such method or device may be used to provide an improved security, verifying authentic hardware or software, malware or attack vulnerability reduction, or an intrusion operation detection/prevention, that are simple, secure, cost-effective, reliable, easy to use or sanitize, has a minimum part count, minimum hardware, and/or uses existing and available components, protocols, programs and applications for providing better security and additional functionalities, and provides a better user experience.

SUMMARY

An analyzer apparatus may be used with a frame-based or packet-based wired network that uses a medium that comprises two or more conductors, and multiple devices that may be connected to, and communicate with each other over, the medium. Each of the multiple devices may be associated with a respective criterion. The analyzer apparatus may comprise a connector for connecting to the medium for receiving a frame or packet transmitted to the medium by a transmitting device that may be one of the multiple devices; an Analog-to-Digital (A/D) converter coupled to the connector for producing digital samples of a waveform that may be part of the received frame or packet; a first memory coupled to the A/D converter for storing the digital samples; a second memory for storing the multiple criterions associated with the multiple devices; a software and a processor for executing the software, the processor coupled to the first memory for analyzing the stored digital samples and to the second memory for fetching at least one of the criterions; and an enclosure housing the connector, the A/D converter, the first and second memories, and the processor. The analyzer apparatus may be operative for checking the waveform according to a criterion from the multiple criterions that may be associated with the transmitting device, and to act in response to the waveform not satisfying the checked criterion. The signal sampled by the A/D converter may be carried differentially over the two conductors, or may be a signal between one the conductors and the ground.

At least one criterion of the multiple criterions may be configured so that the criterion may not be satisfied in case of a changing of, or connecting to, the medium, such as in case of a connecting an additional device to the medium. The additional device may be operative to communicate with at least one the multiple devices over the medium. Alternatively or in addition, at least one criterion of the multiple criterions may be configured so that the criterion may not be satisfied in case of a change in the device that may be associated with the at least one criterion, such as in case of substituting of a line driver or a transceiver in the device that may be associated with the at least one criterion, or in case of substituting the device that may be associated with the at least one criterion.

An analyzer device may be used with a wired network having a medium that comprises two conductors connecting multiple devices where at least one of the devices may be operative for transmitting a signal over the medium. The wired network may be associated with first and second configurations respectively associated with first and second signals received from the medium in response to the transmitted signal. The analyzer device may comprise a connector for connecting to the medium for receiving a physical-layer signal transmitted to the medium by one of the multiple devices; an Analog-to-Digital (A/D) converter coupled to the connector for producing digital samples of the received signal; a memory coupled to the analog to digital converter for storing the digital samples; a software and a processor for executing the software, the processor coupled to the memory for analyzing the stored digital samples; and a single enclosure housing the connector, the A/D converter, the memory, and the processor. The analyzer device may be operative for associating the received signal with one of the first and the second signals. The network may be frame or packet based, and the physical layer signal may respectively be at least one frame or packet.

The analyzer device may comprise a transceiver coupled between the connector and the processor for transmitting digital data to, or receiving digital data from, the multiple devices over the medium. The first or second signal may be associated with a maximum component frequency of the respective signal, and the sampling rate of the A/D converter may be above twice the maximum component frequency. The memory may be a non-volatile memory, that may consist of, or may comprise, Hard Disk Drive (HDD), Solid State Drive (SSD), RAM, SRAM, DRAM, TTRAM, Z-RAM, ROM, PROM, EPROM, EEPROM, Flash-based memory, CD-RW, DVD-RW, DVD+RW, DVD-RAM BD-RE, CD-ROM, BD-ROM, or DVD-ROM. The analyzer device may further comprise an impedance (that may be a resistor) connected to the connector for terminating the received signal, and the impedance may be equal to, or may be based on, the characteristic impedance of the medium. The analyzer device may be connectable to one of the ends of the medium, or may be connectable to the medium at a point that may be distinct from the medium end.

The wired network may be associated with first and second configuration, and the second configuration may comprises changing of, or connecting to, the medium of the first configuration, such as connecting an additional device to the first configuration. The additional device may be operative to communicate with at least one device of the multiple devices over the medium. Alternatively or in addition, the second configuration may comprise substituting of a line driver or a transceiver connected to the medium in the first configuration, or substituting of one device from the multiple devices connected to the medium in the first configuration.

The analyzer device may further comprise a transceiver coupled between the connector and the processor for transmitting digital data to, or receiving digital data from, the multiple devices over the medium, and may further comprise a controller for layer 2 and layer 3 handling of the received signal. Each one of the multiple devices may be associated with a digital address for uniquely being identified in the wired network, and the analyzer device may further be operative to identify the digital address of the transmitting device, and the associating of the received signal with one of the first and the second signals may be based on, or may be according to, the digital address of the transmitting device.

Any analysis herein may comprises a time-domain or frequency domain analyzing of the digital samples of the waveform for measuring a value of a parameter or a characteristics, comparing the measured value to the threshold, and in response to the comparison to associate the received signal with the first state or the second state. Any analysis or comparison herein may be used with a maximum threshold, and the received signal may be associated with the first state if the measured value may be lower than the maximum threshold, and the received signal may be associated with the second state if the measured value may be higher than the maximum threshold. Alternatively or in addition, any analysis or comparison herein may be used with a minimum threshold, and the received signal may be associated with the first state if the measured value may be higher than the minimum threshold, and the received signal may be associated with the second state if the measured value may be lower than the minimum threshold. The analyzer device may be further operative to compare the time-dependent digital samples to a respective time-dependent threshold, and in response to the comparison to associate the received signal with the first state or the second state. Any analysis herein may be used with a mask template that may comprise a time-dependent minimum and maximum thresholds, and the analysis may comprise comparing the time-dependent digital samples to the mask, and in response to the comparison associating the received signal with the first state or the second state.

The analyzer device may be used with a threshold, and may be further operative for measuring an additional value of the parameter or a characteristics, to calculate a value in response to the measured value and the additional measured value, and in response to the comparison to the calculated value to associate the received signal with the first state or the second state. The value may be calculated according to the difference or the ratio of the measured value and the additional measured value. Any measured value may comprise an amplitude of one of the samples, and the measured value may comprise a global or local minimum or maximum amplitude value of the samples amplitudes. Alternatively or in addition, any measured value herein may comprise an energy in waveform. Each one of the multiple devices may be associated with a digital address for uniquely being identified in the wired network, and the analyzer device may further be operative to identify the digital address of the transmitting device, and the threshold, the parameter or characteristics measured may be based on, or may be according to, the digital address of the transmitting device.

Any measured value may comprise a time point or a time interval associated with one or more of the samples, which may be associated with a defined amplitude, global or local minimum, or global or local maximum of an amplitude of the samples. The parameter or characteristic may comprise the amplitude of the low or high level, the peak amplitude value, the overshoot or undershoot amplitude value, or the ringback amplitude value. Alternatively or in addition, the parameter or characteristic comprises a respective rise or fall time or settling time.

Any waveform herein may comprise a positive or negative pulse between low and high levels, and the parameter or characteristic may comprise the amplitude of the low or high level or the amplitude of a peak value, or may comprise a pulse duration. Any waveform herein may comprise a frame or a packet, and the parameter or characteristic may comprise the frame or packet pulse duration or an interframe or inter-packet gap, or a clock rate extracted from the frame or packet. The analyzer device may further comprise a Phase Lock Loop (PLL) coupled to the conditioner and to the processor for recovering and measuring the clock rate of the frame or packet.

The analyzer device may further be operative for frequency-domain analyzing of the digital samples of the waveform for measuring a value of a parameter or a characteristics, and may further be operative for forming frequency domain representation of the signal or waveform, such as by using an Fast Fourier Transformation (FFT), to be used by the frequency-domain analyzing. The analyzer device may further comprise two or more Band Pass Filters (BPFs) coupled between the connector and the processor for forming frequency domain representation, each of the BPFs passing a different frequency band. The measured value may comprise a spectral power density value of one or more frequency points, such as the global or local minimum or maximum spectral power density. Alternatively or in addition, the measured value may comprise one or more frequency points associated with one or more spectral power density values.

The association with one of the first and second signals may be based on the ANN output, and the ANN may be trained to identify only the first signal, and to associate the digital samples with the first signal. Alternatively or in addition, the ANN may be trained to associate the digital samples with the one of the devices. The ANN may comprise multiple output, and each output may be associated with one of the multiple devices. The ANN may be trained so that each of the output may classify the corresponding one of the multiple devices. Each one of the multiple devices may associated with a digital address for uniquely being identified in the wired network, the analyzer device may further be operative to identify the digital address of the transmitting device out of the multiple devices, and may be operative to compare the identity of the transmitting device with the corresponding ANN output.

The analyzer device may further comprise an annunciator for notify a human user using auditory, visual, or haptic stimuli. Any annunciator herein may consist of, may use, or may comprise, an audible annunciator that comprises an audible signaling component for emitting a sound coupled to the control port for activating or controlling the audible annunciator. The audible signaling component may comprise electromechanical or piezoelectric sounder, a buzzer, a chime or a ringer. Alternatively or in addition, the audible signaling component comprises a loudspeaker and the device further comprising a digital to analog converter coupled to the loudspeaker, and may be operative to generate a single or multiple tones or a human voice talking a syllable, a word, a phrase, a sentence, a short story or a long story. Alternatively or in addition, any annunciator herein may consist of, may use, or may comprise, a visual annunciator comprising a visual signaling component, which may be a visible light emitter such as a semiconductor device, an incandescent lamp or fluorescent lamp. Alternatively or in addition, any notifier herein may consist of, may use, or may comprise, a vibrator for providing haptic or tactile stimuli, and the vibrator may consist of, may use, or may comprise, a vibration motor, a linear actuator, or an off-center motor.

Any annunciator herein may further include a visual annunciator comprising a visual signaling component that may be a visible light emitter such as a semiconductor device, an incandescent lamp or fluorescent lamp, and the taking an action may comprise activating or controlling the visual annunciator. The visible light emitter may be adapted for a steady illumination and for blinking in response to the value of the estimated angular deviation, or any other numerical value. Alternatively or in addition, the illumination level, location, type, color, or steadiness of the visible light emitter may be in response to the value of the estimated angular deviation p, the multi-image numerical value, or any other numerical value. Alternatively or in addition, the visible light emitter may be a numerical or an alphanumerical display emitter that may be based on LCD (Liquid Crystal Display), TFT (Thin-Film Transistor), FED (Field Emission Display) or CRT (Cathode Ray Tube), for displaying a value.

The analyzer device may further comprise a line driver or a transceiver coupled between the connector and the processor for transmitting digital data to, the multiple devices over the medium. In response to associating the received signal with the second signal, the analyzer device may be operative to continuously transmit to the medium, using the respective line driver or transceiver, an energy, a signal, a bit-stream, frames, or packets, to the medium, for disabling any communication between any of the multiple devices over the medium. At least one of the frames or packets may comprise the time associated with the received signal, and an identity of the transmitting device. Alternatively or in addition, the analyzer device may further be operative to form and transmit a message that comprises a frame or packet to one of, or all of, the multiple devices over the medium. The message may comprise the time associated with the received signal, and an identity of the transmitting device. Alternatively or in addition, the acting may comprise transmitting a signal to the medium so that the signal collides with the received frame or packet, for rendering the frame or packet ineligible.

An analyzer method may be used with a frame-based or packet-based wired network that uses a medium that comprises two conductors, and multiple devices that may be connected to, and communicate with each other over, the medium. Each of the multiple devices may be associated with a respective criterion. The analyzer method may comprise connecting, by a connector, to the medium; receiving, by the connector, a frame or packet transmitted to the medium by a transmitting device that may be one of the multiple devices; sampling, by an A/D converter, part of the received frame or packet, for producing digital samples of a waveform thereof; storing, in a first memory, the digital samples of the waveform; storing, in a second memory, the multiple criterions associated with the multiple devices; fetching, from the second memory, at least one of the criterions; checking the waveform according to a criterion from the multiple criterions that may be associated with the transmitting device; and acting in response to the waveform not satisfying the checked criterion. A non-transitory computer readable medium include computer executable instructions stored thereon, and the instructions may include the analyzer method.

At least one criterion of the multiple criterions may be configured so that the criterion may not be satisfied in case of a changing of, or connecting to, the medium. At least one criterion of the multiple criterions may be configured so that the criterion may not be satisfied in case of a connecting an additional device to the medium. The additional device may be operative to communicate with at least one the multiple devices over the medium. Alternatively or in addition, at least one criterion of the multiple criterions may be configured so that the criterion may not be satisfied in case of a change in the device that may be associated with the at least one criterion, and at least one criterion of the multiple criterions may be configured so that the criterion may not be satisfied in case of substituting of a line driver, a transceiver in the device, or substituting the device, that may be associated with the at least one criterion.

The analyzer method may further comprise transmitting frames or packet to, and for receiving frames or packets from, one or more of the multiple devices over the medium, by a transceiver coupled to the connector, and may further comprise layer 2 or layer 3 handling of the received frame of packet by a controller. Each one of the multiple devices may be associated with a digital address for uniquely being identified in the wired network, and the analyzer method may further comprise identifying the digital address of the transmitting device. The identifying of the digital address may comprise extracting the digital address from the received frame or packet, and the criterion used for the checking may be based on, or may be according to, the identified digital address. The received frame or packet may be associated with a maximum component frequency of the respective signal, and the sampling rate of the A/D converter may be higher than twice the maximum component frequency. The analyzer method may further comprise terminating a signal propagating over the medium by an impedance or a resistor connected to the connector, and the value of the impedance or resistor may be equal to, or may be based on, the characteristic impedance of the medium. The analyzer method may further comprise receiving multiple frames or packets, and checking the waveform of the multiple frames or packets received. The analyzer method may further comprise detecting a malware or a malware activity, and the malware may consist of, may include, or may be based on, a computer virus, spyware, DoS (Denial of Service), rootkit, ransomware, adware, backdoor, Trojan horse, or a destructive malware.

The wired network topology may be a point-to-point, bus, star, ring or circular, mesh, tree, hybrid, or daisy chain topology. Alternatively or in addition, the wired network topology may be a point-to-point topology between two nodes connected to the medium ends, and the communication may be unidirectional, half-duplex, or full-duplex. The connecting to the medium may comprise connecting to one of the ends of the medium, or connecting at a point that may be distinct from an end of the medium. The medium may comprise, or may consist of, an unbalanced line, signals carried over the medium may employ single-ended signaling, and the signals may use single-ended signaling that may be based on, may be according to, or may be compatible with, RS-232 or RS-423 standards. Alternatively or in addition, the medium may comprise, or may consist of, a balanced line, and signals may be carried over the medium may employ differential signaling, that may be based on, may be according to, or may be compatible with, RS-232 or RS-423 standards. Further, the communication over the medium may use serial or parallel transmission. The analyzer method may further comprise transmitting and receiving digital data over the wired network by a wired transceiver coupled to the connector.

Further, the analyzer method may be used with a vehicle, and the acting may comprise providing a notification or an indication to a person operating or controlling the vehicle. The analyzer method may further comprise connecting to, coupling to, or communicating with, an automotive electronics in a vehicle or an Electronic Control Unit (ECU), and may be used within an ECU, and the Electronic Control Unit (ECU) may be selected from the group consisting of Electronic/engine Control Module (ECM), Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed Control Unit (SCU), Telematic Control Unit (TCU), Transmission Control Unit (TCU), Brake Control Module (BCM; ABS or ESC), Battery management system, control unit, and a control module. The analyzer method may further comprise executing software, an operating-system, or a middleware, that may comprise, or may use OSEK/VDX, International Organization for Standardization (ISO) 17356-1, ISO 17356-2, ISO 17356-3, ISO 17356-4, ISO 17356-5, or AUTOSAR standard. Alternatively or in addition, the software may comprises, may use, or may be based on, an operating-system or a middleware, that comprises, or uses OSEK/VDX, International Organization for Standardization (ISO) 17356-1, ISO 17356-2, ISO 17356-3, ISO 17356-4, ISO 17356-5, or AUTOSAR standard.

The wired network may use a data link layer or a physical layer signaling that may be according to, may be based on, may use, or may be compatible with, ISO 11898-1:2015 or standard, and the connector may be an On-Board Diagnostics (OBD) complaint connector. The wired network may be a vehicle bus, which may be compatible with, a multi-master, serial protocol using acknowledgement, arbitration, and error-detection schemes. The analyzer method may further comprise transmitting digital data to, and for receiving digital data from, the medium, by a vehicle bus transceiver coupled to the connector. The vehicle bus may employ, may use, may be based on, or may be compatible with, a synchronous and frame-based protocol, such as a Controller Area Network (CAN). The CAN may be according to, may be based on, may use, or may be compatible with, a standard selected from the group consisting of ISO 11898-3:2006, ISO 11898-2:2004, ISO 11898-5:2007, ISO 11898-6:2013, ISO 11992-1:2003, ISO 11783-2:2012, SAE J1939/11_201209, SAE J1939/15_201508, On-Board Diagnostics (OBD), and SAE J2411_200002. Alternatively or in addition, the CAN may be according to, may be based on, may use, or may be compatible with, Flexible Data-Rate (CAN FD) protocol.

The analyzer method may further comprise signal conditioning or manipulating of a signal received from the connector by a signal conditioner, and the signal conditioning may be a linear or non-linear conditioning or manipulating. The analyzer method may be used with a wireless network, and may further comprising further comprising transmitting and receiving Radio-Frequency (RF) signals over the air by an antenna; and wirelessly transmitting and receiving digital data over the wireless network by a wireless transceiver coupled to the antenna. The analyzer method may be used with an additional wired network that uses an additional wired medium, and the method may further comprise connecting to the additional wired medium by an additional connector, and transmitting and receiving digital data over the additional wired network by a wired transceiver coupled to the additional connector. The additional wired network may be a vehicle bus, and the wired transceiver may be a vehicle bus transceiver.

An analyzer method may be used with a wired network using a medium that comprises two conductors, and multiple devices that are connected to, and communicate with each other over, the medium using frames, and each of the frames may be composed of first and second parts. Any method herein may comprise connecting, by a connector, to the medium; receiving, by the connector, a frame transmitted to the medium by a transmitting device that is one of the multiple devices; sampling, by an A/D converter, a first part of the received frame, for producing digital samples of a waveform thereof; checking the waveform according to a criterion using an Artificial Neural Network (ANN); and responsive to the first part complying with the rule or criteria, transmitting a signal to the medium via the connector while receiving a second part of the received frame, so that the second part of the frame is interfered and is corruptedly propagated on the vehicle bus so that the frame is rendered ineligible to be properly received by any of the multiple devices. A non-transitory computer readable medium may be having computer executable instructions stored thereon, and the instructions include any method herein.

Each of the multiple devices herein may be associated with a respective criterion, and any checking herein of any waveform may be according to a criterion selected from the multiple criterions that is associated with the transmitting device. Any method herein may further comprise storing, in a first memory, the digital samples of the waveform; storing, in a second memory, the multiple criterions associated with the multiple devices; and fetching, from the second memory, at least one of the criterions.

Any checking herein of any waveform according to the criterion may comprise a time-domain or a frequency domain analyzing of the digital samples of the waveform for measuring a value of a parameter or a characteristic. The parameter or characteristic measured may be based on, or may be according to, the identity of the transmitting device. The analyzer method may be used with a threshold, and the criterion checking comprises comparing the measured value to the threshold. Any threshold herein may be based on, or may be according to, the identity of the transmitting device. Any criterion herein may be satisfied when the measured value may be lower than a maximum threshold, or when the measured value may be higher than a minimum threshold.

The checking of the waveform according to the criterion may comprise comparing the time-dependent waveform digital samples to a respective time-dependent threshold. The analyzer method may be used with a mask template that comprise a time-dependent minimum and maximum thresholds, and the criterion may be satisfied in response to comparing the time-dependent digital samples to the mask. Alternatively or in addition, the checking of the waveform according to the criterion comprises measuring two values of two parameters or a characteristics for calculate a total value in response to the measured values, and the criterion may be satisfied in response to the comparison to the calculated total value to a threshold. The total value may be calculated according to the difference or the ratio of the two measured values.

Any measured value herein may comprise an amplitude of one of the samples, such as the global or local minimum or maximum amplitude value of the digital samples. Alternatively or in addition, the measured value may comprise an energy in the waveform. Alternatively or in addition, the measured value may comprise a time point or a time interval associated with one or more of the digital samples, or the time point or time interval may be associated with a defined value, global or local minimum, or global or local maximum, of an amplitude of the digital samples. Any waveform herein may comprise a rising or falling edge transitioning from low to high levels, and the parameter or characteristic may comprise the amplitude of the low or high level, the peak amplitude value, the overshoot or undershoot amplitude value, the ringback amplitude value, a respective rise, a fall time, or a settling time. Alternatively or in addition, the waveform may comprise a positive or negative pulse between low and high levels, and the parameter or characteristic may comprise the amplitude of the low or high level or the amplitude of a peak value or a pulse duration. The parameter or characteristic may comprise a pulse duration or a respective an interframe or inter-packet gap. The parameter or characteristic may comprise a clock rate extracted from the respective frame or packet, or the recovered clock rate extracted from respective frame or packet, such as by recovering and measuring the clock rate of the respective frame or packet by a Phase Lock Loop (PLL) coupled to the connector.

The checking of the waveform according to the criterion may comprise frequency-domain analyzing of the digital samples of the waveform for measuring a value of a parameter or a characteristics, and the checking of the waveform according to the criterion comprises forming frequency domain representation of the waveform, by forming the frequency domain representation by Fast Fourier Transformation (FFT). Alternatively or in addition, the analyzer method may further comprise forming frequency domain representation, by using two or more Band Pass Filters (BPFs) coupled between the connector, and each of the BPFs may be configure to pass a different frequency band.

The checking of the waveform according to the criterion may comprise using an Artificial Neural Network (ANN) for analyzing or classifying the waveform, and the criterion may be satisfied according to the value of one of the ANN outputs. The ANN may be trained to classify the transmitting device out of the multiple devices according to the waveform, and may comprise multiple output, and each output may be classifying one of the multiple devices. The checking of the waveform according to the criterion may comprise comparing the identity of the transmitting device with the corresponding ANN output.

The acting may comprise notifying a human user using auditory, visual, or haptic stimuli by an annunciator, such as by emitting a sound by the audible signaling component, and the annunciator may consist of, may use, or may comprise, an audible annunciator that comprises an audible signaling component. Alternatively or in addition, the annunciator may consist of, may use, or may comprise, a visual annunciator that comprises a visual signaling component. Alternatively or in addition, the acting may comprise providing a haptic or a tactile stimuli, and the annunciator may consist of, may use, or may comprise, a vibrator.

The analyzer method may further comprise transmitting digital data to, the multiple devices over the medium by a line driver or a transceiver coupled to the connector, and the acting may comprise transmitting to the medium using the respective line driver or transceiver. The acting may comprise continuously transmitting an energy, a signal, or a bit-stream, to the medium, for disabling any communication between any of the multiple devices over the medium, or may comprise continuously transmitting frames or packets to the medium, for disabling any communication between any of the multiple devices over the medium. At least one of the frames or packets may comprise the time associated with the received signal, and an identity of the transmitting device. Alternatively or in addition, the acting may comprise forming and transmitting a message that comprises a respective notifying frame or packet to one of, or all of, the multiple devices over the medium. The message may comprise the time associated with the received signal, and an identity of the transmitting device. The analyzer method may be used with an additional network using an additional medium, and may further comprise transmitting and receiving digital data over the additional network via a port and a transceiver coupled thereto for coupling to the additional medium, and the acting may comprise composing a message.

The analyzer method may further comprise transferring or relaying messages between the wired network and the additional network, and each of the messages may comprise one or more respective frames or packets. The analyzer may further comprise coupling between the wired network and the additional network when functioning as a switch, bridge, router, or gateway, such as an Ethernet, IP, or vehicle-bus switch, bridge, router, or gateway. The analyzer method may further comprise receiving messages from the additional network addressed to the wired network, and transporting the received messages to the wired network. The acting may comprise blocking one or more, or all, of the messages from the wired network. Alternatively or in addition, the analyzer method may further comprise receiving messages from the wired network addressed to the additional network, and transporting the received messages to the additional network. The acting may comprise blocking one or more of, or all of, the messages from the additional network.

Any apparatus or device herein may further comprise a signal conditioner coupled to the first sensor output for conditioning or manipulating of the first sensor output signal, and the signal conditioner may comprise a linear or non-linear conditioning or manipulating. Any signal conditioner herein may comprise an operation or an instrument amplifier, a multiplexer, a frequency converter, a frequency-to-voltage converter, a voltage-to-frequency converter, a current-to-voltage converter, a current loop converter, a charge converter, an attenuator, a sample-and-hold circuit, a peak-detector, a voltage or current limiter, a delay line or circuit, a level translator, a galvanic isolator, an impedance transformer, a linearization circuit, a calibrator, a passive or active (or adaptive) filter, an integrator, a deviator, an equalizer, a spectrum analyzer, a compressor or a de-compressor, a coder (or decoder), a modulator (or demodulator), a pattern recognizer, a smoother, a noise remover, an average or RMS circuit, an analog to digital (A/D) converter, or any combination thereof.

Any Artificial Neural Network (ANN) herein may be used to analyze or classify any part of, or whole of, the received signal waveform. The ANN may be a dynamic neural network, such as Feedforward Neural Network (FNN) or Recurrent Neural Network (RNN), and may comprise at least 3, 4, 5, 7, 10, 15, 20, 25, 30, 35, 40, 45, or 50 layers. Alternatively or in addition, the ANN may comprise less than 3, 4, 5, 7, 10, 15, 20, 25, 30, 35, 40, 45, or 50 layers.

Any network herein may be a wired network where the transmission medium comprises, consists of, or may be part of, two or more conductors, which may comprise, may consist of, or may be part of, a stripline, a microstrip, two wires, or a cable. Further, any medium herein may comprise, may consist of, or may be part of, a twisted wire pair that comprises, or consists of, two individually insulated solid or stranded conductors or wires, and the twisted wire pair may comprise, or may consist of, an Unshielded Twisted Pair (UTP) or a Shielded Twisted Pair (STP). Any twisted wire pair herein may be according to, may be based on, may be compatible with, or may use, ISO/IEC 11801:2002 or ANSI/TIA/EIA-568-B.2-2001 standard, and any STP herein be according to, may be based on, may be compatible with, or may use, F/UTP, S/UTP, or SF/UTP. Further, any twisted wire pair herein may be according to, may be part of, may be based on, may be compatible with, or may use, Category 3, Category 5, Category 5e, Category 6, Category 6A, Category 7, Category 7A, Category 8.1, or Category 8.2 cable. Alternatively or in addition, any wired network herein may comprise, may consist of, or may be part of, a coaxial cable, and the coaxial cable may comprise a dielectric materials are commonly used are foamed polyethylene (FPE), solid polyethylene (PE), polyethylene foam (PF), polytetrafluoroethylene (PTFE), or air space polyethylene (ASP).

Any network herein may be frame or packet based. The topology of any wired network herein may be based on, or may use, point-to-point, bus, star, ring or circular, mesh, tree, hybrid, or daisy chain topology. Any two nodes may be connected in a point-to-point topology, and any communication herein between two nodes may be unidirectional, half-duplex, or full-duplex. Any medium herein may comprise, or may consist of, an unbalanced line, and any signals herein may be carried over the medium employing single-ended signaling, that may be based on, may be according to, or may be compatible with, RS-232 or RS-423 standards. Alternatively or in addition, any medium herein may comprises, or may consist of, a balanced line, and any signals herein may be carried over the medium employing differential signaling, that may be based on, may be according to, or may be compatible with, RS-232 or RS-423 standards. Any communication over a medium herein may use serial or parallel transmission.

Any vehicle herein may be a ground vehicle adapted to travel on land, such as a bicycle, a car, a motorcycle, a train, an electric scooter, a subway, a train, a trolleybus, and a tram. Alternatively or in addition, the vehicle may be a buoyant or submerged watercraft adapted to travel on or in water, and the watercraft may be a ship, a boat, a hovercraft, a sailboat, a yacht, or a submarine. Alternatively or in addition, the vehicle may be an aircraft adapted to fly in air, and the aircraft may be a fixed wing or a rotorcraft aircraft, such as an airplane, a spacecraft, a glider, a drone, or an Unmanned Aerial Vehicle (UAV). Alternatively or in addition, any apparatus or device herein may be used for measuring or estimating the apparatus or device speed, positioning, pitch, roll, or yaw of the mobile apparatus or device.

Any apparatus or device herein may be used with, or may comprise, a wired network that comprises a network medium, and may further comprise a connector for connecting to the network medium; and a transceiver coupled to the connector for transmitting and receiving first data over the wired network, the transceiver may be coupled to be controlled by the processor. The wired network may be a vehicle network or a vehicle bus connectable to an Electronic Control Unit (ECU). Any ECU herein may be an Electronic/engine Control Module (ECM), Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed Control Unit (SCU), Telematic Control Unit (TCU), Transmission Control Unit (TCU), Brake Control Module (BCM; ABS or ESC), Battery management system, control unit, or a control module.

Any network data link layer or any physical layer signaling herein may be according to, may be based on, may be using, or may be compatible with, ISO 11898-1:2015 or On-Board Diagnostics (OBD) standard. The connector may be an On-Board Diagnostics (OBD) complaint connector, and any network medium access herein may be according to, may be based on, may be using, or may be compatible with, ISO 11898-2:2003 or On-Board Diagnostics (OBD) standard. Any network herein may be in-vehicle network such as a vehicle bus, and may employ, may use, may be based on, or may be compatible with, a multi-master, serial protocol using acknowledgement, arbitration, and error-detection schemes. Any network or vehicle bus herein may employ, may use, may be based on, or may be compatible with, a synchronous and frame-based protocol, and may further consist of, may employ, may use, may be based on, or may be compatible with, a Controller Area Network (CAN), that may be according to, may be based on, may use, or may be compatible with, ISO 11898-3:2006, ISO 11898-2:2004, ISO 11898-5:2007, ISO 11898-6:2013, ISO 11992-1:2003, ISO 11783-2:2012, SAE J1939/11_201209, SAE J1939/15_201508, On-Board Diagnostics (OBD), or SAE J2411_200002 standards. Any CAN herein may be according to, may be based on, may use, or may be compatible with, Flexible Data-Rate (CAN FD) protocol.

Alternatively or in addition, any network or vehicle bus herein may consist of, may employ, may use, may be based on, or may be compatible with, a Local Interconnect Network (LIN), which may be according to, may be based on, may use, or may be compatible with, ISO 9141-2:1994, ISO 9141:1989, ISO 17987-1, ISO 17987-2, ISO 17987-3, ISO 17987-4, ISO 17987-5, ISO 17987-6, or ISO 17987-7 standard. Alternatively or in addition, any network or vehicle bus herein may consist of, may employ, may use, may be based on, or may be compatible with, FlexRay protocol, which may be according to, may be based on, may use, or may be compatible with, ISO 17458-1:2013, ISO 17458-2:2013, ISO 17458-3:2013, ISO 17458-4:2013, or ISO 17458-5:2013 standard. Alternatively or in addition, any network or vehicle bus herein may consist of, may employ, may use, may be based on, or may be compatible with, Media Oriented Systems Transport (MOST) protocol, which may be according to, may be based on, may use, or may be compatible with, MOST25, MOST50, or MOST150.

Any vehicle bus herein may consist of, may comprise, or may be based on, an avionics data bus standard, such as Aircraft Data Network (ADN), Avionics Full-Duplex Switched Ethernet (AFDX), Aeronautical Radio INC. (ARINC) 664, ARINC 629, ARINC 708, ARINC 717, ARINC 825, MIL-STD-1553, MIL-STD-1760, or Time-Triggered Protocol (TTP).

Any vehicle bus herein may consist of, may comprise, or may be based on, automotive Ethernet, and may use a single twisted pair. Alternatively or in addition, any network or vehicle bus herein may consist of, may employ, may use, may be based on, or may be compatible with, IEEE802.3 100BaseT1, IEEE802.3 1000BaseT1, BroadR-Reach®, or IEEE 802.3bw-2015 standard.

Any network herein may be a Personal Area Network (PAN), any connector herein may be a PAN connector, and any transceiver herein may be a PAN transceiver. Alternatively or in addition, any network herein may be a Local Area Network (LAN) that may be Ethernet-based, ant connector herein may be a LAN connector, and any transceiver herein may be a LAN transceiver. The LAN may be according to, may be compatible with, or may be based on, IEEE 802.3-2008 standard. Alternatively or in addition, the LAN may be according to, may be compatible with, or may be based on, 10Base-T, 100Base-T, 100Base-TX, 100Base-T2, 100Base-T4, 1000Base-T, 1000Base-TX, 10GBase-CX4, or 10GBase-T; and the LAN connector may be an RJ-45 type connector. Alternatively or in addition, the LAN may be according to, may be compatible with, or may be based on, O1Base-FX, 100Base-SX, 100Base-BX, 100Base-LX10, 1000Base-CX, 1000Base-SX, 1000Base-LX, 1000Base-LX10, 1000Base-ZX, 1000Base-BX10, 10GBase-SR, 10GBase-LR, 10GBase-LRM, 10GBase-ER, 10GBase-ZR, or 10GBase-LX4, and the LAN connector may be a fiber-optic connector. Alternatively or in addition, any network herein may be a packet-based or switched-based Wide Area Network (WAN), any connector herein may be a WAN connector, and any transceiver herein may be a WAN transceiver. Alternatively or in addition, any network herein may be according to, may be compatible with, or may be based on, a Serial Peripheral Interface (SPI) bus, Inter-Integrated Circuit ($I^2C$) bus, or 1-Wire bus.

Any wireless network herein may be a Wireless Personal Area Network (WPAN), the wireless transceiver may be a WPAN transceiver, and the antenna may be a WPAN antenna, and further the WPAN may be according to, may be compatible with, or may be based on, Bluetooth™ or IEEE 802.15.1-2005 standards, or the WPAN may be a wireless control network that may be according to, may be compatible with, or may be based on, ZigBee™, IEEE 802.15.4-2003 or Z-Wave™ standards. Alternatively or in addition, the wireless network may be a Wireless Local Area Network (WLAN), the wireless transceiver may be a WLAN transceiver, and the antenna may be a WLAN antenna, and further the WLAN may be according to, or base on, IEEE 802.11-2012, IEEE 802.11a, IEEE 802.11b, IEEE 802.11g, IEEE 802.11n, or IEEE 802.11ac. The wireless network may use a licensed or unlicensed radio frequency band, and the unlicensed radio frequency band may be an Industrial, Scientific and Medical (ISM) radio band. Alternatively or in addition, the wireless network may be a Wireless Wide Area Network (WWAN), the wireless transceiver may be a WWAN transceiver, and the antenna may be a WWAN antenna, and the WWAN may be a wireless broadband network or a WiMAX network, where the antenna may be a WiMAX antenna and the wireless transceiver may be a WiMAX modem, and the WiMAX network may be according to, may be compatible with, or may be based on, IEEE 802.16-2009. Alternatively or in addition, the wireless network may be a cellular telephone network, the antenna may be a cellular antenna, and the wireless transceiver may be a cellular modem, and the cellular telephone network may be a Third Generation (3G) network that uses UMTS W-CDMA, UMTS HSPA, UMTS TDD, CDMA2000 1xRTT, CDMA2000 EV-DO, or GSM EDGE-Evolution. Alternatively or in addition, the cellular telephone network may be a Fourth Generation (4G) network that uses HSPA+, Mobile WiMAX, LTE, LTE-Advanced, MBWA, or may be based on IEEE 802.20-2008.

Any network herein may be a vehicle network, such as a vehicle bus or any other in-vehicle network. A connected element comprises a transceiver for transmitting to, and receiving from, the network. The physical connection typically involves a connector coupled to the transceiver. The vehicle bus may consist of, may comprise, may be compatible with, may be based on, or may use a Controller Area Network (CAN) protocol, specification, network, or system. The bus medium may consist of, or comprise, a single wire, or a two-wire such as an UTP or a STP. The vehicle bus may employ, may use, may be compatible with, or may be based on, a multi-master, serial protocol using acknowledgement, arbitration, and error-detection schemes, and may further use synchronous, frame-based protocol.

The network data link and physical layer signaling may be according to, compatible with, based on, or use, ISO 11898-1:2015. The medium access may be according to, compatible with, based on, or use, ISO 11898-2:2003. The vehicle bus communication may further be according to, compatible with, based on, or use, any one of, or all of, ISO 11898-3: 2006, ISO 11898-2:2004, ISO 11898-5:2007, ISO 11898-6: 2013, ISO 11992-1:2003, ISO 11783-2:2012, SAE J1939/11_201209, SAE J1939/15_201508, or SAE J2411_200002 standards. The CAN bus may consist of, may be according to, may be compatible with, may be based on, or may use a CAN with Flexible Data-Rate (CAN FD) protocol, specification, network, or system.

Alternatively or in addition, the vehicle bus may consist of, may comprise, may be based on, may be compatible with, or may use a Local Interconnect Network (LIN) protocol, network, or system, and may be according to, may be compatible with, may be based on, or may use any one of, or all of, ISO 9141-2:1994, ISO 9141:1989, ISO 17987-1, ISO 17987-2, ISO 17987-3, ISO 17987-4, ISO 17987-5, ISO 17987-6, or ISO 17987-7 standards. The battery powerlines or a single wire may serve as the network medium, and may use a serial protocol where a single master controls the network, while all other connected elements serve as slaves.

Alternatively or in addition, the vehicle bus may consist of, may comprise, be compatible with, may be based on, or may use a FlexRay protocol, specification, network or system, and may be according to, may be compatible with, may be based on, or may use any one of, or all of, ISO 17458-1:2013, ISO 17458-2:2013, ISO 17458-3:2013, ISO 17458-4:2013, or ISO 17458-5:2013 standards. The vehicle bus may support a nominal data rate of O1 Mb/s, and may support two independent redundant data channels, as well as independent clock for each connected element.

Alternatively or in addition, the vehicle bus may consist of, comprise, be compatible with, may be based on, or may use a Media Oriented Systems Transport (MOST) protocol, network or system, and may be according to, may be compatible with, may be based on, or may use any one of, or all of, MOST25, MOST50, or MOST150. The vehicle bus may employ a ring topology, where one connected element may be the timing master that continuously transmits frames where each comprises a preamble used for synchronization of the other connected elements. The vehicle bus may support both synchronous streaming data as well as asynchronous data transfer. The network medium may be wires (such as UTP or STP), or may be an optical medium such as Plastic Optical Fibers (POF) connected via an optical connector.

Any wireless network herein may be a Wireless Personal Area Network (WPAN), any wireless transceiver may be a WPAN transceiver, and any antenna herein may be a WPAN antenna. The WPAN may be according to, may be compatible with, or may be based on, Bluetooth™ or IEEE 802.15.1-2005 standards, or the WPAN may be a wireless control network that may be according to, or may be based on, ZigBee™, IEEE 802.15.4-2003, or Z-Wave™ standard.

Any wireless network herein may be a Wireless Local Area Network (WLAN), any wireless transceiver may be a WLAN transceiver, and any antenna herein may be a WLAN antenna. The WLAN may be according to, may be compatible with, or may be based on, IEEE 802.11-2012, IEEE 802.11a, IEEE 802.11b, IEEE 802.11g, IEEE 802.11n, or IEEE 802.11ac. Any wireless network herein may use a licensed or unlicensed radio frequency band, and the unlicensed radio frequency band may be an Industrial, Scientific and Medical (ISM) radio band.

A system may comprise any analyzer device described herein and a wired network having a medium that comprises two conductors connecting multiple devices where at least one of the devices may be operative for transmitting a signal over the medium. The wired network may be associated with first and second configurations respectively associated with first and second signals received from the medium in response to the transmitted signal, and the analyzer device may be connected to one end, or to a point that may be distinct from an end, of the medium using the connector. The analyzer device may be integrated with one of multiple devices. The system may further comprise at least one an additional analyzer device connected to the medium using the respective connector of the at least one additional analyzer device.

Any method herein may be used with multiple devices that communicate over a wired medium that comprises two conductors, each of the multiple device may be associated with one or more identifiers, the communication may be based on frames (or packets) where each frame carry one of the identifiers associated with the sending device. Any method herein may comprise connecting, by a connector, to the wired medium; receiving, by the connector, multiple frames transmitted over the wired medium; extracting, using Layer-2 or Layer-3 handling by a transceiver or a controller, first and second identifiers carried in the received frames; sampling, by an Analog-to-Digital (A/D) converter, part of the received frames carrying the first or second identifier, for producing digital samples of a waveform thereof; providing the samples to an Artificial Neural Network (ANN); and training the ANN to classify the samples relating to frames carrying the first or second identifiers to respective first or second classes. Further, any method herein may comprise receiving, by the connector, additional multiple frames transmitted over the wired medium; extracting, using Layer-2 or Layer-3 handling by the transceiver or the controller, the first and second identifiers carried in the received additional frames; sampling, by the A/D converter, part of the received additional frames carrying the first or second identifier, for producing digital samples of a waveform thereof; and classifying, using the trained ANN, the samples of the received additional frames to the first or second classes.

Further, any method herein may comprise defining as failed frames, the additional frames that are associated by the extracting with the first identifier and are classified by the ANN as the second class, and the additional frames that are associated by the extracting with the second identifier and are classified by the ANN as the first class; and calculating the ratio of the number of the first frames divided by the number of the total additional frames. Furthermore, any method herein may be used with a threshold, and may comprise comparing the ratio to the threshold; and responsive to the ratio being lower than the calculated ratio, determining that the first and second identifiers are associated with the same device. Any threshold herein may be less than 20%, 15%, 10%, 8%, 5%, 2%, 1%, 0.5%, 0.1%, 0.05%, or 0.01%, or may be above than 15%, 10%, 8%, 5%, 2%, 1%, 0.5%, 0.1%, 0.05%, 0.01%, or 0.005%.

Any method herein may be used for clustering of the identifiers, and may be used with a group including three or more identifiers. The method may be repeated by selecting different pairs of first and second identifiers for the group, for clustering all identifiers in the group into distinct clusters. Alternatively or in addition, the group may include four or more identifiers, and upon determining in one of the repetitions that two identifiers are associated with the same device, removing one of the two identifiers from the group, and continuing the repetitions with the group without the removed identifier.

A non-transitory computer readable medium may include computer executable instructions stored thereon, wherein the instructions may include any step or steps, any method, or any flow chart described herein. Any analyzer apparatus may perform any step or steps, any method, or any flow chart described herein.

Any training or classifying by any ANN herein may comprise a time-domain or a frequency domain analyzing of the digital samples of the waveform. Further, any training or classifying of any ANN herein may comprise comparing the time-dependent waveform digital samples to a respective time-dependent threshold. Any waveform herein may comprise a rising or falling edge transitioning from low to high levels, or may comprise a positive or negative pulse between low and high levels. Alternatively or in addition, any training or classifying by any ANN herein may comprise frequency-domain analyzing of the digital samples of the waveform, and the classifying or the training of any ANN herein may comprise forming frequency domain representation of the waveform, such as by forming the frequency domain representation by Fast Fourier Transformation (FFT), or by forming frequency domain representation, by two or more Band Pass Filters (BPFs) coupled between the connector, where each of the BPFs is configure to pass a different frequency band.

Any acting herein may comprise transmitting a signal to the medium while the at least part of the frame is received, so that the frame is interfered and is corruptly propagated on the medium so that the first frame is rendered ineligible to be properly received by any of the multiple devices. The transmitting of the signal to the medium may comprise changing a single bit in the series of bits received by each of the multiple devices, or the transmitting of the signal to the medium may comprise changing multiple consecutive or non-consecutive bits (such as 2, 4, 6, 8 bits or more) in the series of bits received by each of the multiple devices. Further, the medium may be carrying data as dominant ('0') or recessive ('1') bits, and the transmitting of the signal to the medium may comprise transmitting high voltage or high current pulse for changing one or more bits from recessive to dominant bits, so that the one or more bits in the series of bits received by each of the multiple devices is changed.

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below, and particularly pointed out in the claims filed with the application. Such combinations have particular advantages not specifically recited in the above summary.

BRIEF DESCRIPTION OF THE DRAWINGS

The invention is herein described, by way of non-limiting examples only, with reference to the accompanying drawings, wherein like designations denote like elements. Understanding that these drawings only provide information concerning typical embodiments of the invention and are not therefore to be considered limiting in scope:

FIG. 16a illustrates schematically a simplified flowchart of an arrangement for a rising edge waveform analysis using Artificial Neural Network (ANN);

FIG. 19 illustrates schematically simplified waveforms of consecutive frame or packets;

FIGS. 23, 23a, 23b, and 23c illustrate schematically tables of correlations of identifier pairs using an Artificial Neural Network (ANN).

DETAILED DESCRIPTION

Figure 1:
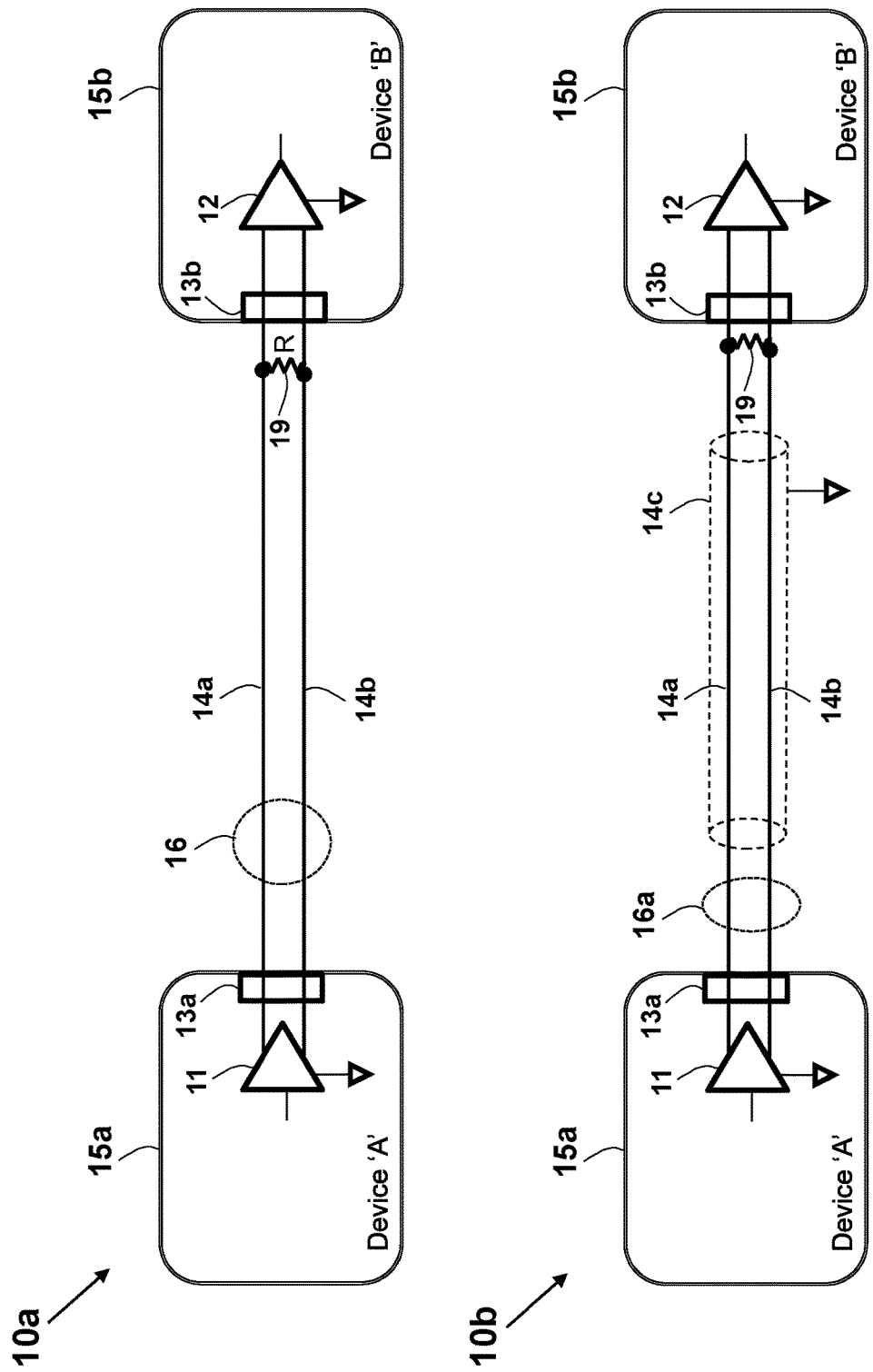
FIG. 1 illustrates schematically block diagrams of unidirectional balanced point-to-point wired networks.

The principles and operation of an apparatus according to the present invention may be understood with reference to the figures and the accompanying description wherein similar components appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (even in the case of using different suffix, such as 5, 5a, 5b and 5c) refer to functions or actual devices that are either identical, substantially similar, or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention. It is to be understood that the singular forms "a," "an," and "the" herein include plural referents unless the context clearly dictates otherwise. Thus, for example, a reference to "a component surface" includes reference to one or more of such surfaces. The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The transfer of digital data signals between two devices, systems, or components, commonly makes use of a line driver for transmitting the signal to the conductors serving as the transmission medium connecting the two modules, and a line receiver for receiving the transmitted signal from the transmission medium. The communication may use a proprietary interface or preferably an industry standard, which typically defines the electrical signal characteristics such as voltage level, signaling rate, timing and slew rate of signals, voltage withstanding levels, short-circuit behavior, and maximum load capacitance. Further, the industry standard may define the interface mechanical characteristics such as the pluggable connectors, and pin identification and pin-out. In one example, the module circuit can use an industry or other standard used for interfacing serial binary data signals. Preferably the line drivers and line receivers and their associated circuitry will be protected against electrostatic discharge (ESD), electromagnetic interference (EMI/EMC), and against faults (fault-protected), and employs proper termination, failsafe scheme and supports live insertion. Preferably, a point-to-point connection scheme is used, wherein a single line driver is communicating with a single line receiver. However, multi-drop or multi-point configurations may as well be used. Further, the line driver and the line receiver may be integrated into a single IC (Integrated Circuit), commonly known as transceiver IC.

A line driver typically converts the logic levels used by the module internal digital logic circuits (e.g., CMOS, TTL, LSTTL and HCMOS) to a signal to be transmitted. In order to improve the common-mode noise rejection capability, and to allow higher data rates, a balanced and differential interface may be used. For example, a balanced interface line driver may be an RS-422 driver such as RS-422 transmitter MAX3030E, available from Maxim Integrated Products, Inc. of Sunnyvale, Calif., U.S.A., described in the data sheet "±15 kV ESD-Protected, 3.3V Quad RS-422 Transmitters" publication number 19-2671 Rev. 0 October 2002, which is incorporated in its entirety for all purposes as if fully set forth herein. A line receiver typically converts the received signal to the logic levels used by the module internal digital logic circuits (e.g., CMOS, TTL, LSTTL and HCMOS). For example, industry standard TIA/EIA-422 (a.k.a. RS-422) can be used for a connection, and the line receiver may be an RS-422 compliant line receiver, such as RS-422 receiver MAX3095, available from Maxim Integrated Products, Inc. of Sunnyvale, Calif., U.S.A., described in the data sheet "+15kV ESD-Protected, 10 Mbps, 3V/5V, Quad RS-422/RS-485 Receivers" publication number 19-0498 Rev. 1 October 2000, which is incorporated in its entirety for all purposes as if fully set forth herein. American national standard ANSI/TIA/EIA-422-B (formerly RS-422) and its international equivalent ITU-T Recommendation V.11 (also known as X.27), are technical standards that specify the "electrical characteristics of the balanced voltage digital interface circuit". These technical standards provide for data transmission, using balanced or differential signaling, with unidirectional/non-reversible, terminated or non-terminated transmission lines, point to point. Overview of the RS-422 standard can be found in National Semiconductor Application Note 1031 publication AN012598 dated January 2000 and titled: "TIA/EIA-422-B Overview" and in B&B Electronics publication "RS-422 and RS-485 Application Note" dated June 2006, which are incorporated in their entirety for all purposes as if fully set forth herein.

A transmission scheme may be based on the serial binary digital data standard Electronic Industries Association (EIA) and Telecommunications Industry Association (TIA) EIA/TIA-232, also known as Recommended Standard RS-232 and ITU-T (The Telecommunication Standardization Sector (ITU-T) of the International Telecommunication Union (ITU)) V.24 (formerly known as CCITT Standard V.24). Similarly, RS-423 based serial signaling standard may be used. For example, RS-232 transceiver MAX202E may be used, available from Maxim Integrated Products, Inc. of Sunnyvale, Calif., U.S.A., described in the data sheet "±12 kV ESD-Protected, +5V RS-232 Transceivers" publication number 19-0175 Rev. 6 March 2005, which is incorporated in its entirety for all purposes as if fully set forth herein.

A 2-way communication interface may use the EIA/TIA-485 (formerly RS-485), which supports balanced signaling and multipoint/multi-drop wiring configurations. Overview of the RS-422 standard can be found in National Semiconductor Application Note 1057 publication AN012882 dated October 1996 and titled: "*Ten ways to Bulletproof RS-485 Interfaces*", which is incorporated in their entirety for all purposes as if fully set forth herein. In this case, RS-485 supporting line receivers and line driver are used, such as for example, RS-485 transceiver MAX3080 may be used, available from Maxim Integrated Products, Inc. of Sunnyvale, Calif., U.S.A., described in the data sheet "*Fail-Safe, High-Speed* (10 *Mbps*), *Slew-Rate-Limited RS-*485/*RS-*422 *Transceivers*" publication number 19-1138 Rev. 3 December 2005, which is incorporated in its entirety for all purposes as if fully set forth herein.

An attack or intrusion of a wired network may include connecting of non-legitimate or unauthorized device to the network, or disconnecting (or removal) of a legitimate or authorized device from the network. In one example, the network is compromised by the connecting of an unauthorized device as an additional network node for eavesdropping to the traffic carried over the network. Alternatively or in addition, the added unauthorized device may use malware for transmitting harmful or non-legitimate information to the network, to be used or analyzed for a harmful purpose by the legitimately connected nodes. If not detected, the unauthorized device may harmfully participate in the wired network. Such an intrusion in a wired network typically takes the form of wire-tapping to the wired network medium, allowing for monitoring or recording the data over the network by a non-authorized third party. Passive wiretapping monitors or records the traffic, while active wiretapping alters or otherwise affects it. Protection against active wire-tapping in which the attacker attempts to seize control of a communication association, e.g. packet injection or modifying, hijacking sessions, TCP sequence number attacks, piggyback attacks, man-in-the-middle attacks, spoofing etc.

Modern automobiles are no longer mere mechanical devices; they are pervasively monitored and controlled by dozens of digital computers coordinated via internal vehicular networks. While this transformation has driven major advancements in efficiency and safety, it has also introduced a range of new potential risks. Experimentally evaluated issues on a modern automobile that demonstrate the fragility of the underlying system structure are described in a paper that appeared in 2010 IEEE Symposium on Security and Privacy, entitled: "*Experimental Security Analysis of a Modern Automobile*" by Karl Koscher, Alexei Czeskis, Franziska Roesner, Shwetak Patel, and Tadayoshi Kohno, all of Department of Computer Science and Engineering, University of Washington, Seattle, Wash. 98195-2350 and by Stephen Checkoway, Damon McCoy, Brian Kantor, Danny Anderson, Hovav Shacham, and Stefan Savage of the Department of Computer Science and Engineering, University of California San Diego, La Jolla, Calif. 92093-0404, which is incorporated in its entirety for all purposes as if fully set forth herein. In this paper, it is demonstrated that an attacker who is able to infiltrate virtually any Electronic Control Unit (ECU) can leverage this ability to completely circumvent a broad array of safety-critical systems. Over a range of experiments, both in the lab and in road tests, the ability to adversarially control a wide range of automotive functions and completely ignore driver input—including disabling the brakes, selectively braking individual wheels on demand, stopping the engine, and so on, is demonstrated.

Modern automobiles are pervasively computerized, and hence potentially vulnerable to attack. However, while previous research has shown that the internal networks within some modern cars are insecure, the associated threat model—requiring prior physical access—has justifiably been viewed as unrealistic. Thus, it remains an open question if automobiles can also be susceptible to remote compromise. A work that seeks to put this question to rest by systematically analyzing the external attack surface of a modern automobile is described in a 2011 published paper entitled: "*Comprehensive Experimental Analyses of Automotive Attack Surfaces*", by Stephen Checkoway, Damon McCoy, Brian Kantor, Danny Anderson, Hovav Shacham, and Stefan Savage, all of University of California, San Diego, and by Karl Koscher, Alexei Czeskis, Franziska Roesner, and Tadayoshi Kohno, all of University of Washington, which is incorporated in its entirety for all purposes as if fully set forth herein. The paper discover that remote exploitation is feasible via a broad range of attack vectors (including mechanics tools, CD players, Bluetooth and cellular radio), and further, that wireless communications channels allow long distance vehicle control, location tracking, in-cabin audio exfiltration and theft. Finally, we discuss the structural characteristics of the automotive ecosystem that give rise to such problems and highlight the practical challenges in mitigating them.

Figure 2:
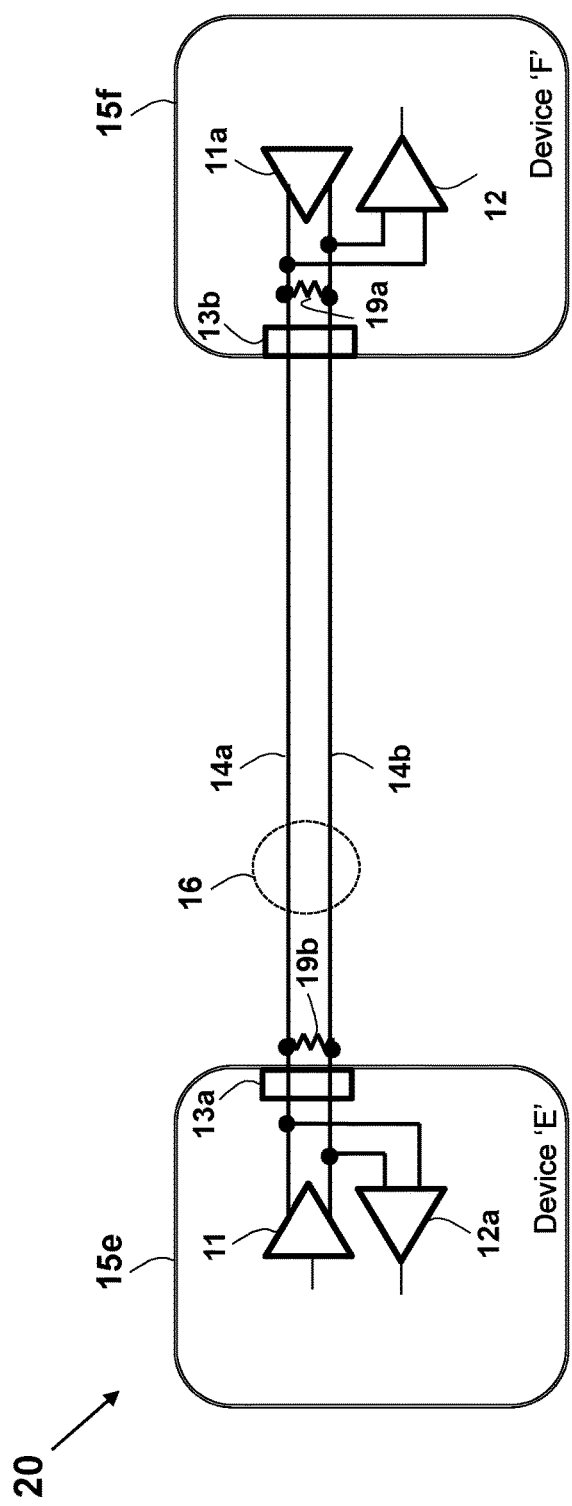
FIG. 2 illustrates schematically a block diagram of a bi-directional balanced point-to-point wired network.
Figure 3:
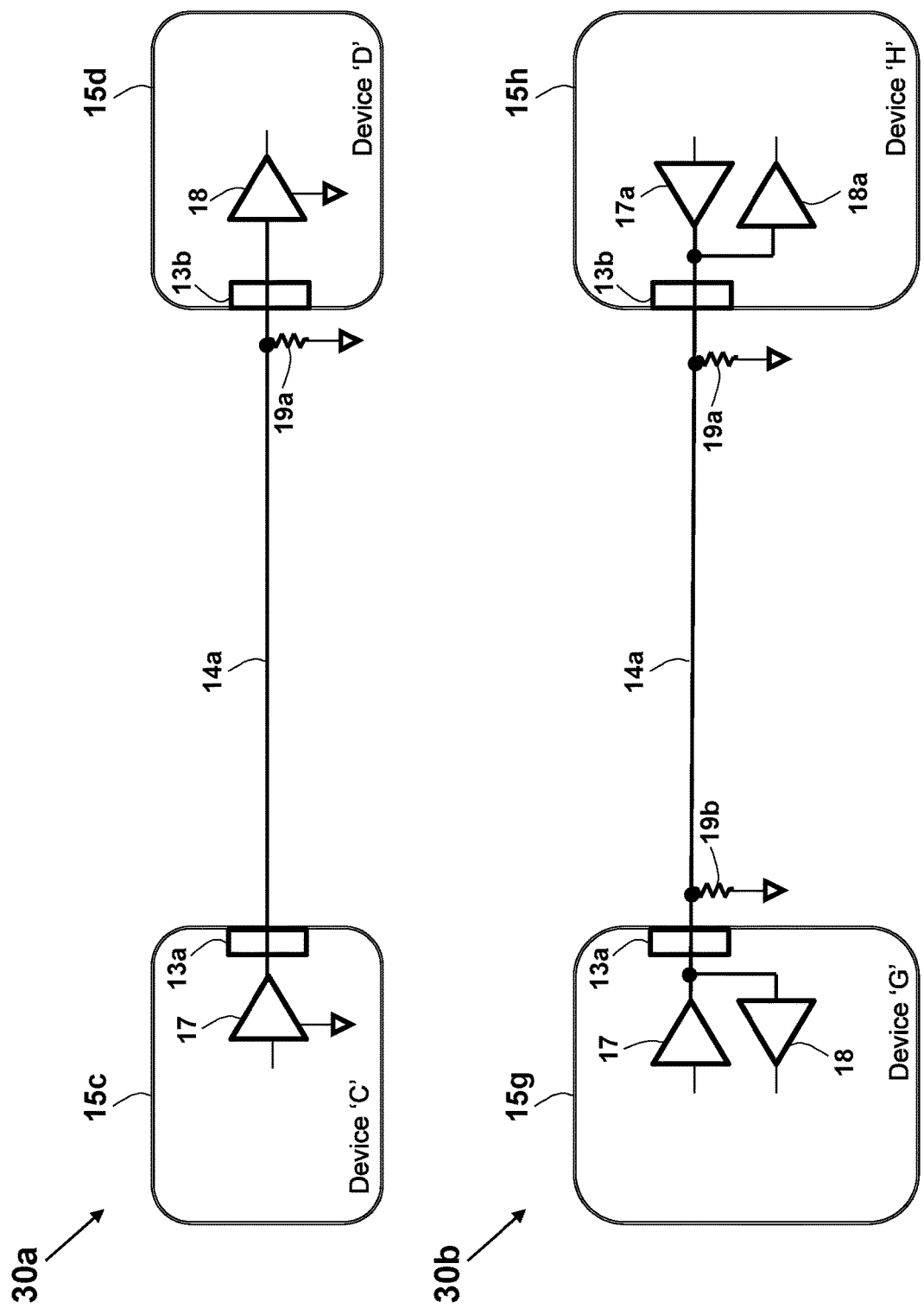
FIG. 3 illustrates schematically block diagrams of a unidirectional and a bidirectional unbalanced point-to-point wired networks.
Figure 8:
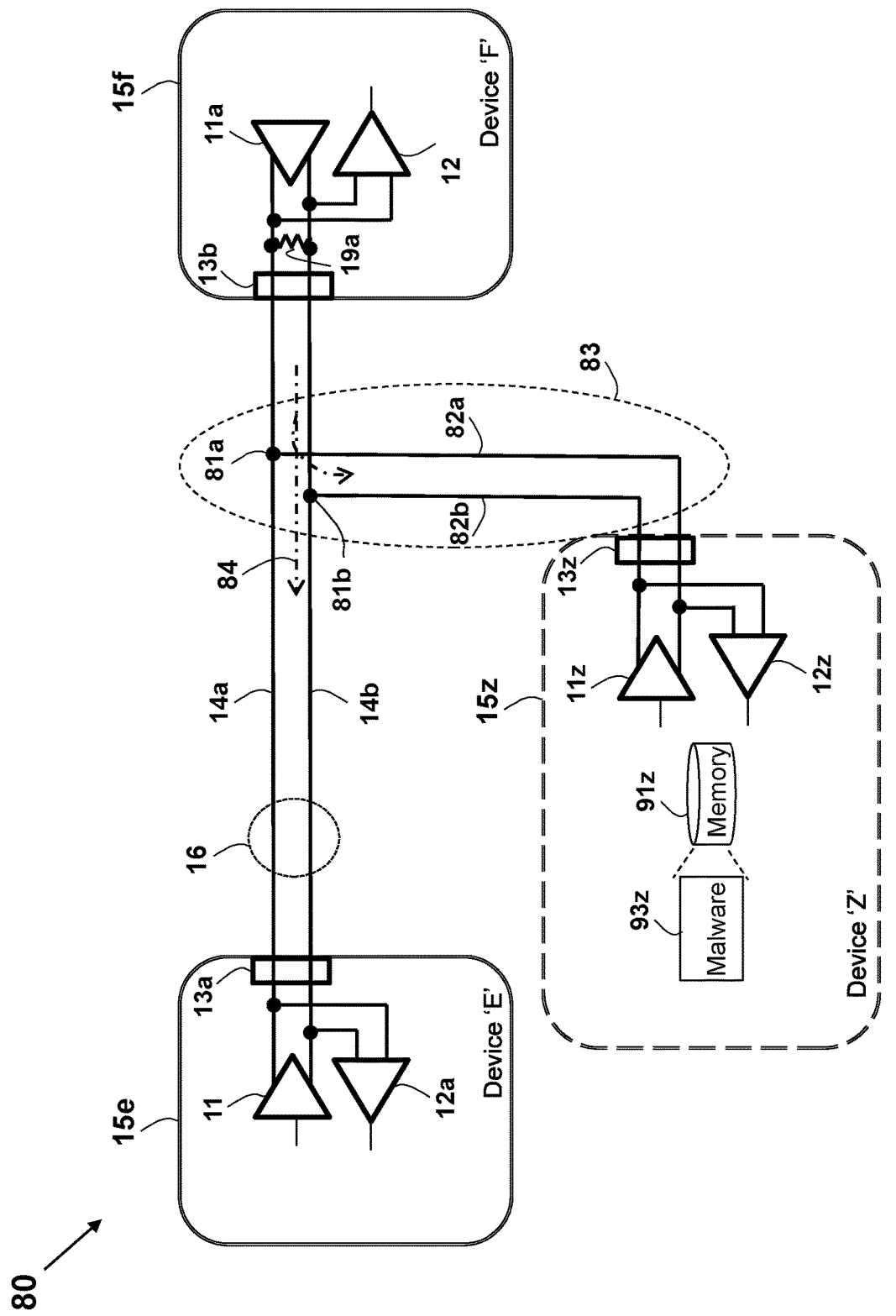
FIG. 8 illustrates schematically a block diagram of a bi-directional balanced point-to-point wired network tapped into by a device.

An example of an attack on the wired network 20 shown in FIG. 2 is described in an arrangement 80 shown in FIG. 8. An unauthorized device 15z includes a line receiver 12z and a line driver 11z, connected to the medium 16 by a connector 13z. The unauthorized device 15z further comprises a memory 91z that stores a malware 93z for eavesdropping of, or otherwise interfering with, the network 20 operation. Using the connector 13z, the unauthorized device 15z connects to the conductor or wire 14a at a point 81a using a conductor or wire 82a, and to the conductor or wire 14b at a point 81b using a conductor or wire 82b.

The connection of the unauthorized device 15z changes some integrated or distributed characteristics of the medium 16. For example, the added device 15z may affect the impedance or the common-mode characteristics of the medium 16, and may further change the leakage current between the conductors 14a and 14b, or the leakage to ground. From distributed point of view, the transmission-line or wave-carrying characteristics of the medium 16 may be impacted. For example, a stub 83 is formed by the conductors or wires 82a and 82b, affecting the propagation of a signal over the medium 16. In one example, the propagation of a signal 84 transmitted from the Device 'F' 15f by the line driver 11a may be affected by the stub 83. Neglecting transmission line losses, the input impedance of the stub 83 is purely reactive; either capacitive or inductive, depending on the electrical length of the stub, and on whether it is open or short circuit. Stubs may thus function as capacitors, inductors and resonant circuits at radio frequencies. Such a stub 83 may influence standing waves of radio waves along their length, where their reactive properties are determined by their physical length in relation to the wavelength of the propagated waves.

Figure 4:
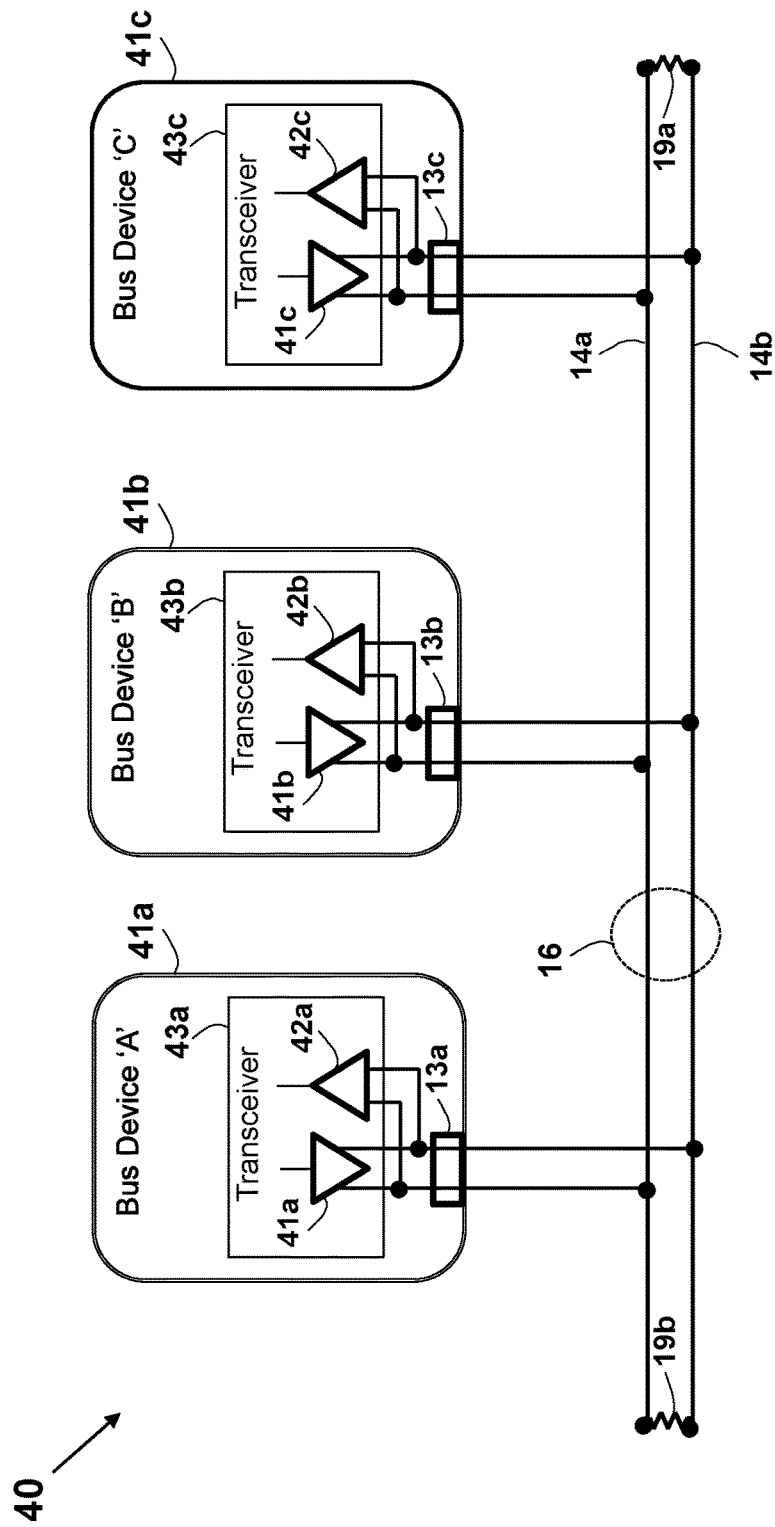
FIG. 4 illustrates schematically a block diagram of a balanced multi-point (bus) wired network.
Figure 9:
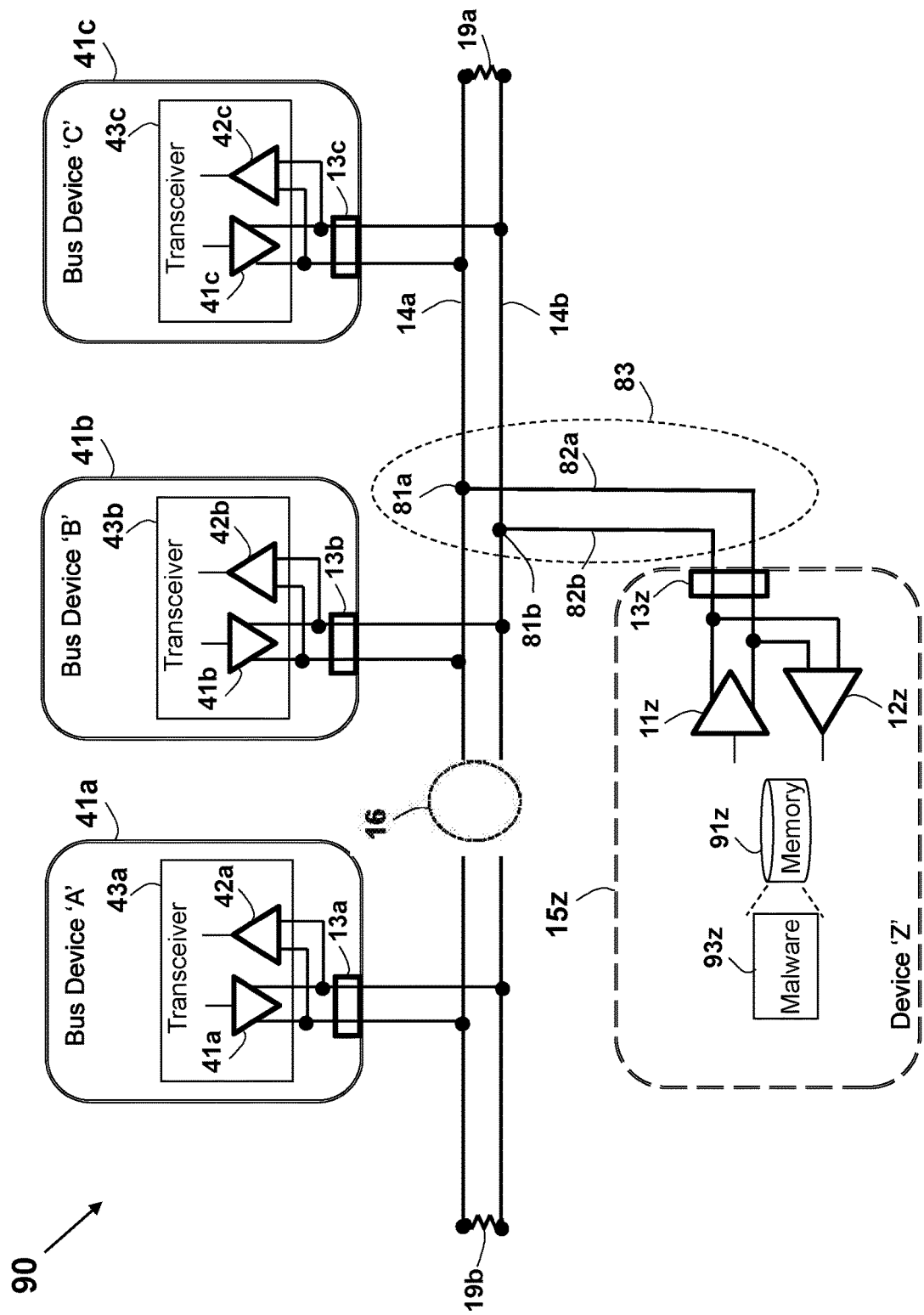
FIG. 9 illustrates schematically a block diagram of a balanced multi-point wired network tapped into by a device.

In an automotive or a multi-point topology environment, an example of an attack on the wired network 40 shown in FIG. 4 is described in an arrangement 90 shown in FIG. 9. Using the connector 13z, the unauthorized device 15z connects to the conductor or wire 14a at the point 81a using the conductor or wire 82a, and to the conductor or wire 14b at the point 81b using the conductor or wire 82b.

Figure 9A:
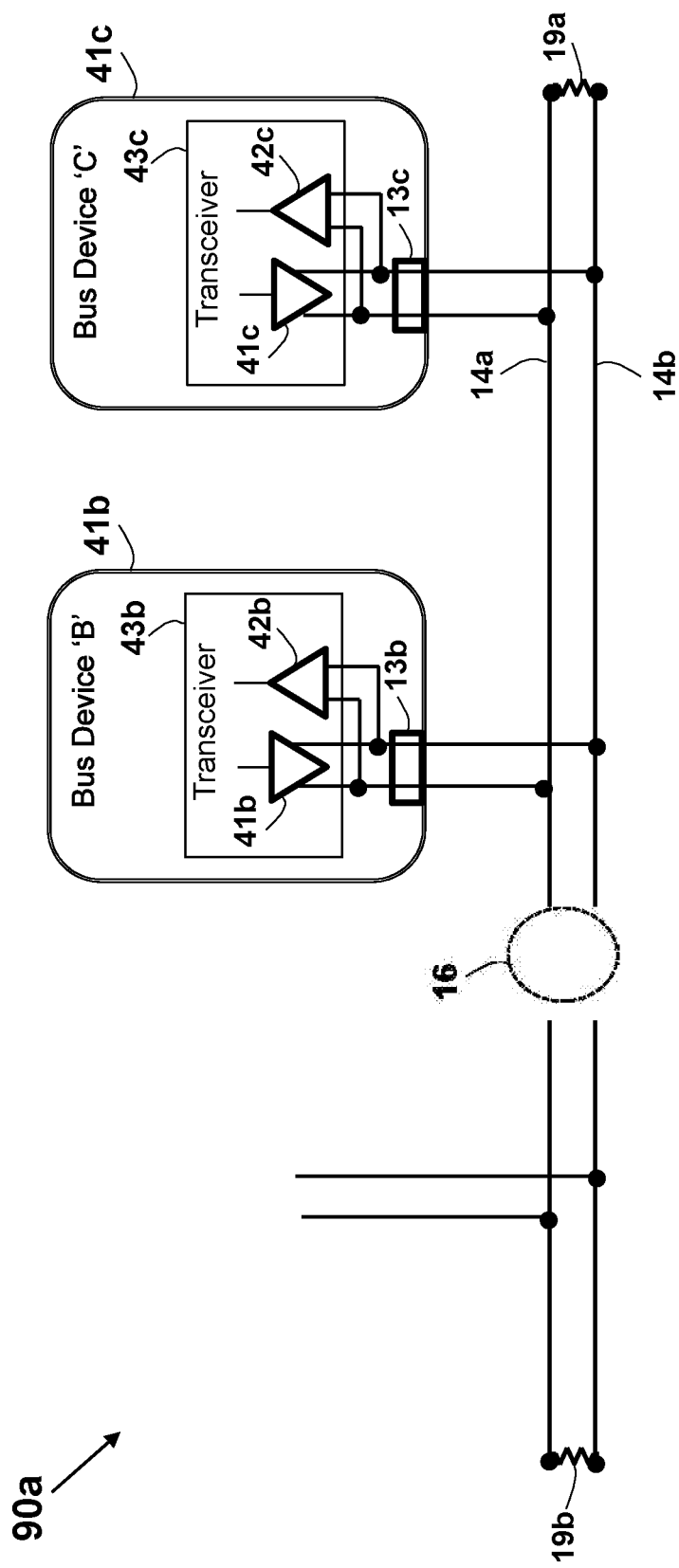
FIG. 9a illustrates schematically a block diagram of a balanced multi-point wired network with removed or disconnected device.

Similarly, an attack on a network may involve removal or disconnecting of one of the devices connected to the network, as exampled in an arrangement 90a shown in FIG. 9a. In the arrangement 90a, the Bus Device 'A' 41a (used in the wired network 40 shown in FIG. 4) is either removed or disconnected from the medium 16.

The change in the wired medium 16 characteristics may be used in order to detect the attack. In one example, a signal received at a location along the medium 16 may be analyzed and compared to a corresponding signal received before a suspected attack, and in case of a significant difference that may be result of a stub, an attack is determined.

Figure 5:
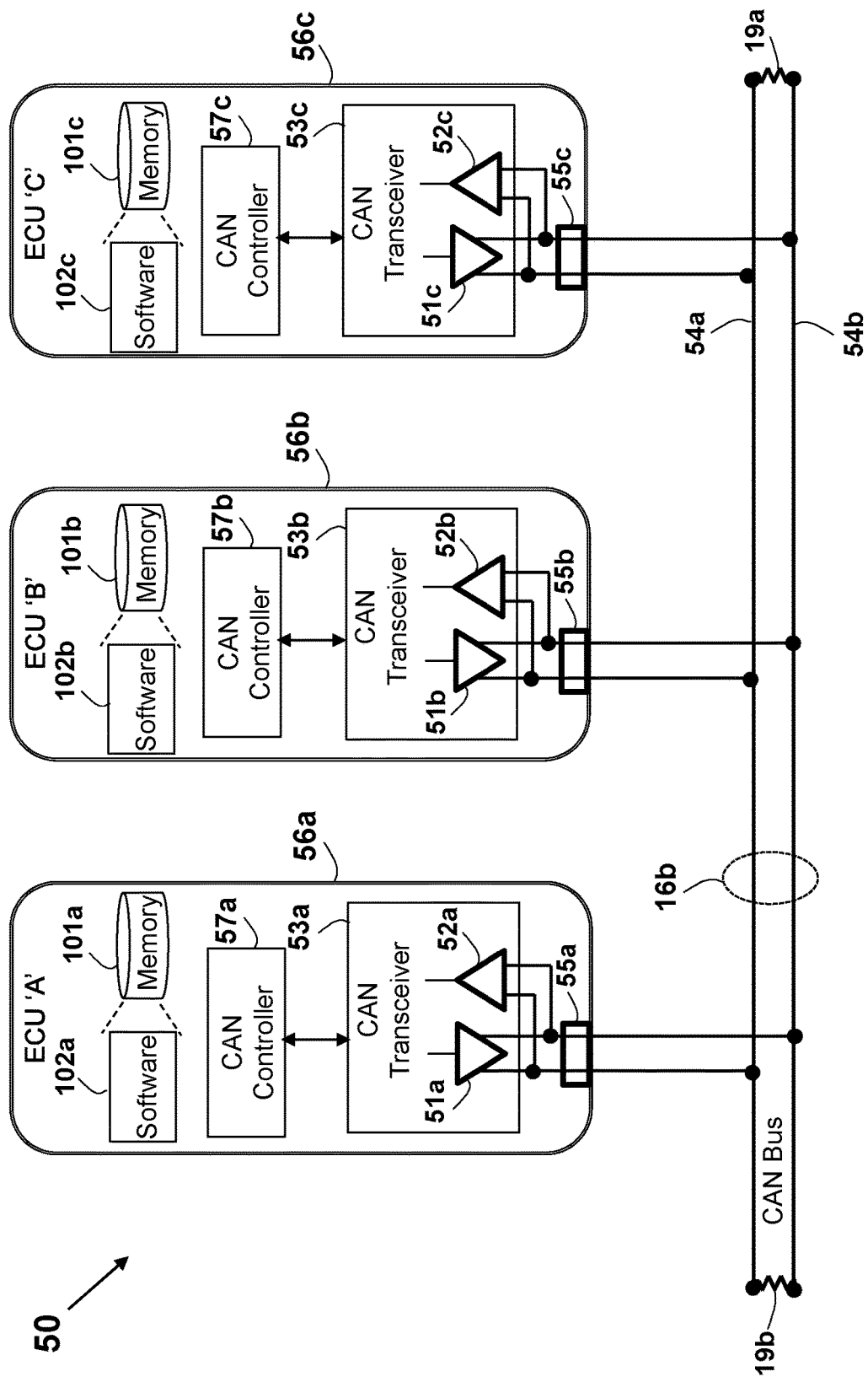
FIG. 5 illustrates schematically a block diagram of an automotive bus using a Controller Area Network (CAN) connecting multiple ECUs.
Figure 6:
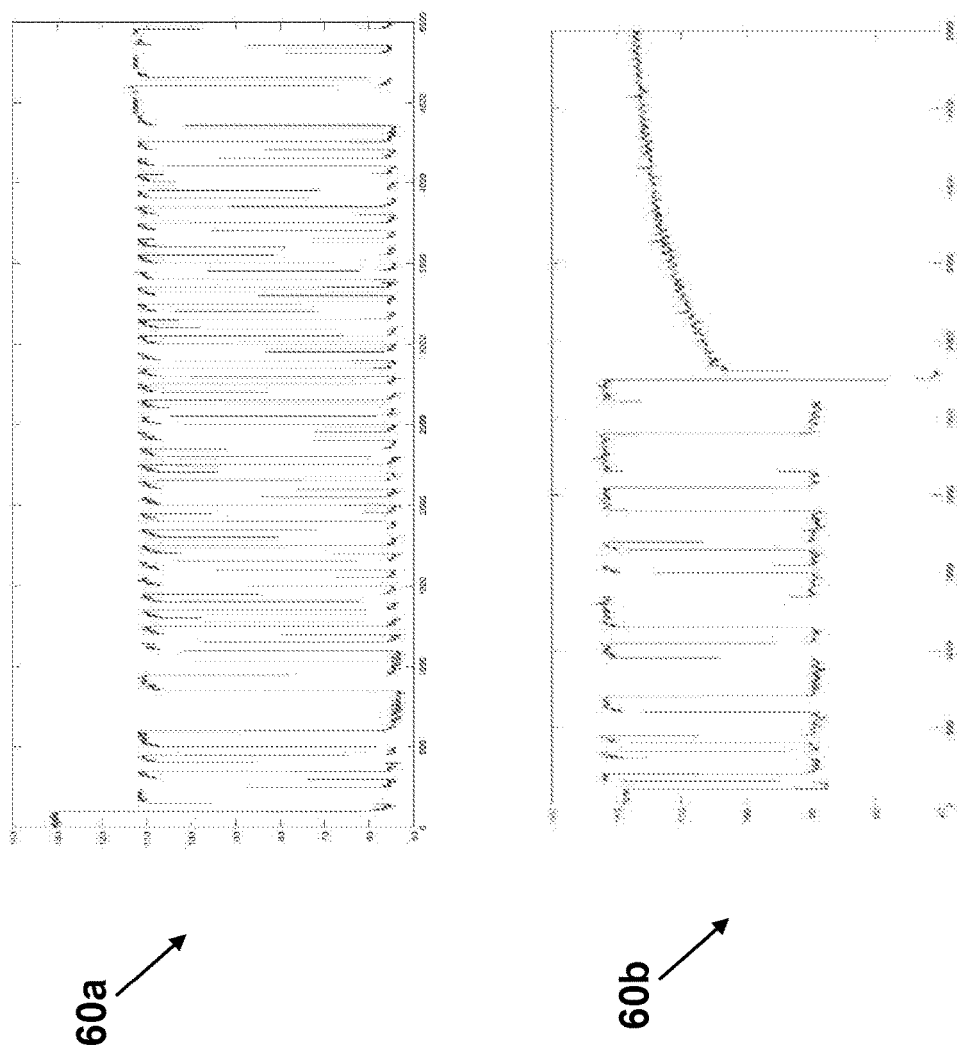
FIG. 6 depicts an actual screen-shot of a waveform of an actual CAN bus frame.
Figure 10:
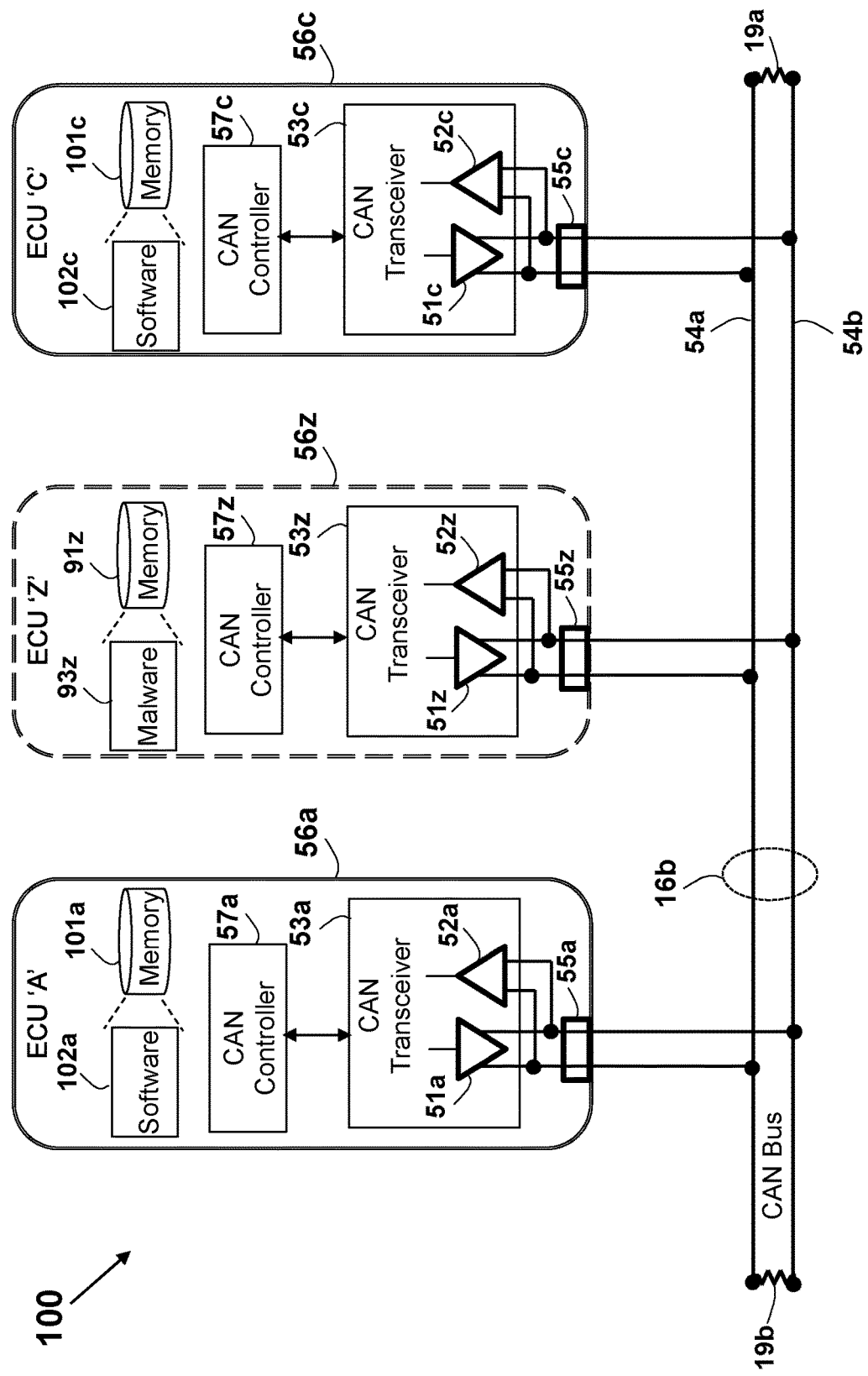
FIG. 10 illustrates schematically a block diagram of an automotive bus using a Controller Area Network (CAN) where one of the ECUs is substituted.

An example of an attack on the in-vehicle wired network 50 shown in FIG. 5 is described in an arrangement 100 shown in FIG. 10. An unauthorized device ECU 'Z' 56z that includes a line receiver 52z and a line driver 51z, as part of the CAN transceiver 53z (coupled to the CAN controller 57z) connected to the medium 16 by a connector 55z, as a substitute to the authorized or legitimate device ECU 'B' 56b. The unauthorized device ECU 'Z' 56z further comprises a memory 91z that stores a malware 93z for eavesdropping of, or otherwise interfering with, the network 50 operation. In a typical attack, the unauthorized device ECU 'Z' 56z impersonates part or whole of the functionality or activity of the former ECU 'B' 56b, in order to disguise itself so that the intrusion is less likely to be detected.

Line drivers 51 are typically distinct from each other. For example, while meeting the relevant specification requirements, different IC models or circuits from different vendors, may use different designs of internal circuits, thus resulting in distinguishable output or driving signals. Similarly, there may be differences between different production lots, and between products in the same lot. Similarly transceivers 53 and controllers 57 may be different from each other. Hence, assuming the same general network configuration or arrangement 50, a signal propagating over the medium 16 that is transmitted by the unauthorized ECU 'Z' 56z may be distinct, even under all equal circumstances, from a signal propagating over the medium 16 that is transmitted by the authorized ECU 'B' 56b. Such difference may be captured and analyzed, and the attack may be detected by identifying or detecting the difference between the signals.

Figure 10A:
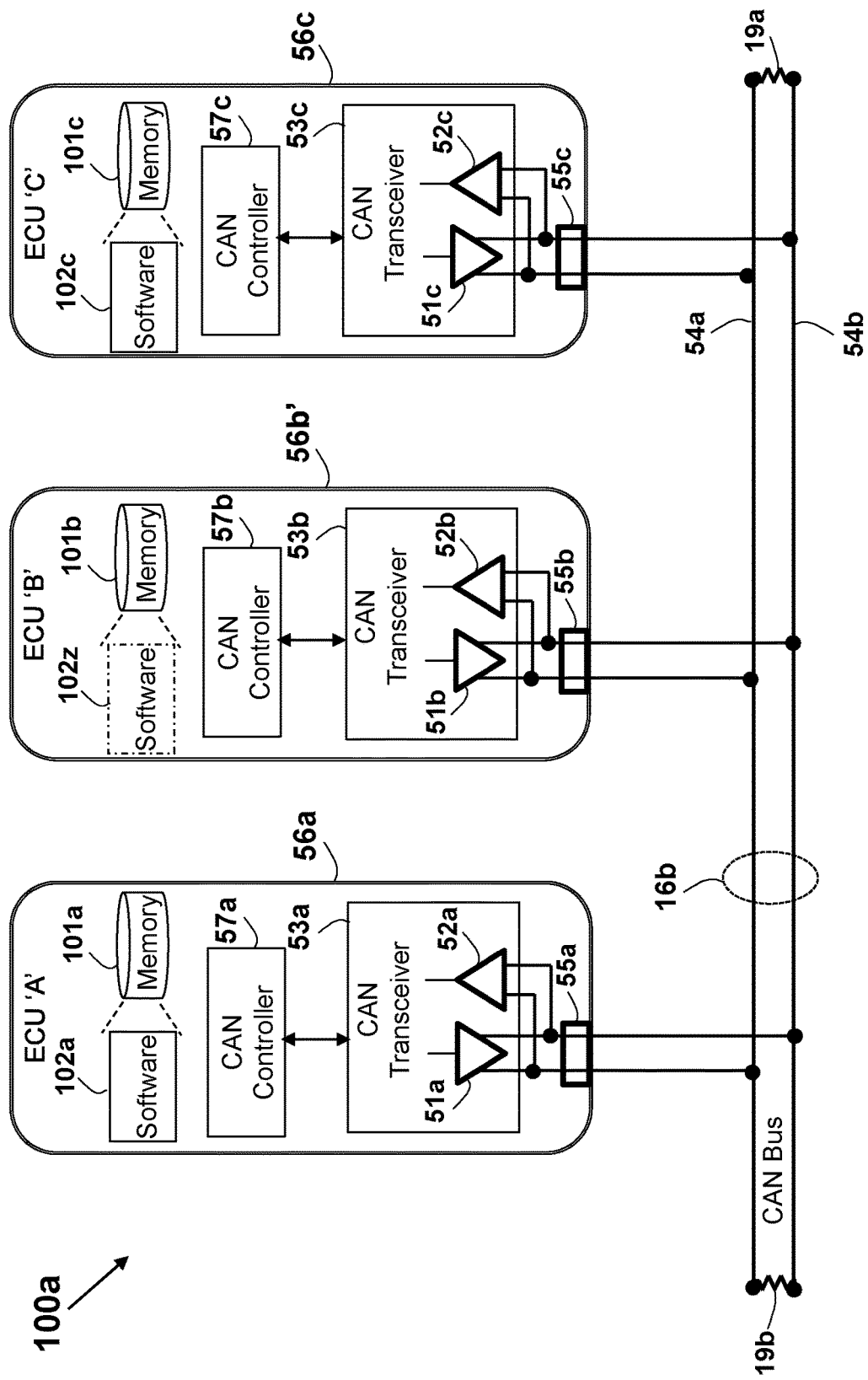
FIG. 10a illustrates schematically a block diagram of an automotive bus using a Controller Area Network (CAN) where the software in one of the ECUs is compromised.

Another example of an intrusion or attack on a wired network is shown in an arrangement 100a shown in FIG. 10a. The attack scenario involves compromise of the software 102b in the ECU 'B' 56b, such as by substituting it with a software 102z forming a compromised ECU 'B' 56b'. The substituting software 102z may include a harmful malware. In one example, the compromised ECU 'B' 56b' is programmed by the malware 102z to impersonate another ECU in the system, such as ECU 'A' 56a, and messages transmitted over the CAN bus medium 16b may be shown as originated by the ECU 'A' 56a, while in fact they were generated by the malware 102z in the ECU 'B' 56b'.

Figure 12:
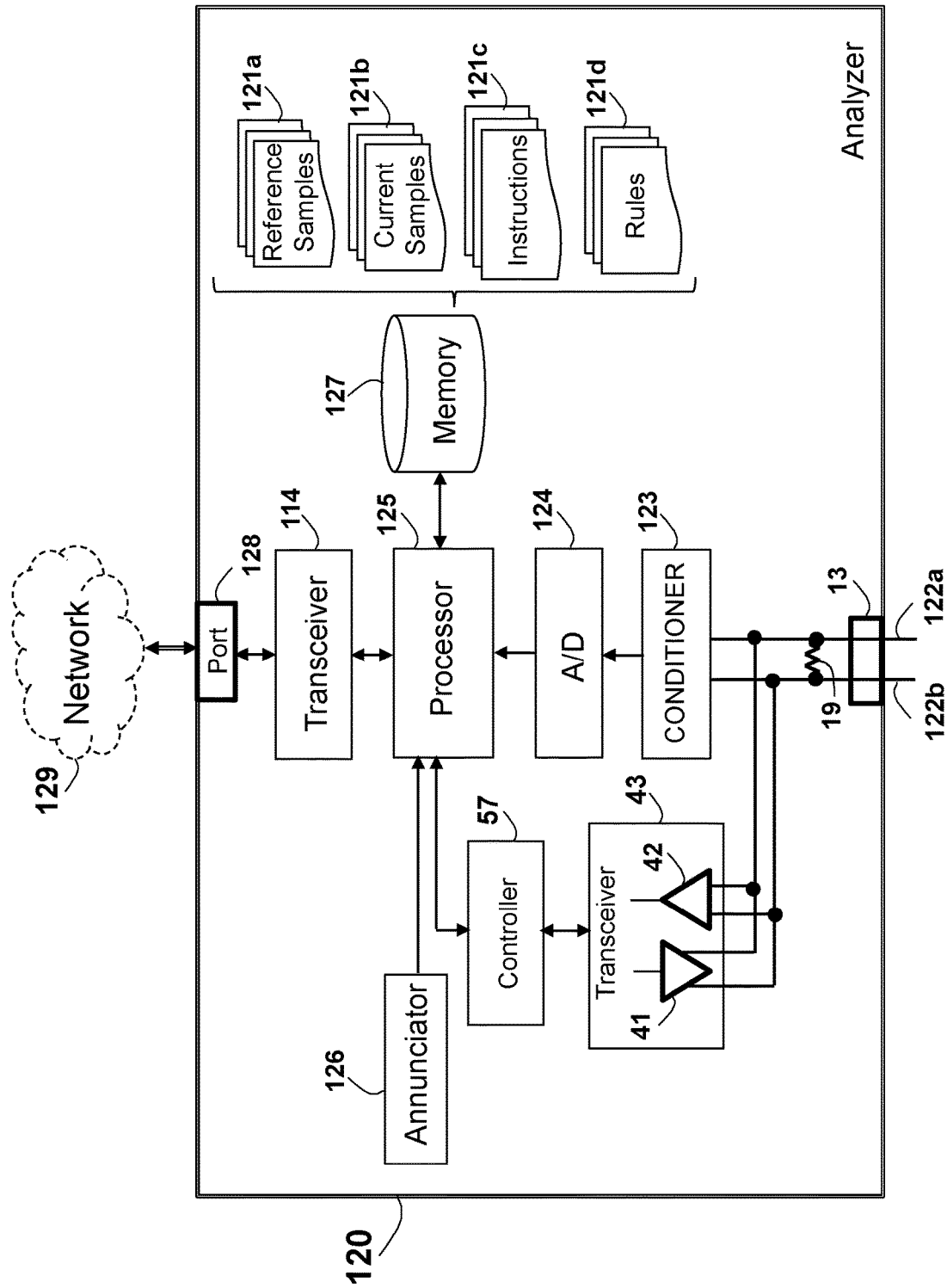
FIG. 12 illustrates schematically a block diagram of an analyzer device for analyzing a differential signal.

An exemplary block diagram of an analyzer device 120 is shown in FIG. 12. The analyzer device 120 may be connected to a network medium to receive a signal therefrom, and by analyzing the waveform of the received signal, to detect an intrusion to the network, such as by tapping to the medium as described in FIGS. 8 and 9, or by substituting an authorized node with an unauthorized one, as shown regarding to FIG. 10 above. The analyzer device 120 connects to the network medium using a connector 13, that may include two contacts 122a and 122b, for example for respectively connecting to the network medium 16 conductors or wires 14a and 14b. The analyzer may include a terminating resistor 19 connected to the contacts 122a and 122b, which may be used as termination where the analyzer device 120 is connected to one of the medium 16 ends.

The signal received via the connector 13 may be conditioned by a signal conditioning circuit. The signal conditioner may involve time, frequency, or magnitude related manipulations, typically adapted to optimally operate, activate, or interface an Analog to digital (A/D) converter 124. The signal conditioner 123 may be linear or non-linear, and may include an operation or an instrument amplifier, a multiplexer, a frequency converter, a frequency-to-voltage converter, a voltage-to-frequency converter, a current-to-voltage converter, a current loop converter, a charge converter, an attenuator, a sample-and-hold circuit, a peak-detector, a voltage or current limiter, a delay line or circuit, a level translator, a galvanic isolator, an impedance transformer, a linearization circuit, a calibrator, a passive or active (or adaptive) filter, an integrator, a deviator, an equalizer, a spectrum analyzer, a compressor or a de-compressor, a coder (or decoder), a modulator (or demodulator), a pattern recognizer, a smoother, a noise remover, an average or RMS circuit, or any combination thereof. The signal conditioner 123 may use any one of the schemes, components, circuits, interfaces, or manipulations described in a handbook published 2004-2012 by Measurement Computing Corporation entitled: *Data Acquisition Handbook—A Reference For DAQ And Analog & Digital Signal Conditioning*", which is incorporated in its entirety for all purposes as if fully set forth herein. Further, the conditioning may be based on the book entitled: *Practical Design Techniques for Sensor Signal Conditioning*", by Analog Devices, Inc., 1999 (ISBN-0-916550-20-6), which is incorporated in its entirety for all purposes as if fully set forth herein.

The Analog-to-Digital (A/D) converter 124 may be used to convert the conditioned received signal to a digital sensor data, and the digital representation of the received waveform is fed to a processor 125. Alternatively or in addition to the receiving, conditioning, and digitizing the received signal waveform, a transceiver 43 may be connected to the connector 13, for sending digital data received from a controller (such as a CAN controller 57) to the network medium, for sending to the controller 57 digital data received from the wired network, or both. The messages to or from the wired network are controlled by a processor 125 coupled to the controller 57. The waveform digital samples from the A/D converter 124 may be stored for further analysis in a memory 127 in s 'Current Samples' part 121b, or may be used for future reference in a 'Reference Samples' part 121a of the memory 127. Instruction for controlling the processor 125 may be stored in an 'Instructions' part 121c, and various analysis rules may be stored in a 'Rules' part 121d, of the memory 127.

The received signal is treated as an analog signal that is continuous in time and it is necessary to convert this to a flow of digital values by the A/D converter 124. The rate of new values is called the sampling rate or sampling frequency of the converter. A continuously varying bandlimited signal can be sampled and then the original signal can be exactly reproduced from the discrete-time values by an interpolation formula, and the accuracy is limited by quantization error. However, this faithful reproduction is only possible if the sampling rate is higher than twice the highest frequency of the signal, according to the Shannon-Nyquist sampling theorem. Since a practical ADC cannot make an instantaneous conversion, the input value must necessarily be held constant during the time that the converter performs a conversion (called the conversion time). An input circuit called a sample and hold performs this task—in most cases by using a capacitor to store the analog voltage at the input, and using an electronic switch or gate to disconnect the capacitor from the input. Preferably, the sampling rate is above the Nyquist rate, which is the minimum sampling rate that satisfies the Nyquist sampling criterion for a given signal or family of signals. The Nyquist rate is twice the maximum component frequency of the signal being sampled.

The processor 125 may be based on a discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device. In the case of a programmable device as well as in other implementations, a memory is required. The processor 125 commonly includes a memory, which may comprise, may be part of, or may consist of, the memory 127 that may include a static RAM (random Access Memory), dynamic RAM, flash memory, ROM (Read Only Memory), or any other data storage medium. The memory may include data, programs, and/or instructions and any other software or firmware executable by the processor. Control logic can be implemented in hardware or in software, such as a firmware stored in the memory. The processor 125 controls and monitors the analyzer device 120 operation, such as initialization, configuration, interface, analysis, notification, and commands. An annunciator 126 is coupled to the processor 125 for locally notifying a person in case an intrusion is suspected.

In addition to the connection to the wired network to be analyzed via the connector 13, the analyzer device 120 may be connected to an additional network 129, via a transceiver 114 and a port 128. In one example, the additional network 129 is a wired network, where the port is a connector, and the transceiver 114 is a wired transceiver. In one example, the network 129 may be similar or identical to the analyzed network, thus the port 128 may comprise a connector that is similar or identical to the connector 13, and the transceiver 114 may be similar or identical to the transceiver 43. Alternatively or in addition, the additional network 129 may be a wireless network, thus the port 128 is implemented as an antenna, and the transceiver 114 is implemented as a wireless transceiver. The analyzer device 120 may further function as a bridge, switch, router, or gateway for transferring or relaying messages between the two connected networks.

As another non-limiting example, the network 129 may be a Local Area Network (LAN) card to provide a data communication connection to a compatible LAN. For example, Ethernet connection based on IEEE802.3 standard may be used, such as 10/100BaseT, 1000BaseT (gigabit Ethernet), 10 gigabit Ethernet (10GE or 10GbE or 10 GigE per IEEE Std. 802.3ae-2002as standard), 40 Gigabit Ethernet (40 GbE), or 100 Gigabit Ethernet (100 GbE as per Ethernet standard IEEE P802.3ba). These technologies are described in Cisco Systems, Inc. Publication number 1-587005-001-3 (June 1999), "*Internetworking Technologies Handbook*", Chapter 7: "*Ethernet Technologies*", pages 7-1 to 7-38, which is incorporated in its entirety for all purposes as if fully set forth herein. In such a case, the transceiver 114 may include a LAN transceiver or a modem, such as a Standard Microsystems Corporation (SMSC) LAN91C111 10/100 Ethernet transceiver, described in the Standard Microsystems Corporation (SMSC) data-sheet "*LAN91C111 10/100 Non-PCI Ethernet Single Chip MAC+ PHY*" Data-Sheet, Rev. 15 (Feb. 20, 2004), which is incorporated in its entirety for all purposes as if fully set forth herein.

Figure 12A:
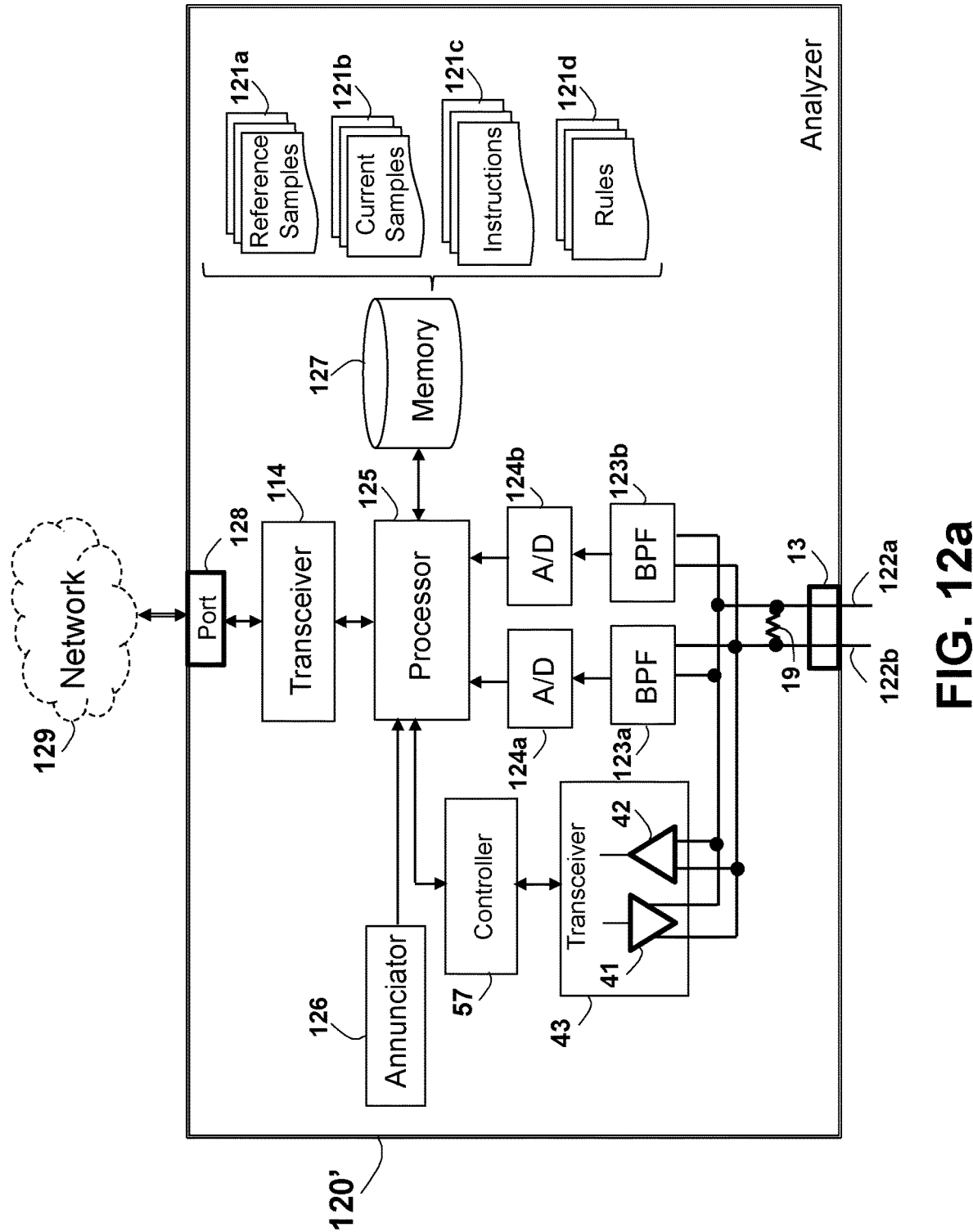
FIG. 12a illustrates schematically a block diagram of an analyzer device that uses frequency domain analysis.

Alternatively or in addition, the conditioner 123 may comprise, or may be substituted by, set of filters for isolating frequency bands of the received signal, as illustrated in an analyzer device 120' shown in FIG. 12*a*. The received signals from the connector 13 is passed through two Band Pass Filters (BPFs) 123*a* and 123*b*, and then digitized by two respective A/D converters 124*a* and 124*b*. While two BPFs are shown, any number of BPFs may be equally used, and they may feed respective A/D converters. Preferably, each BPF passes a distinct frequency band, allowing for measuring the power spectral density in each of the frequency bands. The BPFs 123*a* and 123*b* may be part of, or in addition to, the conditioner 123.

Figure 12B:
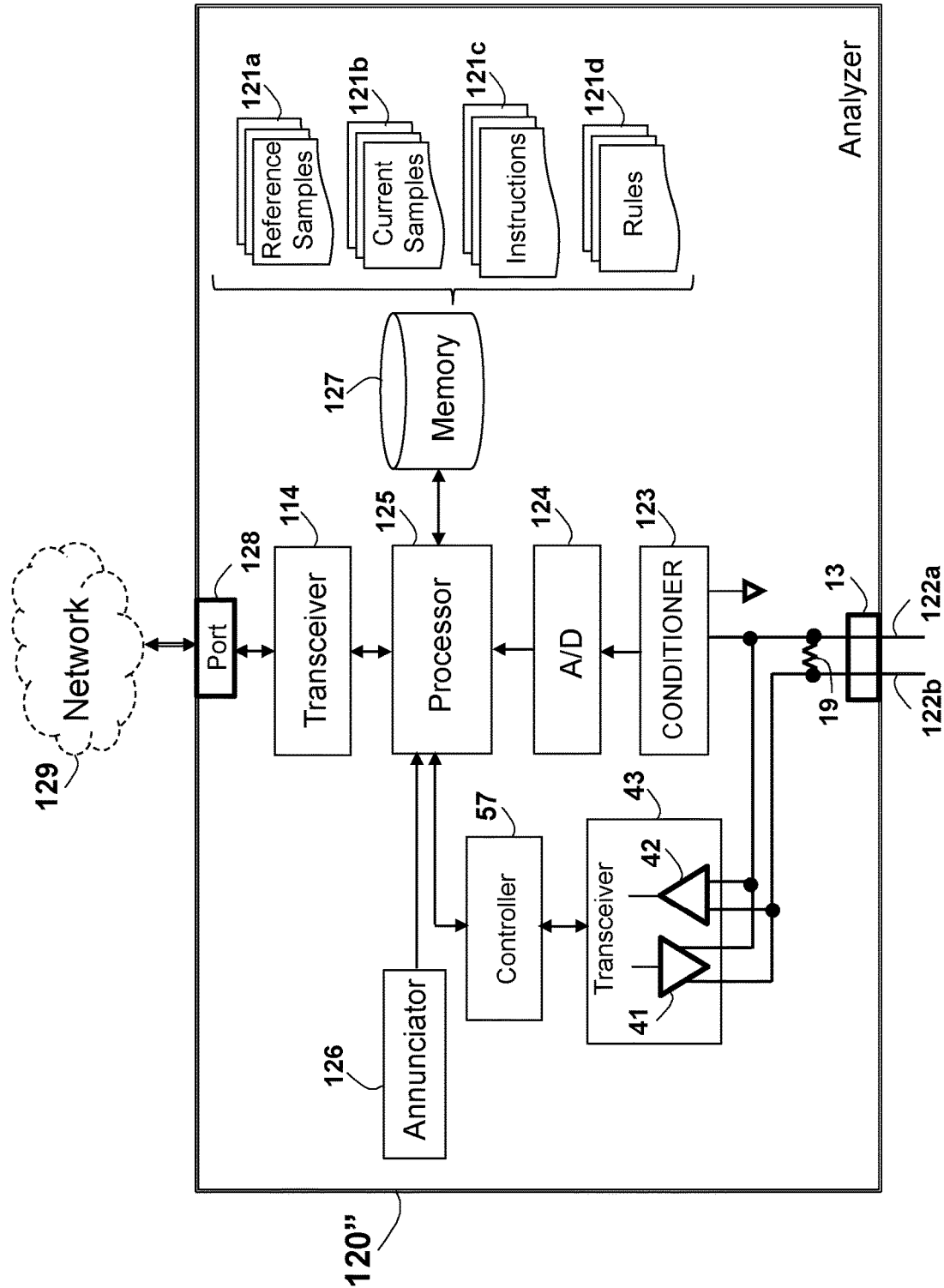
FIG. 12b illustrates schematically a block diagram of an analyzer device for analyzing a signal relative to a ground.

Alternatively or in addition to analyzing a differential signal received from the medium 16 via the connector 13, a signal carried over one of the conductors of the medium 16 may be analyzed versus the ground, allowing for measuring of ground leakage and impedance, as well as a common-mode ratio. Such an analyzer device 120" is shown in FIG. 12*b*, where the signal conditioned by the conditioner 123 is the signal carried over the single connection 122*a* in the connector 13 versus the ground.

In the case of wireless networking, the wireless network 129 may use any type of modulation, such as Amplitude Modulation (AM), a Frequency Modulation (FM), or a Phase Modulation (PM). Further, the wireless network 129 may be a control network (such as ZigBee or Z-Wave), a home network, a WPAN (Wireless Personal Area Network), a WLAN (wireless Local Area Network), a WWAN (Wireless Wide Area Network), or a cellular network. An example of a Bluetooth-based wireless controller that may be included in a wireless transceiver is SPBT2632C1A Bluetooth module available from STMicroelectronics NV and described in the data sheet DoclD022930 Rev. 6 dated April 2015 entitled: "*SPBT2632C1A—Bluetooth® technology class-1 module*", which is incorporated in its entirety for all purposes as if fully set forth herein.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Further, a wireless communication may be based on, or may be compatible with, wireless technologies that are described in Chapter 20: "*Wireless Technologies*" of the publication number 1-587005-001-3 by Cisco Systems, Inc. (July 1999) entitled: "*Internetworking Technologies Handbook*", which is incorporated in its entirety for all purposes as if fully set forth herein.

The networking or the communication with the wireless-capable analyzer 120 may be according to, may be compatible with, or may be based on, a Body Area Network (BAN) that may be according to, may be compatible with, or based on, IEEE 802.15.6 standard, and the wireless transceivers 114 may be a BAN modem, and the respective antenna 128 may be a BAN antenna. Alternatively or in addition, the networking or the communication with the wireless-capable device may be using, may be according to, may be compatible with, or may be based on, Near Field Communication (NFC) using passive or active communication mode, and may use the 13.56 MHz frequency band, and data rate may be 106 Kb/s, 212 Kb/s, or 424 Kb/s, and the modulation may be Amplitude-Shift-Keying (ASK), and may be according to, may be compatible with, or based on, ISO/IEC 18092, ECMA-340, ISO/IEC 21481, or ECMA-352. In such a case, the wireless transceiver 114 may be an NFC transceiver and the respective antenna 128 may be an NFC antenna.

Alternatively or in addition, the networking or the communication with the wireless-capable device may be using, may be according to, may be compatible with, or may be based on, a Personal Area Network (PAN) that may be according to, may be compatible with, or based on, Bluetooth™ or IEEE 802.15.1-2005 standards, and the wireless transceiver 114 may be a PAN modem, and the respective antenna 128 may be a PAN antenna. Alternatively or in addition, the networking or the communication with the wireless-capable device may be using, may be according to, may be compatible with, or may be based on, a Wireless Personal Area Network (WPAN) that may be according to, may be compatible with, or based on, Bluetooth™ or IEEE 802.15.1-2005 standards, and the wireless transceiver 114 may be a WPAN modem, and the respective antenna 128 may be a WPAN antenna. The WPAN may be a wireless control network according to, may be compatible with, or based on, ZigBee™ or Z-Wave™ standards, such as IEEE 802.15.4-2003.

Alternatively or in addition, the networking or the communication with the wireless-capable device may be using, may be according to, may be compatible with, or may be based on, a Wireless Local Area Network (WLAN) that may be according to, may be compatible with, or based on, IEEE 802.11a, IEEE 802.11b, IEEE 802.11g, IEEE 802.11n, or IEEE 802.11ac standards, and the wireless transceiver 114 may be a WLAN modem, and the respective antenna 128 may be a WLAN antenna. Alternatively or in addition, the networking or the communication with the wireless-capable device may be using, may be according to, may be compatible with, or may be based on, a wireless broadband network or a Wireless Wide Area Network (WWAN), and the wireless transceiver 114 may be a WWAN modem, and the respective antenna 128 may be a WWAN antenna. The WWAN may be a WiMAX network such as according to, may be compatible with, or based on, IEEE 802.16-2009, and the wireless transceiver 114 may be a WiMAX modem, and the respective antenna 128 may be a WiMAX antenna. Alternatively or in addition, the WWAN may be a cellular telephone network and the wireless transceiver 114 may be a cellular modem, and the respective antenna 128 may be a cellular antenna. The WWAN may be a Third Generation (3G) network and may use UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network and may use HSPA+, Mobile WiMAX, LTE, LTE-Advanced, MBWA, or may be based on, or may be compatible with, IEEE 802.20-2008. Alternatively or in addition, the WWAN may be a satellite network, and the wireless transceiver 114 may be a satellite modem, and the respective antenna 128 may be a satellite antenna.

Alternatively or in addition, the networking or the communication with the wireless-capable device may be using licensed or an unlicensed radio frequency band, such as the Industrial, Scientific and Medical (ISM) radio band. For example, an unlicensed radio frequency band may be used that may be about 60 GHz, may be based on beamforming, and may support a data rate of above 7 Gb/s, such as according to, may be compatible with, or based on, WiGig™ IEEE 802.11ad, WirelessHD™ or IEEE 802.15.3c-2009, and may be operative to carry uncompressed video data, and may be according to, may be compatible with, or based on, WHDI™. Alternatively or in addition, the wireless network may use a white space spectrum that may be an analog television channel consisting of a 6 MHz, 7 MHz or 8 MHz frequency band, and allocated in the 54-806 MHz band. The wireless network may be operative for channel bonding, and may use two or more analog television channels, and may be based on Wireless Regional Area Network (WRAN) standard using OFDMA modulation. Further, the wireless communication may be based on geographically-based cognitive radio, and may be according to, may be compatible with, or based on, IEEE 802.22 or IEEE 802.11af standards.

One or more analyzer devices, each based on the analyzer device 120 shown in FIG. 12, may be used for detecting configuration change in a wired network, such as tapping to the network as shown in the arrangements 80 or 90 respectively shown in FIG. 8 or 9, or unauthorized substituting of a device as shown in the arrangement 100 shown in FIG. 10.

Figure 13:
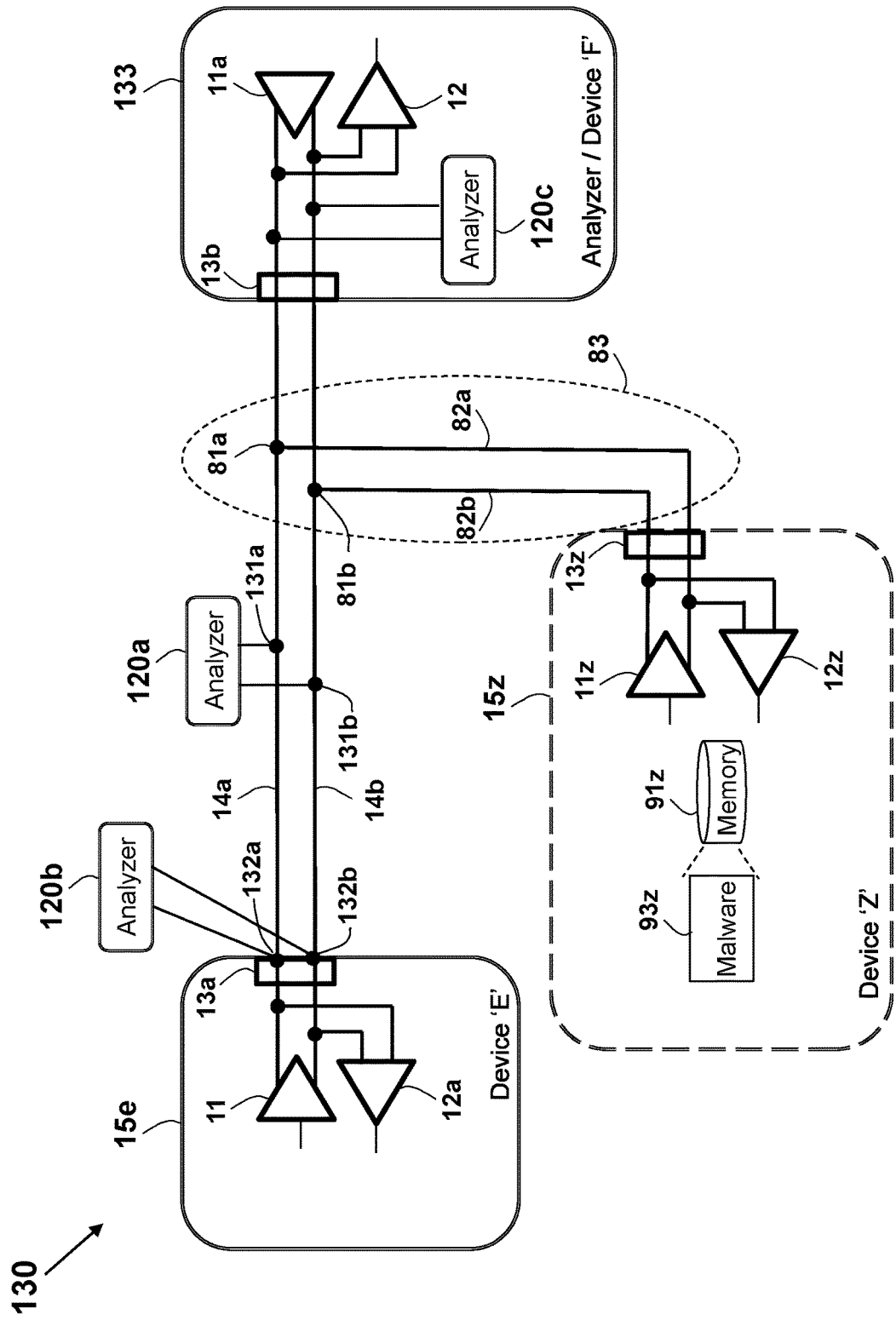
FIG. 13 illustrates schematically a block diagram of an analyzer device connected to a bi-directional balanced point-to-point wired network.

The analyzer device 120 may be connected to the medium 16 at any point. An arrangement 130 shown in FIG. 13 describes various alternatives, used alone or in combination, for connecting the analyzer device 120 to the network medium 16, for monitoring and analyzing the arrangement 80 shown in FIG. 8. An analyzer device 120*b* is connected to the conductors 14*a* and 14*b* of the medium 16 at respective points 132*a* and 132*b*, which are the end points of the point-to-point medium 16, and may be the same, or adjacent to, the end point used for connecting of the device 'E' 15*e* via the connector 13*a*. Alternatively or in addition, an analyzer device 120*a* is connected to the conductors 14*a* and 14*b* of the medium 16 at respective points 131*a* and 131*b*, which are not the end points of the point-to-point medium 16, but rather any arbitrary points along the medium 16. Alternatively or in addition, an analyzer device 120*c* may be integrated within any device communicating over the medium 16, such as in the device 'F' 15*f*, forming an Analyzer/Device 'F' combination device 133. In such a case, the connector 13*b* is shared for both the device 'F' 15*f* and the analyzer 120*c* functionalities for connecting to the medium 16.

Figure 14:
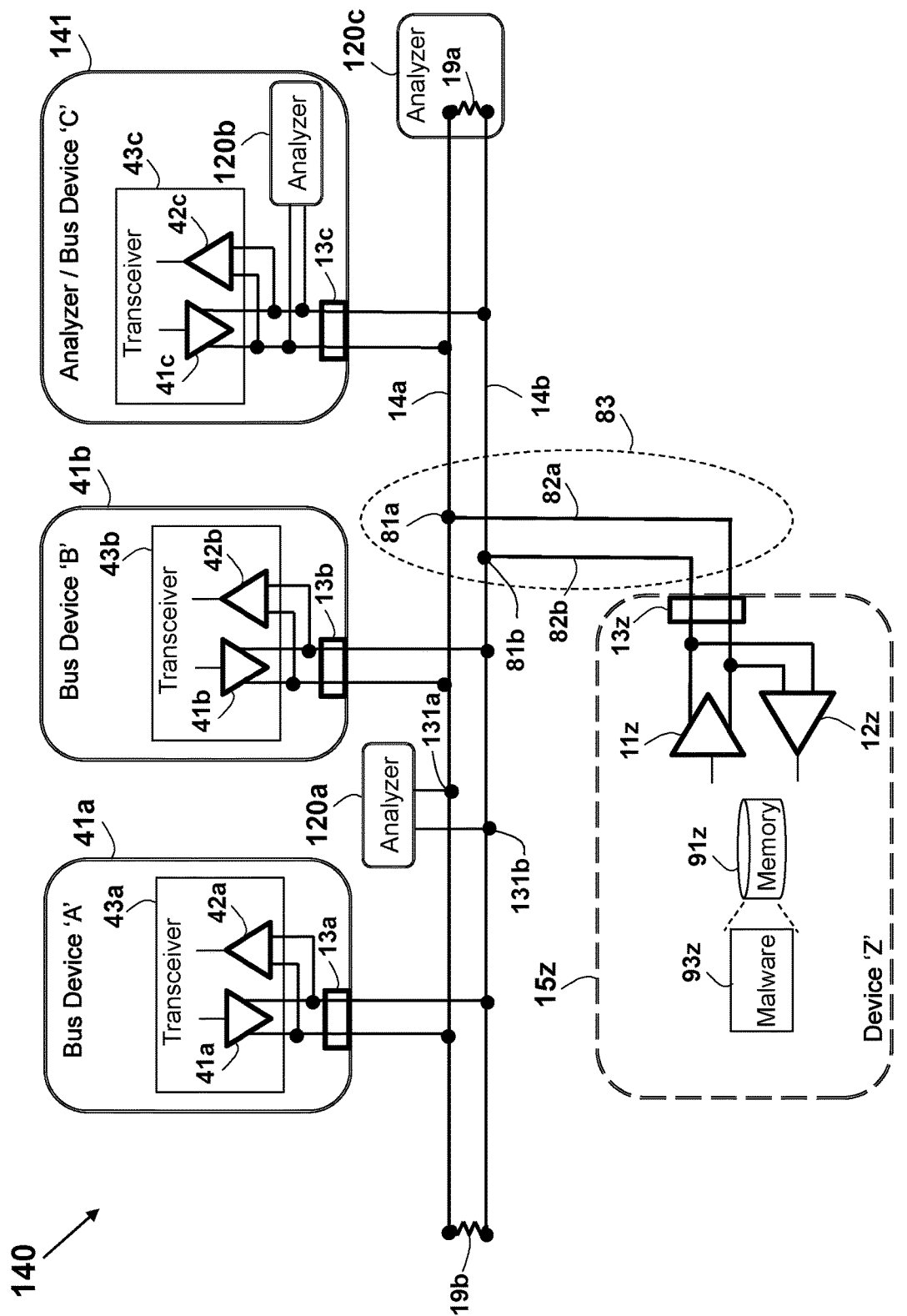
FIG. 14 illustrates schematically a block diagram of an analyzer device connected to a balanced multi-point wired network.

Similarly, the analyzer device 120 may be connected to the medium 16 at any point in a multi-point topology environment. An arrangement 140 shown in FIG. 14 describes various alternatives, used alone or in combination, for connecting the analyzer device 120 to the network medium 16, for monitoring and analyzing the arrangement 90 shown in FIG. 9. An analyzer device 120*c* is connected to the conductors 14*a* and 14*b* at the end of the medium 16 that may be the same, or adjacent to, the end points where the termination resistor 19*a* is connected. Alternatively or addition, the analyzer device 120*c* may comprise the termination resistor 19*a*, sharing its connection to the medium 16. Alternatively or in addition, an analyzer device 120*a* is connected to the conductors 14*a* and 14*b* of the medium 16 at respective points 131*a* and 131*b*, which are not the end points of the point-to-point medium 16, but rather any arbitrary points along the medium 16. Alternatively or in addition, an analyzer device 120*b* may be integrated within any device communicating over the medium 16, such as in the device 'C' 41*c*, forming an Analyzer/Bus Device 'C' combination device 141. In such a case, the connector 13*c* is shared for both the device 'C' 41*c* and the analyzer 120*b* functionalities for connecting to the medium 16. The integration of the analyzer device 120 with another device, such as with the Bus Device 'C' 41c, may be by being enclosed in the same housing, sharing a power source (such as a battery), using the same processor, connecting via the same connector, or any other integration functionality.

Figure 15:
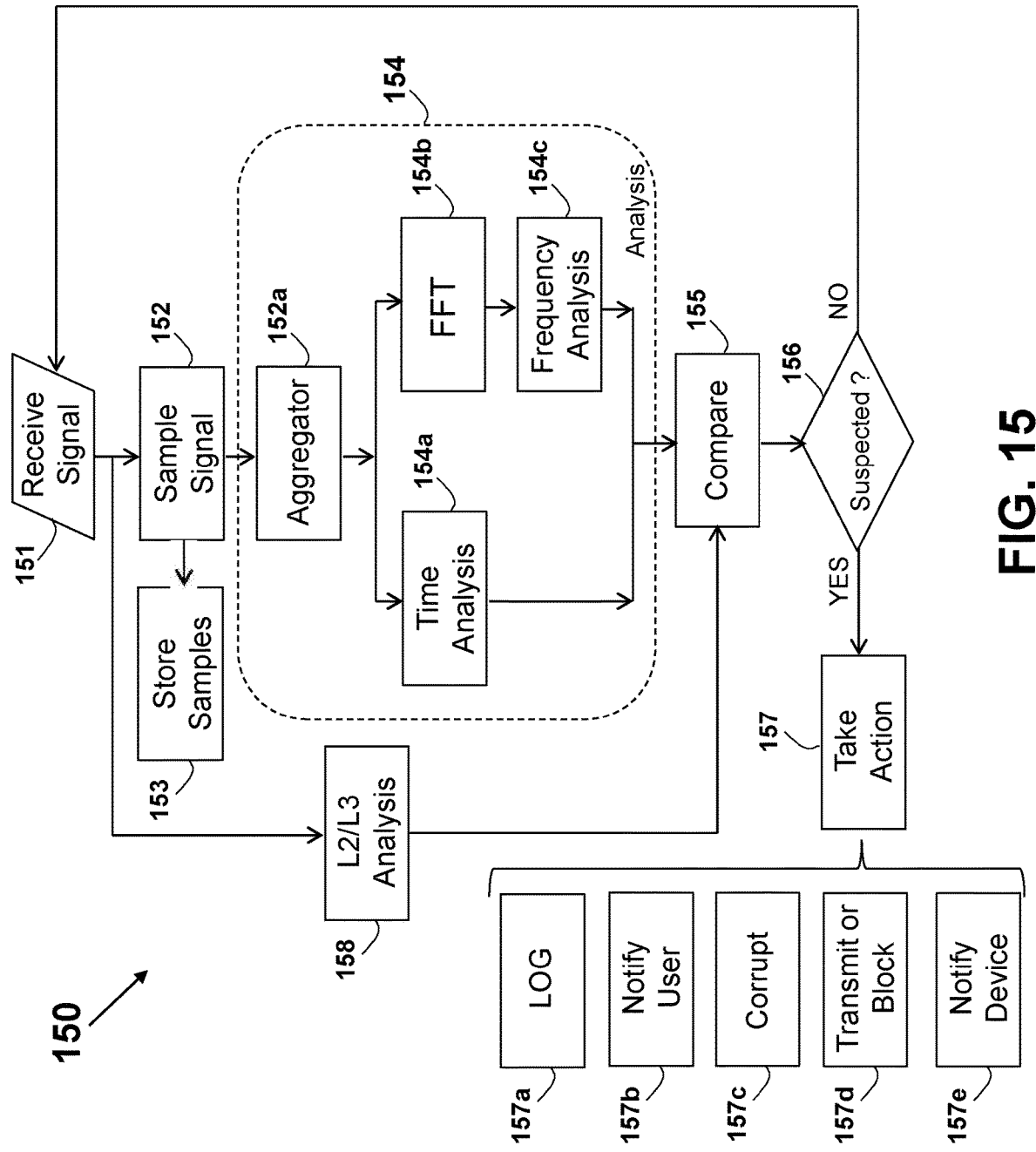
FIG. 15 illustrates schematically a simplified flowchart of an analyzer device operation.

A flow chart 150 shown in FIG. 15 describes the operation of the analyzer device 120, and may be executed by, or may controlled by, the processor 125 under instructions stored in the memory part "Instructions" 121c as part of the memory 127. In a "Receive Signal" step 151, a signal is received from the network medium 16 via the connector 13. A part, or whole, of a waveform of the received signal is conditioned by the conditioner 123 and sampled, preferably using a sampling rate that enables the latter analysis, by the A/D converter 124 as part of a "Sample Signal" step 152. The waveform samples may be stored in the 'Current Samples' memory part 121b that is part of the memory 127. The analysis of the waveform samples is performed as part of a sub flow-chart "Analysis" 154, that includes an "Aggregator" step 152a, a "Time Analysis" step 154a, an "FFT" step 154b, and an "Frequency Analysis" step 154c. The analysis as part of the "Analysis" block 154 may include only time analysis as part of the "Time Analysis" step 154a, only frequency analysis as part of the "Frequency Analysis" step 154c, or both or any combination thereof. An ANN may be used as part of the "Time Analysis" step 154a or as part of the "Frequency Analysis" step 154c. A criterion is applied to the analysis results from the "Analysis" procedure 154 in a "Compare" step 155. The comparison may use data or information contained the received signal, and extracted as part of an "L2/L3 Analysis" step 158, which may use the transceiver 43 and the controller 57. According to the comparison results, it is determined in a "Suspected?" step 156 if the waveform represent a normal or authorized condition or configuration, and in such a case, the analyzer 120 reverts to continue monitoring the medium 16 in as part of the "Receive Signal" step 151. In the case where the criterion applied to the analysis suggests an anomaly or configuration change, such as possible or certain intrusion to the network, various actions may be taken as part of a "Take Action" step 157. As part of the action taken as part of the "Take Action" step 157, a record regarding the incident may be stored in the memory, such as the memory 127, for logging the analyzer device 120 activity and results, as part of a "LOG" step 157a. Alternatively or in addition, a person may be notified of the suspected attack or intrusion as part of a "Notify User" step 157b, that may include activating or controlling the annunciator 126 by the processor 125. In a case where a frame or packet that may be affected or generated as part of an attack, the analyzer device 120 may transmit in parallel to the receiving of the frame or packet, a signal to the medium 16, such as a frame or packet, using the line driver 41 in the transceiver 43, forming a collision on the medium 16, thus neutralizing the unauthorized effect or propagation of the frame or packet, causing the other devices in the network to ignore the suspected frame or packet. As part of a "Transmit or Block" step 157d, the detection of an attack may result in a transmission of a message, or blocking a transmission of a message, to the network 129 using the transceiver 114 via the port 128. Similarly, as part of a "Notify Device" step 157e, the detection of an attack may result in a transmission of a message, such as a warning or alert message, to one of the devices that is connected to the medium 16.

Figure 7:
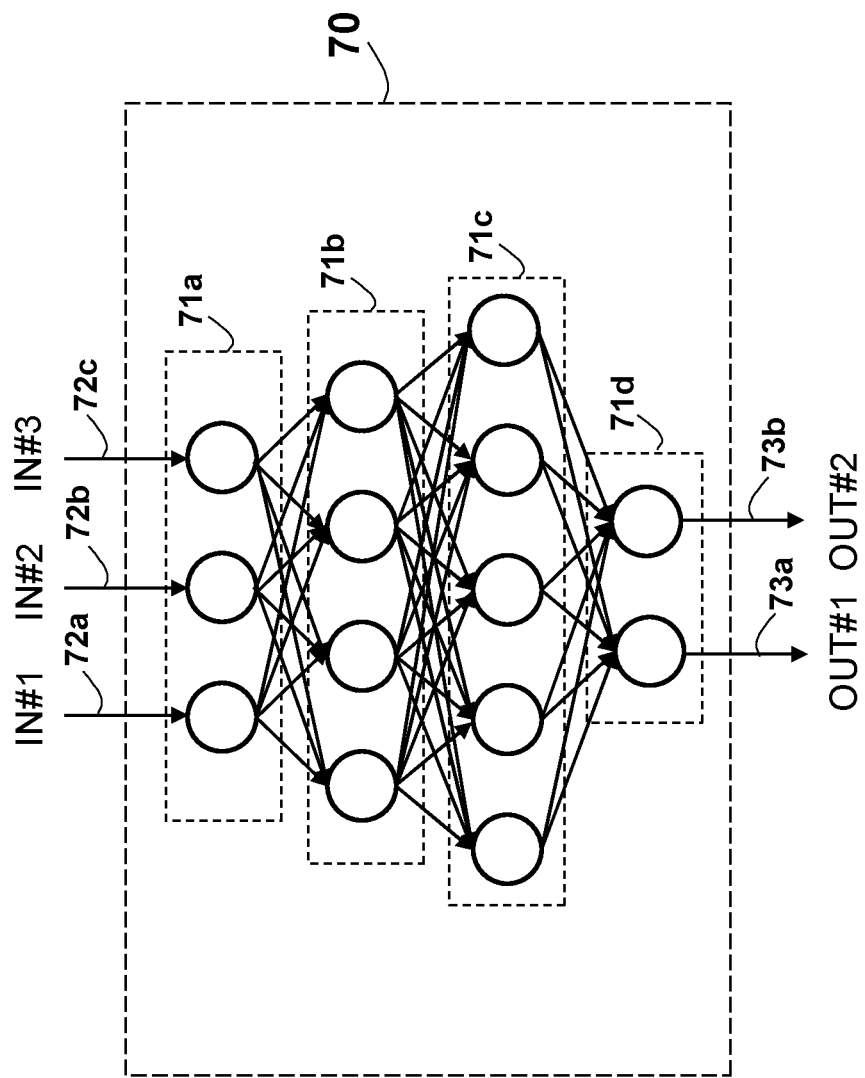
FIG. 7 illustrates schematically a block diagram of an example of a feed-forward artificial neural network.
Figure 7A:
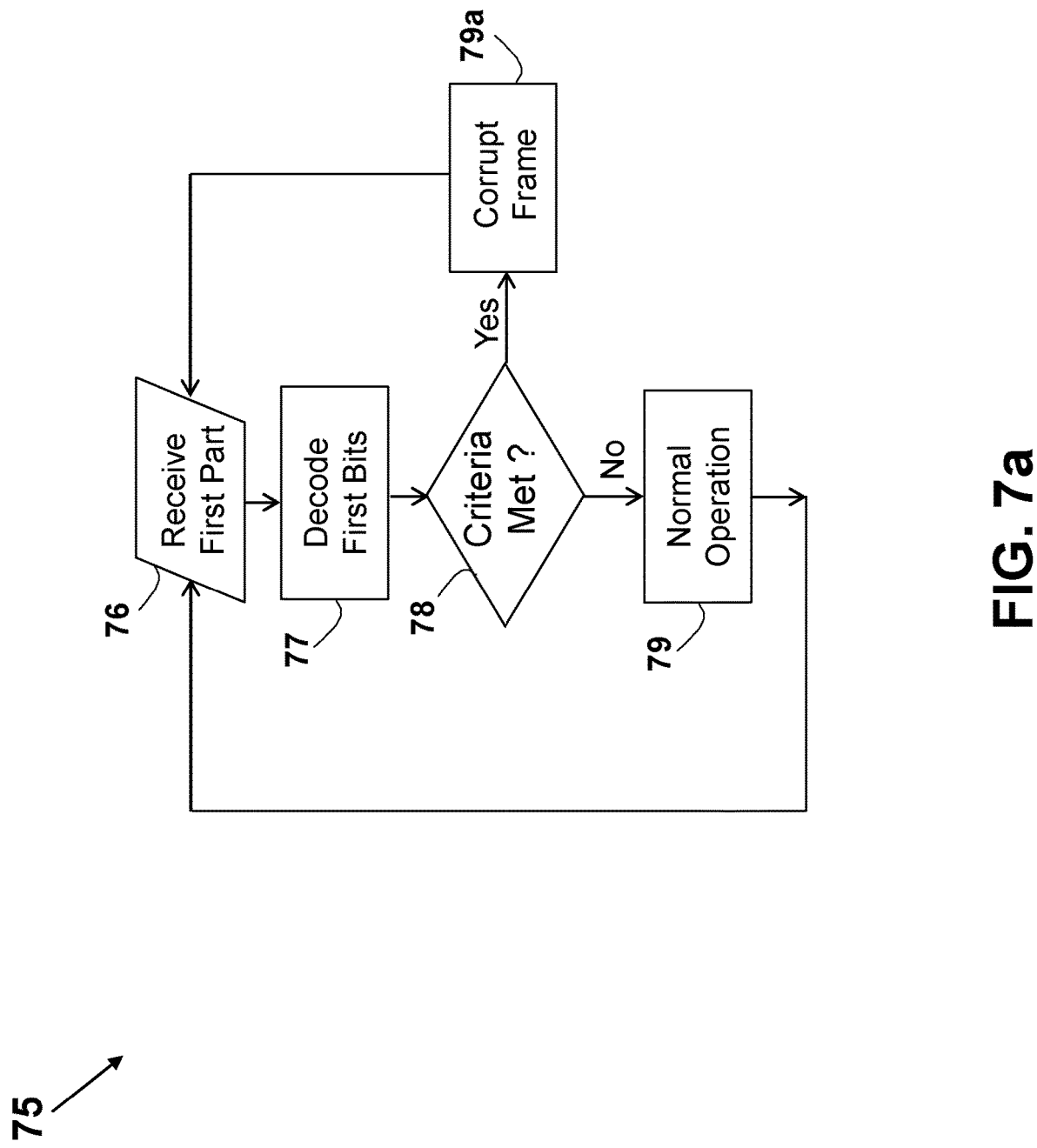
FIG. 7a illustrates schematically a simplified flowchart of detecting and corrupting suspected message over a communication medium.
Figure 15A:
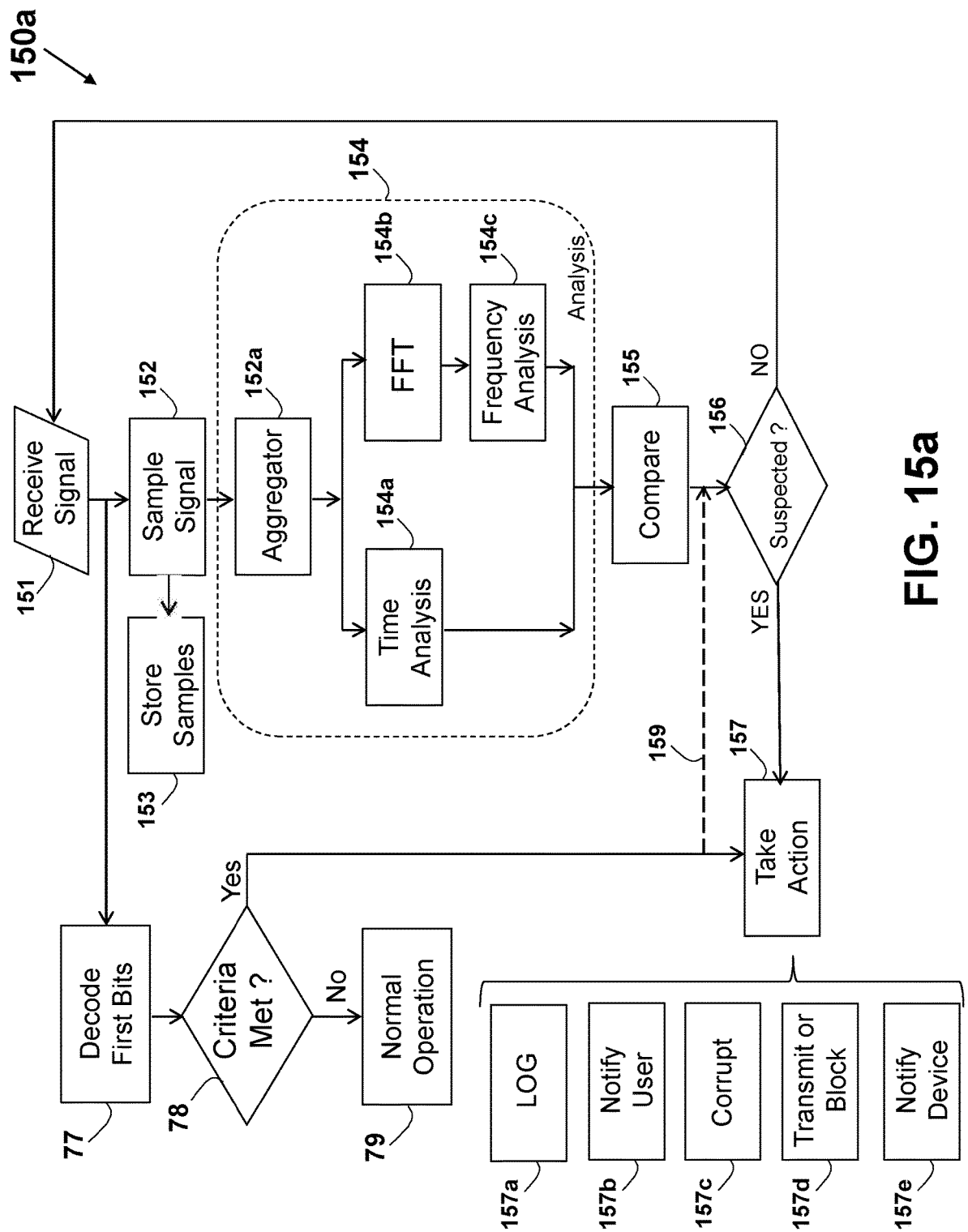
FIG. 15a illustrates schematically a simplified flowchart of an analyzer device operation used for detecting and corrupting suspected message over a communication medium.

The "L2/L3 Analysis" step 158 may include any physical layer (PHY) handling, any Layer-2 handling, any Layer-3 handling, or any combination thereof, and may be performed by the transceiver 43, by the controller 57, by the processor 125, or any combination thereof. In one example, the analyzer 120 may be integrated with, or may include, detecting of suspected messages (frames or packets), for example as described in the flow chart 75 shown in FIG. 7a. An example where the "L2/L3 Analysis" step 158 includes such functionality is shown as a flow chart 150a shown in FIG. 15a. In one example, in addition to analyzing the received waveform, the first part of the received message is handled by decoding the first bits, such as by the transceiver 43 via the line receiver 42, as part of the "Decode First Bits" step 77, and the decoded bits are checked as part the "Criteria Met?" step 78. If the frame is determined as not suspected, such as by failing to meet criteria, normal operation is resumed as part of the "Normal Operation" step 79, and the analyzer 120 continues the operation without any impact or affect. However, if the frame is determined as suspected, an action may be taken as part of the "Take Action" step 157. Alternatively or in addition, the determination of a message as suspected as part of the "Suspected?" step 156 may be performed as part of the "Suspected?" step 156, and may be based on both meeting of the criteria as part of the "Criteria Met?" step 78 and the comparison as part of the "Compare" step 155, illustrated by a dashed line 159 in the flow chart 150a.

Preferably, the analysis flow chart 154 is used to extract or measure at least one feature, attribute, parameter, or characteristic, which value is distinct (or different) between the 'normal', pre-compromise state or configuration of the network or the network medium, and an 'unauthorized' or anomaly state or configuration of the network or the network medium (or other network attack or intrusion), for example due to tapping to the medium (as shown in the arrangements 80 shown in FIG. 8 or the arrangement 90 shown in FIG. 9), or due to replacement of a transceiver, a device, or using malware as shown in the arrangement 100 in FIG. 10. The distinction (or difference) in the measured value is detected in the "Compare" step 155 for determining the message or the network status in the "Suspected?" step 156. For example, a threshold (e.g., for an amplitude or time interval) may be used to distinguish between the two network and medium states, so that a value under the threshold may indicate 'normal'/pre-compromise state, and exceeding the threshold indicates 'unauthorized' or anomaly state. The extracted or measured features, attributes, parameters, or characteristics, and the criterions used to evaluate them, may be stored in the memory part 'Rules' 121d.

While exampled herein regarding using the raw waveform samples, any pre-processing involving applying any function may be performed to the samples before or after being analyzed. In one example, second or third derivatives of the samples may be calculated and used, as an alternative or as an addition to the raw samples values.

In one example, a single edge (rising or falling) or a single pulse (positive or negative) is analyzed. Alternatively or in addition, multiple same type signals are analyzed, such as multiple rising or falling edges or multiple positive or negative pulses. Analyzing multiple signals increases the analysis accuracy, and reduces the risk of false detection due to an induced noise or interference. For example, a set of multiple consecutive edges or pulses extracted from a single frame or packet may be used. Alternatively or in addition, a set of multiple consecutive edges or pulses may be extracted from multiple frames or packets. In one example, the multiple signals are aggregated before being analyzed as part of the "Aggregator" step 152a as part of the 'Analysis' functionality 154.

In one example, various parameters, features, and characteristics are obtained from time-domain analysis of part of, or whole of, the waveform of the signal received in the "Receive Signal" step 151, as part of the "Time Analysis" step 154a that is part of the 'Analysis' part 154.

The time domain analysis in the "Time Analysis" step 154a may involve measuring amplitudes of the analyzed waveform in various times that may be pre-determined or based on the signal analysis. Such amplitude values, separately or any combination thereof, may be compared with a pre-defined threshold or a region. Alternatively or in addition, the analysis in the "Time Analysis" step 154a may involve measuring times between pre-set amplitude values that may be pre-determined or based on the signal analysis. Such timing values, separately or any combination thereof, may be compared with a pre-defined threshold or a region.

For example, a time domain analysis of the signal waveform (or any part thereof) in the "Time Analysis" step 154a may be used to obtain few voltages, designated as V1, V2, and V3. In one example, in the "Compare" step 155, a set maximum threshold voltage VMAX is used, and to compare each of the voltages to this value, and in case where V1>VMAX, V2>VMAX, V3>VMAX (or any combination thereof), a suspected condition is resulted in the "Suspected?" step 156. Alternatively or in addition, a set minimum threshold voltage VMIN may be used, and to compare each of the voltages to this value, and in case where V1<VMIN, V2<VMIN, V3<VMIN (or any combination thereof), a suspected condition is resulted in the "Suspected?" step 156. Further, any function or combination of one or more of the measured voltage values may be used as part of the "Compare" step 155, including a difference as V1−V2 or V1−V3, or a ratio such as V1/V2, V3/V2, or any combination thereof.

Alternatively or in addition, a time domain analysis of the signal waveform (or any part thereof) in the "Time Analysis" step 154a may be used to obtain one or more time points, designated as t1, t2, and t3, that may be in reference to a defined initial time (t=0). In one example, in the "Compare" step 155, a set maximum threshold time (or duration) TMAX is used, and to compare each of the timing points to this value, and in case where t1>TMAX, t2>TMAX, t3>TMAX (or any combination thereof), a suspected condition is resulted in the "Suspected?" step 156. Alternatively or in addition, a set minimum threshold time (or duration) TMIN may be used, and to compare each of the timing points to this value, and in case where t1<TMIN, t2<TMIN, t3<TMIN (or any combination thereof), a suspected condition is resulted in the "Suspected?" step 156. Further, any function or combination of one or more of the measured timing points values may be used as part of the "Compare" step, including a difference as t1−t2 or t1−t3, or a ratio such as t1/t2, t3/t2, or any combination thereof.

In a 'normal' condition of the network, the characteristics of the signal received by the analyzer device 120 are dependent upon the transmitting device. Each transceiver (or line driver) is distinct, such as from a different vendor, different models from the same vendor, and inherent production differences between lots and within a lot. Further, due to the different connection points to the medium, the signals received from the medium 16 at one connection point may be different due to different propagation paths over the medium 16, even when identical line drivers are used. Further, different controller may involve different clock rates, and different devices may respond in different delays due to processor power or load. For example, the analyzer device 120a is shown in the arrangement 130 connected in points 131a and 13b to the medium 16. A waveform of a signal received from the Analyzer/Device 'F' 133 is different from a waveform of a signal received from the Device 'E' 15e, due to differences between the corresponding line drivers 11a and 11, as well as the different propagation paths from corresponding connectors 13b and 13a to the analyzer device 120a connection location.

Preferably, in order to accurately detect the intrusion of the Device 'Z' 15z, the analysis of the waveform of the received signal takes into account the identity of the device that transmitted the signal to the medium 16. In one example, the controller 57 receives the frame or packet from the transceiver 43, and using the source address in the frame or packet, associate the received signal with the transmitting device, as part of the 'L2/L3 Analysis' step 158. In the arrangement 140 shown in FIG. 14, for example, the analyzer device 120a receives the frame or packet, and associates it to one of the possible transmitters, being the Bus Device 'A' 41a, the Bus Device 'B' 41b, or the Analyzer/Bus Device 'C' 141. The analysis of the signal is based on the identity of the source device as part of the 'Compare' step 155, using the source identification obtained as part of the 'L2/L3 Analysis' step 158. For example, the analyzer device 120a in the arrangement 140 may store and use three different threshold values, one for use with waveforms obtained from frames or packets received from the Bus Device 'A' 41a, another one for use with waveforms obtained from frames or packets received from the Bus Device 'B' 41b, and a third threshold value for use with waveforms obtained from frames or packets received from the Bus Device 'C' 141.

In one example, two levels of signals (designated 'high' and 'low') are carried over the medium 16, and the analyzed part of the waveform is a low-to-high transition (rising or positive edge) or a high-to-low transition (falling or negative edge). While exampled herein regarding a rising edge, the analysis equally applies to a falling edge. An example of an analysis of a critically or overdamped rising edge 173a and an underdamped rising edge 173b is described in a diagram 170 shown in FIG. 17. The edges 173a and 173b are shown using an amplitude axis 171 (e.g., in Volts) versus a time axis 172 (e.g., in seconds), and the edges are transitioning from a low voltage value VL 171h to a high voltage value VH 171i. A low settling region is defined by a low threshold value V1 171a and a high threshold value V2 171b, a high settling region is defined by a low threshold value V3 171c and a high threshold value V4 171d. In one example, the measured parameter is the low state value VL 171h, to be compared to a pre-set threshold value or region. Alternatively or in addition, the measured parameter is the high state value VH 171i, to be compared to a pre-set threshold value or region.

Alternatively or in addition, the measured parameters may be the time t1 172a when the rising edge starts to transition, defined by crossing the low level higher settling threshold V2 171b, or the measured parameters may be the time t2 172b when the rising edge ends to transition, defined by crossing the high level lower settling threshold V3 171c. Further, a rising time parameter may be calculated, defined by the rising duration t2−t1.

In the case of the underdamped rising edge 173b, similar to the overdamped rising edge 173a, the measured parameter may be the low state value VL 171h, to be compared to a pre-set threshold value or region. Alternatively or in addition, the measured parameter may be the high state value VH 171*i*, to be compared to a pre-set threshold value or region. Further, in the case or ringing, the amplitude of the first overshoot V6 171*f*, the amplitude of the ringback V5 171*e*, the amplitude of the second overshoot V7 171*g*, or any combination thereof may be measured. Alternatively or in addition, the measured parameters may be the time t3 172*c* when the rising edge starts to transition, defined by crossing the low level higher settling threshold V2 171*b*, or the measured parameters may be the time t4 172*d* when the rising edge ends to transition, defined by a first crossing the high level lower settling threshold V3 171*c*. Similarly, the measured parameters may be the time t5 172*e* when the rising edge reaches the first maximum (overshoot peak), the time t6 172*f* when the rising edge reaches the first local minimum (ringback minimum), or the time t7 172*g* when the rising edge reaches the first local minimum (ringback minimum). Further, various rising time parameters may be calculated, defined by the rising edge durations t4–t3, t5–t4, t6–t5, t7–t6, t5–t3, t6–t3, or t7–t3.

While the analysis exampled in the chart 170 used time fixed voltage thresholds and reference voltages, a time-changing amplitudes may equally be used, such as a signal mask. Using a rising edge mask is described in a chart 170*a* shown in FIG. 17*a*. For the overdamped rising edge 173*a*, a template is defined as a 'mask' that consists of the region between a lower time-changing voltage 174*b* and a higher time-changing voltage 174*a*. As part of the "Compare" step 155, the waveform is checked versus the defined mask, and in a case where the rising edge signal 173*a* is in the region defined by the signal mask, as shown in the left part of the chart 170*a*, a normal (non-suspected) condition is resulted in the "Suspected?" step 156. However, when the same mask is applied to the underdamped rising edge 173*b* as shown in the right side of the chart 170*a*, the overshoot causes the signal to exceed the higher mask threshold 174*a* at a time point t8 172*h*, and to cross again the lower mask threshold 174*b* due to the ringback in a time point t9 172*i*. In such a case, a suspected condition may be resulted in the "Suspected?" step 156.

The edge to be analyzed may be an arbitrary edge in the frame or packet. Alternatively or in addition, the edge to be captured and analyzed may be in a specific location in a frame or packet, providing better accuracy and repeatability due to Intersymbol Interference (ISI), which is a form of a distortion of a signal in which one symbol interferes with subsequent symbols. This is an unwanted phenomenon as the previous symbols have similar effect as noise, thus making the communication less reliable. The spreading of the pulse beyond its allotted time interval causes it to interfere with neighboring pulses. ISI is usually caused by multipath propagation or the inherent non-linear frequency response of a channel causing successive symbols to "blur" together.

In one example, the captured edge is part of the beginning of the frame or packet, such as part of a 'start bit', or of the end of the frame or packet, such as part of a 'stop bit'. Alternatively or in addition, the captured edge may be a specific member in the sequence of edges in the frame, such as the second, third, or fourth edge, and so forth. Alternatively or in addition, the captured edge may be defined by the location of an associated bit, such as the edge of the second, third, or fourth bit or symbol, and so forth.

In one example, where two levels of signals (designated 'high' and 'low') are carried over the medium 16, the analyzed part of the waveform may comprise a waveform starting and ending at the same level, such as from a low-to-high transition (rising or positive edge) to the next high-to-low transition (falling or negative edge), known as positive pulse. Such duration may represent, in some modulation scheme, a single bit or few bits. While exampled herein regarding a positive pulse, the analysis equally applies to a negative pulse, consisting of the duration from a high-to-low transition (rising or positive edge) to the next low-to-high transition (falling or negative edge).

Figure 18:
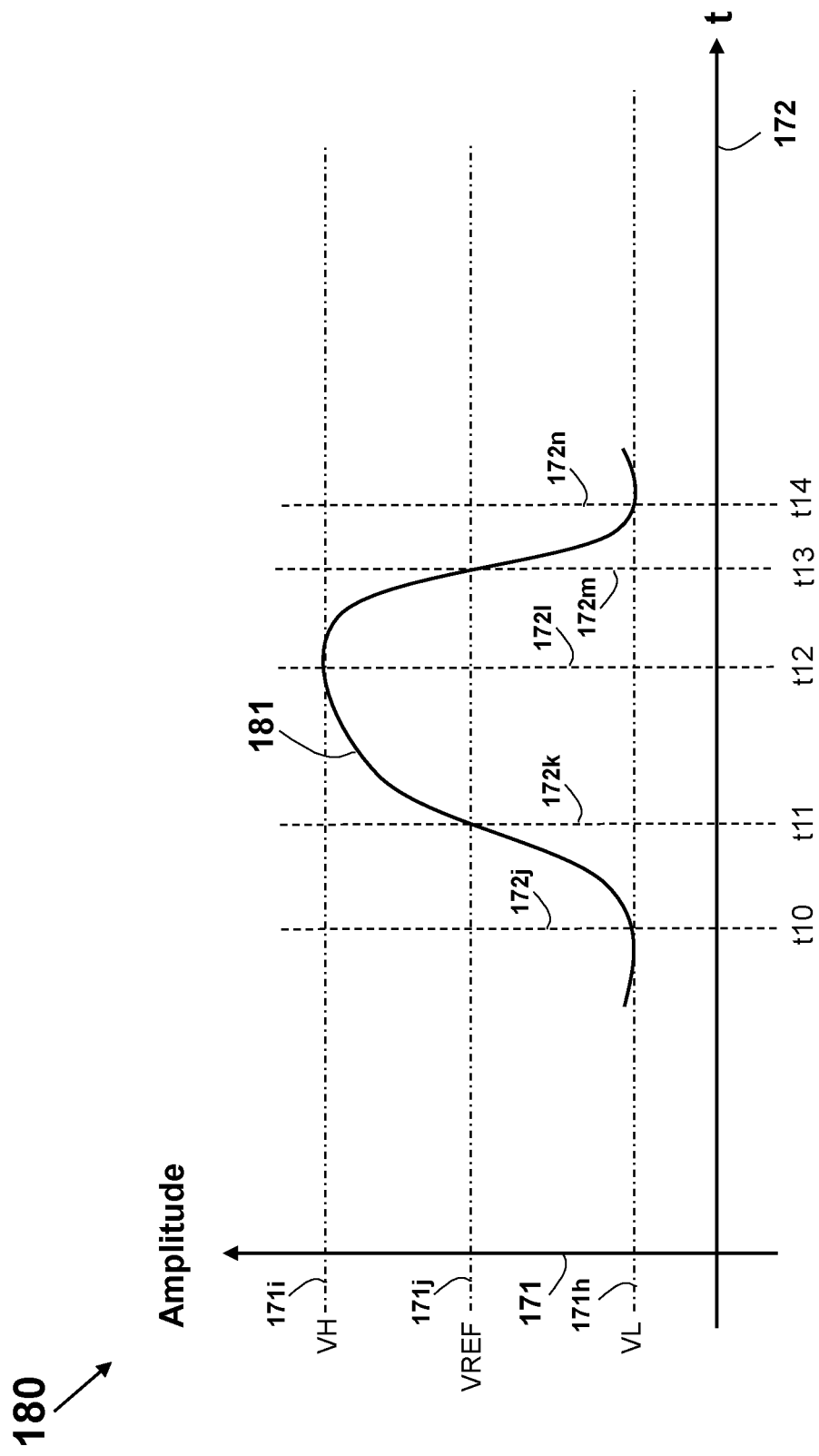
FIG. 18 illustrates schematically a simplified waveform of an exemplary positive pulse.

An example of an analysis of a positive pulse 181 in illustrated in a diagram 180 that is shown in FIG. 18. The pulse 181 starts at time point t10 172*j* and at a lower level VL 171*h*, rising to a peak value VH 171*i* at time point t12 172*l*, and returning to the low level VL 171*h* at a time point t14 172*n*. When rising, the pulse 181 may cross a reference voltage VREF 171*j* at a time point t11 172*k*, and may cross it again when falling in a time point t13 172*m*. The measured parameters may include the minimum voltage VL 171*h* or the peak value VH 171*i*. Alternatively or in addition, the measured parameters may be the time t10 172*j* when the rising edge starts to transition, the time of the peak t12 172*l*, the time when the falling edge ends to transition t14 172*n*, or the time point of the crossing of the VREF 171*j*, being the time point t11 172*k* and the time point t13 172*m*. The differences t14–t10 or t13–t11 may be used as a representation of the pulse duration or 'width'.

Figure 17:
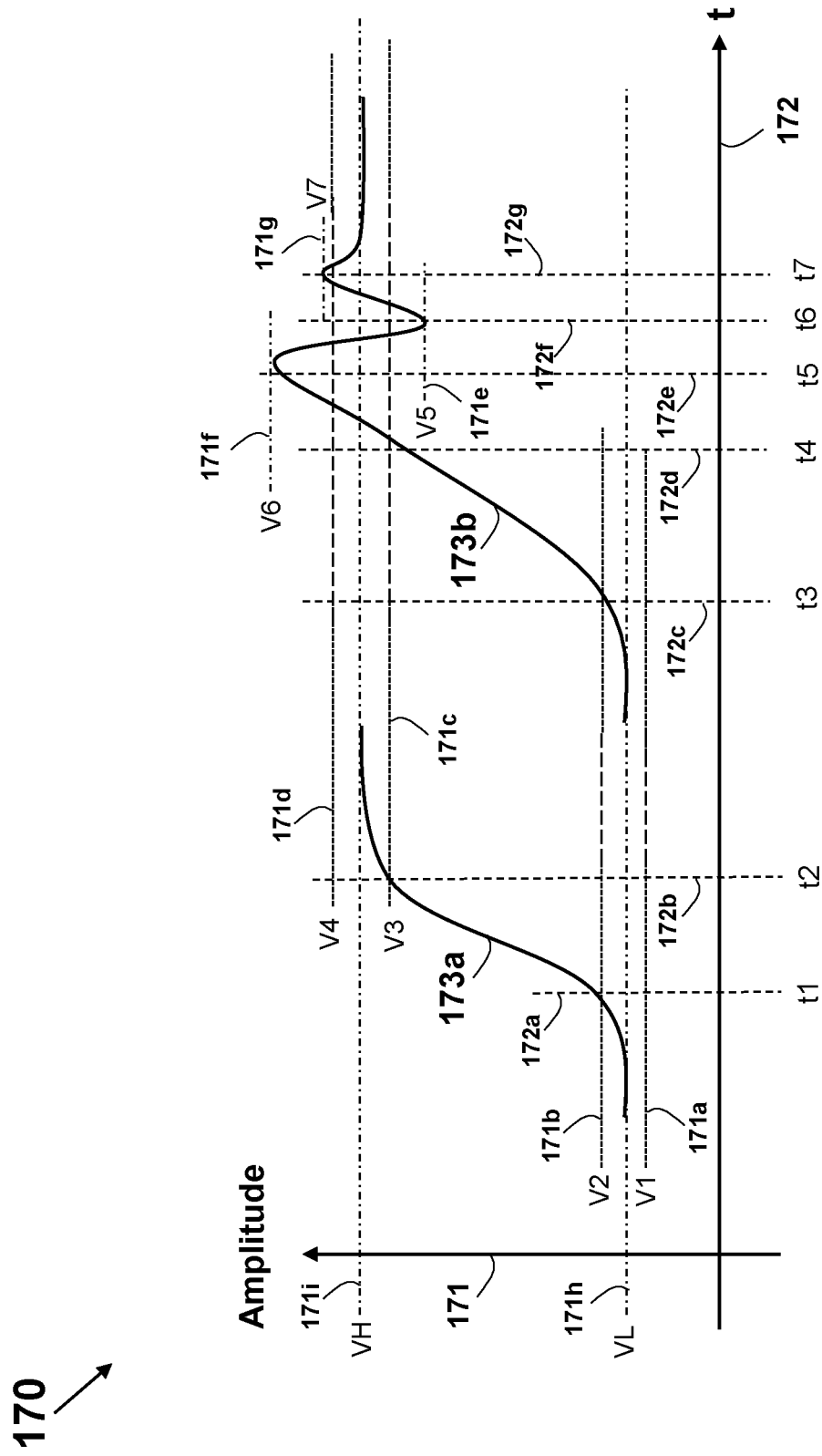
FIG. 17 illustrates schematically simplified waveforms of an exemplary rising edge.
Figure 17A:
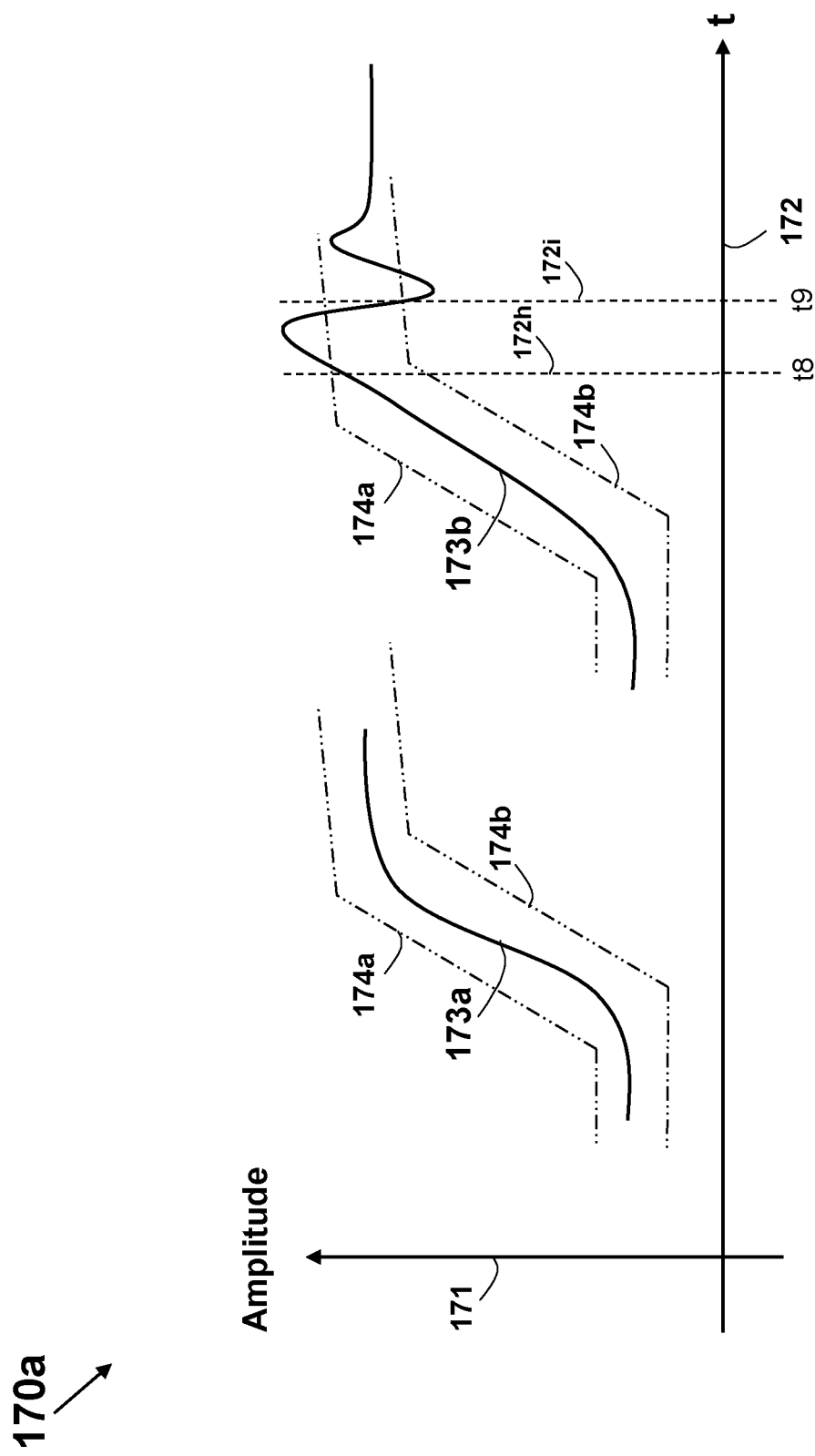
FIG. 17a illustrates schematically simplified waveforms of an exemplary edge versus a mask template.
Figure 18A:
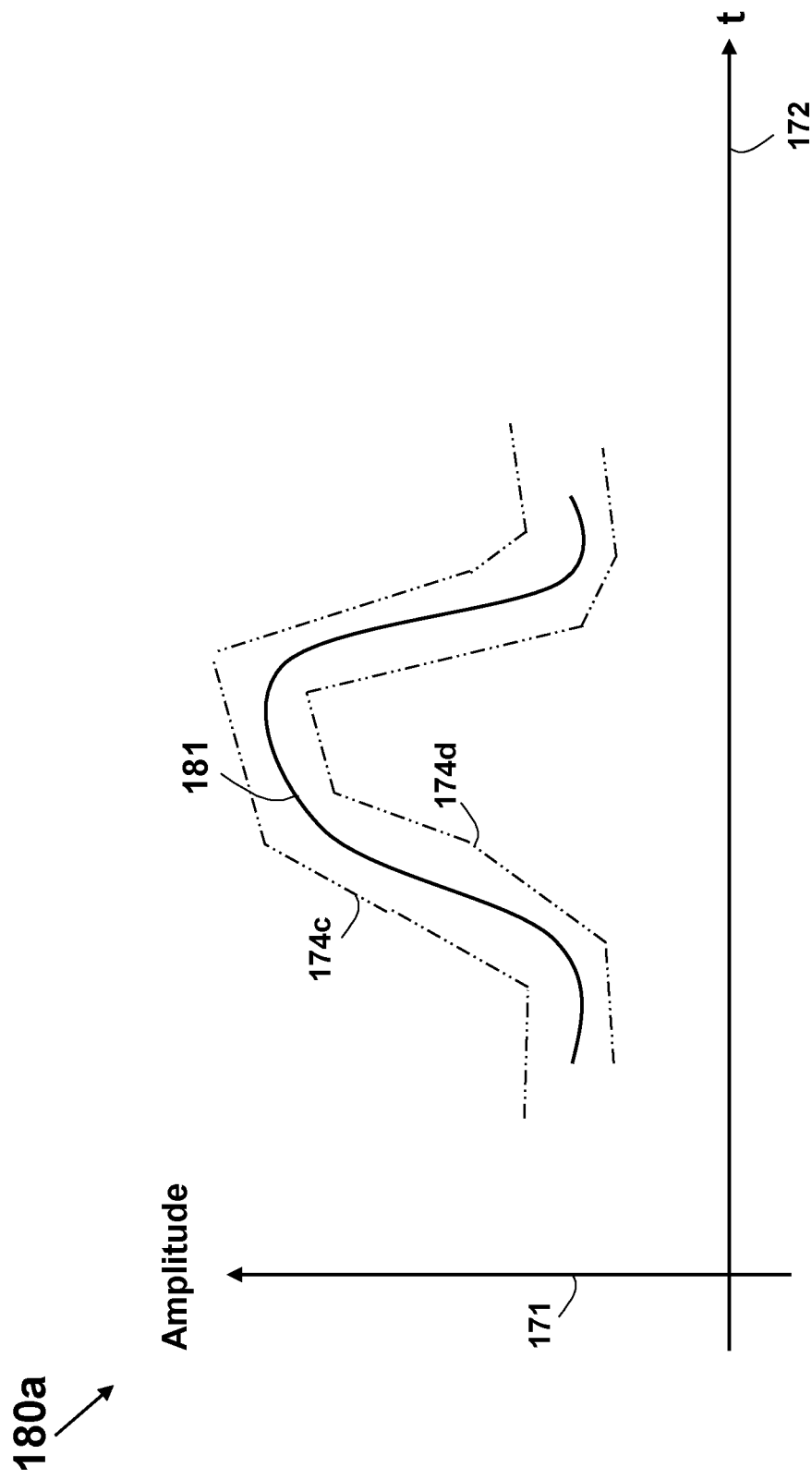
FIG. 18a illustrates schematically a simplified waveform of an exemplary positive pulse versus a mask template.

Similar to the chart 170*a* in FIG. 17, a mask may be used for evaluating the positive pulse 181 is described in chart 180*a* shown in FIG. 18*a*. The mask consists of the lower threshold 174*d* and the high threshold 174*c*. Since the pulse 181 is shown as satisfying the mask defined region, a normal (non-suspected) condition is resulted in the "Suspected?" step 156. In one example, the measured parameter is the total energy carried by the pulse 181.

While the analysis was exampled in chart 180 regarding a single pulse, multiple pulses may be aggregated and analyzed as a group, for example by forming and analyzing their eye pattern. The grouping of multiple readings, such as multiple pulses from the same frame (or packet) of from multiple frames (or packets) is performed as part of the "Aggregator" step 152*a*.

An eye pattern, also known as an eye diagram, is an oscilloscope display in which a digital signal from a receiver is repetitively sampled and applied to the vertical input, while the data rate is used to trigger the horizontal sweep. For several types of coding, the pattern looks like a series of eyes between a pair of rails. It is an experimental tool for the evaluation of the combined effects of channel noise and intersymbol interference on the performance of a baseband pulse-transmission system. It is the synchronized superposition of all possible realizations of the signal of interest viewed within a particular signaling interval. Several system performance measures can be derived by analyzing the display. If the signals are too long, too short, poorly synchronized with the system clock, too high, too low, too noisy, or too slow to change, or have too much undershoot or overshoot, this can be observed from the eye diagram. An open eye pattern corresponds to minimal signal distortion. Distortion of the signal waveform due to intersymbol interference and noise appears as closure of the eye pattern. Eye diagram scheme is further described in ON Semiconductor® Publication Number AND9075/D dated June 2015 entitled: "*Understanding Data Eye Diagram Methodology for Analyzing High Speed Digital Signal*", which is incorporated in its entirety for all purposes as if fully set forth herein.

Figure 18B:
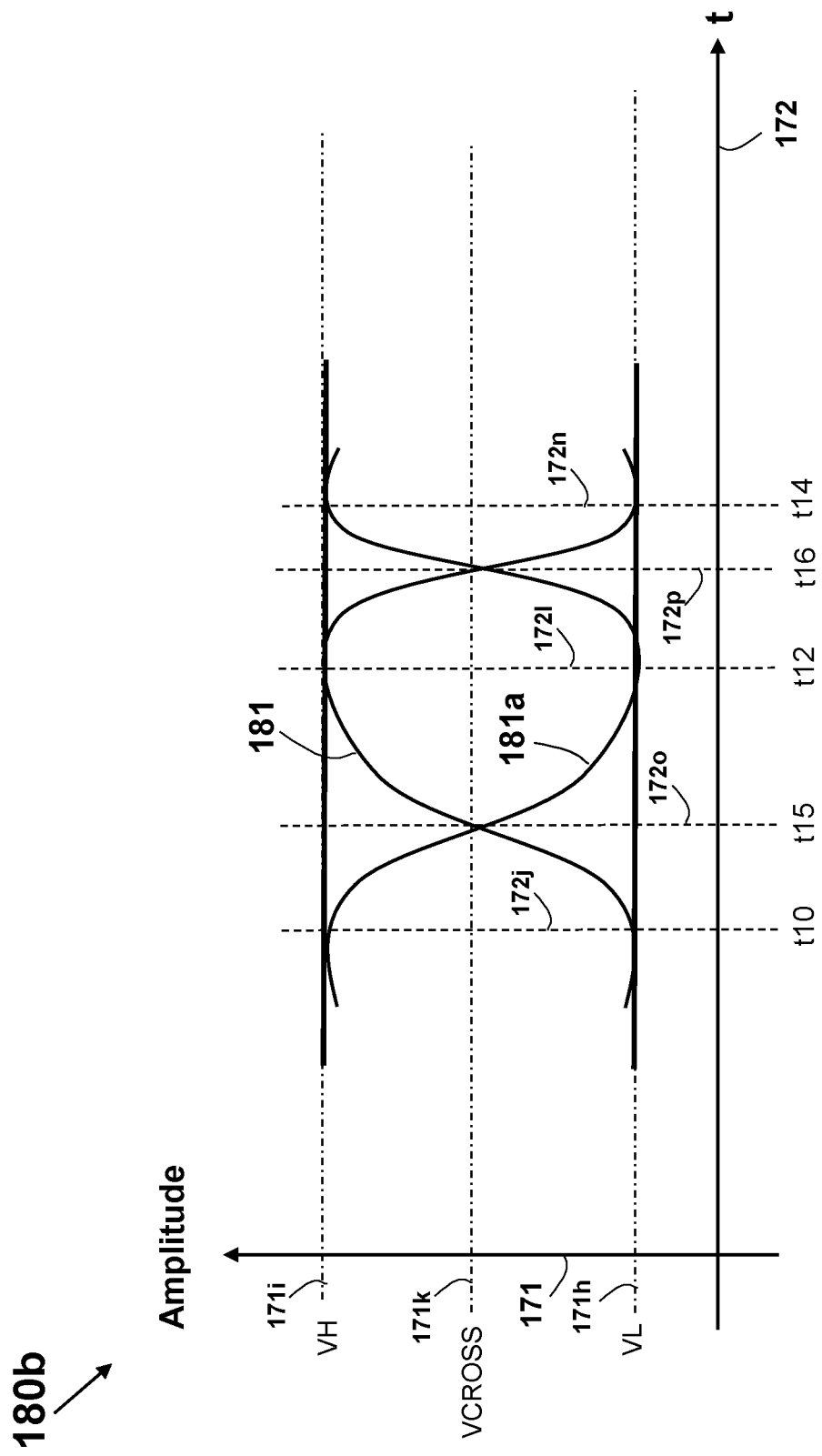
FIG. 18b illustrates schematically a simplified exemplary eye-pattern.

An example of an eye pattern using formed by positive pulses 181 and multiple negative pulses 181*a* is described in chart 180*b* shown in FIG. 18*b*. The average crossing voltage value is defined as VCROSS 171*k*, and in average the pulses cross this level at time points t15 172*o* and t16 172*p*.

There are many measurements that can be obtained from an eye diagram. Amplitude measurements includes Eye amplitudes (such as VL 171*h* and VH 171*i*), Eye crossing amplitude (such as VREF 171*k*), Eye crossing percentage, Eye height, Eye level, Eye signal-to-noise ratio, Quality factor, and Vertical eye opening. Time measurements include Deterministic jitter, Eye crossing time (such as t15 172*o* or t16 172*p*), Eye delay, Eye fall time, Eye rise time, Eye width, Horizontal eye opening, Peak-to-peak jitter, Random jitter, RMS jitter, CRC jitter, and Total Jitter. Eye opening (height, peak to peak) typically measures the additive noise in the signal, Eye overshoot/undershoot is typically associated with Peak distortion due to interruptions in the signal path, eye width commonly relates to Timing synchronization & jitter effects, and Eye closure typically represents the level of intersymbol interference and additive noise.

The pulse to be analyzed may be an arbitrary pulse in the frame or packet. Alternatively or in addition, the pulse to be captured and analyzed may be in a specific location in a frame or packet, providing better accuracy and repeatability due to Intersymbol Interference (ISI), which is a form of a distortion of a signal in which one symbol interferes with subsequent symbols. This is an unwanted phenomenon as the previous symbols have similar effect as noise, thus making the communication less reliable. The spreading of the pulse beyond its allotted time interval causes it to interfere with neighboring pulses. ISI is usually caused by multipath propagation or the inherent non-linear frequency response of a channel causing successive symbols to "blur" together.

In one example, the captured pulse is part of a bit or symbol at the beginning of the frame or packet, such as a 'start bit', or of the end of the frame or packet, such as a 'stop bit'. Alternatively or in addition, the captured pulse may be a specific member in the sequence of pulses in the frame, such as the second, third, or fourth pulse, and so forth. Alternatively or in addition, the captured pulse may be defined by the location of an associated bit, such as the pulse associated with the second, third, or fourth bit or symbol, and so forth.

In the case of frame or packet based networking, the waveform to be analyze may include a whole frame (or packet), or multiple frames (or packets). An example of frame-based received signal is described as a chart 190 shown in FIG. 19, where three consecutive first 191*a*, second 191*b*, and third 191*c* frames are shown. The second frame 191*b* starts at a time point t15 172*q*, and ends at a time point t16 172*r*, hence the frame duration (or length or width) may be calculated as t16–t15. Similarly, the third frame 191*c* starts at a time point t17 172*s*, and ends at a time point t18 172*t*, hence the frame duration (or length or width) may be calculated as t18–t17. The interframe gap may be calculated as t17–t16. The length of a frame, the starting time, the end time, or any combination thereof may be used as a measured parameter to be analyzed.

In one example, the energy (or power) of the frame (or packet) waveform is measured or calculated, and used as the measured parameter. For example, the waveform energy (or power) may be calculated by integrating or summing of the squares of the waveform samples values.

In one example, the "Time Analysis" step 154*a* comprises clock recovery or extraction circuitry, which may be based on a PLL. The extracted clock rate may be measured, and may be used as a value for comparing as part of the "Compare" step 155.

Figure 16:
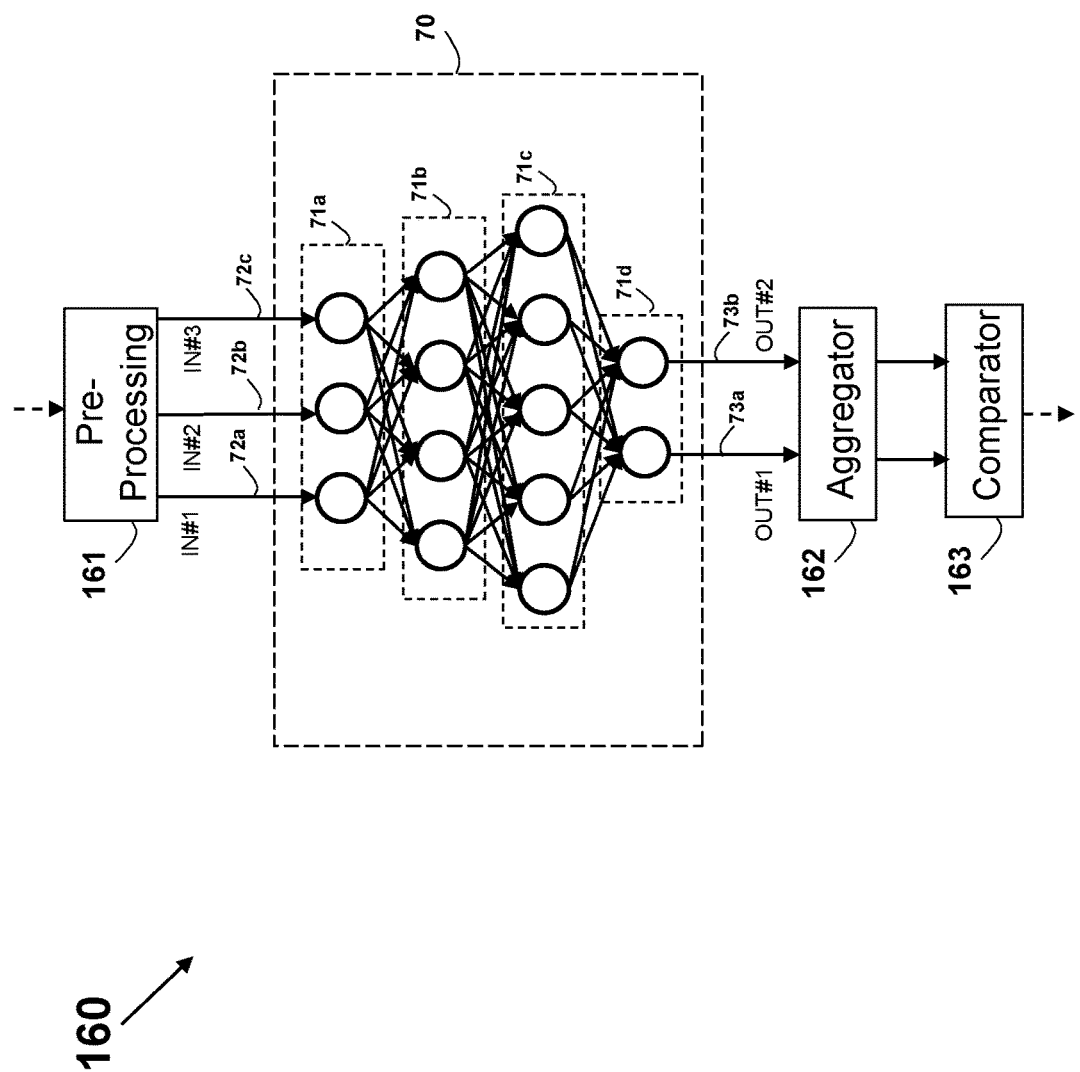
FIG. 16 illustrates schematically a simplified flowchart of a waveform analysis using Artificial Neural Network (ANN)

In one example, the time-domain analysis is using, or is based on, an ANN, as an alternative or in addition to any other analysis described herein. An example of using an ANN is a flow-chart 160 shown in FIG. 16. The waveform samples provided to the feed-forward ANN 70 via the three inputs IN #1 72*a*, IN #2 72*b*, and IN #3 72*c*. While exampled regarding three inputs, any number of inputs may be used. The input represents the waveform samples that are to be analyzed, such as rising or falling edge, positive or negative pulse, a frame, or any other part or whole of the frame or packet, or any other signal. The ANN 70 is trained to classify the input waveform samples to the specific transmitting devices. In the arrangement 130 shown in FIG. 13, for example, the ANN 70 of the analyzer device 120*a* may be trained to identify a signal received from the Device 'E' 15*e* in the OUT #1 73*a*, and to identify a signal received from the Analyzer/Device 'F' 133 in the OUT #2 73*b*. In case where more than two devices are involve in communication over the network medium 16, a corresponding number of outputs may be used. For example, in the arrangement 140 shown in FIG. 14, three output may be used, corresponding to the Bus Device 'A' 41*a*, the Bus Device 'B' 41*b*, and the Analyzer/Bus Device 'C' 141. The output values may be assumed to be in the range of [0,1], where value of 0 in an output suggests that there is zero probability that the analyzed signal originated by the corresponding device, and value of 1 ascertain that the analyzed signal was originated by the corresponding device.

The 'Compare' step 155 shown in the flow-chart 150 may use the comparator functionality 163 shown in the flow-chart 160, where the ANN 70 output are checked. Ideally, only the output corresponding to the device that transmitted the analyzed waveform indicates a value of 1, while all other outputs indicate a value of 0. Practically, due to system limitation and errors, noise, and changing environment, the corresponding output is less than 1, and the non-corresponding outputs are higher than 0. In one example, the comparator 163 uses a pre-set minimum threshold, such as 0.8, and a maximum threshold, such as 0.2. Under normal, non-intrusion scenario conditions, one of the outputs should be above the minimum threshold, while all other output should be below the maximum threshold. Such situation may be interpreted in the "Suspected?" step 156 as normal, not compromised, not-suspected state. In the case where none of the outputs exceed the minimum threshold, or where more than one output exceeds the maximum threshold, a 'suspected' state may be declared as part of the "Suspected?" state 156.

A Pre-Processing step 161 may be used in order to properly fit the inputs of the ANN 70 to the waveform part that is to be analyzed, to verify that the ANN 70 classifies the waveform according to the trained waveform type and location. For example, in the case where a rising edge part of the waveform is selected as the analyzed part, the Pre-Processing step 161 provides the proper samples of the rising edge 173*a*, designated as 164*a*, 164*b*, and 164*c*, respectively to the ANN 70 inputs IN #1 72*a*, IN #2 72*b*, and IN #3 72*c*, as exampled in the flow-chart 160*a* shown in FIG. 16*a*. In order to improve the system accuracy and the Signal-to-Noise Ratio (SNR), an aggregator 162 may be used for manipulating the ANN 70 output results. Multiple received waveforms, all originated from the same transmitting device are fed to the ANN 70, and the output results are aggregated and averaged, thus providing a better estimation of the classification.

Preferably, in order to accurately detect the intrusion of the Device 'Z' 15*z*, the analysis of the waveform of the received signal takes into account the identity of the device that transmitted the signal to the medium 16. In one example, the controller 57 receives the frame or packet from the transceiver 43, and using the source address in the frame or packet, associate the received signal with the transmitting device, as part of the 'L2/L3 Analysis' step 158. In the arrangement 140 shown in FIG. 14, for example, the analyzer device 120*a* receives the frame or packet, and associates it to one of the possible transmitters, being the Bus Device 'A' 41*a*, the Bus Device 'B' 41*b*, or the Analyzer/Bus Device 'C' 141. The analysis of the signal is based on the identity of the source device as part of the 'Compare' step 155, using the source identification obtained as part of the 'L2/L3 Analysis' step 158. In one example, the identity of the transmitting device obtained from the frame or packet content is compared as part of the comparator step 163 with the corresponding ANN 70 output. In the case where there is no match, such as when the ANN 70 indicates that the samples are originated in one device, while the frame content indicates another device address, it may suggest impersonating device, such as described in the arrangement 100 shown in FIG. 10, and the system indicates a suspected status as part of the "Suspected?" step 156.

While the flow chart 160*a* in FIG. 16*a* was explained regarding a single rising edge, the classification accuracy and confidence may be improved by using multiple signals. For example, multiple rising or falling edges or multiple positive or negative pulses, may be analyzed. Analyzing multiple signals increases the analysis accuracy, and reduces the risk of false detection due to an induced noise or interference. A set of multiple consecutive (or non-consecutive) edges or pulses may be extracted from multiple frames or packets. The set of multiple consecutive edges or pulses may be extracted from a single frame or packet, or from multiple (consecutive or non-consecutive) frames or packets.

Figure 16B:
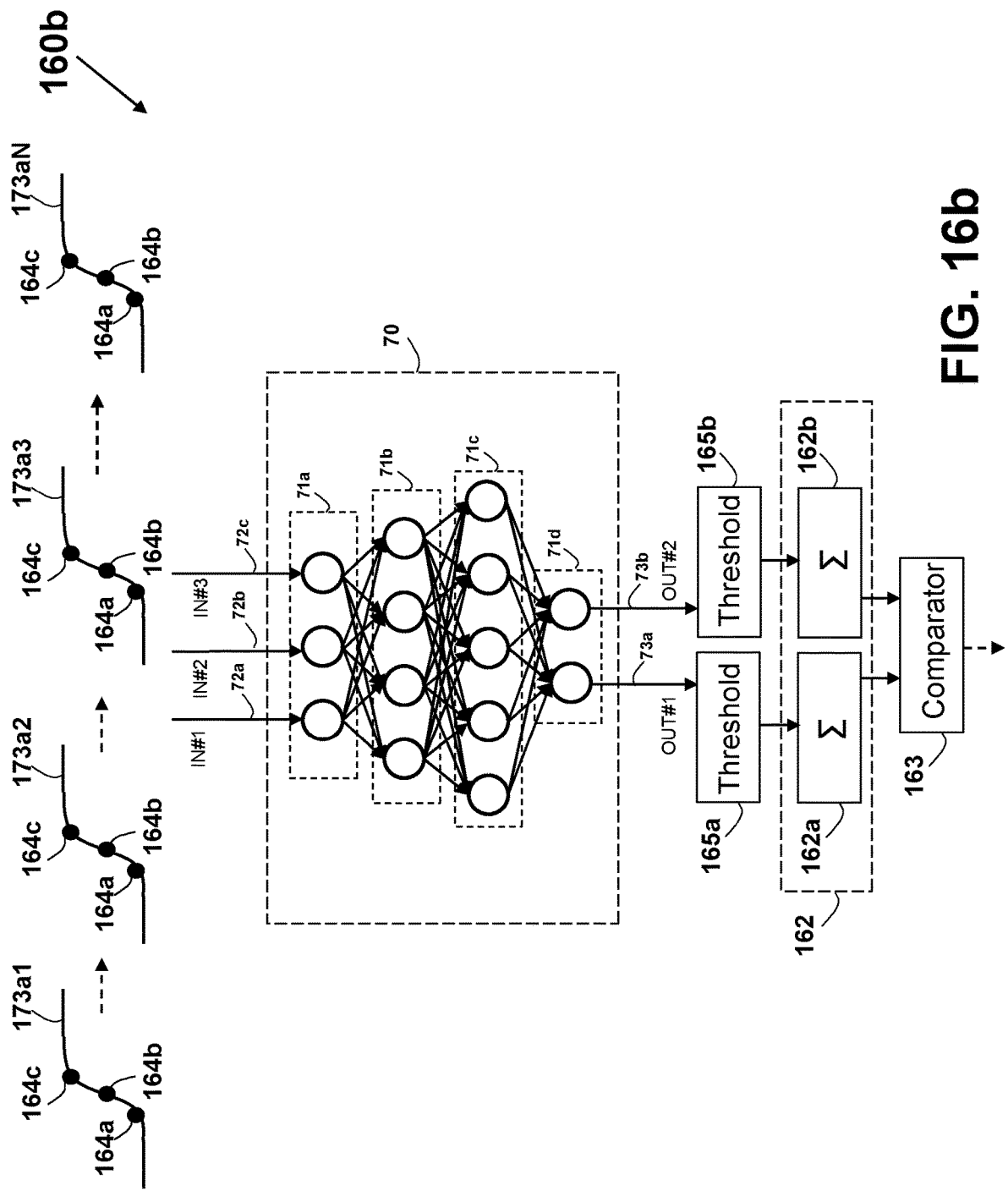
FIG. 16b illustrates schematically a simplified flowchart of an arrangement for multiple rising edge waveforms analysis using Artificial Neural Network (ANN)

An example of ANN 70 based analysis 160*b* of multiple rising edges is shown in FIG. 16*b*. N multiple rising edges, designated as rising edges 173*a*1, 173*a*2, 173*a*3, . . . 173*a*N, are sequentially input to the ANN 70 via the inputs IN #1 72*a*, IN #2 72*b*, and IN #3 72*c*. Each of the outputs of the ANN 70 OUT #1 73*a* and OUT #2 73*b*, is first compared to a pre-set threshold, as part of the threshold block 165*a* for the OUT #1 73*a* and the threshold block 165*b* for the OUT #2 73*b*. For example, a threshold of (0.6) 60% may be used for output range of [0,1], and only edges samples whose analysis exceeds this threshold may be further used, while edges having a lower value are discarded and are not further used. Hence, in case of a single rising edge (for example the rising edge 173*a*3) represents excessive noise signal or is associated with any other induced error, it will be omitted from the analysis. The output values pertaining to those edges that satisfy the threshold criteria, are further summarized as part of the aggregation step 162, by an integrator or summing function 162*a* associated with OUT #1 73*a* and integrator or summer 162*b* associated with OUT #2 73*b*.

Figure 20:
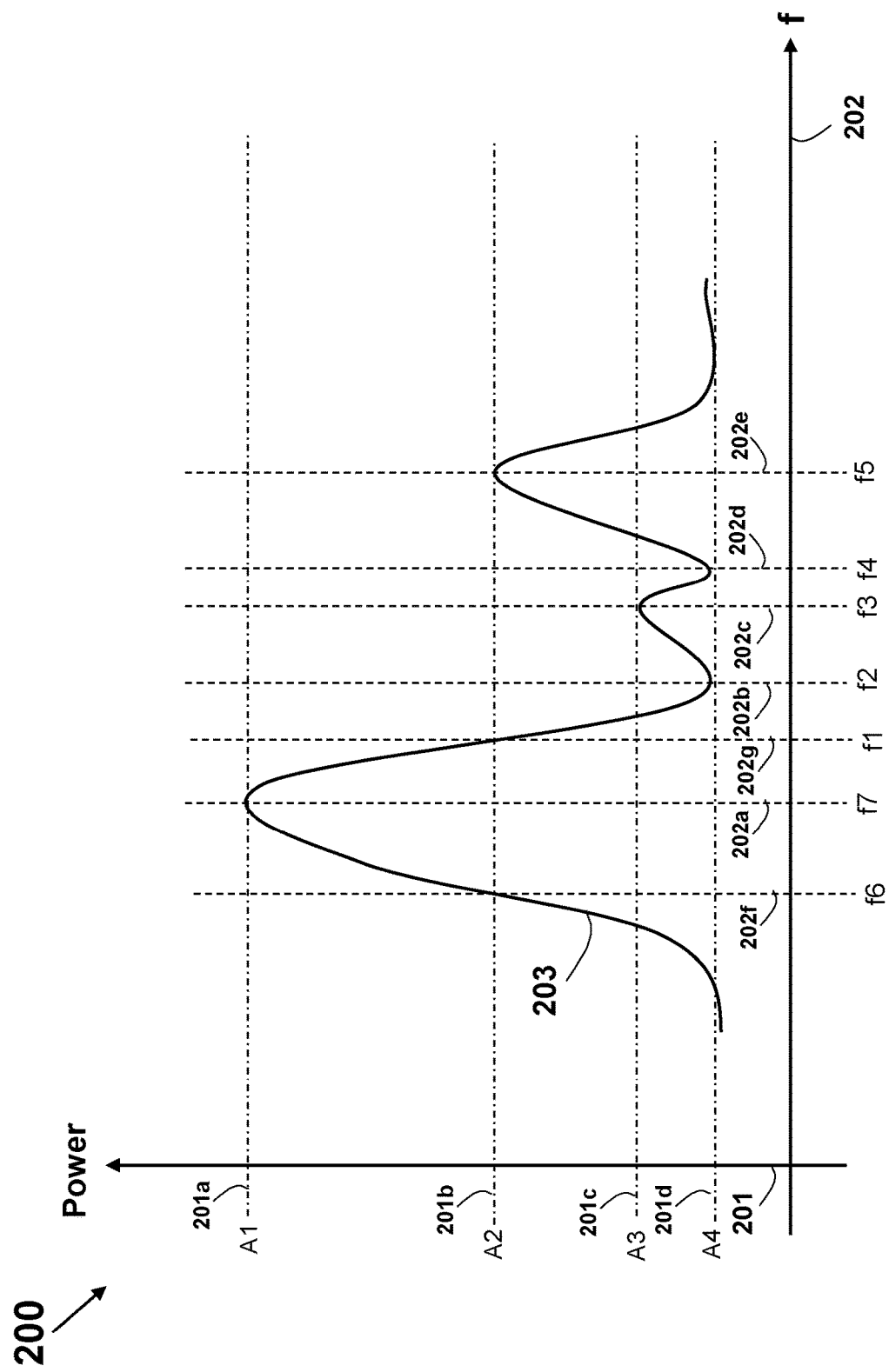
FIGS. 20 and 20a illustrate schematically a simplified frequency-domain chart of an exemplary signal.
Figure 20A:
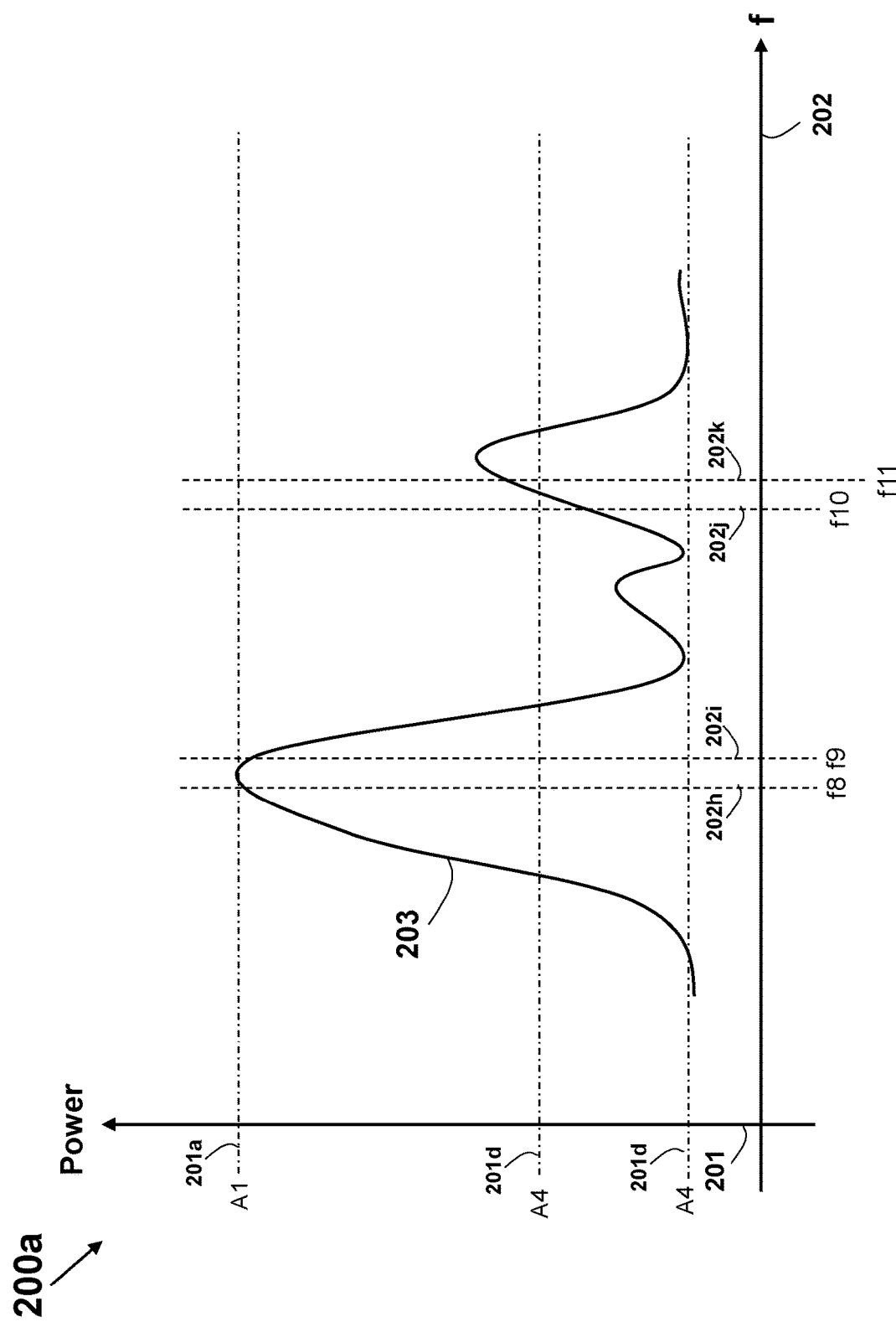

Alternatively or in addition to the time-domain analysis, various parameters, features, and characteristics may be obtained from a frequency-domain analysis. A frequency domain representation of the received signal of its waveform may be obtained by frequency analysis, such as by using FFT as part of the 'FFT' step 154*b*. Such analysis may provide the correlation of the power spectral density 201 versus the frequency 202, as described in by a variable 203 in a chart 200 in FIG. 20. Preferably, the 'window' for the frequency analysis may include a part of, or whole of, a frame or a packet. The FFT in be performed in hardware or in software. A hardware implementation of the FFT may use multiple BPFs, each passing a different frequency band, allowing for measuring the average power in the respective frequency band. An example is illustrated regarding the analyzer device 120', which include two BPFs 123*a* and 123*b*, respectively connected to the two A/D converters 124*a* and 124*b*. The A/D converters sample the average power in each of the frequency bands defined by the respective BPFs. In an example of the spectral density 203 in a chart 200*a* shown in FIG. 20*a*, the BPF 123*a* may be defined to pass the frequency band between the lower frequency value f8 202*h* and the higher frequency value f9 202*i*, hence defining the frequency band [f8, f9], and the corresponding A/D converter 124*a* thus measures the respective average power value A1 201*a* in this band. Similarly, the BPF 123*b* may be defined to pass the frequency band between the lower frequency value f10 202*j* and the higher frequency value f11 202*k*, hence defining the frequency band [f10, f11], and the corresponding A/D converter 124*b* thus measures the respective average power value A4 201*d* in this band. While two BPFs are exampled herein, any number of BPFs may equally be used. Further, any of the BPF may comprise, or may consist of, an LPF or an HPF.

The frequency domain analysis in the "Frequency Analysis" step 154*c* may involve measuring spectral power density of the analyzed waveform that may be pre-determined or based on the signal analysis. Such power values, separately or any combination thereof, may be compared with a pre-defined threshold or a region. Alternatively or in addition, the analysis may involve measuring frequency points or frequency ranges between pre-set power values that may be pre-determined or based on the signal analysis. Such frequency values, separately or any combination thereof, may be compared with a pre-defined threshold or a region.

Similar to the time domain analysis, a frequency domain analysis of the signal waveform (or any part thereof) in the "Frequency Analysis" step 154*c* may be used to obtain few power levels, designated as P1, P2, and P3. In one example, in the "Compare" step 155, a set maximum threshold power PMAX is used, and to compare each of the voltages to this value, and in case where P1>PMAX, P2>PMAX, P3>PMAX (or any combination thereof), a suspected condition is resulted in the "Suspected?" step 156. Alternatively or in addition, a set minimum threshold power PMIN may be used, and to compare each of the power values to this value, and in case where P1<PMIN, P2<PMIN, P3<PMIN (or any combination thereof), a suspected condition is resulted in the "Suspected?" step 156. Further, any function or combination of one or more of the measured power values may be used as part of the "Compare" step 155, including a difference as P1–P2 or P1–P3, or a ratio such as P1/P2, P3/P2, or any other combination thereof.

Alternatively or in addition, a frequency domain analysis of the signal waveform (or any part thereof) in the "Frequency Analysis" step 154*c* may be used to obtain one or more frequency points, designated as f1, f2, and f3. In one example, in the "Compare" step 155, a set maximum threshold frequency FMAX is used, and to compare each of the frequency points to this value, and in case where f1>TMAX, f2>FMAX, f3>FMAX (or any combination thereof), a suspected condition is resulted in the "Suspected?" step 156.

Alternatively or in addition, a set minimum threshold frequency FMIN may be used, and to compare each of the frequency points to this value, and in case where f1<FMIN, f2<FMIN, f3<FMIN (or any combination thereof), a suspected condition is resulted in the "Suspected?" step 156. Further, any function or combination of one or more of the measured frequency points values may be used as part of the "Compare" step 155, including a difference as f1–f2 or f1–f3, or a ratio such as f1/f2, f3/f2, or any other combination thereof.

In a 'normal' condition of the network, the characteristics of the signal received by the analyzer device 120 are dependent upon the transmitting device. Each transceiver (or line driver) is distinct, such as from a different vendor, different models from the same vendor, and inherent production differences between lots and within a lot. Further, due to the different connection points to the medium, the signals received from the medium 16 at one connection point may be different due to different propagation paths over the medium 16, even when identical line drivers are used. Further, different controller may involve different clock rates, and different devices may respond in different delays due to processor power or load. For example, the analyzer device 120a is shown in the arrangement 130 connected in points 131a and 13b to the medium 16. A frequency analysis of a waveform of a signal received from the Device 'F' 133 is different from frequency analysis of a waveform of a signal received from the Device 'E' 15e, due to differences between the corresponding line drivers 11a and 11, as well as the different propagation paths from corresponding connectors 13b and 13a to the analyzer device 120a connection location.

Preferably, in order to accurately detect the intrusion of the Device 'Z' 15z, the analysis of the waveform of the received signal takes into account the identity of the device that transmitted the signal to the medium 16. In one example, the controller 57 receives the frame or packet from the transceiver 43, and using the source address in the frame or packet, associate the received signal with the transmitting device, as part of the 'L2/L3 Analysis' step 158. In the arrangement 140 shown in FIG. 14, for example, the analyzer device 120a receives the frame or packet, and associates it to one of the possible transmitters, being the Bus Device 'A' 41a, the Bus Device 'B' 41b, or the Analyzer/Bus Device 'C' 141. The analysis of the signal is based on the identity of the source device as part of the 'Compare' step 155, using the source identification obtained as part of the 'L2/L3 Analysis' step 158. For example, the analyzer device 120a in the arrangement 140 may store and use three different threshold values, one for use with spectral analysis of waveforms obtained from frames or packets received from the Bus Device 'A' 41a, another one for use with spectral analysis of waveforms obtained from frames or packets received from the Bus Device 'B' 41b, and a third threshold value for use with spectral analysis of waveforms obtained from frames or packets received from the Analyzer/Bus Device 'C' 141.

Parameters that may be measured as part of the "Frequency Analysis" step 154c include a peak value A1 201a, a peak value of a first harmonic distortion A2 201b, and a peak of a spurious signal A3 201c. The power levels may be measured versus the 'floor' power level A4 201d. Further, various frequencies may be measures such as a frequency point of the peak of the main energy f7 202a (typically associated with the transmitter clock rate), a frequency point of the peak of the first harmonic signal f5 202e, and a frequency point of the peak of the spurious signal f3 202c.

Further, minimum power points may be measured, such as a frequency point of the higher minimum power level associated with the main signal energy f2 202b, and a frequency point of the higher minimum power level associated with the spurious signal energy f4 202d. In one example, the 'width' of the main signal energy may be measured at a power level of −3 dB or −6 dB of the peak level such as a power level A2 201b, where the 'width' is calculated as a band from a lower frequency point f6 202f to the higher frequency point f1 202g, defining the frequency band [f6, f1].

Preferably, the parameters or characteristics to analyze, the thresholds to use in the analysis, and the ANN training, are best fitted to a specific implementation of a configuration of the network. In one example, the network configuration, including the medium type and topology, and the type of the connected device, may be known, such as where multiple copies of a same configuration are produced. For example, if the network is an in-vehicle network, all the vehicle of the same model and configuration are expected to use the same network configuration. In such a scenario, the detection criterion may be learned or trained according to, or based on, a calculation or a simulation, or may be based on actual measurements of one or more samples of the network configuration.

Alternatively or in addition, actual real-time training or learning may be used by the actual to-be-monitored network. In one example, the network may be associated with two modes of operation: Learning/training and detecting. During the learning/training mode, the network operates normally for a limited time under controlled or supervised condition and environment, and the data gathered by the analyzer device 120 is used for learning or training. Then, as part of the detecting mode, the analyzer device 120 is used for detecting an anomaly or intrusion, using the parameters or characteristics learned, the thresholds calculated, or the ANN training that were performed during the learning/training mode of operation.

In one example, a 'dictionary' database may be available to the analyzer device 120 that includes detecting information regarding various networks types and topologies, and various transceivers, such as per line driver or transceiver type. The analyzer device 120 may use such a database for extracting data relevant to a specific configuration, and use it accordingly.

In one example, the training scheme uses a training set and a validation set. The ANN is trained using the training set, while the validation set is used to recognize overfitting of the trained data, by comparing the classification results of the training set to the validation set labels. An overfitting of the training may be indicated where the training set provides better results than the validation set.

In the example of a CAN bus based network 50 shown in FIG. 5, CAN messages are transmitted and received by the various ECUs connected to the CAN-bus medium 16b. Each CAN message is typically associated with a unique identifying code (message ID), commonly according to the message type. The CAN messages transmitted by an ECU may be associated with several IDs. For example, the ECU 'A' 56a may originate CAN messages having IDs of 1, 2, and 5, while the ECU 'B' 56b may originate CAN messages having IDs of 3, 4, and 6. Several networks, each using a distinct CAN-bus medium, may be connected using a CAN gateway.

In one example, the training uses a supervised learning scheme, where measured waveform samples are used to classify a pair of message identification (ID) and the originating ECU. In the case where the mapping of ECUs to message IDs is not known, the labels of the ECUs may not be available for using in a supervised learning scheme. In such a scenario, a non-supervised learning scheme may be used, such as by using clustering. In this case, the training may involve using only the message ID, or using a pair including the message ID and the message content. Where message IDs are used for training rather than ECU labels, Messages that are originated from the same ECU but associated with different IDs are created by the same transceiver (such as the same line driver and the same bus coupling components) and are carried over the same transmission path from the transmitting ECU and the analyzer (or aa receiver). Hence, errors are not expected to occur between messages having different IDs originated by the same ECU. The errors may be reduced by validation or testing group, such as by filtering out of overfitting elements, and then clustering of message IDs according to the originating ECU. Preferably, an algorithm may be used for training the ANN so that each label (or class) is associated with a single ECU, and a mapping between message IDs and ECUs is identified.

An example of such algorithm may comprise the steps of setting labels for training and validation data according to the message IDs, and performing the training until the training set is validated, such as by satisfying an error criteria, outperforming a validation set, or any other known training quality measuring. Then the labels having most likely cross-error on the validation set are identified (such as where messages with label 1 are mistakenly identified as label 2), and are merged into a single label. This process is repeated for several labels, until no classification errors are found in the merged labels, the number of the merged labels fits the number of the ECUs (if known), a maximum number of merger is reached, or any combination thereof. The process including training and merging labels may be repeated using the training set, until the error rate between labels is small compared to a correct classification, or the reduced error after the merges is below a threshold. Alternatively or in addition, the process including training and merging labels may be repeated until a fast convergence is observed, such as where no overfitting is observed since the labels of the validation set are correctly identified, or until the number of label is according to the number of ECUs, assuming such number is known.

Another example of a training algorithm may comprise the steps of setting labels for training and validation data according to the message IDs, and performing the training until the training set outperform the validation set even when the classification is correct, or according to any pre-set criterion. Then a weighted graph is created, where each vertex is a label, and each edge weight receives the cross error of the validation set. For example, the weight between vertex 1 and vertex 2 relates to the sum of error rate between vertex 1 to 2 and vertex 2 and 1. For the validation data set, the error rate between vertex 1 and 2 is defined, for all the pairs of message data (content) and label 1, and the rate is classified as label 2. The higher the rate, the closer are the vertices. A clustering of the weighted graph is then performed, such as Markov cluster algorithm described in CS 595D Presentation by Kathy Macropol (downloaded December 2016) entitled: *"Clustering on Graphs: The Markov Cluster Algorithm"*, which is incorporated in its entirety for all purposes as if fully set forth herein. The algorithm may stop by the stopping condition described above, or upon any stopping condition that is part of the clustering algorithm.

Further, a connected graph (non-weighted) may be created by using a threshold on the edge error rate. Similarly, a directed/non-weighted graph may be created based on the one-way error rate between vertices. In both cases, a clustering algorithm may be applied. When performing a weighted graph clustering, in an exceptional case where few message IDs are shared between ECUs, no shared label between two ECUs should be formed, and such a message may be either excluded or be individually labeled.

In order for allowing later additional waveform analysis or for statistical analysis, an information pertaining to an event of suspected waveform detected as part of "Suspected?" step 156 may be logged in a memory, such as in the 'Reference Samples' memory part 121*a*. For example, a record may be formed upon detecting a suspected signal as part of the "Suspected?" step 156, that may include the content of the suspected frame or packet, and the address or identification of the transmitting device, according to the content received via the line receiver 42 that is part the transceiver 43 and the controller 57. Further, the criterion and reasoning used for declaring the signal as 'suspected' may also be included in the transmitted message. Further, the message may comprise the actual waveform samples that were analyzed, allowing for additional remote processing or analyzing. The record may be time-stamped using an RTC that is part of the analyzer device 120.

In order to notify a human user of a status or otherwise alert for any detected or identified attack, as part of the "Notify User" step 157*b* the analyzer device 120 may include the annunciator 126, which may be activated by the processor 125. The annunciator 126 may consist of one or more visual or audible signaling component, or any other devices that indicate a status to the person. The annunciator may include a visual signaling device. In one example, the device illuminates a visible light, such as a Light-Emitting-Diode (LED), or uses a Liquid Crystal Display (LCD) that uses changes in the reflectivity in an applied electric field. The LED may be a multi-color LED, such as LED Part No. 08L5015RGBC available from RSR Electronics, Inc. from NJ, U.S.A., described in data-sheet Multi Color LED Part No. 08L5015RGBC, which is incorporated in its entirety for all purposes as if fully set forth herein.

However, any type of visible electric light emitter such as a flashlight, an incandescent lamp, and compact fluorescent lamps can be used. Multiple light emitters may be used, and the illumination may be steady, blinking or flashing. Further, a single-state visual indicator may be used to provide multiple indications, such as by using different colors (of the same visual indicator), different intensity levels, variable duty-cycle and so forth. Further, the visual signaling may be associated with the analyzer device 120 function. Such conceptual relationships may include, for example, the light emitters' brightness, appearance, location, type, color and steadiness that are influenced by the estimated value.

In one example, the annunciator operation is based on a numerical digital display that provides readings in the form of numbers of the estimated value of any value derived thereof. For example, the annunciator may use the quadruple digits, seven-segments, LED display Part No.: LTC-3610G available from Lite-On Electronics, Inc., and described in Lite-On Electronics, Inc., Publication BNS-OD-C131/A4 downloaded March 2011, which is incorporated in its entirety for all purposes as if fully set forth herein. Similarly, the annunciator may be based on an alphanumerical digital display that provides readings in the form of characters, including numbers, letters or symbols. For example, the annunciator may use the quadruple digits, seven-segments, LED display Part No.: LTM-8647AC available from Lite-On Electronics, Inc., and described in Lite-On Electronics, Inc., Publication BNS-OD-C131/A4 downloaded March 2011, which is incorporated in its entirety for all purposes as if fully set forth herein.

The scheme can be similarly used to display word messages in a variety of fashions and formats, such as scrolling, static, bold, and flashing. The device may further display visual display material beyond words and characters, such as arrows, symbols, ASCII and non-ASCII characters, still images such as pictures and video. The annunciator may use any electronic display or any other output device used for the presentation of visual information. The display may be a digital or analog video display, and may use technologies such as LCD (Liquid Crystal Display), TFT (Thin-Film Transistor), FED (Field Emission Display), CRT (Cathode Ray Tube) or any other electronic screen technology that visually shows information such as graphics or text. In many cases, an adaptor (not shown) is required in order to connect an analog display to the digital data. For example, the adaptor may convert to composite video (PAL, NTSC) or S-Video or HDTV signal. Analog displays commonly use interfaces such as composite video such as NTSC, PAL or SECAM formats. Similarly, analog RGB, VGA (Video Graphics Array), SVGA (Super Video Graphics Array), SCART, S-video and other standard analog interfaces can be used. Further, personal computer monitors, plasma or flat panel displays, CRT, DLP display or a video projector may be equally used. Standard digital interfaces such as an IEEE1394 interface, also known as FireWire™, may be used. Other digital interfaces that can be used are USB, SDI (Serial Digital Interface), FireWire, HDMI (High-Definition Multimedia Interface), DVI (Digital Visual Interface), UDI (Unified Display Interface), DisplayPort, Digital Component Video and DVB (Digital Video Broadcast).

In one example, the annunciator 126 may affect sound or voice generation. The estimated value may be associated with a musical tune (or a tone) or any other single sound, which is played upon activation of the annunciator. The annunciator 126 may include an audible signaling device (sounder) that emits audible sounds that can be heard by a human (having frequency components in the 20-20,000 Hz band). In one example, the device is a buzzer (or beeper), a chime, a whistle or a ringer. Buzzers are known in the art, and are either electromechanical or ceramic-based piezoelectric sounders that make a high-pitch noise. The sounder may emit a single or multiple tones, and can be in continuous or intermittent operation. In another example, the sounder simulates the voice of a human, typically by using an electronic circuit having a memory for storing the sounds (e.g., click, gong, music, song, voice message, etc.), a digital to analog converter to reconstruct the electrical representation of the sound and driver for driving a loudspeaker, which is an electro-acoustical transducer that converts an electrical signal to sound. An example of a greeting card providing music and mechanical movement is disclosed in U.S. Patent Application 2007/0256337 to Segan entitled: "User Interactive Greeting Card", which is incorporated in its entirety for all purposes as if fully set forth herein. A 'Gong' sound may be generated using SAE 800 from Siemens, described in Data-sheet *"Programmable Single-/Dual-/Triple-Tone Gong, SAE* 800, *Siemens semiconductor Group, 02.05"*, which is incorporated in its entirety for all purposes as if fully set forth herein.

In one example, a human voice talking is played by the annunciator 126. The sound may be a syllable, a word, a phrase, a sentence, a short story or a long story, and can be based on speech synthesis or pre-recorded. Male or female voice can be used, being young or old. The text sounded is preferably associated with the shape or theme. For example, an estimated value or quality associated value derived thereof of the system can be heard, such as 'Alert', 'Attach detected' and 'Alarm'. A tone, voice, melody or song sounder typically contains a memory storing a digital representation of the pre-recorder or synthesized voice or music, a digital to analog (D/A) converter for creating an analog signal, a speaker and a driver for feeding the speaker. An annunciator, which includes a sounder, may be based on Holtek HT3834 CMOS VLSI Integrated Circuit (IC) named '36 Melody Music Generator' available from Holtek Semiconductor Inc., headquartered in Hsinchu, Taiwan, and described with application circuits in a data sheet Rev. 1.00 dated Nov. 2, 2006, which is incorporated in their entirety for all purposes as if fully set forth herein.

Similarly, the sounder may be based on EPSON 7910 series 'Multi-Melody IC' available from Seiko-Epson Corporation, Electronic Devices Marketing Division located in Tokyo, Japan, and described with application circuits in a data sheet PF226-04 dated 1998, which is incorporated in its entirety for all purposes as if fully set forth herein. A human voice synthesizer may be based on Magnevation SpeakJet chip available from Magnevation LLC and described in 'Natural Speech & Complex Sound Synthesizer' described in User's Manual Revision 1.0 Jul. 27, 2004, which is incorporated in its entirety for all purposes as if fully set forth herein. A general audio controller may be based on OPTi 82C931 'Plug and Play Integrated Audio Controller' described in Data Book 912-3000-035 Revision: 2.1 published on Aug. 1, 1997, which is incorporated in its entirety for all purposes as if fully set forth herein. Similarly, a music synthesizer may be based on YMF721 OPL4-ML2 FM+Wavetable Synthesizer LSI available from Yamaha Corporation described in YMF721 Catalog No. LSI-4MF721A20, which is incorporated in its entirety for all purposes as if fully set forth herein.

Alternatively or in addition, tactile (or haptic) stimuli may be used, where the annunciator 126 may is configured to generate a tactile sensation, preferably the device comprises a motor, e.g., a vibration motor such as a pancake vibration motor or linear actuator or off-center motor. The motor may, for example, be configured to generate a single type of vibration or pulsation or to generate a plurality of types of vibrations and/or pulsations that vary based on pattern and/or intensity or other parameter or features. Other types of tactile stimulation that the signaling assembly may be configured to generate include, but are not limited to, pressure by causing a blunt or other element to extend through the housing when activated.

Upon detecting of an attack, there may be a need to immediately react in order to minimize potential damage, either from the unauthorized device provided access to the data traffic over the medium 16 by the line receiver 12$z$ of the intruding device 15$z$ (or by the line receiver 52$z$ of the unauthorized device 56$z$), or from a malware-originated information, such as false or obstructing data, transmitted to the medium by the line driver 11$z$ of the unauthorized device 15$z$ (or by the line driver 51$z$ of the unauthorized device 56$z$). In one example, the analyzer device 120 may continuously transmit signals or energy to the medium 16 by the line driver 41. A continuous bit-stream may comprise a continuous '0' bits, '1' bits, alternating '1' and '0' bits, or any other pattern or bit-sequence. Such a transmission renders the medium 16 inoperative to carry any additional signals or data, rendering the wired network operative. Further, the bit-stream or the specific bit-sequence may be used as an alert to the other devices connected to the medium, alarming them regarding the detected attack. Such continuous bitstream may be transmitted until the attack is corrected or the system is reset.

Alternatively or in addition, the analyzer device 120 may use the controller 57 and the transceiver 43 to continuously transmit to the medium 16 frames or packets according to the protocol used, again rendering the medium 16 inoperative for use of communication by any of the other devices connected to the medium 16. In such a case, the frames or messages sent may include information regarding the attack, such as the content of the suspected frame or packet, and the address or identification of the transmitting device, according to the content received via the line receiver 42 that is part the transceiver 43 and the controller 57. This content allows the other connected devices to ignore, discard, or otherwise handle the formerly received messages, frames, or packets that are suspected as being non-legitimate or unauthorized. Further, the content may comprise the waveform samples that were analyzed, allowing for additional remote processing or analyzing. The message may be time-stamped using an RTC that is a part of the analyzer device 120, notifying the timing of the attack detection. Such continuous transmission may be transmitted until the attack is eliminated or the system is reset.

In one example, the analyzed waveform is part of the start or the beginning of a frame or packet, and the attack may be detected during the receiving of the rest of the frame or packet. In such a case, in response to the attack detection as part of a "Corrupt" step 157c, the analyzer device 120, using the line driver 41, may transmit signal or energy to the medium 16 until the end of the frame or packet, thus rending the suspected frame or packet inconceivable by the other devices connected to the medium 16. Alternatively or in addition, a single bit is only corrupted, such as a CRC bit. Any of the methods for destroying a transmitted frame or packet that is described in PCT application PCT/IB2016/054363 attached herein may equally be used or applied. The functionality or actions as part of the "Corrupt" step 157c may include any corrupting functionality herein, and may comprise any activity described as part of the "Corrupt Frame" step 79a as part of the flow chart 75 shown in FIG. 7a above. Alternatively or in addition, the corrupting signal or energy may use a dedicated signal generator provided and connected to the bus via connector 13, as an alternative or as an addition to using the line driver 41 for transmitting the corrupting signal.

The message (frame or packet) corruption as part of the "Corrupt" step 157c may comprise transmitting a signal (such as by the line driver 41 or by a dedicated signal generator) to the communication medium (such as a vehicle bus) for changing a single bit or multiple (consecutive or non-consecutive) bits in the series of bits when received by devices connected to the communication medium (such as ECUs), for interfering and corrupting one or multiple frames transmitted to the communication medium. For example, 2, 4, 6, 8, or more consecutive or non-consecutive bits may be changed or affected. In one example, the changed bit or bits renders the message CRC invalid. In one example, the communication medium is a vehicle bus that is carrying data as dominant ('0') or recessive ('1') bits, and the analyzer is further operative for transmitting the signal to the vehicle bus for inducing high voltage or high current pulse for changing one or bits from dominant to recessive bits, so that the one or more bits in the series of bits received by each of the multiple ECUs is changed. In one example, a specific bit or bits are changed, rendering the message (frame or packet) an error message according to protocol used. In the example of CAN protocol, specific bits in the frame (such as flags) are always defines as recessive ones, such as the last bits of the frame. Changing one or more of these bits to dominant bits renders the frame to be defined as an 'Error Frame'. Similarly, the CAN protocol defines a frame having 6 or more consecutive dominant bits as an 'Error Frame', thus forcing 6 consecutive dominant bits renders the frame to be defined as an 'Error Frame' as well.

Alternatively or in addition, as part of the "Notify Device" step 157e, upon detecting of an attack, an alerting message is sent to one or more devices connected to medium 16. The message sent may include information regarding the attack, such as the content of the suspected frame or packet, the address or identification of the transmitting device, and the time of detecting the attack. The message may be formed according to the protocol by the controller 57, and transmitted to the network medium 16 by the line driver 41.

As part of the "Transmit or Block" step 157d, in response to suspected intrusion or attack, a message is sent to the network 129 using the transceiver 114 via the port 128. The message sent may include identification of the sending analyzer module 120, such as its IP address or CAN ID, the time of sending the message, and the status. A notifying message may be sent periodically, such as every 1, 2, 5, or 10 seconds, every 1, 2, 5, or 10 minutes, every 1, 2, 5, or 10 hours, or every 1, 2, 5, or 10 days. Alternatively or in addition, the user may be notified by using an event-driven messaging. For example, a message may be transmitted upon detecting a suspected signal as part of the "Suspected?" step 156. The message may further include content of the suspected frame or packet, and the address or identification of the transmitting device according to the content received via the line receiver 42 that is part the transceiver 43 and the controller 57. Further, the criterion and reasoning used for declaring the signal as 'suspected' may also be included in the transmitted message. Further, the message may comprise the waveform samples that were analyzed, allowing for additional remote processing or analyzing. The message may be time-stamped using an RTC that is a part of the analyzer device 120.

The message may be sent using XMPP, SIMPLE, Apple Push Notification Service (APNs), or IMPS. The message may be a text-based message, such as by using SMS, or Twitter services, as well as social marketing service such as Facebook. Alternatively or addition, the message may include an audio or video message, and sent using MMS or Enhanced Messaging Service (EMS). Other services such as e-mail, Viber, or Whatsapp may be used.

Further, the analyzer device 120 send the message, which may be a notification or an alert, to a user. The notification to the user device may be text based, such as an electronic mail (e-mail), website content, fax, or a Short Message Service (SMS). Alternatively or in addition, the notification or alert to the user device may be voice-based, such as a voicemail, a voice message to a telephone device. Alternatively or in addition, the notification or the alert to the user device may activate a vibrator, causing vibrations that are felt by human body touching, or may be based on a Multimedia Message Service (MMS) or Instant Messaging (IM). The messaging, alerting, and notifications may be based on, include part of, or may be according to U.S. Patent Application No. 2009/0024759 to McKibben et al. entitled: "System and Method for Providing Alerting Services", U.S. Pat. No. 7,653,573 to Hayes, Jr. et al. entitled: "Customer Messaging Service", U.S. Pat. No. 6,694,316 to Langseth. et al. entitled: "System and Method for a Subject-Based Channel Distribution of Automatic, Real-Time Delivery of Personalized Informational and Transactional Data", U.S. Pat. No. 7,334,001 to Eichstaedt et al. entitled: "Method and System for Data Collection for Alert Delivery", U.S. Pat. No. 7,136,482 to Wille entitled: "Progressive Alert Indications in a Communication Device", U.S. Patent Application No. 2007/0214095 to Adams et al. entitled: "Monitoring and Notification System and Method", U.S. Patent Application No. 2008/0258913 to Busey entitled: "Electronic Personal Alert System", or U.S. Pat. No. 7,557,689 to Seddigh et al. entitled: "Customer Messaging Service", which are all incorporated in their entirety for all purposes as if fully set forth herein.

In one example, the analyzer device 120 further serves as a switch, bridge, router, or gateway that connects the network 129 and the medium 16 based wired network, and thus transfer or relay messages, packets, frames, information, or any content therebetween. Alternatively or in addition, the analyzer device 120 may be integrated with such a switch, bridge, router, or gateway. For example, both networks may be IP or Ethernet based networks, and the analyzer device 120 further provide the functionality of Ethernet (or IP) switch, bridge, router, or gateway. Alternatively or in addition, both the network 129 and the medium 16 based networks are in-vehicle networks (such as CAN based networks), and the analyzer device 120 further implements the functionality of, or is integrated with, an in-vehicle (e.g. CAN) switch, bridge, router, or gateway. In such a scenario, upon detecting an attack, as part of the "Transmit or Block" step 157d, the analyzer device 120 block the transfer of messages (such as frames or packets) from the medium 16 to the network 129. In one example, all messages received from the medium 16 are considered suspected, and as such all messages from the medium 16 are blocked and no messages are transferred to the network 129. Alternatively or in addition, only suspected messages, such as specific frames or packets, are blocked and are not transported to the network 129. Similarly, upon detecting an attack, as part of the "Transmit or Block" step 157d, the analyzer device 120 block the transfer of messages (such as frames or packets) from the network 129 to the medium 16. In one example, all messages to the medium 16 are blocked and no messages are transferred from the network 129. Alternatively or in addition, only specific messages, such as specific frames or packets addressed to specific devices, are blocked and are not transported to the network 129.

While exampled herein regarding detecting an intrusion in a wired network, the device, system, and method may equally be used with a wireless network.

While exampled herein regarding detecting an intrusion in a wired network, the device, system, and method may equally be used for identifying transceivers, line drivers, or any transmitting circuitry. By connecting the analyzer device 120 directly or via a pre-defined medium, to any transmitting apparatus, and by comparing to known or formerly captured and stored criterions, detecting if there is a change in the transmitting circuitry and suggesting that the checked device is different from the data-stored one.

Experiment 1. A CAN bus network, operating at 500 Kbps, was formed in a laboratory, to which one CAN device was connected, programmed to transmit a first set of messages. In a first scenario, a vehicle infotainment device having a CAN interface was connected to the bus. In a second scenario, another CAN device of the same type as the other CAN device, was connected to the bus at the same connection points. The signal propagating over the CAN bus medium was captured and recorded using oscilloscope Model No. DS2250, operating at a sampling rate of 25 MSps, an analog rate of 100 Mhz, resolution 8 bit, and single-ended connection. The captured samples around an event (rise/fall edge) and additional inputs were input to an ANN, after pre-processing to aligning the input data according to the event. For each event, the ANN was trained using the number of bits before an event, the number of bits after the event, identifying whether this is the first or last event. A separation of input between different events was used, due to the linear properties of the system. About 80% of samples before and after an event of a rising edge rise and 80% of sample before and after an event of falling edge were used. The feed-forward ANN was used having 3 layers (input, hidden, and output), where the hidden layer included 20 neurons. The output layer contained 2 neurons each trained for output in the range of [−1, 1]. The training set used around 20 messages, each containing dozens of samples, for each device/transceiver connected to the CAN bus. The results for each event of each message were summed-up to a total representing the whole message. A classification of messages was performed both manually and (by extracting the ID from the frames). The ANN output results for the first scenario showed 100% success for 800 messages (no misses) for classifying the correct transceiver, and in the second scenario a 99.9% success rate was achieved for 900 messages (1 miss).

Figure 11:
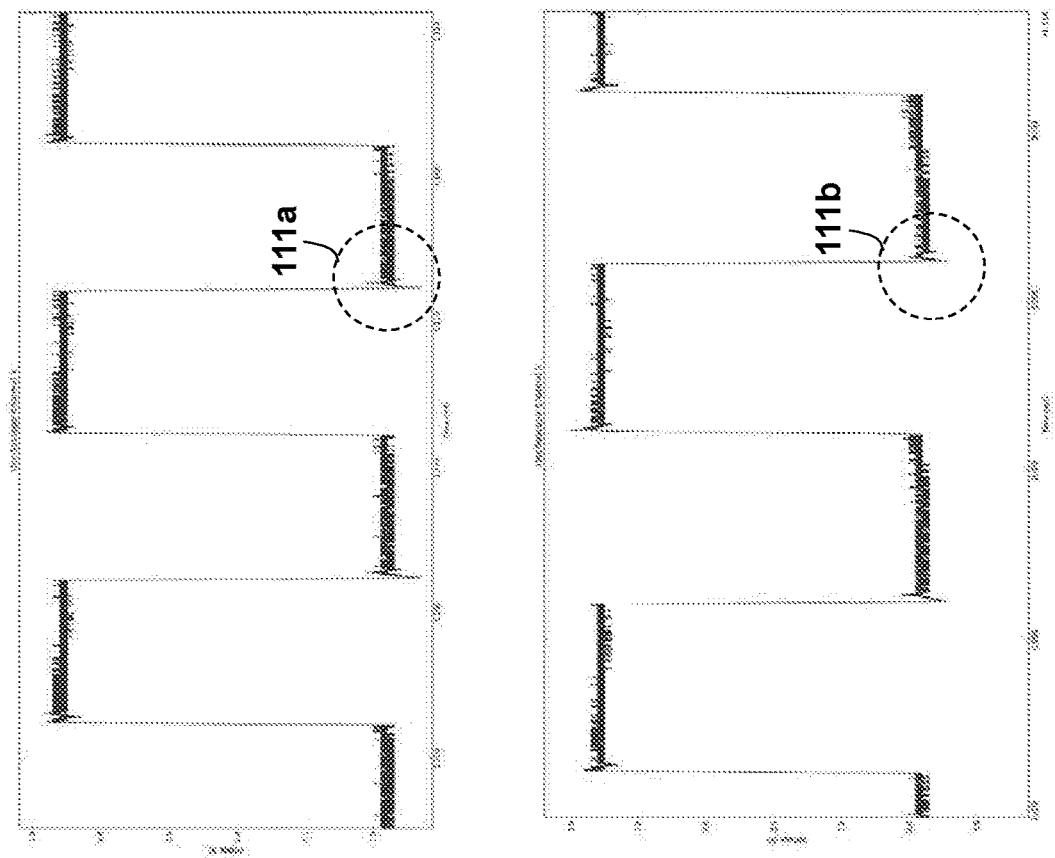
FIG. 11 depicts an actual oscilloscope capturing of a signal waveform in a CAN bus with and without tapping.

Experiment 2. In a first scenario, a CAN bus, having same termination impedance of 120 ohm at each of the ends (60 ohm line impedance), was used for communication between two CAN transceivers connected thereto. In a second scenario, a third CAN transceiver was tapped into the CAN bus, operative only to receive, simulating a tapped-into eavesdropping device. One of the communicating CAN devices was programmed to repeatedly transmit 500 Kb/s CAN messages each consisting of 8 bytes of '0xaa' data (0b101010101 ... ). The signal propagating over the CAN bus medium was captured by an oscilloscope Model No. DS1102D by Rigol, operating at 500 MSPS with analog bandwidth of 100 MHz, where each sample is 8 bits deep. The captured waveform of the first scenario is shown as a chart 110a, and the captured waveform of the second scenario is shown as a chart 110b, in FIG. 11. The transitioning captured, as marked by the circle 111a shown in the chart 110a and the by the circle 111b shown in the chart 110b, indicated a distinction between the scenarios. Without tapping to the CAN bus medium (first scenario), relating to the chart 110a, the ringing amplitude (peak to peak from overshoot/undershoot to ringback) was measured as 4.33 bits (in average), while with tapping (second scenario), higher ringing amplitude ranges from of 6.5 bits (in fall) to 5.66 bits (on rise).

In some communication protocols, such as the Ethernet, each node in the network is uniquely addressed using a single unique digital word (digital address). The digital address, such as Media Access Control (MAC) address, may be used for identifying a message (such as a packet or frame), such as identifying the message source, message destination, or both. In some protocols, such as CAN, each node (such as an ECU) may be associated with multiple identifiers (IDs). Such an example is exampled in an arrangement 210 shown in FIG. 21, where the bus (which be a CAN bus) that comprises two conductors 14a and 14b serves for communication between three devices (which may be ECUs): Device 'A' 41a (connected via the connector 13a), device 'B' 41b (connected via the connector 13b), and device 'C' 41c (connected via the connector 13c), similar to the arrangement 140 shown in FIG. 14 above. The messages over the shared bus may carry the identification of the sending device. For example, messages originated by the device 'A' 41*a* are identified using a single identifier ID3 210*a*, messages originated by the device 'B' 41*b* are identified using the identifiers ID1 and ID4, as part of the identifiers group 210*b*, and messages originated by the device 'C' 41*c* are identified using the identifiers ID2, ID5 and ID6, as part of the identifiers group 210*c*. In some cases, it may be required to cluster the different identifiers to the originating devices, such as by using the analyzer 120. The identifiers may be extracted from the received messages by a transceiver 43 and a controller 57, as exampled in the analyzer 120 in FIG. 12*a*.

Since all the messages sourced from a specific device are transmitted using the same transceiver, and since the topology and medium from the transmitting device to the analyzer 120 typically does not change over time, the messages from a specific device typically exhibit common or same characteristics that may be detected by the analyzer 120, and may be used for clustering the various identifiers that are originated by the same device. In the example shown in the arrangement 210 in FIG. 21, the messages from the device 'B' 41*b* are expected to share common characteristics when received by the analyzer 120*c* (or the analyzer 120*a*), since the same transceiver in the device 'B' 41*b* is used for the transmission of all the messages, and since the medium transfer function from the connector 13*b* to the analyzer 120*c* (or the analyzer 120*a*) is stationary during such transmissions.

Figure 21:
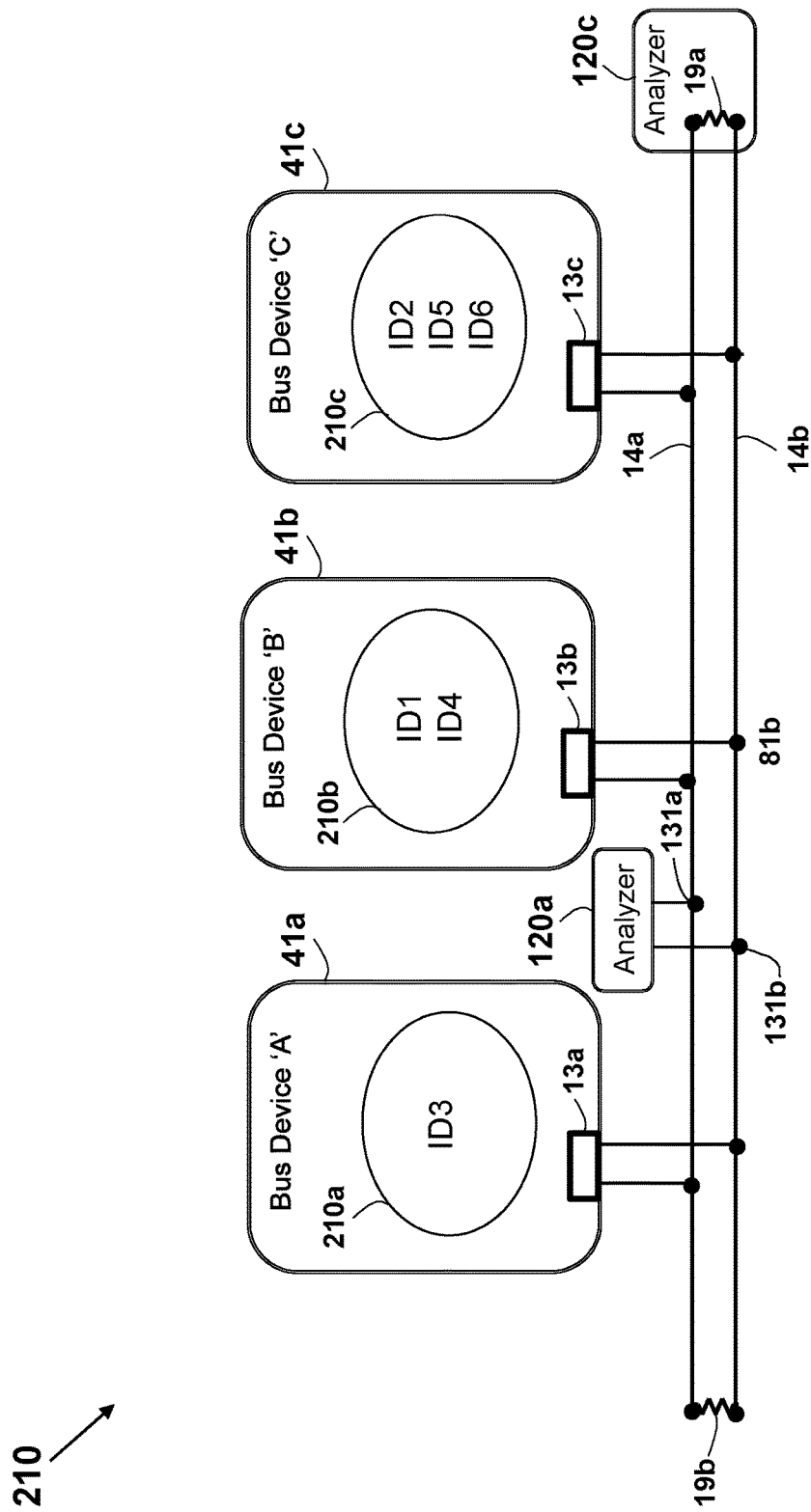
FIG. 21 illustrates schematically a block diagram of an automotive bus connecting multiple ECUs, where each ECU is associated with one or more identifiers.
Figure 22:
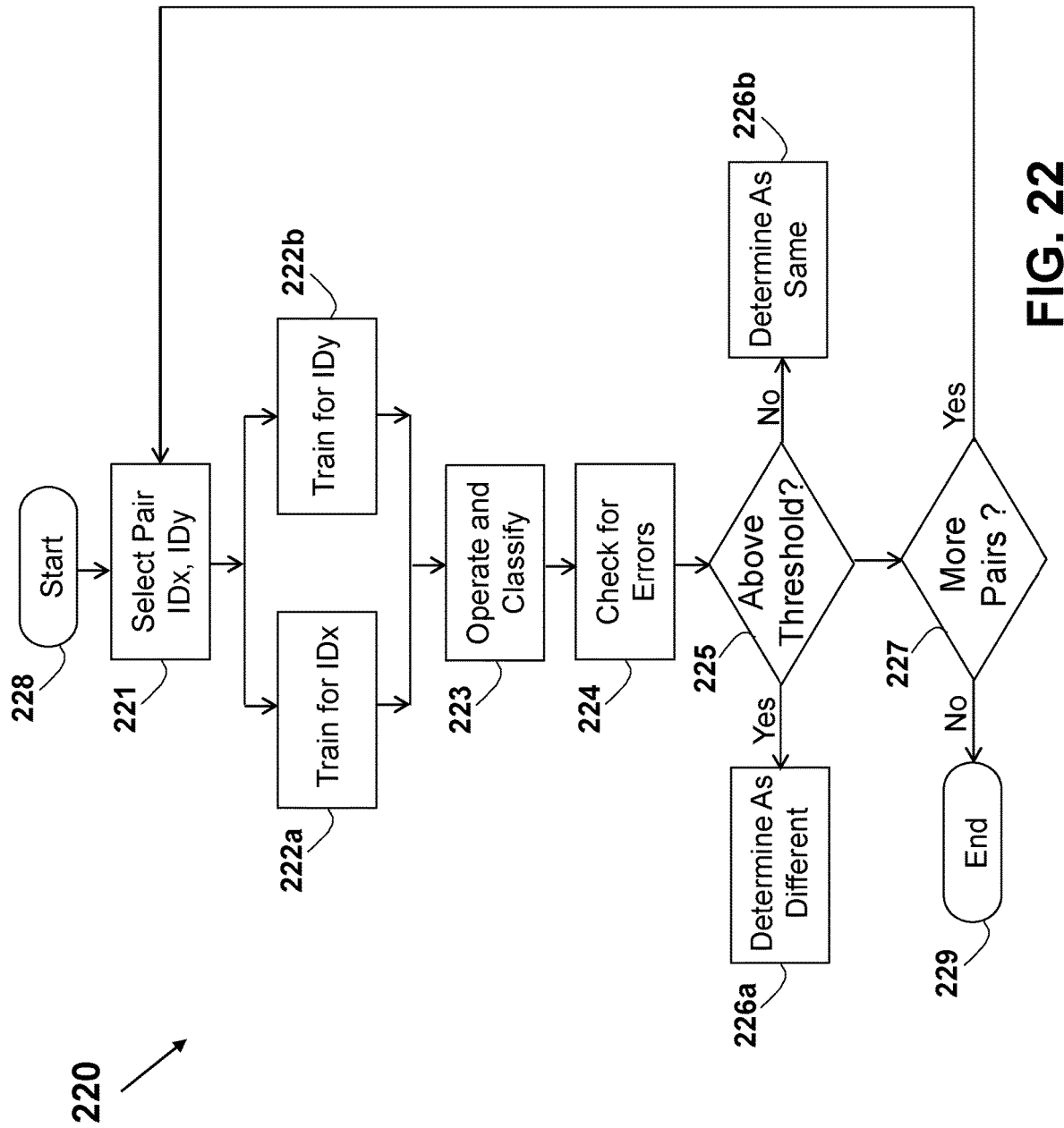
FIG. 22 illustrates schematically a simplified flowchart of an arrangement for clustering identifiers using an Artificial Neural Network (ANN)

An example of a flow chart 220 for using an analyzer for clustering identifiers to devices is shown in FIG. 22. The method may be stored in the memory 127 and executed by the processor 125 shown in the analyzer block diagram 120 shown in FIG. 12. The method is based on checking the similarity of characteristics of messages received that are associated with two different identifiers, using analysis by the ANN 70. After initiated as part of a "Start" step 228, the method begins with a "Select Pair IDx, IDy" step 221, where two identifiers, out of a known or an unknown set, are selected. The selection may be random, may be according to the numerical value of the identifiers, or may be according to the first messages received by the analyzer 120. For example, the selected identifiers as part of this step may be ID1 and ID2 of the arrangement 210 shown in FIG. 21. As part of a step "Train for IDx" step 222*a*, the waveforms of messages received by the analyzer 120 and are identified (e.g., by the controller 57 via the transceiver 43) to carry the identifier IDx are used for training the ANN 70 to classify these waveforms as a group 'A'. Similarly, as part of a step "Train for IDy" step 222*b*, the waveforms of messages received by the analyzer 120 and are identified (e.g., by the controller 57 via the transceiver 43) to carry the identifier IDy are used for training the ANN 70 to classify these waveforms as a different group 'B'. In the example of ID1 and ID2, the messages that are sourced by the device 'B' 41*b* carry the identifier ID1 and are classified as the group 'A', and the messages that are sourced by the device 'C' 41*c* carry the identifier ID2 and are classified as the group 'B'. At this point, it is not yet clear if the groups A and B represent the same device or different devices, and it is assumed that the corresponding devices are different. The training steps "Train for IDx" step 222*a* and "Train for IDy" step 222*b* may be performed concurrently or sequentially. Further, the training may be performed upon system initialization, as part of a diagnostic mode of the system, or as part of normal system operation.

After the training is completed, the analyzer 120 resumes a normal operation, and the waveforms of the received messages having IDx or IDy are respectively classified into the groups A and B, as part of an "Operate and Classify" step 223. The messages that are associated with identifier IDx are expected to be classified to group A, as trained, and the messages that are associated with identifier IDy are expected to be classified to group B, as trained. The statistics of classification failures is accumulated and calculated as part of a "Check for Errors" step 224. For example, the count of messages having ID1 or ID2 that are not respectively classified into the groups A and B is calculated versus the total number of received messages. For example, assuming 100 total messages (having identifiers of either ID1 or ID2) are received, and classification failures are found in 33 of them, where messages having identifier ID1 are classified to group B or messages having identifier ID2 are classified to A, the failure rate can be calculated as 33%, and the success rate can be calculated as 100%−33%=67%. A lower success rate suggests that the waveforms relating to different identifiers (such as ID1 and ID2) exhibit similar characteristics thus are more probable to originate from the device. In order to quantify the similarity and to determine that indeed the same device sourced the messages, the success rate may be compared with a maximum threshold as part of an "Above Threshold?" step 225. For example, a maximum value of 65% may be used, and success rate less than this threshold may be used to determine that the messages associated with the pair of IDs (such as ID1 and ID2 in the example) are originated from the same device, as part of a "Determine As Same" step 226*b*. A success rate above this threshold may be used to determine that the messages associated with the pair of IDs (such as ID1 and ID2 in the example) are originated from different devices, as part of a "Determine As Different" step 226*a*. In the example, since the messages associated with ID1 are originated by device 'B' 41*b* and the messages associated with ID2 are originated by device 'C' 41*c*, it is expected that the success rate will be above the threshold rendering the identifiers as originating from different devices as part of the "Determine As Different" step 226*a*. For example, the maximum threshold may be above 40%, 45%, 50%, 55%, 60%, 65%, 70%, 75%, 80%, 85%, 90%, or 95%. Alternatively or in addition, the maximum threshold may be below 45%, 50%, 55%, 60%, 65%, 70%, 75%, 80%, 85%, 90%, 95%, 96%, 97%, 98% or 99%.

In one example, all the possible identifier pairs are checked for success rate, for determining the clustering of the total system. In the case of N identifiers, a total of N*(N−1)/2 pairs need to be checked. In the example of the arrangement 210 where six identifiers are used, a total of 15 possible identifier pairs needs to be checked, namely the pairs (ID1, ID2), (ID1, ID3), (ID1, ID4), (ID1, ID5), (ID1, ID6), (ID2, ID3), (ID2, ID4), (ID2, ID5), (ID2, ID6), (ID3, ID4), (ID3, ID5), (ID3, ID6), (ID4, ID5), (ID4, ID6), and (ID5, ID6). As part of a "More Pairs?" step 227, it is checked weather all the possible pairs were checked. If all the possible pairs were checked, the method stops as part of an "End" step 229, and the clustering is assumed to be completed. If not all possible identifier pairs have been checked, a new pair is selected by repeating the "Select Pair IDx, IDy" step 221. In the above example, after checking the pair (ID1, ID2), the next selected pair may be (ID1, ID3) or any other pair from the possible fourteen named above.

An example of a table 230 summarizing the success rate results of a system having six identifiers, such as the arrangement 210 shown in FIG. 21, is shown in FIG. 23. Each of the rows, as shown in an upper row 231*a* in the table 230, relates to one of the identifiers. Similarly, each of the columns, as shown in a left column 231*b* in the table 230, relates to one of the identifiers as well. An example of the success rate of each of the possible identifier pairs is shown. For example, the success rate for the pair (ID1, ID3) is shown as 97%, and the success rate for the pair (ID3, ID4) is shown as 96%. In one example, a maximum threshold of 65% is used, as exampled in a table 230a shown in FIG. 23a, where success rates lower than 65% are circled. For such a threshold, the resulted clustering suggest that since the pair (ID1, ID4) results a success rate of 50% that is lower than the 65% threshold, messages associated with identifiers ID1 and ID4 are originated from the same device (device 'B' 41b) in the example. Similarly, since the pair (ID2, ID5) results a success rate of 60% that is lower than the 65% threshold, and since the pair (ID2, ID6) results a success rate of 55% that is lower than the 65% threshold, messages associated with identifiers ID2, ID5, and ID6 are originated from the same device (device 'C' 41c) in the example. Since ID3 is not paired with any other identifier with a success rate lower than the maximum threshold, it may be assumed that a single device (device 'A' 41a in the example) use this identifier ID3.

Alternatively or in addition, the number of identifier pairs to be checked may be reduced by using results of former pair. Once a pair is determined to be originated from the same device as part of the "Determine As Same" step 226b, the pair may be considered as a single identifier, reducing the number of possible pairs left to check. In the example above, the first pairs to be checked are (ID1, ID2), (ID1, ID3), (ID1, ID4), (ID1, ID5), and (ID1, ID6), having the intermediary results in a table 230b shown in FIG. 23b. Once determined that ID1 and ID4 are associated with the same originating device, the rest of the checks may use only ID1 or ID4, and there is no need to check, for example, both (ID1, ID5) and (ID4, ID5) pairs, since it is assumed that the same results will be obtained for both pairs. An example of a table 230c is shown in FIG. 23c, describing the pairs to be checked after combining ID1 and ID4. Similarly, identifiers ID2, ID5, and ID6 may be combined for later pair checks, further reducing the number of identifier pairs to be checked.

Any other algorithms, techniques, or schemes for clustering or for other data analysis may be used, as an alternative or as an addition to any step, steps or method described in the flow chart 220 shown in FIG. 22. For example, any other algorithms or schemes for clustering or for other data analysis described in a book edited by Charu C. Aggarwal and Chandan K. Reddy published 2014 by CRC Press—Taylor & Francis Group, LLC [ISBN-978-1-4665-5822-9] entitled: "*DATA CLUSTERING—Algorithms and Applications*", which is incorporated in its entirety for all purposes as if fully set forth herein.

The waveform used for the training as part of the 'Train for IDx' step 222a, 'Train for IDy' step 222b, and 'Operate and Classify' step 223 may be a whole of the received message (frame or packet), or may be any part thereof. Further, the analysis of the waveform as part of the 'Train for IDx' step 222a, 'Train for IDy' step 222b, and 'Operate and Classify' step 223 may be based on time-domain or a frequency domain analyzing of the digital samples of the waveform. Furthermore, the part of the waveform that is used for any training or for any classifying herein may be associated with a rising or falling edge transitioning from low to high levels, a positive or negative pulse between low and high levels, multiple pulses, or any combination thereof. Furthermore, the waveform used may comprise multiple consecutive or non-consecutive parts of the message. A frequency-domain analyzing of the digital samples of the waveform (or any part of parts thereof) may comprise forming frequency domain representation of the waveform, by forming the frequency domain representation by Fast Fourier Transformation (FFT). Alternatively or in addition, the analyzer method may further comprise forming frequency domain representation, by using two or more Band Pass Filters (BPFs) coupled between the connector, and each of the BPFs may be configure to pass a different frequency band, as described herein.

Any ANN herein may be based on, may use, or may be trained or used, using the schemes, arrangements, or techniques described in the book by David Kriesel entitled: "*A Brief Introduction to Neural Networks*" (ZETA2-EN) [downloaded May 2015 from www.dkriesel.com], in the book by Simon Haykin published 2009 by Pearson Education, Inc. [ISBN-978-0-13-147139-9] entitled: "*Neural Networks and Learning Machines—Third Edition*", in the article in Engineering Letters, 20:1, EL_20_1_09 (Advance online publication: 27 Feb. 2012) by Juan A. Ramirez-Quintana, Mario I. Cacon-Murguia, and F. Chacon-Hinojos entitled: "*Artificial Neural Image Processing Applications: A Survey*", or in the article entitled: "*Image processing with neural networks—a review*", and in the article by Dick de Ridder et al. (of the Utrecht University, Utrecht, The Netherlands) entitled: "*Nonlinear image processing using artificial neural networks*".

Any object detection herein using ANN may be based on, may use, or may be trained or used, using the schemes, arrangements, or techniques described in the article by Christian Szegedy, Alexander Toshev, and Dumitru Erhan (of Google, Inc.) entitled: "*Deep Neural Networks for Object Detection*", in the CVPR2014 paper provided by the Computer Vision Foundation entitled: "*Scalable Object Detection using Deep Neural Networks*", in the article by Shawn McCann and Jim Reesman entitled: "*Object Detection using Convolutional Neural Networks*", or in any other document mentioned herein.

Any object recognition or classification herein using ANN may be based on, may use, or may be trained or used, using the schemes, arrangements, or techniques described in the article by Mehdi Ebady Manaa, Nawfal Turki Obies, and Dr. Tawfiq A. Al-Assadi entitled: "*Object Classification using neural networks with Gray-level Co-occurrence Matrices (GLCM)*", in the technical report No. IDSIA-01-11 entitled: "*High-Performance Neural Networks for Visual Object Classification*", in the article by Yuhua Zheng et al. entitled: "*Object Recognition using Neural Networks with Bottom-Up and top-Down Pathways*", in the article by Karen Simonyan, Andrea Vedaldi, and Andrew Zisserman, entitled: "*Deep Inside Convolutional Networks: Visualising Image Classification Models and Saliency Maps*", or in any other document mentioned herein.

Any signal processing herein using ANN may be based on, may use, or may be trained or used, using the schemes, arrangements, or techniques described in the final technical report No. RL-TR-94-150 by Rome Laboratory, Air force Material Command, Griffiss Air Force Base, New York, entitled: "*NEURAL NETWORK COMMUNICATIONS SIGNAL PROCESSING*", or in any other document mentioned herein.

Any Artificial Neural Network (ANN) herein may be used to analyze or classify any part of, or whole of, the received signal waveform. The ANN may be a dynamic neural network, such as Feedforward Neural Network (FNN) or Recurrent Neural Network (RNN), and may comprise at least 3, 4, 5, 7, 10, 15, 20, 25, 30, 35, 40, 45, or 50 layers. Alternatively or in addition, the ANN may comprise less than 3, 4, 5, 7, 10, 15, 20, 25, 30, 35, 40, 45, or 50 layers.

Any wired network herein may be a Personal Area Network (PAN), any connector herein may be a PAN connector, and any transceiver herein may be a PAN transceiver. Alternatively or in addition, any network herein may be a Local Area Network (LAN) that may be Ethernet-based, ant connector herein may be a LAN connector, and any transceiver herein may be a LAN transceiver. The LAN may be according to, may be compatible with, or may be based on, IEEE 802.3-2008 standard. Alternatively or in addition, the LAN may be according to, may be compatible with, or may be based on, O1Base-T, 100Base-T, 100Base-TX, 100Base-T2, 100Base-T4, 1000Base-T, 1000Base-TX, 10GBase-CX4, or 10GBase-T; and the LAN connector may be an RJ-45 type connector. Alternatively or in addition, the LAN may be according to, may be compatible with, or may be based on, O1Base-FX, 100Base-SX, 100Base-BX, 100Base-LX10, 1000Base-CX, 1000Base-SX, 1000Base-LX, 1000Base-LX10, 1000Base-ZX, 1000Base-BX10, 10GBase-SR, 10GBase-LR, 10GBase-LRM, 10GBase-ER, 10GBase-ZR, or 10GBase-LX4, and the LAN connector may be a fiber-optic connector. Alternatively or in addition, any network herein may be a packet-based or switched-based Wide Area Network (WAN), any connector herein may be a WAN connector, and any transceiver herein may be a WAN transceiver. Alternatively or in addition, any network herein may be according to, may be compatible with, or may be based on, a Serial Peripheral Interface (SPI) bus or Inter-Integrated Circuit ($I^2C$) bus.

Any one of the apparatuses described herein, such as a device, module, or system, may be integrated or communicating with, or connected to, the vehicle self-diagnostics and reporting capability, commonly referred to as On-Board Diagnostics (OBD), to a Malfunction Indicator Light (MIL), or to any other vehicle network, sensors, or actuators that may provide the vehicle owner or a repair technician access to health or state information of the various vehicle sub-systems and to the various computers in the vehicle. Common OBD systems, such as the OBD-II and the EOBD (European On-Board Diagnostics), employ a diagnostic connector, allowing for access to a list of vehicle parameters, commonly including Diagnostic Trouble Codes (DTCs) and Parameters IDentification numbers (PIDs). The OBD-II is described in the presentation entitled: "*Introduction to On Board Diagnostics (II)*" downloaded on November 2012 from: http://groups.engin.umd.umich.edu/vi/w2_workshops/OBD_ganesan_w2.pdf, which is incorporated in its entirety for all purposes as if fully set forth herein. The diagnostic connector commonly includes pins that provide power for the scan tool from the vehicle battery, thus eliminating the need to connect a scan tool to a power source separately. The status and faults of the various sub-systems accessed via the diagnostic connector may include fuel and air metering, ignition system, misfire, auxiliary emission control, vehicle speed and idle control, transmission, and the on-board computer. The diagnostics system may provide access and information about the fuel level, relative throttle position, ambient air temperature, accelerator pedal position, air flow rate, fuel type, oxygen level, fuel rail pressure, engine oil temperature, fuel injection timing, engine torque, engine coolant temperature, intake air temperature, exhaust gas temperature, fuel pressure, injection pressure, turbocharger pressure, boost pressure, exhaust pressure, exhaust gas temperature, engine run time, NOx sensor, manifold surface temperature, and the Vehicle Identification Number (VIN). The OBD-II specifications defines the interface and the physical diagnostic connector to be according to the Society of Automotive Engineers (SAE) J1962 standard, the protocol may use SAE J1850 and may be based on, or may be compatible with, SAE J1939 Surface Vehicle Recommended Practice entitled: "*Recommended Practice for a Serial Control and Communication Vehicle Network*" or SAE J1939-01 Surface Vehicle Standard entitled: "*Recommended Practice for Control and Communication Network for On-Highway Equipment*", and the PIDs are defined in SAE International Surface Vehicle Standard J1979 entitled: "*E/E Diagnostic Test Modes*", which are all incorporated in their entirety for all purposes as if fully set forth herein. Vehicle diagnostics systems are also described in the International Organization for Standardization (ISO) 9141 standard entitled: "*Road vehicles—Diagnostic systems*", and the ISO 15765 standard entitled: "*Road vehicles—Diagnostics on Controller Area Networks (CAN)*", which are all incorporated in their entirety for all purposes as if fully set forth herein.

The physical layer of the in-vehicle network may be based on, compatible with, or according to, J1939-11 Surface Vehicle Recommended Practice entitled: "*Physical Layer, 250K bits/s, Twisted Shielded Pair*" or J1939-15 Surface Vehicle Recommended Practice entitled: "*Reduced Physical Layer, 250K bits/s, Un-Shielded Twisted Pair (UTP)*", the data link may be based on, compatible with, or according to, J1939-21 Surface Vehicle Recommended Practice entitled: "*Data Link Layer*", the network layer may be based on, compatible with, or according to, J1939-31 Surface Vehicle Recommended Practice entitled: "*Network Layer*", the network management may be based on, compatible with, or according to, J1939-81 Surface Vehicle Recommended Practice entitled: "*Network Management*", and the application layer may be based on, compatible with, or according to, J1939-71 Surface Vehicle Recommended Practice entitled: "*Vehicle Application Layer (through December 2004)*", J1939-73 Surface Vehicle Recommended Practice entitled: "*Application Layer—Diagnostics*", J1939-74 Surface Vehicle Recommended Practice entitled: "*Application—Configurable Messaging*", or J1939-75 Surface Vehicle Recommended Practice entitled: "*Application Layer—Generator Sets and Industrial*", which are all incorporated in their entirety for all purposes as if fully set forth herein.

Any wired network herein may be a Local Area Network (LAN) to provide a data communication connection to a compatible LAN. For example, Ethernet connection based on IEEE802.3 standard may be used, such as 10/100BaseT, 1000BaseT (gigabit Ethernet), 10 gigabit Ethernet (10GE or 10 GbE or 10 GigE per IEEE Std. 802.3ae-2002as standard), 40 Gigabit Ethernet (40 GbE), or 100 Gigabit Ethernet (100 GbE as per Ethernet standard IEEE P802.3ba). These technologies are described in Cisco Systems, Inc. Publication number 1-587005-001-3 (June 1999), "*Internetworking Technologies Handbook*", Chapter 7: "*Ethernet Technologies*", pages 7-1 to 7-38, which is incorporated in its entirety for all purposes as if fully set forth herein. In such a case, a LAN transceiver or a modem may be used, such as a Standard Microsystems Corporation (SMSC) LAN91C111 10/100 Ethernet transceiver, described in the Standard Microsystems Corporation (SMSC) data-sheet "*LAN91C111 10/100 Non-PCI Ethernet Single Chip MAC+PHY*" Data-Sheet, Rev. 15 (Feb. 20, 2004), which is incorporated in its entirety for all purposes as if fully set forth herein.

Wireless. Any embodiment herein may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Any wireless network or wireless connection herein may be operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards. Further, a network element (or a device) herein may consist of, be part of, or include, a cellular radio-telephone communication system, a cellular telephone, a wireless telephone, a Personal Communication Systems (PCS) device, a PDA device that incorporates a wireless communication device, or a mobile/portable Global Positioning System (GPS) device. Further, a wireless communication may be based on wireless technologies that are described in Chapter 20: "Wireless Technologies" of the publication number 1-587005-001-3 by Cisco Systems, Inc. (July 1999), entitled: "Internetworking Technologies Handbook", which is incorporated in its entirety for all purposes as if fully set forth herein. Wireless technologies and networks are further described in a book published 2005 by Pearson Education, Inc. William Stallings [ISBN: 0-13-191835-4] entitled: "Wireless Communications and Networks—second Edition", which is incorporated in its entirety for all purposes as if fully set forth herein.

Wireless networking typically employs an antenna (a.k.a. aerial), which is an electrical device that converts electric power into radio waves, and vice versa, connected to a wireless radio transceiver. In transmission, a radio transmitter supplies an electric current oscillating at radio frequency to the antenna terminals, and the antenna radiates the energy from the current as electromagnetic waves (radio waves). In reception, an antenna intercepts some of the power of an electromagnetic wave in order to produce a low voltage at its terminals that is applied to a receiver to be amplified. Typically an antenna consists of an arrangement of metallic conductors (elements), electrically connected (often through a transmission line) to the receiver or transmitter. An oscillating current of electrons forced through the antenna by a transmitter will create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming radio wave exert force on the electrons in the antenna elements, causing them to move back and forth, creating oscillating currents in the antenna. Antennas can be designed to transmit and receive radio waves in all horizontal directions equally (omnidirectional antennas), or preferentially in a particular direction (directional or high gain antennas). In the latter case, an antenna may also include additional elements or surfaces with no electrical connection to the transmitter or receiver, such as parasitic elements, parabolic reflectors or horns, which serve to direct the radio waves into a beam or other desired radiation pattern.

ZigBee. ZigBee is a standard for a suite of high-level communication protocols using small, low-power digital radios based on an IEEE 802 standard for Personal Area Network (PAN). Applications include wireless light switches, electrical meters with in-home displays, and other consumer and industrial equipment that require a short-range wireless transfer of data at relatively low rates. The technology defined by the ZigBee specification is intended to be simpler and less expensive than other WPANs, such as Bluetooth. ZigBee is targeted at Radio-Frequency (RF) applications that require a low data rate, long battery life, and secure networking. ZigBee has a defined rate of 250 kbps suited for periodic or intermittent data or a single signal transmission from a sensor or input device.

ZigBee builds upon the physical layer and medium access control defined in IEEE standard 802.15.4 (2003 version) for low-rate WPANs. The specification further discloses four main components: network layer, application layer, ZigBee Device Objects (ZDOs), and manufacturer-defined application objects, which allow for customization and favor total integration. The ZDOs are responsible for a number of tasks, which include keeping of device roles, management of requests to join a network, device discovery, and security. Because ZigBee nodes can go from a sleep to active mode in 30 ms or less, the latency can be low and devices can be responsive, particularly compared to Bluetooth wake-up delays, which are typically around three seconds. ZigBee nodes can sleep most of the time, thus an average power consumption can be lower, resulting in longer battery life.

There are three defined types of ZigBee devices: ZigBee Coordinator (ZC), ZigBee Router (ZR), and ZigBee End Device (ZED). ZigBee Coordinator (ZC) is the most capable device, forms the root of the network tree, and might bridge to other networks. There is exactly one defined ZigBee coordinator in each network, defined as the device that started the network originally. It is able to store information about the network, including acting as the Trust Center & repository for security keys. ZigBee Router (ZR) may be running an application function as well as may be acting as an intermediate router, passing on data from other devices. ZigBee End Device (ZED) contains functionality to talk to a parent node (either the coordinator or a router). This relationship allows the node to be asleep a significant amount of the time, thereby giving long battery life. A ZED requires the least amount of memory, and therefore can be less expensive to manufacture than a ZR or ZC.

The protocols build on recent algorithmic research (Ad-hoc On-demand Distance Vector, neuRFon) to automatically construct a low-speed ad-hoc network of nodes. In most large network instances, the network will be a cluster of clusters. It can also form a mesh or a single cluster. The current ZigBee protocols support beacon and non-beacon enabled networks. In non-beacon-enabled networks, an unslotted CSMA/CA channel access mechanism is used. In this type of network, ZigBee Routers typically have their receivers continuously active, requiring a more robust power supply. However, this allows for heterogeneous networks in which some devices receive continuously, while others only transmit when an external stimulus is detected.

In beacon-enabled networks, the special network nodes called ZigBee Routers transmit periodic beacons to confirm their presence to other network nodes. Nodes may sleep between the beacons, thus lowering their duty cycle and extending their battery life. Beacon intervals depend on the data rate; they may range from 15.36 milliseconds to 251.65824 seconds at 250 Kbit/s, from 24 milliseconds to 393.216 seconds at 40 Kbit/s, and from 48 milliseconds to 786.432 seconds at 20 Kbit/s. In general, the ZigBee protocols minimize the time the radio is on to reduce power consumption. In beaconing networks, nodes only need to be active while a beacon is being transmitted. In non-beacon-enabled networks, power consumption is decidedly asymmetrical: some devices are always active while others spend most of their time sleeping.

Except for the Smart Energy Profile 2.0, current ZigBee devices conform to the IEEE 802.15.4-2003 Low-Rate Wireless Personal Area Network (LR-WPAN) standard. The standard specifies the lower protocol layers—the PHYsical layer (PHY), and the Media Access Control (MAC) portion of the Data Link Layer (DLL). The basic channel access mode is "Carrier Sense, Multiple Access/Collision Avoidance" (CSMA/CA), that is, the nodes talk in the same way that people converse; they briefly check to see that no one is talking before they start. There are three notable exceptions to the use of CSMA. Beacons are sent on a fixed time schedule, and do not use CSMA. Message acknowledgments also do not use CSMA. Finally, devices in Beacon Oriented networks that have low latency real-time requirements may also use Guaranteed Time Slots (GTS), which by definition do not use CSMA.

Z-Wave. Z-Wave is a wireless communications protocol by the Z-Wave Alliance (http://www.z-wave.com) designed for home automation, specifically for remote control applications in residential and light commercial environments. The technology uses a low-power RF radio embedded or retrofitted into home electronics devices and systems, such as lighting, home access control, entertainment systems and household appliances. Z-Wave communicates using a low-power wireless technology designed specifically for remote control applications. Z-Wave operates in the sub-gigahertz frequency range, around 900 MHz. This band competes with some cordless telephones and other consumer electronics devices, but avoids interference with WiFi and other systems that operate on the crowded 2.4 GHz band. Z-Wave is designed to be easily embedded in consumer electronics products, including battery-operated devices such as remote controls, smoke alarms, and security sensors.

Z-Wave is a mesh networking technology where each node or device on the network is capable of sending and receiving control commands through walls or floors, and use intermediate nodes to route around household obstacles or radio dead spots that might occur in the home. Z-Wave devices can work individually or in groups, and can be programmed into scenes or events that trigger (either automatically or via remote control) multiple devices. The Z-wave radio specifications include bandwidth of 9,600 bit/s or 40 Kbit/s, fully interoperable, GFSK modulation, and a range of approximately 100 feet (or 30 meters) assuming "open air" conditions, with reduced range indoors depending on building materials, etc. The Z-Wave radio uses the 900 MHz ISM band: 908.42 MHz (United States); 868.42 MHz (Europe); 919.82 MHz (Hong Kong); and 921.42 MHz (Australia/New Zealand).

Z-Wave uses a source-routed mesh network topology and has one or more master controllers that control routing and security. The devices can communicate to another by using intermediate nodes to actively route around, and circumvent household obstacles or radio dead spots that might occur. A message from node A to node C can be successfully delivered even if the two nodes are not within range, providing that a third node B can communicate with nodes A and C. If the preferred route is unavailable, the message originator will attempt other routes until a path is found to the "C" node. Therefore, a Z-Wave network can span much farther than the radio range of a single unit; however, with several of these hops, a delay may be introduced between the control command and the desired result. In order for Z-Wave units to be able to route unsolicited messages, they cannot be in sleep mode. Therefore, most battery-operated devices are not designed as repeater units. A Z-Wave network can consist of up to 232 devices with the option of bridging networks if more devices are required.

WWAN. Any wireless network herein may be a Wireless Wide Area Network (WWAN) such as a wireless broadband network, and the WWAN port may be an antenna and the WWAN transceiver may be a wireless modem. The wireless network may be a satellite network, the antenna may be a satellite antenna, and the wireless modem may be a satellite modem. The wireless network may be a WiMAX network such as according to, compatible with, or based on, IEEE 802.16-2009, the antenna may be a WiMAX antenna, and the wireless modem may be a WiMAX modem. The wireless network may be a cellular telephone network, the antenna may be a cellular antenna, and the wireless modem may be a cellular modem. The cellular telephone network may be a Third Generation (3G) network, and may use UMTS W-CDMA, UMTS HSPA, UMTS TDD, CDMA2000 1xRTT, CDMA2000 EV-DO, or GSM EDGE-Evolution. The cellular telephone network may be a Fourth Generation (4G) network and may use or be compatible with HSPA+, Mobile WiMAX, LTE, LTE-Advanced, MBWA, or may be compatible with, or based on, IEEE 802.20-2008.

WLAN. Wireless Local Area Network (WLAN), is a popular wireless technology that makes use of the Industrial, Scientific and Medical (ISM) frequency spectrum. In the US, three of the bands within the ISM spectrum are the A band, 902-928 MHz, the B band, 2.4-2.484 GHz (a.k.a. 2.4 GHz), and the C band, 5.725-5.875 GHz (a.k.a. 5 GHz). Overlapping and/or similar bands are used in different regions such as Europe and Japan. In order to allow interoperability between equipment manufactured by different vendors, few WLAN standards have evolved, as part of the IEEE 802.11 standard group, branded as WiFi (www.wi-fi.org). IEEE 802.11b describes a communication using the 2.4 GHz frequency band and supporting communication rate of 11 Mb/s, IEEE 802.11a uses the 5 GHz frequency band to carry 54 MB/s and IEEE 802.11g uses the 2.4 GHz band to support 54 Mb/s. The WiFi technology is further described in a publication entitled: "*WiFi Technology*" by Telecom Regulatory Authority, published on July 2003, which is incorporated in its entirety for all purposes as if fully set forth herein. The IEEE 802 defines an ad-hoc connection between two or more devices without using a wireless access point: the devices communicate directly when in range. An ad hoc network offers peer-to-peer layout and is commonly used in situations such as a quick data exchange or a multiplayer LAN game, because the setup is easy and an access point is not required.

A node/client with a WLAN interface is commonly referred to as STA (Wireless Station/Wireless client). The STA functionality may be embedded as part of the data unit, or alternatively be a dedicated unit, referred to as bridge, coupled to the data unit. While STAs may communicate without any additional hardware (ad-hoc mode), such network usually involves Wireless Access Point (a.k.a. WAP or AP) as a mediation device. The WAP implements the Basic Stations Set (BSS) and/or ad-hoc mode based on Independent BSS (IBSS). STA, client, bridge and WAP will be collectively referred to hereon as WLAN unit. Bandwidth allocation for IEEE 802.11g wireless in the U.S. allows multiple communication sessions to take place simultaneously, where eleven overlapping channels are defined spaced 5 MHz apart, spanning from 2412 MHz as the center frequency for channel number 1, via channel 2 centered at 2417 MHz and 2457 MHz as the center frequency for channel number 10, up to channel 11 centered at 2462 MHz. Each channel bandwidth is 22 MHz, symmetrically (+/−11 MHz) located around the center frequency. In the transmission path, first the baseband signal (IF) is generated based on the data to be transmitted, using 256 QAM (Quadrature Amplitude Modulation) based OFDM (Orthogonal Frequency Division Multiplexing) modulation technique, resulting a 22 MHz (single channel wide) frequency band signal. The signal is then up converted to the 2.4 GHz (RF) and placed in the center frequency of required channel, and transmitted to the air via the antenna. Similarly, the receiving path comprises a received channel in the RF spectrum, down converted to the baseband (IF) wherein the data is then extracted.

In order to support multiple devices and using a permanent solution, a Wireless Access Point (WAP) is typically used. A Wireless Access Point (WAP, or Access Point—AP) is a device that allows wireless devices to connect to a wired network using Wi-Fi, or related standards. The WAP usually connects to a router (via a wired network) as a standalone device, but can also be an integral component of the router itself. Using Wireless Access Point (AP) allows users to add devices that access the network with little or no cables. A WAP normally connects directly to a wired Ethernet connection, and the AP then provides wireless connections using radio frequency links for other devices to utilize that wired connection. Most APs support the connection of multiple wireless devices to one wired connection. Wireless access typically involves special security considerations, since any device within a range of the WAP can attach to the network. The most common solution is wireless traffic encryption. Modern access points come with built-in encryption such as Wired Equivalent Privacy (WEP) and Wi-Fi Protected Access (WPA), typically used with a password or a passphrase. Authentication in general, and a WAP authentication in particular, is used as the basis for authorization, which determines whether a privilege may be granted to a particular user or process, privacy, which keeps information from becoming known to non-participants, and non-repudiation, which is the inability to deny having done something that was authorized to be done based on the authentication. An authentication in general, and a WAP authentication in particular, may use an authentication server that provides a network service that applications may use to authenticate the credentials, usually account names and passwords of their users. When a client submits a valid set of credentials, it receives a cryptographic ticket that it can subsequently be used to access various services. Authentication algorithms include passwords, Kerberos, and public key encryption.

Prior art technologies for data networking may be based on single carrier modulation techniques, such as AM (Amplitude Modulation), FM (Frequency Modulation), and PM (Phase Modulation), as well as bit encoding techniques such as QAM (Quadrature Amplitude Modulation) and QPSK (Quadrature Phase Shift Keying). Spread spectrum technologies, to include both DSSS (Direct Sequence Spread Spectrum) and FHSS (Frequency Hopping Spread Spectrum) are known in the art. Spread spectrum commonly employs Multi-Carrier Modulation (MCM) such as OFDM (Orthogonal Frequency Division Multiplexing). OFDM and other spread spectrum are commonly used in wireless communication systems, particularly in WLAN networks.

BAN. A wireless network may be a Body Area Network (BAN) according to, compatible with, or based on, IEEE 802.15.6 standard, and communicating devices may comprise a BAN interface that may include a BAN port and a BAN transceiver. The BAN may be a Wireless BAN (WBAN), and the BAN port may be an antenna and the BAN transceiver may be a WBAN modem.

Bluetooth. Bluetooth is a wireless technology standard for exchanging data over short distances (using short-wavelength UHF radio waves in the ISM band from 2.4 to 2.485 GHz) from fixed and mobile devices, and building personal area networks (PANs). It can connect several devices, overcoming problems of synchronization. A Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein. Any Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein.

Bluetooth operates at frequencies between 2402 and 2480 MHz, or 2400 and 2483.5 MHz including guard bands 2 MHz wide at the bottom end and 3.5 MHz wide at the top. This is in the globally unlicensed (but not unregulated) Industrial, Scientific and Medical (ISM) 2.4 GHz short-range radio frequency band. Bluetooth uses a radio technology called frequency-hopping spread spectrum. Bluetooth divides transmitted data into packets, and transmits each packet on one of 79 designated Bluetooth channels. Each channel has a bandwidth of 1 MHz. It usually performs 800 hops per second, with Adaptive Frequency-Hopping (AFH) enabled. Bluetooth low energy uses 2 MHz spacing, which accommodates 40 channels. Bluetooth is a packet-based protocol with a master-slave structure. One master may communicate with up to seven slaves in a piconet. All devices share the master's clock. Packet exchange is based on the basic clock, defined by the master, which ticks at 312.5 as intervals. Two clock ticks make up a slot of 625 as, and two slots make up a slot pair of 1250 as. In a simple case of single-slot packets, the master transmits in even slots and receives in odd slots. The slave, conversely, receives in even slots and transmits in odd slots. Packets may be 1, 3, or 5 slots long, but in all the cases the master's transmission begins in even slots and the slave's in odd slots.

A master Bluetooth device can communicate with a maximum of seven devices in a piconet (an ad-hoc computer network using Bluetooth technology), though not all devices reach this maximum. The devices can switch roles, by agreement, and the slave can become the master (for example, a headset initiating a connection to a phone necessarily begins as master—as initiator of the connection—but may subsequently operate as slave). The Bluetooth Core Specification provides for the connection of two or more piconets to form a scatternet, in which certain devices simultaneously play the master role in one piconet and the slave role in another. At any given time, data can be transferred between the master and one other device (except for the little-used broadcast mode). The master chooses which slave device to address; typically, it switches rapidly from one device to another in a round-robin fashion. Since it is the master that chooses which slave to address, whereas a slave is supposed to listen in each receive slot, being a master is a lighter burden than being a slave. Being a master of seven slaves is possible; being a slave of more than one master is difficult.

Bluetooth Low Energy. Bluetooth low energy (Bluetooth LE, BLE, marketed as Bluetooth Smart) is a wireless personal area network technology designed and marketed by the Bluetooth Special Interest Group (SIG) aimed at novel applications in the healthcare, fitness, beacons, security, and home entertainment industries. Compared to Classic Bluetooth, Bluetooth Smart is intended to provide considerably reduced power consumption and cost while maintaining a similar communication range. Bluetooth low energy is described in a Bluetooth SIG published Dec. 2, 2014 standard Covered Core Package version: 4.2, entitled: *"Master Table of Contents & Compliance Requirements—Specification Volume 0"*, and in an article published 2012 in Sensors [ISSN 1424-8220] by Carles Gomez et al. [Sensors 2012, 12, 11734-11753; doi:10.3390/s120211734] entitled: *"Overview and Evaluation of Bluetooth Low Energy: An Emerging Low-Power Wireless Technology"*, which are both incorporated in their entirety for all purposes as if fully set forth herein.

Bluetooth Smart technology operates in the same spectrum range (the 2.400 GHz-2.4835 GHz ISM band) as Classic Bluetooth technology, but uses a different set of channels. Instead of the Classic Bluetooth 79 1-MHz channels, Bluetooth Smart has 40 2-MHz channels. Within a channel, data is transmitted using Gaussian frequency shift modulation, similar to Classic Bluetooth's Basic Rate scheme. The bit rate is 1 Mbit/s, and the maximum transmit power is 10 mW. Bluetooth Smart uses frequency hopping to counteract narrowband interference problems. Classic Bluetooth also uses frequency hopping but the details are different; as a result, while both FCC and ETSI classify Bluetooth technology as an FHSS scheme, Bluetooth Smart is classified as a system using digital modulation techniques or a direct-sequence spread spectrum. All Bluetooth Smart devices use the Generic Attribute Profile (GATT). The application-programming interface offered by a Bluetooth Smart aware operating system will typically be based around GATT concepts.

NFC. Any wireless communication herein may be partly or in full in accordance with, compatible with, or based on, short-range communication such as Near Field Communication (NFC), having a theoretical working distance of 20 centimeters and a practical working distance of about 4 centimeters, and commonly used with mobile devices, such as smartphones. The NFC typically operates at 13.56 MHz as defined in ISO/IEC 18000-3 air interface, and at data-rates that range from 106 Kbit/s to 424 Kbit/s. NFC commonly involves an initiator and a target; the initiator actively generates an RF field that may power a passive target. NFC peer-to-peer communication is possible, provided both devices are powered.

The NFC typically supports passive and active modes of operation. In passive communication mode, the initiator device provides a carrier field and the target device answers by modulating the existing field, and the target device may draw its operating power from the initiator-provided electromagnetic field, thus making the target device a transponder. In active communication mode, both devices typically have power supplies, and both initiator and target devices communicate by alternately generating their own fields, where a device deactivates its RF field while it is waiting for data. NFC typically uses Amplitude-Shift Keying (ASK), and employs two different schemes to transfer data. At the data transfer rate of 106 Kbit/s, a modified Miller coding with 100% modulation is used, while in all other cases, Manchester coding is used with a modulation ratio of 10%.

The NFC communication may be partly or in full in accordance with, compatible with, or based on, NFC standards ISO/IEC 18092 or ECMA-340 entitled: "Near Field Communication Interface and Protocol-1 (NFCIP-1)", and ISO/IEC 21481 or ECMA-352 standards entitled: *"Near Field Communication Interface and Protocol-2 (NFCIP-2)"*. The NFC technology is described in ECMA International white paper Ecma/TC32-TG19/2005/012 entitled: *"Near Field Communication—White paper"*, in Rohde&Schwarz White Paper 1MA182_4e entitled: *"Near Field Communication (NFC) Technology and Measurements White Paper"*, and in Jan Kremer Consulting Services (JKCS) white paper entitled: *"NFC—Near Field Communication—White paper"*, which are all incorporated in their entirety for all purposes as if fully set forth herein.

Cellular. Cellular telephone network may be according to, compatible with, or may be based on, a Third Generation (3G) network that uses UMTS W-CDMA, UMTS HSPA, UMTS TDD, CDMA2000 1xRTT, CDMA2000 EV-DO, or GSM EDGE-Evolution. The cellular telephone network may be a Fourth Generation (4G) network that uses HSPA+, Mobile WiMAX, LTE, LTE-Advanced, MBWA, or may be based on or compatible with IEEE 802.20-2008.

Electronic circuits and components are described in a book by Wikipedia entitled: *"Electronics"* downloaded from en.wikibooks.org dated Mar. 15, 2015, and in a book authored by Owen Bishop entitled: *"Electronics—Circuits and Systems"* Fourth Edition, published 2011 by Elsevier Ltd. [ISBN-978-0-08-096634-2], which are both incorporated in its entirety for all purposes as if fully set forth herein The topology of any wired network herein may be based on, or may use, point-to-point, bus, star, ring or circular, mesh, tree, hybrid, or daisy chain topology. Any two nodes may be connected in a point-to-point topology, and any communication herein between two nodes may be unidirectional, half-duplex, or full-duplex. Any medium herein may comprise, or may consist of, an unbalanced line, and any signals herein may be carried over the medium employing single-ended signaling, that may be based on, may be according to, or may be compatible with, RS-232 or RS-423 standards. Alternatively or in addition, any medium herein may comprises, or may consist of, a balanced line, and any signals herein may be carried over the medium employing differential signaling, that may be based on, may be according to, or may be compatible with, RS-232 or RS-423 standards. Any communication over a medium herein may use serial or parallel transmission.

Any vehicle herein may be a ground vehicle adapted to travel on land, such as a bicycle, a car, a motorcycle, a train, an electric scooter, a subway, a train, a trolleybus, and a tram. Alternatively or in addition, the vehicle may be a buoyant or submerged watercraft adapted to travel on or in water, and the watercraft may be a ship, a boat, a hovercraft, a sailboat, a yacht, or a submarine. Alternatively or in addition, the vehicle may be an aircraft adapted to fly in air, and the aircraft may be a fixed wing or a rotorcraft aircraft, such as an airplane, a spacecraft, a glider, a drone, or an Unmanned Aerial Vehicle (UAV).

Any apparatus or device herein may be operative to connected to, coupled to, communicating with, an automotive electronics in a vehicle, or may be part of, or may be integrated with, an automotive electronics in a vehicle. An Electronic Control Unit (ECU) may comprise, or may be part of, any apparatus or device herein. Alternatively or in addition, any apparatus or device herein may consist of, may be part of, may be integrated with, may be connectable to, or may be couplable to, an Electronic Control Unit (ECU) in the vehicle, and the Electronic Control Unit (ECU) may be Electronic/engine Control Module (ECM), Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed Control Unit (SCU), Telematic Control Unit (TCU), Transmission Control Unit (TCU), Brake Control Module (BCM; ABS or ESC), Battery management system, control unit, or a control module. Alternatively or in addition, the Electronic Control Unit (ECU) may comprise, may use, may be based on, or may execute a software, an operating-system, or a middleware, that may comprise, may be based on, may be according to, or may use, OSEK/VDX, International Organization for Standardization (ISO) 17356-1, ISO 17356-2, ISO 17356-3, ISO 17356-4, ISO 17356-5, or AUTOSAR standard. Any software herein may comprise, may use, or may be based on, an operating-system or a middleware, that may comprise, may be based on, may be according to, or may use, OSEK/VDX, International Organization for Standardization (ISO) 17356-1, ISO 17356-2, ISO 17356-3, ISO 17356-4, ISO 17356-5, or AUTOSAR standard.

Any network herein may be a vehicle network, such as a vehicle bus or any other in-vehicle network. A connected element comprises a transceiver for transmitting to, and receiving from, the network. The physical connection typically involves a connector coupled to the transceiver. The vehicle bus may consist of, may comprise, may be compatible with, may be based on, or may use a Controller Area Network (CAN) protocol, specification, network, or system. The bus medium may consist of, or comprise, a single wire, or a two-wire such as an UTP or a STP. The vehicle bus may employ, may use, may be compatible with, or may be based on, a multi-master, serial protocol using acknowledgement, arbitration, and error-detection schemes, and may further use synchronous, frame-based protocol.

The network data link and physical layer signaling may be according to, compatible with, based on, or use, ISO 11898-1:2015. The medium access may be according to, compatible with, based on, or use, ISO 11898-2:2003. The vehicle bus communication may further be according to, compatible with, based on, or use, any one of, or all of, ISO 11898-3: 2006, ISO 11898-2:2004, ISO 11898-5:2007, ISO 11898-6: 2013, ISO 11992-1:2003, ISO 11783-2:2012, SAE J1939/ 11_201209, SAE J1939/15_201508, or SAE J2411_200002 standards. The CAN bus may consist of, may be according to, may be compatible with, may be based on, or may use, CAN with Flexible Data-Rate (CAN FD) protocol, specification, network, or system.

Alternatively or in addition, the vehicle bus may consist of, may comprise, may be based on, may be compatible with, or may use a Local Interconnect Network (LIN) protocol, network, or system, and may be according to, may be compatible with, may be based on, or may use any one of, or all of, ISO 9141-2:1994, ISO 9141:1989, ISO 17987-1, ISO 17987-2, ISO 17987-3, ISO 17987-4, ISO 17987-5, ISO 17987-6, or ISO 17987-7 standards. The battery power-lines or a single wire may serve as the network medium, and may use a serial protocol where a single master controls the network, while all other connected elements serve as slaves.

Alternatively or in addition, the vehicle bus may consist of, may comprise, be compatible with, may be based on, or may use a FlexRay protocol, specification, network or system, and may be according to, may be compatible with, may be based on, or may use any one of, or all of, ISO 17458-1:2013, ISO 17458-2:2013, ISO 17458-3:2013, ISO 17458-4:2013, or ISO 17458-5:2013 standards. The vehicle bus may support a nominal data rate of O1 Mb/s, and may support two independent redundant data channels, as well as independent clock for each connected element.

Alternatively or in addition, any vehicle bus herein may consist of, may comprise, or may be based on, an avionics data bus standard, such as Aircraft Data Network (ADN), Avionics Full-Duplex Switched Ethernet (AFDX), Aeronautical Radio INC. (ARINC) 664, ARINC 629, ARINC 708, ARINC 717, ARINC 825, MIL-STD-1553, MIL-STD-1760, or Time-Triggered Protocol (TTP).

Alternatively or in addition, the vehicle bus may consist of, comprise, be compatible with, may be based on, or may use a Media Oriented Systems Transport (MOST) protocol, network or system, and may be according to, may be compatible with, may be based on, or may use any one of, or all of, MOST25, MOST50, or MOST150. The vehicle bus may employ a ring topology, where one connected element may be the timing master that continuously transmits frames where each comprises a preamble used for synchronization of the other connected elements. The vehicle bus may support both synchronous streaming data as well as asynchronous data transfer. The network medium may be wires (such as UTP or STP), or may be an optical medium such as Plastic Optical Fibers (POF) connected via an optical connector. In one example, the vehicle bus may consists of, comprises, or may be based on, automotive Ethernet, may use only a single twisted pair, and may consist of, employ, use, may be based on, or may be compatible with, IEEE802.3 100BaseT1, IEEE802.3 1000BaseT1, BroadR-Reach®, or IEEE 802.3bw-2015 standard.

The method and steps described herein may be used for detecting malware such as a firmware virus, a computer virus, spyware, DoS (Denial of Service), rootkit, ransomware, adware, backdoor, Trojan horse, or a destructive malware. Further, by stopping a malware related message from passing through the system (such as to, or from, a peripheral), a damage that may be caused by the malware is avoided.

Electronic circuits and components are described in a book by Wikipedia entitled: "*Electronics*" downloaded from en.wikibooks.org dated Mar. 15, 2015, and in a book authored by Owen Bishop entitled: "*Electronics—Circuits and Systems*" Fourth Edition, published 2011 by Elsevier Ltd. [ISBN-978-0-08-096634-2], which are both incorporated in their entirety for all purposes as if fully set forth herein.

The term 'message' is used herein to include any type of information or one or more datagram, handled as a single, as a set or as a group of datagrams. The datagram may be a packet or a frame, or any other type of group of data bytes (or bits) which represent an information unit.

In the case where dedicated PCB is used, the electrical connection may use an edge connector, relating to the portion of a printed circuit board (PCB) consisting of traces leading to the edge of the board that are intended to plug into a matching socket. Such connectors are used in computers for expansion slots for peripheral cards, such as PCI, PCI Express, and AGP cards. Edge connector sockets consist of a plastic "box" open on one side, with pins on one or both side(s) of the longer edges, sprung to push into the middle of the open center. Connectors are often keyed to ensure the correct polarity, and may contain bumps or notches both for polarity, and to ensure that the wrong type of device is not inserted. The socket width is chosen to fit to the thickness of the connecting PCB.

Any part of, or the whole of, any of the methods described herein may be provided as part of, or used as, an Application Programming Interface (API), defined as an intermediary software serving as the interface allowing the interaction and data sharing between an application software and the application platform, across which few or all services are provided, and commonly used to expose or use a specific software functionality, while protecting the rest of the application. The API may be based on, or according to, Portable Operating System Interface (POSIX) standard, defining the API along with command line shells and utility interfaces for software compatibility with variants of Unix and other operating systems, such as POSIX.1-2008 that is simultaneously IEEE STD. 1003.1™-2008 entitled: "*Standard for Information Technology—Portable Operating System Interface (POSIX(R))* Description", and The Open Group Technical Standard Base Specifications, Issue 7, IEEE STD. 1003.1™, 2013 Edition.

Any part of, or whole of, any of the methods described herein may be implemented by a processor such as processor 125, and may further be used in conjunction with various devices and systems, for example a device may be a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, or a non-mobile or non-portable device.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, such as, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

Any device herein, such as the analyzer device 120, may be integrated with a part of or in an entire appliance. The primary function of the appliance may be associated with food storage, handling, or preparation, such as microwave oven, an electric mixer, a stove, an oven, or an induction cooker for heating food, or the appliance may be a refrigerator, a freezer, a food processor, a dishwasher, a food blender, a beverage maker, a coffee-maker, or an iced-tea maker. Alternatively or in addition, the primary function of the appliance may be associated with an environmental control such as temperature control, and the appliance may consist of, or may be part of, an HVAC system, an air conditioner or a heater. Alternatively or in addition, the primary function of the appliance may be associated with a cleaning action, such as a washing machine, a clothes dryer for cleaning clothes, or a vacuum cleaner. Alternatively or in addition, the primary function of the appliance may be associated with water control or water heating. The appliance may be an answering machine, a telephone set, a home cinema system, a HiFi system, a CD or DVD player, an electric furnace, a trash compactor, a smoke detector, a light fixture, or a dehumidifier. The appliance may be a handheld computing device or a battery-operated portable electronic device, such as a notebook or laptop computer, a media player, a cellular phone, a Personal Digital Assistant (PDA), an image processing device, a digital camera, or a video recorder. The integration with the appliance may involve sharing a component such as housing in the same enclosure, sharing the same connector such as sharing a power connector for connecting to a power source, where the integration involves sharing the same connector for being powered from the same power source. The integration with the appliance may involve sharing the same power supply, sharing the same processor, or mounting onto the same surface.

The steps described herein may be sequential, and performed in the described order. For example, in a case where a step is performed in response to another step, or upon completion of another step, the steps are executed one after the other. However, in the case where two or more steps are not explicitly described as being sequentially executed, these steps may be executed in any order or may be simultaneously performed. Two or more steps may be executed by two different network elements, or in the same network element, and may be executed in parallel using multiprocessing or multitasking.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions cause the processor to perform the one or more of the methods or steps described herein. Any of the disclosed flow charts or methods, or any step thereof, may be implemented in the form of software stored on a memory or a computer-readable non-transitory information storage medium such as an optical or magnetic disk, a non-volatile memory (e.g., Flash or ROM), RAM, and other forms of volatile memory. The information storage medium may be an internal part of the computer, a removable external element coupled to the computer, or unit that is remotely accessible via a wired or wireless network.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Throughout the description and claims of this specification, the word "couple", and variations of that word such as "coupling", "coupled", and "couplable", refer to an electrical connection (such as a copper wire or soldered connection), a logical connection (such as through logical devices of a semiconductor device), a virtual connection (such as through randomly assigned memory locations of a memory device) or any other suitable direct or indirect connections (including combination or series of connections), for example for allowing the transfer of power, signal, or data, as well as connections formed through intervening devices or elements.

The arrangements and methods described herein may be implemented using hardware, software or a combination of both. The term "integration" or "software integration" or any other reference to the integration of two programs or processes herein refers to software components (e.g., programs, modules, functions, processes etc.) that are (directly or via another component) combined, working or functioning together or form a whole, commonly for sharing a common purpose or set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "integration" or "hardware integration" or integration of hardware components herein refers to hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled by the same software or hardware. The term "integration" herein refers (as applicable) to a software integration, hardware integration, or any combination thereof.

Any network herein may be frame or packet based. Any networking protocol may be utilized for exchanging information between the network elements (e.g., clients, and servers) within the network (such as the Internet). For example, it is contemplated that communications can be performed using TCP/IP. Generally, HTTP and HTTPS are utilized on top of TCP/IP as the message transport envelope. These two protocols can deal with firewall technology better than other message management techniques. However, partners may choose to use a message-queuing system instead of HTTP and HTTPS if greater communications reliability is needed. A non-limiting example of a message queuing system is IBM's MQ-Series or the Microsoft Message Queue (MSMQ). The system described herein is suited for both HTTP/HTTPS, message-queuing systems, and other communications transport protocol technologies. Furthermore, depending on the differing business and technical requirements of the various partners within the network, the physical network may embrace and utilize multiple communication protocol technologies.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein.

Any device or network element herein may comprise, consists of, or include a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or a non-portable device. Further, any device or network element herein may comprise, consist of, or include a major appliance (white goods) and may be an air conditioner, dishwasher, clothes dryer, drying cabinet, freezer, refrigerator, kitchen stove, water heater, washing machine, trash compactor, microwave oven and induction cooker. The appliance may similarly be a 'small' appliance such as TV set, CD or DVD player, camcorder, still camera, clock, alarm clock, video game console, HiFi or home cinema, telephone or answering machine.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

As used herein, the term "Integrated Circuit" (IC) shall include any type of integrated device of any function where the electronic circuit is manufactured by the patterned diffusion of trace elements into the surface of a thin substrate of semiconductor material (e.g., Silicon), whether single or multiple die, or small or large scale of integration, and irrespective of process or base materials (including, without limitation Si, SiGe, CMOS and GAs) including without limitation applications specific integrated circuits (ASICs), field programmable gate arrays (FPGAs), digital processors (e.g., DSPs, CISC microprocessors, or RISC processors), so-called "system-on-a-chip" (SoC) devices, memory (e.g., DRAM, SRAM, flash memory, ROM), mixed-signal devices, and analog ICs. The circuits in an IC are typically contained in a silicon piece or in a semiconductor wafer, and commonly packaged as a unit. The solid-state circuits commonly include interconnected active and passive devices, diffused into a single silicon chip. Integrated circuits can be classified into analog, digital and mixed signal (both analog and digital on the same chip). Digital integrated circuits commonly contain many of logic gates, flip-flops, multiplexers, and other circuits in a few square millimeters. The small size of these circuits allows high speed, low power dissipation, and reduced manufacturing cost compared with board-level integration. Further, a multi-chip module (MCM) may be used, where multiple integrated circuits (ICs), the semiconductor dies, or other discrete components are packaged onto a unifying substrate, facilitating their use as a single component (as though a larger IC).

The term "computer" is used generically herein to describe any number of computers, including, but not limited to personal computers, embedded processing elements and systems, control logic, ASICs, chips, workstations, mainframes, etc. Any computer herein may consist of, or be part of, a handheld computer, including any portable computer, which is small enough to be held and operated while holding in one hand, or fit into a pocket. Such a device, also referred to as a mobile device, typically has a display screen with a touch input and/or a miniature keyboard. Non-limiting examples of such devices include Digital Still Camera (DSC), Digital video Camera (DVC or digital camcorder), Personal Digital Assistant (PDA), and mobile phones and Smartphones.

The mobile devices may combine video, audio and advanced communications capabilities, such as PAN and WLAN. A mobile phone (also known as a cellular phone, cell phone and a hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS, email, Internet access, short-range wireless communications (infrared, Bluetooth), business applications, gaming and photography.

As used herein, the terms "program", "programmable", and "computer program" are meant to include any sequence or human or machine cognizable steps that perform a function. Such programs are not inherently related to any particular computer or other apparatus, and may be rendered in virtually any programming language or environment including, for example, C/C++, Fortran, COBOL, PASCAL, assembly language, markup languages (e.g., HTML, SGML, XML, VoXML), and the likes, as well as object-oriented environments such as the Common Object Request Broker Architecture (CORBA), Java™ (including J2ME, Java Beans, etc.) and the like, as well as in firmware or other implementations. Generally, program modules include routines, programs, objects, components, data structures, etc., that performs particular tasks or implement particular abstract data types.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value—the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments of the invention are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. The invention may also be practiced in distributed computing environments where tasks are performed by remote processing devices that are linked through a communications network. In a distributed computing environment, program modules may be located in both local and remote memory storage devices.

Any wired network herein may be based on a LAN communication, such as Ethernet, and may be partly or in full in accordance with the IEEE802.3 standard. For example, Gigabit Ethernet (GbE or 1 GigE) may be used, describing various technologies for transmitting Ethernet frames at a rate of a gigabit per second (1,000,000,000 bits per second), as defined by the IEEE 802.3-2008 standard. There are five physical layer standards for gigabit Ethernet using optical fiber (1000BASE-X), twisted pair cable (1000BASE-T), or balanced copper cable (1000BASE-CX). The IEEE 802.3z standard includes 1000BASE-SX for transmission over multi-mode fiber, 1000BASE-LX for transmission over single-mode fiber, and the nearly obsolete 1000BASE-CX for transmission over balanced copper cabling. These standards use 8b/10b encoding, which inflates the line rate by 25%, from 1000 Mbit/s to 1250 Mbit/s, to ensure a DC balanced signal.

The symbols are then sent using NRZ. The IEEE 802.3ab, which defines the widely used 1000BASE-T interface type, uses a different encoding scheme in order to keep the symbol rate as low as possible, allowing transmission over twisted pair. Similarly, The 10 gigabit Ethernet (10GE or 10 GbE or 10 GigE may be used, which is a version of Ethernet with a nominal data rate of 10 Gbit/s (billion bits per second), ten times faster than gigabit Ethernet. The 10 Gigabit Ethernet standard only defines full duplex point-to-point links that are generally connected by network switches. The 10 Gigabit Ethernet standard encompasses a number of different physical layers (PHY) standards. A networking device may support different PHY types through pluggable PHY modules, such as those based on SFP+.

As used herein, the terms "network", "communication link" and "communications mechanism" are used generically to describe one or more networks, communications media or communications systems, including, but not limited to, the Internet, private or public telephone, cellular, wireless, satellite, cable, data networks. Data networks include, but not limited to, Metropolitan Area Networks (MANs), Wide Area Networks (WANs), Local Area Networks (LANs), Personal Area networks (PANs), WLANs (Wireless LANs), Internet, internets, NGN, intranets, Hybrid Fiber Coax (HFC) networks, satellite networks, and Telco networks. Communication media include, but not limited to, a cable, an electrical connection, a bus, and internal communications mechanisms such as message passing, interprocess communications, and shared memory. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.). While exampled herein with regard to secured communication between a pair of network endpoint devices (host-to-host), the described method can equally be used to protect the data flow between a pair of gateways or any other networking-associated devices (network-to-network), or between a network device (e.g., security gateway) and a host (network-to-host).

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive, or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

The invention claimed is:

1. An analyzer apparatus for use with a frame-based or packet-based wired network using a medium that comprises two conductors that carry a waveform of part of a frame or a packet, and for use with multiple devices that are connected to, and communicate with each other over, the medium, where each of the multiple devices is associated with a respective waveform-related criterion, the analyzer apparatus comprising:
   a connector for connecting to the medium for receiving the waveform transmitted to the medium by a transmitting device that is one of the multiple devices;
   an Analog-to-Digital (A/D) converter coupled to the connector for producing digital samples of the waveform that is part of the received frame or packet;
   a first memory coupled to the A/D converter for storing the digital samples;
   a second memory for storing the multiple waveform-related criterions associated with the multiple devices;
   a software and a processor for executing the software, the processor coupled to the first memory for analyzing the stored digital samples and to the second memory for fetching at least one of the criterions;
   an audible annunciator coupled to the processor and comprises an audible signaling component; and
   an enclosure housing the connector, the A/D converter, the first and second memories, and the processor, wherein the analyzer apparatus is operative for checking the digital samples of the received waveform according to a waveform-related criterion associated with the transmitting device from the multiple waveform-related criterions, and acting in response to the waveform not satisfying the checked criterion, and wherein the acting comprises emitting a sound by the audible signaling component.

2. The analyzer apparatus according to claim 1, wherein at least one criterion of the multiple criterions is configured so that the criterion is not satisfied in case of a changing of, or connecting to, the medium.

3. The analyzer apparatus according to claim 2, wherein at least one criterion of the multiple criterions is configured so that the criterion is not satisfied in case of a connecting an additional device to the medium.

4. The analyzer apparatus according to claim 3, wherein the additional device is operative to communicate with at least one the multiple devices over the medium.

5. The analyzer apparatus according to claim 1, wherein at least one criterion of the multiple criterions is configured so that the criterion is not satisfied in case of a change in the device that is associated with the at least one criterion.

6. The analyzer apparatus according to claim 5, wherein at least one criterion of the multiple criterions is configured so that the criterion is not satisfied in case of substituting of a line driver or a transceiver in the device that is associated with the at least one criterion.

7. The analyzer apparatus according to claim 5, wherein at least one criterion of the multiple criterions is configured so that the criterion is not satisfied in case of substituting the device that is associated with the at least one criterion.

8. The analyzer apparatus according to claim 1, further comprising a transceiver coupled between the connector and the processor for transmitting frames or packet to, and for receiving frames or packets from, one or more of the multiple devices over the medium, and wherein the waveform is formed from samples of a signal carried differentially over the two conductors, or from samples of a signal carried between one of the two conductors and the ground.

9. The analyzer apparatus according to claim 8, further comprising a controller for layer 2 or layer 3 handling of the received frame of packet.

10. The analyzer apparatus according to claim 9, wherein each one of the multiple devices is associated with a digital address for uniquely being identified in the wired network, and the analyzer apparatus is further operative to identify the digital address of the transmitting device.

11. The analyzer apparatus according to claim 10, wherein the digital address is extracted from the received frame or packet.

12. The analyzer apparatus according to claim 10, wherein the criterion used for the checking is based on, or is according to, the identified digital address.

13. The analyzer apparatus according to claim 1, wherein the received frame or packet is associated with a maximum component frequency of the respective signal, and the sampling rate of the A/D converter is higher than twice the maximum component frequency.

14. The analyzer apparatus according to claim 1, further comprising an impedance or a resistor connected to the connector for at least partially terminating a signal propagating over the medium.

15. The analyzer apparatus according to claim 14, wherein the value of the impedance or resistor is equal to, or is based on, the characteristic impedance of the medium.

16. The analyzer apparatus according to claim 1, further operative to receive multiple frames or packets, and wherein the analyzer apparatus is operative for checking the waveform of the multiple frames or packets received.

17. The analyzer apparatus according to claim 1, further operative to detect a malware or a malware activity, wherein the malware consists of, includes, or is based on, a computer virus, spyware, DoS (Denial of Service), rootkit, ransomware, adware, backdoor, Trojan horse, or a destructive malware.

18. The analyzer apparatus according to claim 1, wherein the checking of the waveform according to the criterion comprises a time-domain or a frequency domain analyzing of the digital samples of the waveform for measuring a value of a parameter or a characteristic.

19. The analyzer apparatus according to claim 18, wherein the parameter or characteristic measured is based on, or according to, the identity of the transmitting device.

20. The analyzer apparatus according to claim 18, for use with a threshold, wherein the criterion checking comprises comparing the measured value to the threshold.

21. The analyzer apparatus according to claim 20, wherein the threshold is based on, or according to, the identity of the transmitting device.

22. The analyzer apparatus according to claim 20, for use with a maximum threshold, wherein the criterion is satisfied when the measured value is lower than the maximum threshold.

23. The analyzer apparatus according to claim 20, for use with a minimum threshold, wherein the criterion is satisfied when the measured value is higher than the minimum threshold.

24. The analyzer apparatus according to claim 18, wherein the checking of the waveform according to the criterion comprises comparing the time-dependent waveform digital samples to a respective time-dependent threshold.

25. The analyzer apparatus according to claim 24, for use with a mask template that comprises a time-dependent minimum and maximum thresholds, and wherein the criterion is satisfied in response to comparing the time-dependent digital samples to the mask.

26. The analyzer apparatus according to claim 18, for use with a threshold, wherein the checking of the waveform according to the criterion comprises measuring two values of two parameters or a characteristics for calculate a total value in response to the measured values, wherein the criterion is satisfied in response to the comparison to the calculated total value to the threshold.

27. The analyzer apparatus according to claim 26, wherein the total value is calculated according to the difference or the ratio of the two measured values.

28. The analyzer apparatus according to claim 18, wherein the measured value comprises an amplitude of one of the samples.

29. The analyzer apparatus according to claim 28, wherein the measured value comprises the global or local minimum or maximum amplitude value of the digital samples.

30. The analyzer apparatus according to claim 18, wherein the measured value comprises an energy in the waveform.

31. The analyzer apparatus according to claim 18, wherein the measured value comprises a time point or a time interval associated with one or more of the digital samples.

32. The analyzer apparatus according to claim 31, wherein the measured value comprises a time point or a time interval associated with a defined value, global or local minimum, or global or local maximum, of an amplitude of the digital samples.

33. The analyzer apparatus according to claim 18, wherein the waveform comprises a rising or falling edge transitioning from low to high levels.

34. The analyzer apparatus according to claim 33, wherein the parameter or characteristic comprises the amplitude of the low or high level, the peak amplitude value, the overshoot or undershoot amplitude value, or the ringback amplitude value.

35. The analyzer apparatus according to claim 33, wherein the parameter or characteristic comprises a respective rise or fall time or settling time.

36. The analyzer apparatus according to claim 18, wherein the waveform comprises a positive or negative pulse between low and high levels.

37. The analyzer apparatus according to claim 36, wherein the parameter or characteristic comprises the amplitude of the low or high level or the amplitude of a peak value.

38. The analyzer apparatus according to claim 36, wherein the parameter or characteristic comprises a pulse duration.

39. The analyzer apparatus according to claim 18, wherein the parameter or characteristic comprises a pulse duration or a respective an interframe or inter-packet gap.

40. The analyzer apparatus according to claim 18, wherein the parameter or characteristic comprises a clock rate extracted from the respective frame or packet.

41. The analyzer apparatus according to claim 18, wherein the parameter or characteristic comprises the recovered clock rate extracted from respective frame or packet.

42. The analyzer apparatus according to claim 41, further comprising a Phase Lock Loop (PLL) coupled to the connector and to the processor for recovering and measuring the clock rate of the respective frame or packet.

43. The analyzer apparatus according to claim 1, wherein the checking of the waveform according to the criterion comprises frequency-domain analyzing of the digital samples of the waveform for measuring a value of a parameter or a characteristics.

44. The analyzer apparatus according to claim 43, wherein the checking of the waveform according to the criterion comprises forming frequency domain representation of the waveform.

45. The analyzer apparatus according to claim 44, further operative for Fast Fourier Transformation (FFT) for forming the frequency domain representation.

46. The analyzer apparatus according to claim 44, further comprising two or more Band Pass Filters (BPFs) coupled between the connector and the processor for forming frequency domain representation, wherein each of the BPFs is configure to pass a different frequency band.

47. The analyzer apparatus according to claim 44, wherein the measured value comprises a spectral power density value of a frequency points.

48. The analyzer apparatus according to claim 47, wherein the measured value comprises the global or local minimum or maximum spectral power density.

49. The analyzer apparatus according to claim 44, wherein the measured value comprises the frequency point associated with a spectral power density value.

50. The analyzer apparatus according to claim 49, wherein the measured value comprises the frequency point associated with a local or global, of a minimum or maximum spectral power density.

51. The analyzer apparatus according to claim 1, wherein the checking of the waveform according to the criterion comprises using an Artificial Neural Network (ANN) for analyzing or classifying the waveform.

52. The analyzer apparatus according to claim 51, wherein the criterion is satisfied according to the value of one of the ANN outputs.

53. The analyzer apparatus according to claim 52, wherein the ANN is trained to classify the transmitting device out of the multiple devices according to the waveform.

54. The analyzer apparatus according to claim 51, wherein the ANN comprises multiple outputs, and wherein each output is classifying one of the multiple devices.

55. The analyzer apparatus according to claim 54, wherein the checking of the waveform according to the criterion comprises comparing the identity of the transmitting device with the corresponding ANN output.

56. The analyzer apparatus according to claim 51, wherein the ANN is a Feedforward Neural Network (FNN).

57. The analyzer apparatus according to claim 51, wherein the ANN is a Recurrent Neural Network (RNN) or a deep convolutional neural network.

58. The analyzer apparatus according to claim 51, wherein the ANN comprises at least 3, 4, 5, 7, 10, 15, 20, 25, 30, 35, 40, 45, or 50 layers.

59. The analyzer apparatus according to claim 51, wherein the ANN comprises less than 4, 5, 7, 10, 15, 20, 25, 30, 35, 40, 45, or 50 layers.

60. The analyzer apparatus according to claim 1, further comprising an annunciator coupled to the processor, and wherein the acting comprises notifying a human user using auditory, visual, or haptic stimuli.

61. The analyzer apparatus according to claim 1, wherein the audible signaling component comprises electromechanical or piezoelectric sounder.

62. The analyzer apparatus according to claim 1, wherein the audible signaling component comprises a buzzer, a chime or a ringer.

63. The analyzer apparatus according to claim 1, wherein the audible signaling component comprises a loudspeaker and the device further comprising a digital to analog converter coupled to the loudspeaker.

64. The analyzer apparatus according to claim 1, wherein the audible signaling component is operative to generate a single tone or multiple tones.

65. The analyzer apparatus according to claim 1, wherein the sound emitted from the audible signaling component is a human voice talking.

66. The analyzer apparatus according to claim 65, wherein the sound is a syllable, a word, a phrase, a sentence, a short story or a long story.

67. The analyzer apparatus according to claim 60, wherein the annunciator consists of, uses, or comprises, a visual annunciator comprising a visual signaling component.

68. The analyzer apparatus according to claim 67, wherein the visual signaling component is a visible light emitter.

69. The analyzer apparatus according to claim 67, wherein the visible light emitter is a semiconductor device, an incandescent lamp or fluorescent lamp.

70. The analyzer apparatus according to claim 60, wherein the annunciator consists of, uses, or comprises, a vibrator for providing a haptic or tactile stimulus.

71. The analyzer apparatus according to claim 70, wherein the vibrator consists of, uses, or comprises, a vibration motor, a linear actuator, or an off-center motor.

72. The analyzer apparatus according to claim 1, further comprising a line driver or a transceiver coupled between the connector and the processor for transmitting digital data to, the multiple devices over the medium, wherein the acting comprises transmitting to the medium using the respective line driver or transceiver.

73. The analyzer apparatus according to claim 72, wherein the acting comprises continuously transmitting an energy, a signal, or a bit-stream, to the medium, for disabling any communication between any of the multiple devices over the medium.

74. The analyzer apparatus according to claim 72, wherein the acting comprises continuously transmitting frames or packets to the medium, for disabling any communication between any of the multiple devices over the medium.

* * * * *

UNITED STATES PATENT AND TRADEMARK OFFICE
CERTIFICATE OF CORRECTION

PATENT NO. : 11,055,615 B2
APPLICATION NO. : 16/464307
DATED : July 6, 2021
INVENTOR(S) : Gil Litichever et al.

It is certified that error appears in the above-identified patent and that said Letters Patent is hereby corrected as shown below:

In the Claims

In Column 146, Line 39, Claim 8, "packet" should be – packets –;
In Column 146, Line 44, Claim 8, "the ground" should be – a ground –;
In Column 146, Lines 61-62, Claim 13, "the sampling rate" should be – a sampling rate –;
In Column 147, Line 62, Claim 29, "the global" should be – a global –;
In Column 148, Lines 13-14, Claim 34, "the amplitude" should be – an amplitude –;
In Column 148, Line 14, Claim 34, "the peak" should be – a peak –;
In Column 148, Lines 14-15, Claim 34, "the overshoot" should be – an overshoot –;
In Column 148, Line 15, Claim 34, "the ringback" should be – a ringback –;
In Column 148, Lines 25-26, Claim 37, "the amplitude" should be – an amplitude –;
In Column 148, Line 26, Claim 37, "the amplitude" should be – an amplitude –;
In Column 148, Line 38, Claim 41, "claim 18" should be – claim 40 –;
In Column 148, Line 59, Claim 46, "the" should be added after the word "forming";
In Column 148, Line 64, Claim 47, "points" should be – point –; and
In Column 148, Line 66, Claim 48, "the global" should be – a global –.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*